(12) United States Patent
Kapoor et al.

(10) Patent No.: US 8,135,657 B2
(45) Date of Patent: *Mar. 13, 2012

(54) SYSTEMS AND METHODS FOR PROCESSING DATA FLOWS

(75) Inventors: Harsh Kapoor, Boxborough, MA (US); Moisey Akerman, Upton, MA (US); Stephen D. Justus, Portland, OR (US); John C. Ferguson, Harvard, MA (US); Yevgeny Korsunsky, Waban, MA (US); Paul S. Gallo, Newton, MA (US); Charles Ching Lee, Ashland, MA (US); Timothy M. Martin, Westford, MA (US); Chunsheng Fu, Amesbury, MA (US); Weidong Xu, Westford, MA (US)

(73) Assignee: Crossbeam Systems, Inc., Boxborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/216,739

(22) Filed: Aug. 24, 2011

(65) Prior Publication Data

US 2012/0017262 A1   Jan. 19, 2012

Related U.S. Application Data

(63) Continuation of application No. 11/926,292, filed on Oct. 29, 2007, now Pat. No. 8,010,469, which is a continuation-in-part of application No. 11/610,296, filed on Dec. 13, 2006, and a continuation-in-part of application No. 11/174,181, filed on Jul. 1, 2005, now Pat. No. 8,046,465, and a continuation-in-part of application No. 11/173,923, filed on Jul. 1, 2005, now Pat. No. 7,836,443.

(60) Provisional application No. 60/749,915, filed on Dec. 13, 2005, provisional application No. 60/750,664, filed on Dec. 14, 2005, provisional application No. 60/795,886, filed on Apr. 27, 2006, provisional application No. 60/795,885, filed on Apr. 27, 2006, provisional application No. 60/795,708, filed on Apr. 27, 2006, provisional application No. 60/795,712, filed on Apr. 27, 2006, provisional application No. 60/795,707, filed on Apr. 27, 2006.

(51) Int. Cl.
*G06F 17/00* (2006.01)

(52) U.S. Cl. .................. 706/45; 726/11; 726/22

(58) Field of Classification Search .............. 706/45
See application file for complete search history.

(56) References Cited

U.S. PATENT DOCUMENTS

| | | | |
|---|---|---|---|
| 5,062,037 A | 10/1991 | Shorter et al. | |
| 5,134,691 A * | 7/1992 | Elms | 709/209 |
| 5,276,899 A | 1/1994 | Neches | |
| 5,446,680 A | 8/1995 | Sekiya et al. | |
| 5,522,070 A * | 5/1996 | Sumimoto | 718/104 |
| 5,557,742 A * | 9/1996 | Smaha et al. | 726/22 |
| 5,621,889 A * | 4/1997 | Lermuzeaux et al. | 726/22 |
| 5,675,797 A | 10/1997 | Chung et al. | |
| 5,771,234 A * | 6/1998 | Wu et al. | 370/396 |
| 5,774,668 A * | 6/1998 | Choquier et al. | 709/223 |
| 5,790,176 A | 8/1998 | Craig | |
| 5,867,716 A * | 2/1999 | Morimoto et al. | 713/310 |
| 5,872,779 A | 2/1999 | Vaudreuil | |
| 5,975,945 A | 11/1999 | Daoud | |
| 5,978,843 A * | 11/1999 | Wu et al. | 709/219 |
| 6,006,264 A * | 12/1999 | Colby et al. | 709/226 |
| 6,014,700 A | 1/2000 | Bainbridge et al. | 709/226 |
| 6,058,434 A * | 5/2000 | Wilt et al. | 719/310 |
| 6,064,723 A | 5/2000 | Cohn et al. | |
| 6,067,546 A | 5/2000 | Lund | |
| 6,088,804 A * | 7/2000 | Hill et al. | 726/25 |
| 6,092,218 A * | 7/2000 | Liddell et al. | 714/11 |
| 6,167,428 A * | 12/2000 | Ellis | 709/201 |
| 6,182,123 B1 | 1/2001 | Filepp et al. | |
| 6,226,700 B1 * | 5/2001 | Wandler et al. | 710/312 |
| 6,279,028 B1 * | 8/2001 | Bradshaw et al. | 709/201 |
| 6,314,463 B1 | 11/2001 | Abbott et al. | |
| 6,317,775 B1 | 11/2001 | Coile et al. | |
| 6,321,338 B1 * | 11/2001 | Porras et al. | 726/25 |
| 6,347,398 B1 | 2/2002 | Parthasarathy et al. | |
| 6,370,648 B1 * | 4/2002 | Diep | 726/22 |
| 6,393,569 B1 | 5/2002 | Orenshteyn | |
| 6,405,246 B1 | 6/2002 | Hutchison | |
| 6,411,986 B1 | 6/2002 | Susai et al. | |
| 6,430,570 B1 | 8/2002 | Judge et al. | |
| 6,442,599 B1 * | 8/2002 | DuLac et al. | 709/217 |
| 6,446,109 B2 | 9/2002 | Gupta | |
| 6,466,965 B1 | 10/2002 | Chessell et al. | |
| 6,519,703 B1 * | 2/2003 | Joyce | 726/22 |

| | | | |
|---|---|---|---|
| 6,578,066 B1 | 6/2003 | Logan et al. | |
| 6,597,684 B1 | 7/2003 | Gulati et al. | |
| 6,708,212 B2 * | 3/2004 | Porras et al. | 709/224 |
| 6,728,808 B1 * | 4/2004 | Brown | 710/107 |
| 6,735,206 B1 | 5/2004 | Oki et al. | |
| 6,769,066 B1 * | 7/2004 | Botros et al. | 726/23 |
| 6,816,903 B1 | 11/2004 | Rakoshitz et al. | |
| 6,999,952 B1 * | 2/2006 | Pham | 706/33 |
| 7,013,333 B1 | 3/2006 | Skells | |
| 7,023,825 B1 | 4/2006 | Haumont et al. | |
| 7,062,556 B1 | 6/2006 | Chen et al. | |
| 7,069,293 B2 | 6/2006 | Cox et al. | |
| 7,133,365 B2 * | 11/2006 | Klinker et al. | 370/238 |
| 7,237,264 B1 * | 6/2007 | Graham et al. | 726/23 |
| 7,260,846 B2 * | 8/2007 | Day | 726/23 |
| 7,305,492 B2 * | 12/2007 | Bryers et al. | 709/249 |
| 7,458,094 B2 * | 11/2008 | Jackson | 726/2 |
| 7,464,264 B2 * | 12/2008 | Goodman et al. | 713/154 |
| 7,516,227 B2 * | 4/2009 | Cohen | 709/228 |
| 7,574,740 B1 * | 8/2009 | Kennis | 726/22 |
| 7,577,623 B2 | 8/2009 | Genty et al. | |
| 7,836,443 B2 | 11/2010 | Akerman et al. | |
| 7,913,303 B1 * | 3/2011 | Rouland et al. | 726/23 |
| 7,921,204 B2 * | 4/2011 | Wilson et al. | 709/224 |
| 7,934,254 B2 * | 4/2011 | Graham | 726/22 |
| 7,979,368 B2 | 7/2011 | Kapoor et al. | |
| 8,010,469 B2 | 8/2011 | Kapoor et al. | |
| 8,046,465 B2 | 10/2011 | Ferguson et al. | |
| 8,059,533 B2 * | 11/2011 | Andreasen et al. | 370/230 |
| 2001/0003831 A1 | 6/2001 | Boland | |
| 2002/0165947 A1 | 11/2002 | Akerman et al. | |
| 2003/0051026 A1 | 3/2003 | Carter et al. | |
| 2003/0051195 A1 * | 3/2003 | Bosa et al. | 714/43 |
| 2004/0025044 A1 | 2/2004 | Day | |
| 2004/0225895 A1 | 11/2004 | Mukherjee et al. | |
| 2005/0076228 A1 | 4/2005 | Davis | |
| 2005/0081058 A1 | 4/2005 | Chang et al. | |
| 2006/0020595 A1 * | 1/2006 | Norton et al. | 707/6 |
| 2006/0272013 A1 | 11/2006 | Kilgore | |
| 2007/0180449 A1 * | 8/2007 | Croft et al. | 718/1 |
| 2007/0192863 A1 * | 8/2007 | Kapoor et al. | 726/23 |
| 2008/0133517 A1 | 6/2008 | Kapoor et al. | |
| 2008/0133518 A1 | 6/2008 | Kapoor et al. | |
| 2008/0134330 A1 | 6/2008 | Kapoor et al. | |
| 2008/0162390 A1 | 7/2008 | Kapoor et al. | |
| 2008/0229415 A1 | 9/2008 | Kapoor et al. | |
| 2008/0262990 A1 * | 10/2008 | Kapoor et al. | 706/20 |
| 2008/0262991 A1 | 10/2008 | Kapoor et al. | |
| 2010/0042565 A1 | 2/2010 | Akerman | |

FOREIGN PATENT DOCUMENTS

| | | |
|---|---|---|
| EP | 0648038 | 4/1995 |
| EP | 0690376 | 1/1996 |
| WO | WO-2007070838 A2 | 6/2007 |
| WO | WO-2007070838 A3 | 6/2007 |

OTHER PUBLICATIONS

Lee, et al., "A framework for constructing features and models for intrusion detection systems ACM Transactions on Information and System Security (TISSEC)", vol. 3, Issue 4 Nov. 2000, 227-261.

Mourad, Antoine et al., "Scalable web Server Architectures", Computers and Communications, 1997 Proceedings., Second IEEE Symposium in Alexandria, Egypt & Los Angeles, CA, USA IEEE Computer Society, US Jul. 1, 1997, pp. 12-16.

"U.S. Appl. No. 11/173,923, Notice of Allowance mailed Sep. 7, 2010", 25.

"European Search Report", Application # 01971331.2 Jul. 28, 2010, all.

Lei, J. Z., "Network intrusion detection using an improved competitive learning neural network", Communication Networks and Services Research, 2004. Proceedings. Secon D, D Annual Conference on Freeericton May 19, 2004, 190-197 pgs.

Intl. Searching Authority, "PCT Search Report", for US Patent Application No. PCT/US06/62053 Apr. 21, 2008.

Huff, J. et al., "Hierarchical Kohonenen Net for Anomaly Detection in Network Security", IE EE Transactions on Systems, Man and Cybernetics. Part B:Cybernetics, IEEE, Service Center, vol. 35, No. 2, Apr. 1, 2005.

Lan, Youran, "A Dynamic Central Scheduler Load Balancing Mechanism", Computers and Communications, 1995, Conference Proceedings of the 1995 IEEE Fourteenth Annual International Phoenix conference in Scottsdale, AZ, USA Mar. 28-31, 1995, 734-740.

Tsai, et al., "Complexity of gradient projection method for optimal routing in data networks", IEEE Press, vol. 7, Issue 6 1999, 897-905.

Debar, H. B. et al., "A Neutral Network Component for an intrusion Detection System", IEEE Computer Society 1992, 240.

"U.S. Appl. No. 11/174,181, NFOA (Oct. 14, 2008)", U.S. Appl. No. 11/174,181 OARN Oct. 14, 2008, 18pgs.

"U.S. Appl. No. 11/877,819, Non-Final Office Action mailed Oct. 13, 2010", 22 pgs.

"U.S. Appl. No. 11/877,801, Non-Final Office Action mailed Oct. 12, 2010", 19 pgs.

"U.S. Appl. No. 11/173,923, Non-Final Office Action mailed Feb. 19, 2009", , 25 pgs.

"U.S. Appl. No. 11/173,923, Non-Final Office Action mailed Jun. 23, 2008.", OARN, 22 pgs.

"U.S. Appl. No. 11/174,181, Non Final Office Action mailed Oct. 7, 2009", , 16.

"U.S. Appl. No. 11/174,181, Notice of Allowance mailed Jul. 12, 2011", , 15.

"U.S. Appl. No. 11/174,181, Non-Final Office Action mailed Feb. 17, 2011", , 17.

"U.S. Appl. No. 11/610,296 Final Office Action mailed Feb. 17, 2011", , 14.

"U.S. Appl. No. 11/610,296, Non-Final Office Action mailed Jun. 10, 2010", , 16.

"U.S. Appl. No. 11/877,792, Non-Final Office Action mailed Mar. 14, 2011", , 11.

"U.S. Appl. No. 11/877,792, Non-Final Office Action mailed Mar. 12, 2010", , 12.

"U.S. Appl. No. 11/926,292 Non-Final Office Action mailed Jul. 8, 2010", , 17 Pgs.

"U.S. Appl. No. 11/926,307, Notice of Allowance mailed Mar. 18, 2011", , 10.

"U.S. Appl. No. 11/926,311, Non-Final Office Action mailed Sep. 20, 2010", , 8.

"U.S. Appl. No. 11/173,923, Final Office Action mailed Jan. 13, 2010", , 32 Pgs.

"U.S. Appl. No. 11/174,181, Final Office Action mailed May 19, 2009", 15 pgs.

"U.S. Appl. No. 11/174,181, Final Office Action mailed Apr. 29, 2010", , 19.

"U.S. Appl. No. 11/877,801, Final Office Action mailed Mar. 4, 2011", , 15.

"U.S. Appl. No. 11/877,813, Final Office Action mailed Nov. 17, 2010", , 14.

"U.S. Appl. No. 11/877,819, Final Office Action mailed Feb. 28, 2011", , 19.

"U.S. Appl. No. 11/926,292, Notice of Allowance mailed Jun. 24, 2011", , 13.

"U.S. Appl. No. 12/980,714, Non-Final Office Action mailed Aug. 19, 2011", , 7.

"ISR for PCT/US01/29885 (Mail date Oct. 27, 2003)", related matter.

* cited by examiner

*Primary Examiner* — Jeffrey A Gaffin
*Assistant Examiner* — David H Kim
(74) *Attorney, Agent, or Firm* — Strategic Patents, P.C.

(57) ABSTRACT

A flow processing facility, which uses a set of artificial neurons for pattern recognition, such as a self-organizing map, in order to provide security and protection to a computer or computer system supports unified threat management based at least in part on patterns relevant to a variety of types of threats that relate to computer systems, including computer networks. Flow processing for switching, security, and other network applications, including a facility that processes a data flow to address patterns relevant to a variety of conditions are directed at internal network security, virtualization, and web connection security. A flow processing facility for inspecting payloads of network traffic packets detects security threats and intrusions across accessible layers of the IP-stack by applying content matching and behavioral anomaly detection techniques based on regular expression matching and self-organizing maps. Exposing threats and intrusions within packet payload at or near real-time rates enhances network security from both external and internal sources while ensuring security policy is rigorously applied to data and system resources. Intrusion Detection and Protection (IDP) is provided by a flow processing facility that processes a data flow to address patterns relevant to a variety of types of network and data integrity threats that relate to computer systems, including computer networks.

19 Claims, 31 Drawing Sheets

Fig. 11

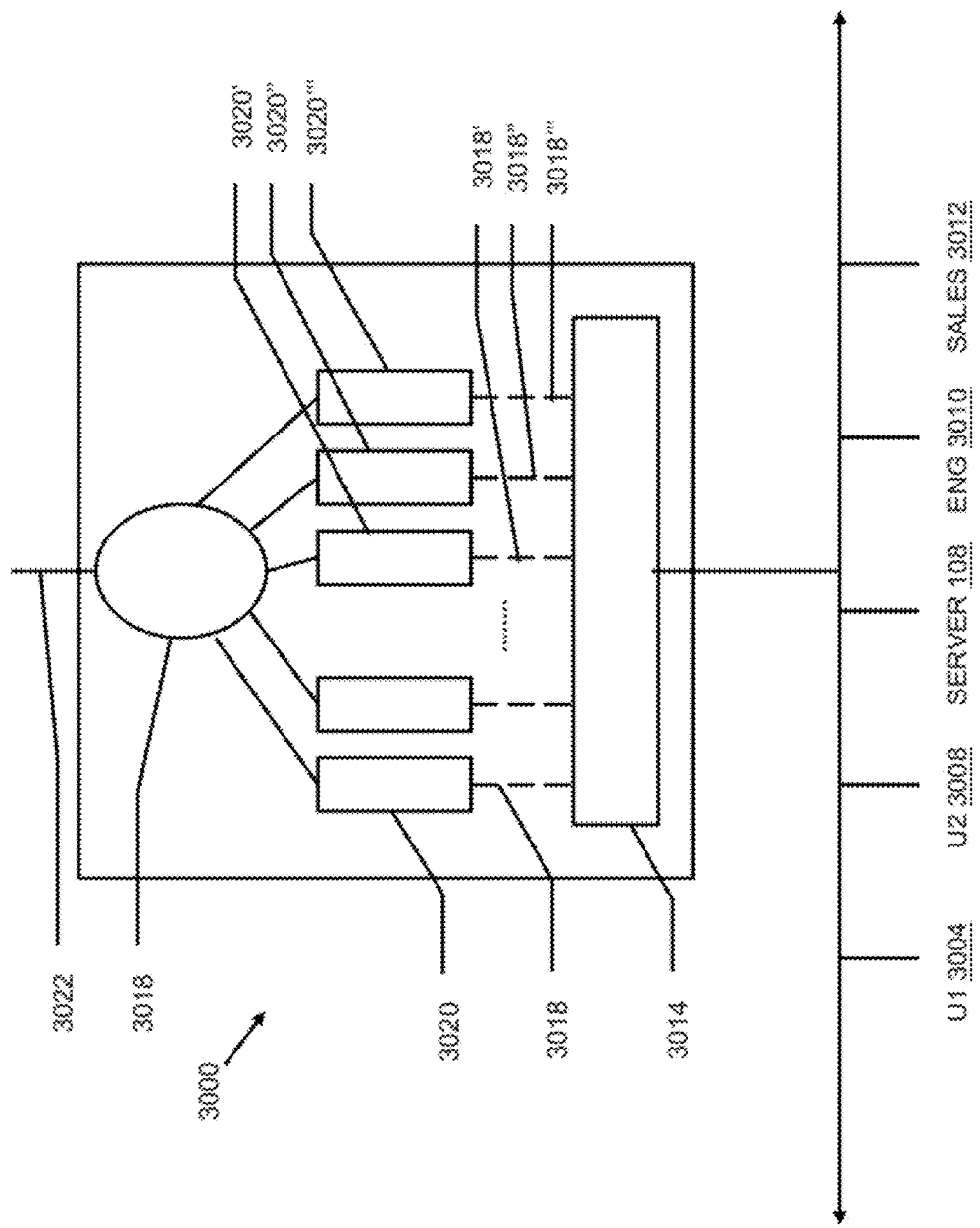

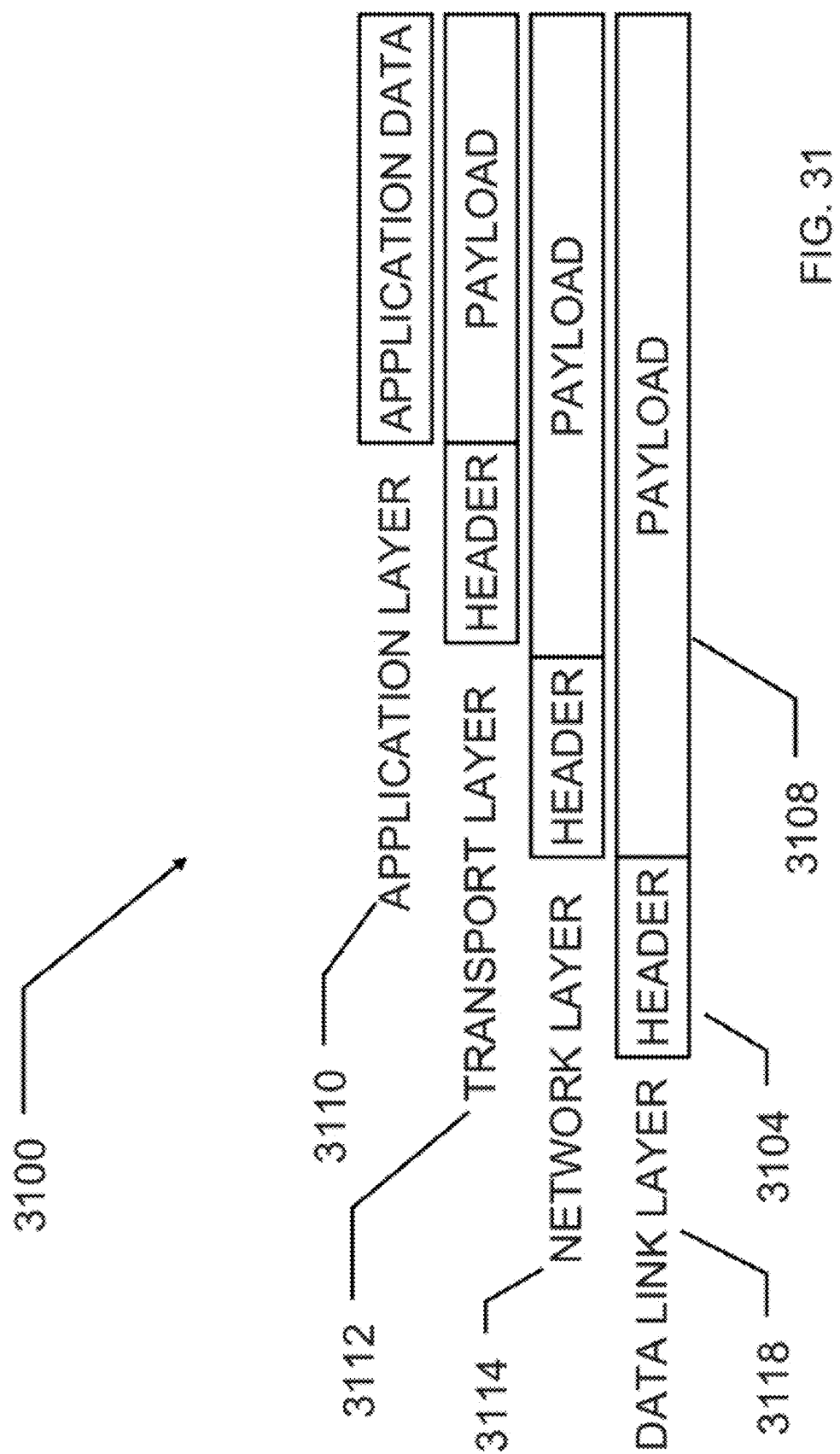

SYSTEMS AND METHODS FOR PROCESSING DATA FLOWS

CROSS-REFERENCE TO RELATED APPLICATIONS

This application is a continuation of U.S. patent application Ser. No. 11/926,292 filed on Oct. 29, 2007 and entitled "SYSTEMS AND METHODS FOR PROCESSING DATA FLOWS", which is a continuation-in-part of U.S. patent application Ser. No. 11/610,296 filed on Dec. 13, 2006 entitled "SYSTEMS AND METHODS FOR PROCESSING DATA FLOWS", each of which is hereby incorporated by reference in its entirety.

Application Ser. No. 11/610,296 claims the benefit of the following provisional applications, each of which is hereby incorporated by reference in its entirety: U.S. App. No. 60/749,915 filed on Dec. 13, 2005 and entitled "HIGH SPEED PATTERN MATCHING"; U.S. App. No. 60/750,664 filed on Dec. 14, 2005 and entitled "USING NEURAL NETWORKS TO DETECT ANOMALOUS COMMUNICATIONS FLOWS"; U.S. App. No. 60/795,886 filed on Apr. 27, 2006 and entitled "SYSTEM AND METHODS OF FLOW PROCESSING FOR UNIFIED THREAT MANAGEMENT"; U.S. App. No. 60/795,885 filed on Apr. 27, 2006 and entitled "SYSTEM AND METHODS OF FLOW PROCESSING FOR VIRUS PROTECTION"; U.S. App. No. 60/795,708 filed on Apr. 27, 2006 and entitled "SYSTEMS AND METHODS FOR FLOW PROCESSING"; U.S. App. No. 60/795,712 filed on Apr. 27, 2006 and entitled "SYSTEM AND METHODS OF FLOW PROCESSING WITH MACHINE LEARNING"; and U.S. App. No. 60/795,707 filed Apr. 27, 2006 and entitled "SYSTEMS AND METHODS OF FLOW PROCESSING FOR NETWORK FIREWALLS".

Application Ser. No. 11/610,296 is a continuation-in-part of the following U.S. patent applications, each of which is incorporated by reference in its entirety: U.S. application Ser. No. 11/174,181 filed on Apr. 24, 2001 and entitled "FLOW SCHEDULING FOR NETWORK APPLICATION APPARATUS," and U.S. application Ser. No. 11/173,923 filed on Apr. 24, 2001 and entitled "NETWORK APPLICATION APPARATUS."

BACKGROUND

1. Field

This invention is in the field of computer security and protection. Specifically, it is in the field of protecting computer systems from viruses, attacks from hackers and other unauthorized intrusions, spyware, spam, phishing and other scams, malicious activities and code.

2. Description of the Related Art

Methods providing security for computer systems have been developed, which address disparate threats to the systems, such threats including computer viruses, attacks by hackers, spyware, phishing, spam, intrusion onto a computer network by unauthorized users, and others. Products have been developed that separately address each of the most prevalent type of threats, and, more recently, those products have been joined together in suites of applications, where each application addresses a different kind of threat. The latter approach, known as unified threat management, offers more comprehensive protection against threats; however, the protection comes at the expense of processing resources, as each application in a unified threat management suite must use such resources.

One type of standalone products, known as firewalls, addresses and protects against these kinds of threats; however, this protection comes either at the expense of processing resources (in cases where a software firewall product must be installed on a server) or at the expense of operational complexity (in cases where the firewall product is embodied in a dedicated network device). A need exists for more convenient and effective firewall techniques.

Methods providing network switching and security services for computer systems have been developed, which address many aspects of networking, internetworking, access control, security, and other such services. Products have been developed that separately provide each of the most needed services. More recently, some of these products have been joined together in suites of applications or monolithic networking hardware, where each application provides a different service or where the hardware is more or less hardwired to provide a set of services. A need exists for improved ways of providing switching and security services.

Network security is also being threatened from ever increasingly sophisticated threats that attack any and all vulnerabilities of network communication systems. Packet switched network communication systems remain vulnerable to security threats in part due to their layered protocol schemes. Detecting and preventing threats and intrusions by inspecting only a packet header does not detect threats that attack application level information transported in and across packets. Therefore, needs exist for improved ways of providing switching and security services for networked environments.

Another need is for better intrusion detection and prevention. Companies' computing systems are more interconnected than ever, with the promise that network expansion will only continue. Companies depend upon the Internet for additional business-critical activities like supply chain integration, long-distance communications, and remote site connectivity. While this helps boost productivity, each Internet-based endeavor potentially opens another door to outside hackers and malicious code attacks. Companies are also faced with legal and ethical responsibility of their information and network security. Regulatory statues such as HIPAA (Health Insurance Portability and Accountability) further require comprehensive network security. As a result, companies must grapple with how to keep their network safe, without sacrificing growth or productivity.

Systems that provide only intrusion detection may have substantial drawbacks in this environment including false alarms, low manageability, high maintenance, and no prevention of attacks. False alarms may manifest as large quantities of records that require manual filtering, a costly and error prone process. An intrusion detection system that requires substantial time and effort to maintain detection sensors, security policies, and intrusion lists may contribute to poor intrusion detection.

A need exists for more effective unified threat management techniques, including techniques that address critical types of threats. Critical threats include, for example, viruses, network security holes, network communications, content inspection, intrusions, and other attacks that can be blocked by firewalls.

SUMMARY

Provided herein are methods and systems for unified threat management, including unified threat management using a flow processing facility that processes a data flow to address patterns relevant to a variety of types of threats that relate to computer systems, including computer networks. The flow processing facility may use a set of artificial neurons for pattern recognition, such as a self-organizing map.

This disclosure describes unified threat management methods and systems in which disparate threat management methods are implemented in a single flow processing architecture. In embodiments, the flow processing architecture may use a set of artificial neurons, such as a self-organizing map (SOM) or neural net, to process data flows, wherein the set of artificial neurons enables recognition of patterns that are relevant to identifying threats of disparate types, including threats relevant to intrusion detection, intrusion protection, anti-virus protection, anti-spyware protection, and anti-spam protection, as well as other types of threats, such as related to phishing or unauthorized use of computer network resources.

The methods and systems disclosed herein for securing a computer resource include methods systems for providing a flow processing facility for processing a data flow, and configuring the flow processing facility to recognize patterns in the data flow, wherein the patterns are relevant to recognition of the presence of at least two of a virus, a spam communication, a hacker's attack, spyware, and intrusion on a computer network and wherein the flow processing facility recognizes patterns using a set of artificial neurons. In embodiments, the patterns are relevant to recognition of a virus and a spam communication. In embodiments, the patterns are relevant to recognition of a virus and a hacker's attack. In embodiments, the patterns are relevant to recognition of a virus and spyware. In embodiments, the patterns are relevant to recognition of a virus and intrusion on a computer network. In embodiments, the patterns are relevant to recognition of a spam communication and a hacker's attack. In embodiments, the patterns are relevant to recognition of a spam communication and spyware. In embodiments, the patterns are relevant to recognition of a spam communication and intrusion on a computer network. In embodiments, the patterns are relevant to recognition of a hacker's attack and spyware. In embodiments, the patterns are relevant to recognition of a hacker's attack and intrusion on a computer network. In embodiments, the patterns are relevant to recognition of spyware and intrusion on a computer network. In embodiments, the set of artificial neurons is a self-organizing map or a neural network.

Provided are systems and methods relating to an architecture of a flow processing facility, including hardware configurations, process flows and data flows. The flow processing facility may include a machine-learning algorithm for characterizing the data flows. The machine-learning algorithm may include a set of artificial neurons, such as and without limitation a SOM. The architecture may be composed of modules, such as a control processor, a network processor, an application processor, a chassis, and so forth. The flow processing facility may provide switching, security, and other network applications.

The flow processing facility may provide a network service by processing a data flow, recognizing patterns in the data flow, receiving the data flow from a network interface, characterizing the data flow within a data flow engine, and routing the data flow. Characterizing the data flow may be achieved with the aid of a set of artificial neurons. Routing the data flow may be associated with a result of characterizing the data flow. The network interface may be a computer network, which may consist of an internetwork, an intranet, a VPN, a personal computer, a computer resource, and so forth. The network interface may be a wireless network or a telecommunications network. The data flow engine may be associated with an application processor module, which may include an application. The data flow engine may include a data flow processor, which may include a machine learning logic facility, a machine learning acceleration hardware, a content search logic, and so forth. The data flow engine may include a cell generator, a cell router, and so forth. The cell router may be associated with an application processor module, which itself may include an application.

External web access to information on a network is critical to the efficient and effective workings of enterprises. Employees, partners, customers, and remote users need timely access using a wide variety of communication methods and devices from all locations. Additionally, the confidentially and integrity of network resources such as intellectual property, competitively advantaged data, regulated or personal data must be maintained in this open environment. However, threats of attack, intrusion, and espionage may come in a wide variety of forms such as spyware, keystroke loggers, and Trojans, while malware such as worms and viruses must also be detected and prevented.

Network security management involves balancing a complex array of network participant needs. Internal and external users have preferences and needs for effective productivity, while the corporation has needs for data integrity and expandability. There are regulatory needs for confidential and financial data protection that must be balanced against client (customer) needs for timely access to information about products and services (including financial transactions). These needs are also to be balanced against protecting network integrity and reliability from threats from external (internet) and internal users. Providing a network security solution that effectively delivers all of one participant's access needs may impose constraints on one or many other participants' needs such as making critical aspects of the network vulnerable to intrusions.

Since all, or nearly all of the data accessed and used by internal users, external users, clients, servers, vendors, and the like passes through an organization's network, segmenting the network to address the various needs of the network participants can be costly because of the substantial expense associated with hardware security facilities. Also, segmenting may not relieve the constraints sufficiently to justify this expense. In addition, management of a myriad of segmented, network management devices increases complexity which may create new opportunities for segments being vulnerable to intrusion.

While physically separating network participants is neither practical nor in most cases possible while still delivering effective business solutions through the network, separation of aspects of a network security management system may be beneficial. An approach to allow managed separation of aspects of a network security system based on participant criteria may include virtualization of the network. Network virtualization may allow one or more participants (or participant types) to be logically connected to the network through a virtual network connection within a network security system such as the flow processing facility.

Network security may address both external threats and internal threats. Attacks from internal resources that may be properly authenticated to connect to a network may include laptops, smart mobile devices, PDS, and other devices that may reconnect to the network throughout the work day. Any threat that propagates from one networked client to another may be introduced from an infected client within a network.

This application describes a flow processing facility used in computer security with particular embodiments relating to content inspection. Referring generally to the present invention, in a networked computer environment using packet switching communication, network security policies may be enforced by inspecting a packet and, as necessary, responding to a result of the packet inspection. The packet inspection may be directed at a header of the packet and/or a payload of the packet. Such packet inspection may be performed at any and all layers of a network communication protocol stack (such as and without limitation the Internet Protocol stack). Inspecting the payload of the packet may be referred to as "deep packet inspection" or "payload inspection." In any case, any and all packet inspection may be directed at the inspection of data that encompasses a packet or flow of packets. A flow processing facility may facilitate inspecting the content of packet payloads using content matching, behavioral anomaly detection, a combination of both, and so on.

This application describes another flow processing facility used in computer security with particular embodiments relating to threats posed by computer viruses. Disclosed herein are various embodiments of anti-virus methods, systems, techniques and applications, including ones in which ISP provides anti-virus protection to all of its customers via a flow processing facility.

Provided herein are methods and systems for routing normalized data from a data flow to an antivirus facility for security screening of data flow patterns, wherein the recognition of patterns is accomplished with the aid of a set of artificial neurons. In embodiments, the network interface is to a computer network, an internet, an intranet, a VPN, a personal computer, a computer resource, a wireless network, or a telecommunications network. In embodiments, the data flow engine is associated with an application processor module. In embodiments, the application processor module includes an antivirus application. In embodiments, the data flow engine includes a data flow processor. In certain embodiments, the data flow processor includes a machine learning logic facility, which may include one or more artificial neurons, such as using a SOM or a neural network. In embodiments, the data flow processor includes a machine learning acceleration hardware. In embodiments, the data flow processor includes a content search logic facility. In embodiments, the data flow engine includes a cell generator and/or a cell router. In embodiments, the cell router is associated with an application processor module. In embodiments, the application processor module includes or enables an antivirus application. In embodiments, normalized data is produced using a set of artificial neurons. In embodiments, the set of artificial neurons is associated with a data flow processor. In embodiments, the antivirus facility is associated with, incorporates, or is incorporated in an application processor module. In embodiments, the antivirus facility is associated with a security policy. In embodiments, security screening includes removal of a virus, quarantining suspect code, sending an alert, triggering a security action (such as updating security policy or configuring security hardware) or the like.

The methods and systems disclosed herein include methods and systems for securing a computer resource, which include methods in systems for providing a flow processing facility for processing a data flow, and configuring the flow processing facility to recognize patterns in the data flow, wherein the patterns are relevant to recognition of a threat, such as related to a virus or other threat. In embodiments, the flow processing facility recognizes patterns using a set of artificial neurons. In embodiments, the patterns are relevant to recognition of a virus and a spam communication. In embodiments, the patterns are relevant to recognition of a virus and a hacker's attack. In embodiments, the patterns are relevant to recognition of a virus and spyware. In embodiments, the patterns are relevant to recognition of a virus and intrusion on a computer network. In embodiments, the patterns are relevant to recognition of a spam communication and a hacker's attack. In embodiments, the patterns are relevant to recognition of a spam communication and spyware. In embodiments, the patterns are relevant to recognition of a spam communication and intrusion on a computer network. In embodiments, the patterns are relevant to recognition of a hacker's attack and spyware. In embodiments, the patterns are relevant to recognition of a hacker's attack and intrusion on a computer network. In embodiments, the patterns are relevant to recognition of spyware and intrusion on a computer network. In embodiments, the set of artificial neurons is a self-organizing map or a neural network.

Also provided herein are methods and systems for providing a firewall, including using a flow processing facility that processes a data flow to address patterns relevant to a variety of types of threats that relate to computer systems, including computer networks. The flow processing facility may use a set of artificial neurons for pattern recognition, such as a self-organizing map.

This disclosure describes firewall methods and systems in which disparate threat management methods are implemented in a single flow processing architecture. In embodiments, the flow processing architecture may use a set of artificial neurons, such as a SOM to process data flows, wherein the SOM enables recognition of patterns that are relevant to identifying threats of disparate types, including threats relevant to attacks by hackers, network traffic from malfunctioning computing resources, as well as other types of threats, such as related to unauthorized use of computer network resources.

The methods and systems relating to a firewall disclosed herein include methods and systems for securing a computer resource, which include methods in systems for providing a flow processing facility configured as a flow processing facility to recognize patterns in the data flow, wherein the patterns are relevant to associating the data flow with a firewall application and wherein the flow processing facility recognizes patterns using a set of artificial neurons. In embodiments, the patterns are relevant to recognition of recognition a hacker's attack, a malformation of the dataflow, or a malfunctioning computing resource, or any combination of the foregoing. In embodiments, the set of artificial neurons is a SOM.

This application describes a flow-processing switch used in network firewall applications. Firewall applications are described in detail, including an example of a network firewall that provides protection against malformed and non-compliant data packets and malicious attacks.

This application also includes methods and systems for an intrusion detection and prevention system. An intrusion detection and prevention system may include any system or method used to keep attackers from gaining access to a network, resources on the network, data on the network, or communication pathways into and out of the network. In a simplified form, intrusion detection and prevention may be embodied as a firewall or as anti-virus software. Intrusion detection and prevention may also provide defense against internal network attacks and help enforce corporate security policies. Additionally, intrusion detection and prevention may detect and prevent misuse from authorized users of a network by enforcing corporate security policies.

Intrusions, alternatively called attacks, are becoming more sophisticated such that many intrusions are now a blend of attack methods. Blended attacks may employ a variety of methods (e.g. spam, malware, phishing) simultaneously to compromise security of systems, and spread in a multitude of ways (via e-mail, Web, IM, P2P, even wireless devices).

Intrusion detection and prevention may be considered a layered security infrastructure that can identify and stop network and application-level attacks before they inflict any damage by providing detection and prevention capabilities that result in network operational and financial benefits.

In an aspect of the invention, methods and systems in a flow processing facility for securing a computer resource may include receiving a data flow; employing a set of artificial neurons to make a determination, the determination indicating which of a plurality of patterns is present in the data flow; accessing a configuration, the configuration associating zero or more actions with each pattern of the plurality of patterns; executing the actions that are associated with the patterns that the determination indicates, the actions modifying the data flow; and transmitting the data flow.

In the methods and systems the patterns may be relevant to one or more of recognition of a virus, a spam communication, a hacker's attack, recognition of a virus, spyware, and intrusion on a computer network.

In the methods and systems, the set of artificial neurons may be a self-organizing map.

In another aspect of the invention, methods and systems in a flow processing facility for providing a network service may include receiving data flow; making a characterization of the data flow, the characterization being made by a set of artificial neurons; and routing the data flow in response to the characterization. In the methods and systems, the network service may be a security service that may include one or more of an anti-virus, anti-spam, hacker attack prevention, spyware prevention, intrusion detection, and intrusion prevention.

In the methods and systems, making a characterization may include inspecting content of the data flow, or analyzing a behavior of the data flow. The data flow may include data packets. Characterization may include inspecting a payload of the data packets.

In another aspect of the invention, methods and systems of securing a computer resource may include a flow processing facility for processing a data flow; a configuration facility adapted to configure the flow processing facility to recognize patterns in the data flow, wherein the recognition of patterns is accomplished with the aid of a set of artificial neurons; a receiving facility adapted to receive a data flow from a network interface to a data flow engine; a facility adapted to characterize from the data flow within the data flow engine; and a routing facility adapted to route the data flow, wherein characterizing the data flow is achieved with the aid of a set of artificial neurons and wherein routing is associated with a result of characterizing the data flow.

In the methods and systems, the network interface may be a wireless network, a telecommunications network, or a computer network such as an internet network, an intranet, a VPN, a personal computer, or a computer resource.

In the methods and systems, the data flow engine may be associated with an application processor module. The application processor module may include an antivirus application, or a data flow processor. The data flow processor may include a machine learning logic facility, a machine learning accelerator hardware, a search content logic facility. In the methods and systems, the data flow engine may include a cell generator, a cell router that may be associated with an application processor module that may include an antivirus application.

In another aspect of the invention, methods and systems for securing a computer resource in a flow processing facility may include receiving a data flow; creating a normalization of the data flow; and routing the normalization to an antivirus facility. The methods and systems may further include processing the normalized data flow using content inspection. In the methods and systems, the antivirus facility may be embodied in the flow processing facility. In the methods and systems a normalization of the data flow may include normalizing one or more of data packet headers, data packet payloads, protocols, data flow behaviors, data flow packet arrival time, and data flow packet size. Normalization may be expressed in terms of standard deviations of measurement of features of the data flow, or as a statistical measure or a result of a mathematic calculation. Normalization may also be associated with neural networks that are applied to the data flow within the antivirus facility.

In another aspect of the system, a flow processing facility for securing a computer resource may include a management facility adapted to configure the flow processing facility to recognize patterns in a data flow, wherein the recognition of patterns is accomplished with the aid of a set of artificial neurons; a receive port for receiving the data flow from a network interface to a data flow engine; a normalization facility for producing normalized data from the data flow within the data flow engine; and a routing facility adapted to route the normalized data to an antivirus facility for security screening of data flow patterns. In the methods and systems, the network interface may be a wireless network, a telecommunications network, or a computer network such as an internet network, an intranet, a VPN, a personal computer, or a computer resource.

In the methods and systems, the data flow engine may be associated with an application processor module. The application processor module may include an antivirus application, or a data flow processor. The data flow processor may include a machine learning logic facility, a machine learning accelerator hardware, a search content logic facility. In the methods and systems, the data flow engine may include a cell generator, a cell router that may be associated with an application processor module that may include an antivirus application.

In another aspect of the invention, methods and systems in a flow processing facility for securing a computer resource, comprising: receiving a data flow; employing a set of artificial neurons to make a determination, the determination indicating which of a plurality of patterns is present in the data flow, the plurality of patterns being associated with a firewall application; and routing the data flow to the firewall application when the determination indicates that at least one of the plurality of patterns is present in the data flow.

In the methods and systems, the patterns may be relevant to one or more of recognition of a hacker's attack, a malformation of the data flow, recognition of a malfunctioning computer resource. In the methods and systems, the anomaly may be associated with the dataflow. In the methods and systems, the set of artificial neurons may be a self organizing map.

In another aspect of the invention, methods and systems of intrusion detection and prevention of a network may include detecting an intrusion based on a signature or a network anomaly; and preventing the intrusion from propagating to the network.

In another aspect of the invention, methods and systems of intrusion detection and prevention in a network may include providing a flow processing facility in-line with a network firewall; configuring the flow processing facility to detect intrusions that pass through the firewall; routing the detected intrusions to a prevention processor; and taking a preventive action on the detected intrusion such that the data flow of the detected intrusion is not propagated to the network.

In another aspect of the invention, methods and systems of intrusion detection and prevention of a network comprising:

flow processing facility that is configured to detect and prevent intrusions in network data flowing through the facility, the facility comprising a plurality of network ports for connecting network devices for communicating network data; and a data flow processor for associating network data flows with one or more of signatures, process anomaly thresholds, network rate thresholds.

In another aspect of the invention, methods and systems may include a flow processing facility for processing a data flow; a facility adapted to configure the flow processing facility to recognize patterns in the data flow; a receiving facility adapted to receive the data flow in a data flow processor facility; and a facility adapted to produce normalized data based at least in part on at least one of a plurality of machine learning logic associated with the data flow processor facility.

In the methods and systems, the data flow may be associated with a network interface such as a wireless network, a telecommunications network, and a computer network. The computer network may be an internet network, an internet, a VPN, a personal computer, or a computer resource. In the methods and systems the data flow processor may include a machine learning logic facility, a machine learning acceleration hardware, or a content search logic facility.

In the methods and systems, may be at least one of computer code, computer file type, software application type, virus, a spam communication, a hacker's attack, spyware, and intrusion on a computer network and wherein the flow processing facility recognizes patterns using a set of artificial neurons.

In the methods and systems, the normalized data may be produced using a set of artificial neurons or at least one of a set of self organizing maps. The artificial neurons may be associated with a data flow processor.

In another aspect of the invention, methods and systems may include a flow processing facility for processing a data flow, wherein the data flow comprises packets; a plurality of packets, wherein each packet includes a payload; an application processing module of the flow processing facility for inspecting a content of the payload of at least some of the plurality of packets; and a switch matrix for controlling the flow of packets related to the inspected packets based on the inspection.

In the methods and systems, content inspection may include content matching which may include regular expression matching. Content inspection may include using one or more of self organizing maps, using neural networks, using behavioral anomaly detection. Behavioral anomaly detection may include neural networks, or self-organizing maps. Content inspection may be based on one or more action rules or a security policy.

In the methods and systems, content inspection may determine the nature of data in the packet payload. The nature may include one or more of a source of the packet and a data type of the packet. The source may include a website, while the data type may include one or more of audio, video, email, and program executable code. In the methods and systems, the packet may be associated with a layer of a communication protocol such as a network layer, an application layer, and a transport layer.

In another aspect of the invention, methods and systems may include providing a flow processing facility for processing a data flow, wherein the data flow comprises packets; receiving a stream of packets, wherein each packet includes a payload; determining the nature of data in a payload of a first packet; determining the nature of data in a payload of a second packet; comparing the first packet nature to the second packet nature; controlling a flow of the stream based on the comparison.

In the methods and systems, controlling may include marking the packets of the stream, rejecting packets of the stream, redirecting the stream to a secure process, or redirecting the stream to an inspection process with in the flow processing facility.

In another aspect of the invention, methods and systems may include providing a flow processing facility for processing a data flow; determining a behavioral time-history metric of a portion of the data flow; determining a behavioral metric of a current packet related to the portion; comparing the behavioral metric to the time-history metric; and controlling a flow of packets related to the current packet based on the comparison.

In the methods and systems, the time-history metric may be associated with a layer of a communication protocol. In the methods and systems, the portion of the data flow may be related to synchronizing a mobile computing device with a network resource.

In an aspect of the invention, methods and systems may include a network interface for receiving packets; a processor for executing content inspection algorithms; and a network processing module for directing the packets based on a result of the processor executing the content inspection algorithms on the received packets.

In the methods and systems, the flow processing facility may be embodied as a network appliance, a network firewall, or a computer program. The firewall may be embodied as a computer program or a network appliance.

In the methods and systems, the processor may be a COTS processor. The algorithms may be compiled to a native format compatible with the COTS processor, and wherein the compiled algorithms are stored in a memory accessible by the processor. In the methods and systems, the processor may be a special purpose processor, and wherein the algorithms are configured in hardware elements of the processor. The special purpose processor may be an application accelerator. The methods and systems may further include an application accelerator for accelerating processing of the packets.

In another aspect of the system, a methods and systems of a flow processing facility may include a plurality of application processor modules for detecting intrusions in packet payloads, wherein each of the plurality of application processor modules is configured to detect intrusions at a specific network layer; and a switching fabric for routing packets through the plurality of application processor modules so that a packet is processed through at least two processor modules.

In the methods and systems the packet may be replicated by the switching fabric for parallel processing in at least two processor modules. Alternatively, a packet may be processed through a first processor module and then processed through a second processor module of the plurality of processor modules.

In another aspect of the invention, methods and systems of network security may include providing a flow processing facility for processing a data flow, wherein the data flow comprises communication packets; receiving the communication packets, wherein each packet comprises a plurality of protocol layer packet data; processing the packets to determine a corresponding protocol layer for each packet data; and inspecting each packet data according to the corresponding protocol layer inspection rules.

In another aspect of the invention, methods and systems of a firewall facility may include a flow processor for processing network packets being transferred between an intranet port and an extranet port of the firewall; content inspection algorithms executed by the flow processing facility to detect abnormalities in the packets; content strings that define invalid packets; and an application processing module for determining if an abnormal packet is an invalid packet. The methods and systems may include a network processing module for taking action on abnormal or invalid packets. Taking action may include dropping the packets or dropping subsequent packets associated with a stream of the abnormal or invalid packets. In the methods and systems, the content strings may define an invalid application layer packet header, an invalid network layer packet payload, malicious code, one or more computer viruses, or one or more spam campaign packets. The content inspection algorithms may include one or more of behavioral analysis and regular expression matching.

In another aspect of the invention, methods and systems may include providing a flow processing facility for processing a data flow, wherein the data flow comprises routed data packets; providing routing information for the data packets; inspecting the packets to determine a validity for each packet; combining the inspection result with packet routing information into a network behavior; establishing a baseline for network behavior; and comparing ongoing network behavior to the baseline to detect abnormal network behavior in the flow processing facility. The packet routing information may include one or more of a port identifier, a source, a destination, and a route.

In another aspect of the invention, methods and systems of virtual network security may include providing a flow processing facility for processing a data flow; establishing a first security policy for a first virtual network; establishing a second security policy for a second virtual network; and processing the data flow for the first and second virtual networks through the data flow processor, wherein portions of the data flow that are associated with the first virtual network are processed according to the first security policy, and wherein portions of the dataflow that are associated with the second virtual network are processed according to the second security policy. The data flow may be composed of data packets. The portions of the data flow associated with the first virtual network may include the data packets associated with the first virtual network, and wherein the portions of the data flow associated with the second virtual network comprise the data packets associated with the second virtual network.

In the methods and systems, each virtual network may support one or more of an enterprise, individual user, home user, home office user, service provider, security provider, central office, remote office, data provider, university, social club, public facility, library, town offices, state offices, federal offices, and virtual private network. Each security policy may support one or more of unified threat management, intrusion detection, intrusion prevention, intrusion detection and prevention, internet firewall, URL filtering, anti-virus, anti-spam, anti-spyware, http scanning, application firewall, xml firewall, and vulnerability scanning.

In another aspect of the invention, methods and systems of a virtual network security service may include providing a flow processing facility for processing a data flow; establishing a virtual network for a customer; receiving a security policy for the customer receiving a data flow including data packets that are associated with at least the customer; routing the data flow through the flow processing facility; and applying the security policy to data packets that are associated with the customer.

In another aspect of the invention, methods and systems of a virtual internet firewall may include a flow processing facility for processing a data flow; a security policy of a first virtual network; a security policy of a second virtual network; and routing the data flow through the firewall so that the flow processing facility processes the data flow according to the first security policy and according to the second security policy. The methods and systems may further include a management facility. The management facility may update one of the security policy of the first virtual network and the security policy of the second virtual network.

In another aspect of the invention, methods and systems may include providing a plurality of flow processing facilities for processing a data flow; providing a network management facility that is networked with the plurality of flow processing facilities; configuring two or more of the plurality of flow processing facilities into a virtual network; and managing a security policy of the virtual network, wherein the two or more flow processing facilities in the virtual network receive and execute the security policy.

In the methods and systems, managing may include updating two or more flow processing facilities simultaneously. In the methods and systems, each of the two or more flow processing facilities may be connected to different network segments. At least one of the two or more flow processing facilities may be located remotely from the others of the two or more flow processing facilities. Being remotely located may include being connected through the internet.

The methods and system may further include routing portions of the data flow through a switch fabric to each of the two or more flow processing facilities.

In another aspect of the invention, methods and systems of testing network security may include providing a flow processing facility for processing a data flow; providing two virtual networks; configuring the flow processing facility to process the data flow through each of the two virtual networks in parallel; applying an experimental security policy to one of the two virtual networks; and comparing the processing of the data flow through the two virtual networks to test the experimental network security policy.

In another aspect of the invention, methods and systems of network security may include providing a flow processing facility for processing a data flow, wherein the data flow processing facility includes a memory; receiving a data flow into the memory; assembling the data flow into data streams; processing the data stream in the data flow processing facility for detecting network security violations; and preventing the data stream from propagating the security violations to the network.

In the methods and systems the flow processing facility may be embodied as a firewall. The firewall may be embodied as a network appliance. The flow processing facility may be embodied as a program executing on a networked computing facility. Security violations may include intrusion of applications, databases, file systems, operating systems, network communications, and security policies. Detecting may include analyzing system calls, application logs, file-system modifications, server activities, and server states. The networked computing facility may be a network server, a web server, a management server, a client computer, a hub, or a router.

In the methods and systems, detecting may include one or more of packet header inspection, packet payload inspection, content inspection, data stream behavioral anomaly detection, content matching, regular expressing matching, self-organizing maps, misuse algorithms, network protocol analysis, and neural networks. Preventing may include quarantining, dropping packets, dropping a data stream, re-routing packets, re-routing a data stream, URL filtering.

In the methods and systems, receiving may include network transmission from one or more of a firewall, network appliance, network server, network client, a virtual private network, a wireless network, network routers, network hubs, network segments, VoIP ports, users, and web clients.

In the methods and systems, data flow may be comprised of data packets. In these methods and systems, processing may include inspecting one or more of data packet headers, data packet payloads, network layer packets, application layer packets, and transport layer packets.

In another aspect of the invention, methods and systems of network security may include providing a flow processing facility for processing a data flow; receiving a network activity baseline; processing a data flow to calculate a metric of network activity; and comparing the baseline to the metric to detect one or more anomalies in the data flow; preventing an anomalous data flow from propagating an intrusion to the network. Comparing may include protocol analysis which may include low level analysis of the data flow such as analysis of network layer and transport layer protocols. Protocol analysis may alternatively include one or more of packet arrival time stamping, packet filtering, and packet triggering. Arrival time stamping may facilitate detecting anomalies in two or more data flows that are merged together. The metric may include a rate of network activity.

In another aspect of the invention, method and systems of network security may include providing a flow processing facility for processing a data flow; learning a network activity baseline; processing a data flow to calculate a rate of network activity; comparing the learned baseline to the calculated rate to detect one or more anomalies in the data flow; and preventing an anomalous data flow from propagating an intrusion to the network.

In the methods and systems, learning may include using self-organizing maps, using neural net algorithms, or predicting a rate of network activity. The predicted rate may include estimating one or more of total number of data packets, number of IP packets, number of ARP packets, connections/second rate; data packets/connection rate, number of data packets per port.

Methods and systems may further include adjusting the activity baseline based on an aspect of the network.

In the methods and systems, the aspect may be past network activity rates.

In the methods and systems, preventing may include one or more of granular rate-limiting on a specific dimension of an intrusion, source tracking, connection tracking, dark-address filtering, network scan filtering, port scan filtering, legitimate IP address validation, data packet rejection, data stream rejection, alerting, anomaly logging, and rerouting a data stream to a virtual network. Alerting may include one or more of email notification, system logging, snmp output, SMS-external transmission, calling a pager, executing an application, spawning a process, console updating, and instant messaging.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 11 depicts details of a pattern tree with a terminal node and an empty leaf node.

FIG. 30 depicts a simplified schematic of an enterprise network.

FIG. 31 depicts the relationship of packet payloads to IP stack layers.

DETAILED DESCRIPTION

Figure 1:
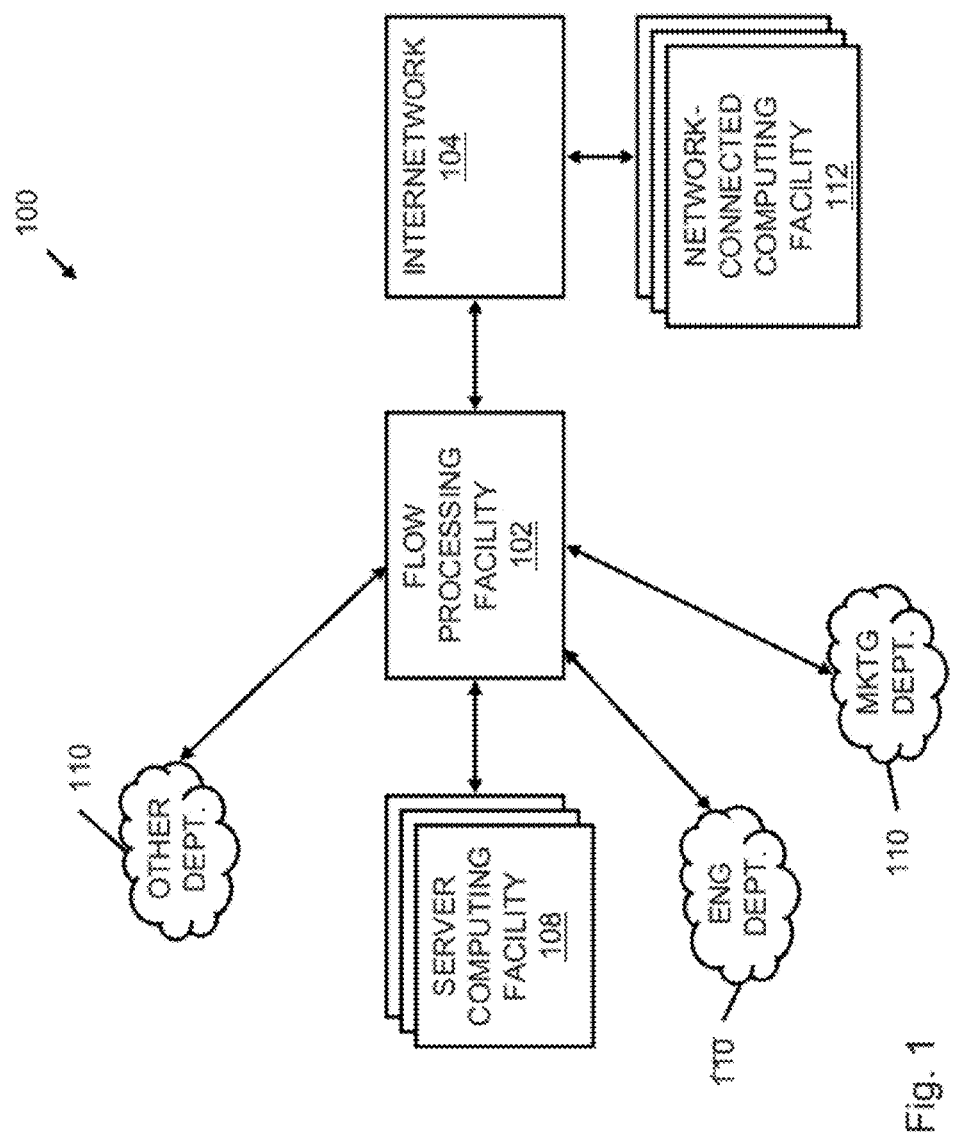
FIG. 1 depicts a networked computing environment.

An aspect of the present invention involves systems and methods for processing data flows. This data flow processing includes deploying software and/or hardware applications in a networked computing environment 100, wherein the applications operate within a network component referred to hereinafter as a flow processing facility 102. It will be appreciated that the flow processing facility 102 may indeed include a networking switch. However, it will also be appreciated that the flow processing facility 102 need not be a networking switch, but instead another type of network computing device. All such embodiments of the flow processing facility 102, many of which are described in detail hereinafter and others of which will be appreciated from the present disclosure, are intended to fall within the scope of the present invention.

Aspects of the present invention may relate to and/or be directed at and/or associated with one or more of the following network applications: firewall; intrusion detection system (IDS); intrusion protection system (IPS); application-level content inspection; network behavioral analysis (NBA); network behavioral anomaly detection (NBAD); extrusion detection and prevention (EDP); any and all combinations of the foregoing; and so forth. Additionally or alternatively, aspects of the present invention may provide and/or be associated with a security event information management system (SEIM); a network management system (NMS); both a SEIM and a NMS; and so on. The network applications may exist and/or be associated with a network computing environment, which may encompass one or more computers (such as and without limitation the server computing facilities) that are operatively coupled themselves and/or to one or more other computers via a data communication system. Many data communications systems will be appreciated, such as an internetwork, a LAN, a WAN, a MAN, a VLAN, and so on. In embodiments, the communications system may comprise a flow processing facility. The flow processing facility, an object of the present invention, may provide, enable, or be associated with any and all of the aforementioned network applications. Additionally or alternatively, the flow processing facility may provide, enable, or be associated with numerous other functions, features, systems, methods, and the like that may be described herein and elsewhere.

Any and all of the network applications, the SEIM, the NMS, and so forth may comprise a facility or group of facilities that may be implemented as one or more software programs and/or hardware devices. In embodiments, these facilities may be integrated into a networked environment and may function within that networked environment.

The firewall may implement one or more measures to detect, prohibit, circumscribe, and/or otherwise limit packet-based, logical connections and individual network packets that are disallowed, such as and without limitation by a reference network security policy. Such a policy may consist of information concerning the conditions (if any) under which a facility that is interacting with a network may be granted access to and/or from network resources, facilities, services, devices, and the like.

The firewall may operate on packets of a data flow. In embodiments, the firewall may process the headers of the packets, the payloads of the packets, or both. The firewall may embody a stateful process that examines the headers, payloads, or both in the context of a network state. This state may relate to a session or connection that is associated with a particular protocol or application in use over the network. In an example and without limitation, this state may relate to a TCP/IP connection.

While the firewall may be an example of an intrusion detection system, the intrusion detection system may implement one or more measures to detect unwanted manipulations of a networked resource (such as a network file or network file system, a server facility, a desktop computing facility, a networked printer, and so on). Such manipulations may, without limitation, comprise accessing, modifying, deleting, utilizing, denying service, activating service, hiding, revealing, naming, renaming, logging in, logging out, and so on.

In embodiments, the intrusion detection system may be directed at detecting intrusions by examining, monitoring, or otherwise processing information associated with a network protocol, a communications technique, a computing application, a business method, and so on. Such processing may be related to data packets, communications flows of data packets, trends in communications flows, and so on. The intrusion may operate in a passive manner (simply observing data packets and related flows) or in an active or reactive manner (by participating in a communication, such as and without limitation by intercepting, generating, modifying, or otherwise affecting data packets and related flows). The intrusion detection system may itself provide one or more networked resources, such as and without limitation a honeypot, which may entice a would-be intruder to interact directly with the intrusion detection system and, thus, be detected by the system. It will be appreciated that the intruder may be a human user, an automatic process, some combination of the two, or a plurality of the foregoing. It will be appreciated that the intrusions may relate to an intentional misuse of a network resource, an unintentional or erroneous misuse of a network resource (such as due to a process error in a computer program), and so on.

The intrusion prevention system may implement one or more measures to prevent unwanted manipulations of a networked resource. In other words, the intrusion prevention system may be related to the intrusion detection system, but may be directed at preventing intrusions rather than simply detecting them. In fact, these systems may be so closely related that detection and prevention capabilities can be combined into an intrusion detection and prevention system. Generally, such a system may monitor for unwanted manipulations of networked resources and either prevent them entirely or stop them while they are still in progress. In an example and without limitation, a networked resource may come under a denial of service attack, in which the resource is flooded with malicious data packets. If the data packets are well-formed and would otherwise not represent an attack were they present in fewer numbers, the intrusion detection and prevention system may (perhaps only momentarily) not recognize the onset of the attack. In this case, the intrusion detection and prevention system may stop the attack while it is in progress. If, however, the data packets are malformed or otherwise suspect, then the system may be able to recognize even the first instance of these packets and prevent the attack entirely.

Application-level content inspection may relate to processing a data flow by examining the application-layer payloads of the packets that make up the flow. Such processing may be aware of application-level logic and/or the measured or expected communication patterns of an application. Such "awareness" may be provided by a program (or programmed logic) and/or may be acquired over time, such as and without limitation according to an artificial intelligence system or method. Application-level content inspection, perhaps like all data flow processing, may consist of pattern matching, behavioral analysis, anomaly detection, and so forth. It will be appreciated that application-level content inspection may be an aspect of any and all systems and methods that are directed at or responsive to the application-layer information of a data flow. It will be appreciated that the application layer may reside above the transport layer, network layer, and data link layer in the IP protocol stack. It will also be appreciated that the application layer may reside above all other layers in an OSI protocol stack.

Network behavioral anomaly detection may monitor network data flows so as to detect anomalous data flows. Such flows may contain types, patterns, frequencies, or other aspects of data that are unusual, unexpected, new, different, or otherwise unlike a normal flow. Such terms as "normal" and "anomalous" may be inherently broad because what is normal for a particular network environment (of servers, clients, network connections, network devices, and so on) may be anomalous for another. In an example and without limitation, a network environment containing a file server may exhibit a relatively large amount of data flows out of the file server as other computing devices access files on the server. However, a network environment that doesn't contain a file server may exhibit relatively large amounts of data flowing out of a server only under anomalous conditions, such as and without limitation when a particular server contains a malicious program that illicitly transmits files from the server to another computing facility. Many other such examples of normal and anomalous data flows will be appreciated and all such examples are within the scope of the present invention. In any case, behavioral anomaly detection may encompass artificial intelligence or machine learning techniques that allow software programs and/or hardware devices to obtain a model of what data flows are "normal," perhaps (in whole or in part) by observing data flows in the networked environment. Then, by comparing actual data flows with such a model, it may be possible to detect anomalies. The observing and comparing of data flows may, without limitation, include processing headers, payloads, protocols, and so on. In embodiments, this processing may comprise regular expression matching on payloads and/or protocols.

Extrusion detection and prevention may detect and prevent the transmission ("act of extrusion") of classified, secret, sensitive, protected, confidential, proprietary, or otherwise private information from within an authorized network area out to an unauthorized network area. A network area may comprise a LAN, MAN, WAN, VLAN, or any and all other instances of a data network. A network area may exist within another network area, such as a VPN may be used to establish a private network within an otherwise public network (or, for that matter, may be used to establish a private network within an already private network). In embodiments and without limitation, a network may comprise a single computing facility, such as a network server. In this case, the transmission of private information from the network server, regardless of the destination, may be considered an act of extrusion. In embodiments and without limitation, a network may comprise any number of computing facilities, such as network servers, switches, routers, hubs, clients, and the like. In any case, the information may comprise a file system, a database, a file, a record, a field, a value, a sequence of bytes, a byte, a bite, or any and all information. Thus, extrusion detection and prevention may examine whether and/or what traffic flows to and/or from a particular network area; the content of the traffic; and so on. In an example and without limitation, a corporation may control a network area. The corporation, as a general privacy policy, may not want social security numbers to be transmitted from its network area out to other network areas. An embodiment of extrusion detection and prevention may be able to enforce such a policy by blocking any and all data flows that contain (or, at least, appear to contain) a social security number from being transmitted out of the network area to another network area (such as and without limitation the Internet). Many other such examples will be appreciated and all such examples are within the scope of the present invention.

Security event information management systems and methods may process security event information. Security event information may encompass any and all information that may be generated during the course of processing, monitoring, blocking, allowing, modifying, routing, rerouting, or otherwise handling or observing any and all aspects of any and all data flows that are associated with the networked environment. The processing of security event information may be directed at collecting, storing, monitoring, and/or otherwise processing the security event information. In embodiments, this information may take the form of alerts, logs, emails, text messages, signals, instant messages, or any and all other forms of system, automatic, or manual messages. The processing of the security event information may include responding to particular security event information, perhaps in accordance with a risk factor that may be associated with the information. In an example and without limitation, security event information that is indicative of a major network security breach may be associated with a high risk factor. The processing of the security event information may include producing a report of the responses to the particular security event information. This report may comprise an audit trail, which may allow an auditor to view a history of events, associated risk factors, association actions taken in response, and so forth.

Network management systems and methods may monitor any and all performance metrics that may be associated with a networked computing environment and, perhaps in response to this monitoring, may adjust any and all parameters or aspects of the networked computing environment so that the performance metrics are returned to and/or maintained at predetermined, estimated, calculated, or otherwise specified levels. These systems and methods may address one or more aspects of a network management model, such as and without limitation performance management, configuration management, accounting management, fault management, security management, and so forth.

Configuration management may encompass the monitoring versions of software, firmware, hardware, and the like that are associated with the networked computing environment. Configuration management may be directed at monitoring (and, if need be, adjusting) any and all aspects of the networked computing environment's performance in light of these versions. As the versions themselves may be an aspect of the networked computing environment, configuration management may adjust the versions, such as and without limitation by requesting or automatically conducting the installation of software, firmware, hardware, and the like.

Fault management may encompass an automatic detection of a fault in a networked computing environment and an automatic action directed at correcting the fault. This automatic action may comprise transmitting an alert to a human operator of the networked computing environment, automatically reconfiguring or adjusting any and all aspects of the networked computing environment, and so forth. In embodiments and without limitation, the fault may comprise a link failure, a node failure, a power failure, intermittent communications, degraded communications, and the like.

Security management may encompass the monitoring and/or control of access to resources in a networked computing environment. Access to resources in a networked computing environment may, without limitation, comprise logging into a resource, communicating with a networked resource, configuring or reconfiguring a networked resource, monitoring a networked resource, and so forth. Security management may include the automatic logging of any and all access (or attempted access) to any and all resources in the networked computing environment. The control of access to the resources may consist of partitioning the networked computing environment into authorized areas and unauthorized area. Authorization may encompass a mapping of network users to network resources, wherein the mapping indicates whether a particular user has access to a particular network resource (and, if so, under what conditions, if any). Security management may include the automatic generation of such mappings.

It will be appreciated that any and all of the aforementioned features, functions, systems, and methods may be combined, according to the present invention, with machine learning or artificial intelligence techniques (as described hereinafter and elsewhere) into a single facility. In an example and without limitation, NBA or NBAD may be combined with a SOM into a single facility. In this way, the SOM (or, more generally, artificial neurons) may store historical information, perhaps obviating the use of a database to store the historical information. In any case, in embodiments, this single facility may encompass a general purpose host processor, such as and without limitation a COTS CPU. Many other such examples are described hereinafter and still others will be appreciated. All such examples are within the scope of the present invention.

Referring to FIG. 1, an example networked computing environment 100 for data flow processing includes a flow processing facility 102 that is operatively coupled to an internetwork 104, a plurality of server computing facilities 108, and a number of departmental computing facilities 110 that are associated with an enterprise. In the depiction, the departmental computing facilities 110 are an engineering department (Eng Dept.) a marketing department (Mktg Dept.) and another department (Other Dept.). The flow processing facility 102 is described in detail hereinafter with references to FIG. 1, FIG. 2, and other figures. Generally speaking, the flow processing facility 102 receives, processes, and transmits a data flow, which is described in detail hereinafter with reference to FIG. 4. The internetwork 104 may be the Internet, or it may be any wired, wireless, or combined wired/wireless data network for transmitting flows of data between one computing facility and another.

The networked computing environment 100 also includes a plurality of network-connected computing facility 112. These facilities 112 may or may not be associated with the enterprise. The network-connected computing facilities 112 may include any client or server computing device that may be operatively coupled to the internetwork 104. These facilities 112 may be provided in the present depiction to illustrate that any number of a variety of computing devices may be operatively coupled to the internetwork 104. Via the internetwork 104, these facilities may communicate data flows with the flow processing facility 102. Via the flow processing facility 102 and the internetwork 104, the network-connected computing facilities 112 may communicate with one or more of the server computing facilities 108 or any of the departmental computing facilities 110.

The server computing facilities 108 may receive and transmit data flows. These flows may be directed at the departmental computing facilities 110 or they may be directed at a computing facility that is operatively coupled to the internetwork 104. In any case, the flow processing facility 102 receives data flows from the departmental computing facilities 110 and other computing facilities via the internetwork 104. The flow processing facility 102 may classify, categorize, or otherwise process the data flows. Depending upon this processing, the flow processing facility 102 may: discard some or all of the data flow; modify some or all of the data flow; pass through some or all of the data flow in an unmodified form; analyze some or all of the data flow; and so forth. Additionally, the flow processing facility 102 may perform as a network switch, hub, router, server, client, gateway, proxy, reverse proxy, load balancer, server, Web server, application server, firewall, URL filter, VLAN, or any other network, data flow, packet handling, or application-level service. Many such services are described in detail hereinafter and still others will be appreciated from this disclosure. All such services are encompassed by the present invention and are intended to fall within the scope thereof.

In the preferred embodiment, flows of data are implemented as a set of associated Internet Protocol (IP) packets. However, it will be appreciated that all possible embodiments of flows of data over the internetwork 104 may be transmitted, received, and processed by the flow processing facility 102. Generally, the flow processing facility 102 is adaptable to any network environment utilizing any network protocols. The flow processing facility 102 may support literally any link-, data-, transmission-, or application-level protocol. It will be seen that this adaptation is achieved through a variety of software or hardware features, all of which are subjects of the present invention.

Those skilled in the art will appreciate that the example networked computing environment 100 is simplified for pedagogical purposes. In an example, the environment 100 does not show the plurality of networking devices that comprise the internetwork 104, the various hubs, routers, and switches that may comprise the networked computing operation of an actual enterprise, and so on. These simplifications are provided for the purpose of drawing attention to the flow processing facility 102, which is an object of the present invention. However, given that networked computing environments 100 can be arbitrarily complex and assume a countless number of configurations, the deployment of the flow processing facility 102 is not in any way limited to the particular networked computing environment 100 shown here. Generally, the flow processing facility 102 can provide a service even when only one other computing device is operatively coupled to it. While particular embodiments of the flow processing facility 102 may be limited in the number of physical, operative couplings that are supported (such as due to a limited number of physical network ports), there is no theoretical limit to the number of physical, operative couplings that could be supported by a flow processing facility 102. Moreover, the flow processing facility 102 does not inherently limit the number of logical operative couplings (such as and without limitation, TCP/IP connections) that can be present in embodiments. Many more advantages, features, and functions of the flow processing facility 102 are described hereinafter and elsewhere.

In embodiments, the flow processing facility 102 may be deployed in dedicated network hardware; associated with dedicated network hardware; contained in or by dedicated network hardware; connected with dedicated network hardware; and so forth. In embodiments, the flow processing facility 102 may contain, comprise, include or encompass dedicated network hardware. This dedicated hardware may, without limitation, be provided in a rack-mount unit, in a chassis/blade configuration, or in a standalone unit with an arbitrary form factor. The standalone unit may be a consumer-oriented device, comprising without limitation one or more of a firewall, a router, a wireless access point, a print server, an HTTP management interface, an Ethernet port, a URL filter, and a MAC access control list.

In embodiments, the flow processing facility 102 can be deployed in, associated with, or comprise a shared device that supports the flow-processing features of the present invention and additional features. This shared device can be a network client, such as and without limitation a PC, cell phone, pager, laptop, PDA, networked sensor, set-top box, video game console, TiVo, printer, VoIP device, handheld computer, smart phone, wireless e-mail device, Treo, Blackberry, media center, XBOX, PlayStation, GameCube, palmtop computer, tablet computer, and the like. The shared device can be a network server, such as and without limitation a rack mount computer, blade computer, tower computer, supercomputer, quantum computer, and so forth. The shared device can be an application server, such as and without limitation a database server, Web server, file server, print server, Web services server, e-mail server, calendar server, software update server, e-commerce server, blog server, proxy server, reverse proxy server, and so forth. The shared device can be a network component, such as and without limitation a router, switch, hub, IP gateway, VoIP gateway, SAN, NAS, modem, wireless access point, firewall, load balancer, cable modem, DSL modem, satellite modem, DSLAM, NIC, and the like.

In embodiments, the flow processing facility 102 can be deployed in, associated with, or comprise an auxiliary device that supports the flow-processing features of the present invention and any and all additional features. This auxiliary device can, without limitation, be a dongle, USB key, FireWire device, smart card, securID, Disk-On-Chip, and so forth.

In embodiments, the flow processing facility 102 can be deployed in, associated with, or comprise network software that supports the flow-processing features of the present invention and additional features. This software can be dedicated software, such as and without limitation a standalone application, a server application, an application suite, and so forth. The software can be shared local software such as and without limitation a library, a library function or method, an embedded operating system, and so forth. The software can be shared, networked software such as and without limitation a Web service or the like. Other kinds of network software will be appreciated from this disclosure and such network software is intended to be encompassed by the present invention.

In embodiments, the flow processing facility 102 may comprise a virtualization aspect. This aspect may cut across any and all of the systems and methods described herein, so as to support the virtualization of them. In embodiments, virtualization may be applied to provide a logical arrangement of policies, networks, behavioral analyses, applications, any and all combinations of the foregoing, and so on. Virtualization may enable the flow processing facility 102 to provide its features and functions in ways that are logically beneficial or convenient; logically tailored to data flows or to users of data flows; consistent with an abstract and logical model (as opposed to a literal and physical model); and so forth. In an example and without limitation, virtualization may present the server computing facility 108 with different policies, networks, behavioral analyses, applications, and so on than it provides to the network-connected computing facility 112. From the perspective of the server computing facility 108 and the network-connected computing facility 112, there may not be an indication that virtualization is in effect. In other words, the flow processing facility 102 may subject the server computing facility 108 to policies, networks, behavioral analyses, applications, and so on without indicating that those are being provided according to virtualization and without providing any indication as to whether other network resources (such as and without limitation the server computing facilities 108) are being subject to the same. Other such applications of virtualization may be described herein and still others will be appreciated. All such applications of virtualization are within the scope of the present invention.

Figure 2:
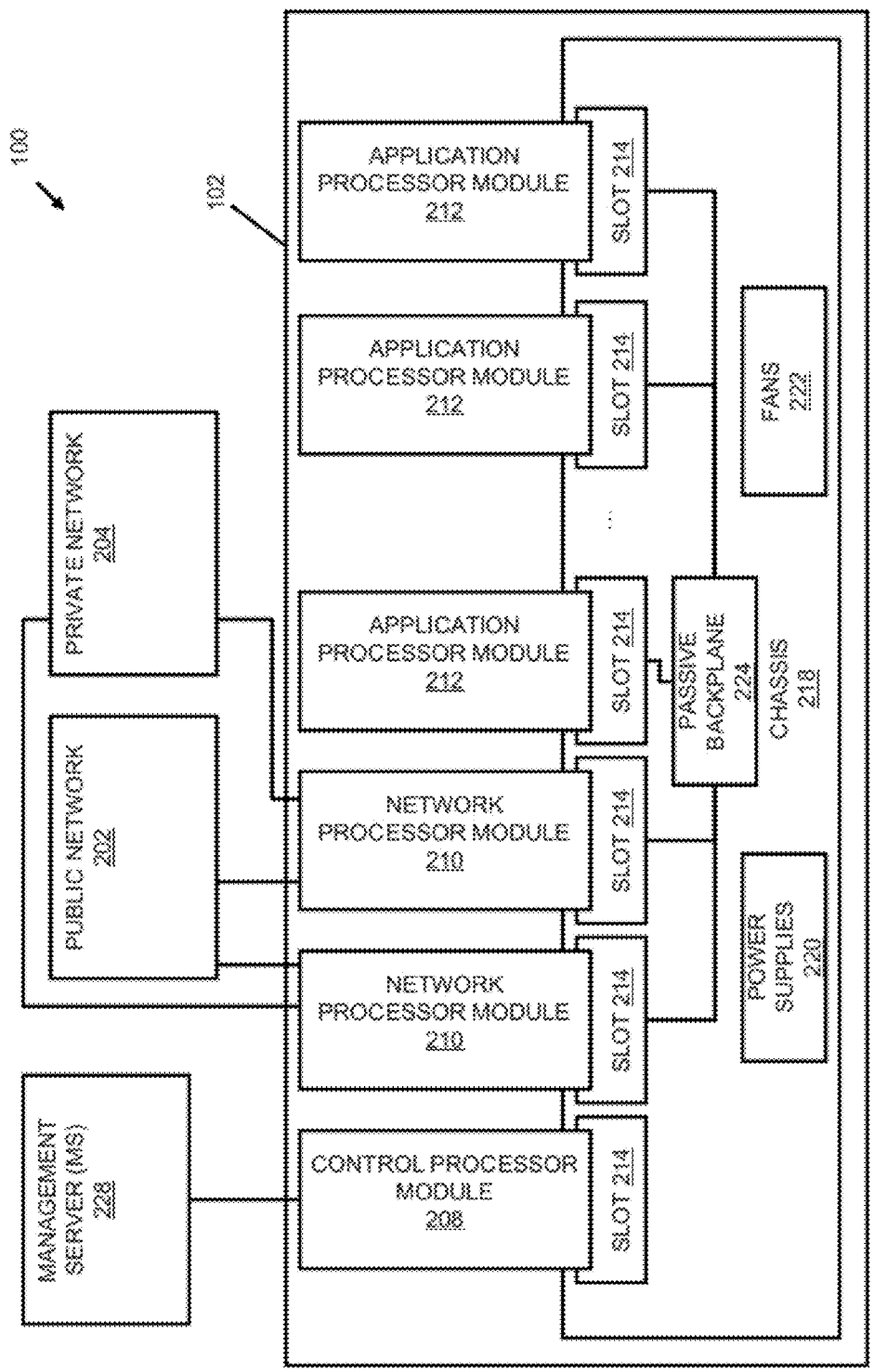
FIG. 2 depicts an expanded view of a flow processing facility in the networked computing environment.

Referring now to FIG. 2, another view of the example networked computing environment 100 is shown. Here the view of the flow processing facility 102 is expanded while the rest of the environment 100 is contracted. The public network 202 may encompass the internetwork 104 or any other data communications network, whether wired, wireless, packet-oriented, digital, analog, and so forth. The private network 204 may encompass any data communications network and may include the server computing facilities 108, the departmental computing facilities 110, and so forth.

A management server 228 is associated with the flow processing facility 102. The management server 228 provides an administrative interface to the flow processing facility 102. Via this interface, any function or feature of the flow processing facility 102 may be configured, edited, monitored, modified, installed, uninstalled, activated, deactivated, or otherwise controlled or viewed by an administrator. The management server 228 may be composed of a computer or computing facility that provides a user interface to better enable interaction with the administrator. The management server 228 is operatively coupled with the flow processing facility 102 via a data network. In some embodiments, this data network may encompass a dedicated physical data connection between the management server 228 and the flow processing facility 102, such as may be provided by a serial cable, an Ethernet cable, a wireless communication channel, or any other such device. The management server 228 may provide a graphical user interface, which can be interactive (i.e. both providing information to and accepting information from the administrator) or can be non-interactive (i.e. simply providing information to the administrator). Alternatively, the management server 228 may provide a command-line interface, which may accept textual commands that are input by the administrator and in return provide textual responses to those commands. In some embodiments, a graphical user interface is provided that also includes a window containing a command-line interface.

The graphical user interface (GUI) or command-line interface (CLI) is provided for configuring and monitoring the flow processing facility 102 and its elements. The management server 228 renders this interface and accepts input associated with the interface. Communication between the management server 228 and the control processor module 208 enables the user interface by transmitting instructions from the user interface to the flow processing facility 102 and by transmitting information from the flow processing facility 102 to the user interface. The communication between the management server 228 and the control processor is conducted over an out-of-band data network that is not the data network 202 or 204 that provides the data flows. Data packets, which may be described in greater detail hereinafter with reference to FIG. 4, may be associated with data flows and are subject to processing by an application processor module 212.

The GUI/CLI may be provided by an administration application that is installed on the management server 228 by an installation wizard. The administration application may utilize SNMP to securely retrieve statistics and trap information from the flow processing facility 102. All communications between the GUI/CLI application and the flow processing facility 102 may be secured according to SSH, SSL, HTTPS, or any other secure data communication protocol. An audit trail, which can be maintained by both the flow processing facility 102 and the administration application, may contain any or all information pertaining to communications between the management application, the performance or actions of the flow processing facility 102 and its elements and so forth. The administration application may be a native management tool associated with an application that is provided by the application processor module 212. In this way, although the application resides in the application processor module 212, an administrator can manage the application as though it were installed in a traditional server such as the Dell PowerEdge 850 server, and not in a flow-processing switch according to the present invention.

Administration of the flow processing facility 102 and its elements can be provided via a three-tiered, role-based administration technique. A master administrative role may be associated with complete access to the elements of the system. This role may also be associated with the ability to create a plurality of sub-administrators. With access rights to specific devices or device groups, the sub-administrator role may be associated with a number of privileges.

The flow processing facility 102 is implemented according to an architecture, which, in the preferred embodiment, may comprise a switch architecture. This architecture may include a network processor module 210, an application processor module 212, and a control processor module 208. The network processor module 210 may be described in detail hereinafter with reference to FIG. 3. In the preferred embodiment, each of the processor modules 208, 210, 212 are adapted to physically couple to a slot 214. The slot 214 provides power and data to the processor modules. A chassis 218 may be provided, which contains a plurality of slots 214. A passive backplane 220, which provides the data to the slots and via the slots to the processor modules 208, 210, 212, is contained within the chassis 218. Within the chassis 218, a number of power supplies 220 and fans 222 are included to provide power and air circulation to the components of the chassis 218 as well as to the processor modules 208, 210, 212, which are physically coupled to the chassis 218. In embodiments, the flow processing facility 102 architecture may support any number of processor modules 208, 210, 212 in any permutation, limited only by the number of slots 214 in a particular chassis 218. In applications, an administrator may physically add or remove processor modules 208, 210, 212 from the chassis 218 by inserting or removing the processor modules 208, 210, 212 from their respective slots 214.

The application processor module 212 includes a host application or network service that processes a data flow. The application processor module 212 comprises one or more resident microprocessors either executing the host application or providing the network service. Applications and network services are distributed to and throughout the resident microprocessors. This distribution can include: the replication of applications and network services; the configuration of them into a failover arrangement; and so forth. The application processor module 212 is described in greater detail hereinafter with reference to FIG. 5.

Applications provided by the application processor module 212 may be software applications. These applications may be updated or maintained from time to time (such as in response to a published bug fix) or periodically (such as the daily retrieval of an application-specific log file). Applications and the application processor modules 212 in which they reside can be grouped and can be managed as a group. This provides a level of convenience for an administrator of the flow processing facility 102, who may want to update, activate, or deactivate groups of applications or application processor modules 212 without having to refer to each of the individual elements in the group.

One class of applications provided by the application processor module 212 may encompass a content scanning function (which may encompass content inspection) for providing an anti-virus feature; an anti-spam feature; an anti-spyware feature; a pop-up blocker; protection against malicious code; an anti-worm feature; an anti-phishing feature; or a protection against an exploit. The anti-spam feature may be associated with a real-time black list; a DNS lookup; a header verification; a keyword filter; a spoof detector; an adaptive filter; and so forth. The anti-spyware filter may be associated with scanning a download; monitoring for output communications from a spyware program; monitoring or regulating the use of cookies in applications; and so forth. The malicious code protection may scan applications in-transit through the flow processing facility 102 for any kind of malicious code such as and without limitation a wabbit. The exploit protection may be directed at detecting vulnerabilities in or exploits for ActiveX, Java, Flash, Javascript, Greasemonkey, JPG files, BMP files, Microsoft Office macros, and so forth. Content scanning may be applied to any data flow, for example and without limitation data flows associated with an SMTP session, a POP3 session, an HTTP session, or an FTP session.

A template can store a set of pre-configured parameters. These parameters may relate to applications or other elements of the flow processing facility 102, allowing the facility 102 and/or its elements to be rapidly configured according to the parameters. An existing configuration of the flow processing facility 102 and/or its elements may be expressed at the template. Thus, the template may be used in a backup operation and a restore operation, both of which relate to one or more configuration parameters of one or more elements of the flow processing facility 102.

The control processor module 208 coordinates the elements of the flow processing facility 102. These elements include the network processor modules 210, the application processor modules 212, and so on. The control processor module 208 enables management access to the flow processing facility 102 and its elements. This management access can include access to local facilities (memory, hard drives, network ports, network services and software applications, and so on) that reside within the elements. The management server 228 receives or produces aggregate health and status information associated with the flow processing facility 102. Any function or feature of the flow processing facility 102 that is subject to control by an administrator or about which information is provided to an administrator can be provided through a physical data port of the control processor module 208. This data port can be operatively coupled to the management server 228. Through this coupling, information may be both received from the management server 228 and provided to the management server 228. This information may originate from the control processor module 208 or from the management server 228 and may be directed at controlling or monitoring the flow processing facility 102.

In embodiments, the elements of the flow processing facility 102 are implemented as processor modules 208, 210, 212 or "blades" which plug into a chassis 218 that is implemented according to the network architecture. In embodiments, the management server 228 is implemented in a host machine that does not plug into this chassis 218. In embodiments, the flow processing facility 102 is implemented as a rack-module with failover (such as and without limitation VRRP failover) or as a blade-chassis 218 module. The implementation of the flow processing facility 102 may include fully redundant elements and features that support complete redundancy. These elements and features may include the fans 222; the power supplies 220; the passive backplane 224; data-switch fabrics; control-switch fabrics; control processor module 208 with RAID-1 mirrored hard drives; active/active failover configuration between two switches; logical interface redundancy (such as and without limitation as may be provided by VRRP); applications (such as in a load-balancing and/or failover configuration); stateful, dynamic re-routing of data packets and flows; dynamic standby modules for M:N sparing; full hot-swap and zero-configuration replacement for failed modules; a dedicated, high-availability link between elements; and so forth. The flow processing facility 102 may support a single-box high availability mode (SBHA) or a multi-box high-availability mode (MBHA). In the preferred embodiment, the flow processing facility 102 is implemented as a chassis-based system with no need for external switches, load balancers, taps, or port mirrors. The flow processing facility 102 may support intelligent load balancing from the network processor modules 210 to the application processor modules 212 based upon actual usage metrics of the application processor modules 212. The flow processing facility 102 supports serialization of the applications and network services. In other words, the flow processing facility 102 can route a data flow between a series of applications and network services that are provided by the application processor module 212. In one example, a data flow may be routed to a firewall application, then to an anti-virus application, then to a URL filter, then back to the firewall. The flow processing facility 102 supports parallelization of the applications and the network services. In other words, the flow processing facility 102 can duplicate a data flow and simultaneously route the duplicates to two different applications or network services which are provided by the application processor module 212. In one example, one of the duplicates is routed to an intrusion detection application while another duplicate is routed to a URL filter. Many other such examples will be apparent, will be discussed herein, or will be discussed in the documents referenced herein, and all such example applications of the flow processing facility 102 are encompassed by the present disclosure.

Figures 3, 3A:
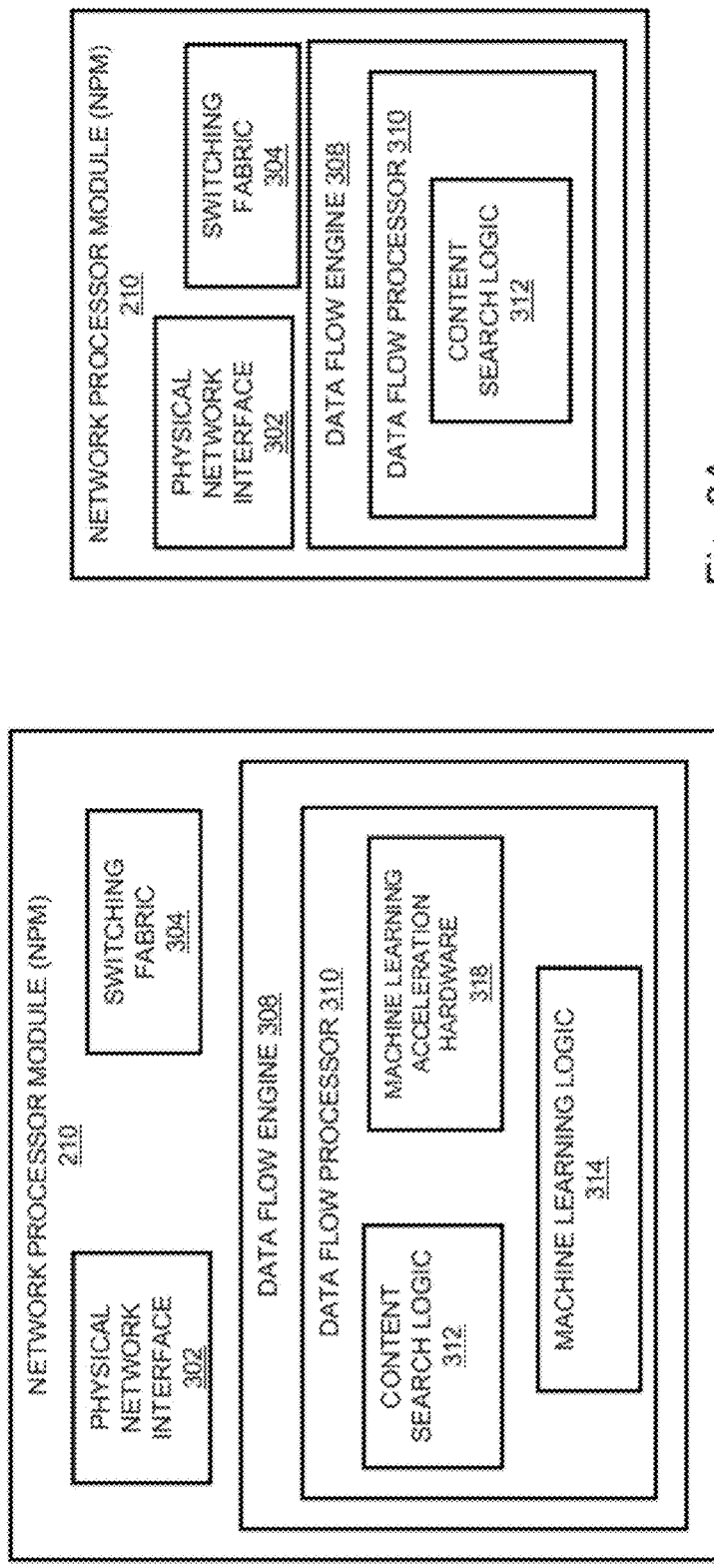
FIG. 3 depicts an expanded, logical view of a network processor module.

Referring now to FIG. 3, a detailed view of the network processor module 210 is shown. The network processor module 210 may include a physical network interface 302; a switching fabric 304; a data flow engine 308; and a data flow processor 310 that includes content search logic 312; self-organizing map logic 314; and self-organizing map memory 318. The network processor module 210 communicates with the public network 202 as well as the private network 204 via the physical network interface 302. The physical network interface 302 may encompass a physical network port, plug, or socket. Switching fabric 304 provides a mechanism and logic for communicating information between the network processor module 210 and other modules 208, 210, 212 via the backplane 224.

Referring now to FIG. 3A, a detailed view of an alternate embodiment of the network processor module 210 is shown. As compared with the network processor module 210 of FIG. 3, that of FIG. 3A is identical except that it does not comprise the machine learning logic 314 and the machine learning acceleration hardware 318. Generally, any and all descriptions that reference FIG. 3 or elements thereof do equally and simultaneously refer to FIG. 3A, except where references to the machine learning logic 314 or the machine learning acceleration hardware 318 necessarily constrain the description to reference FIG. 3 only (since FIG. 3A does not comprise these elements).

Referring now to both FIG. 3 and FIG. 3A, except in such cases as just described, the network processor module 210 provides a physical and/or logical interface to a communications system, such as an IP-based data network, which may encompass the public network 202 and/or private network 204. This module 210 may contain one or more physical network ports or interfaces 302, which may accept physical connections to the communication system. It may be appreciated that any number of physical connections may be provided by the flow processing facility 102 through the addition of an adequate number of network processor modules 210 to the chassis 218. Network processor modules 210 can contain a homogenous or heterogeneous collection of physical network interfaces 302. The physical interfaces 302 may be auto-sensing (such as and without limitation a 10/100 auto-sensing Ethernet port), or, the physical interfaces 302 may have a fixed or manually configured setting such as and without limitation a dedicated uplink port or a port that is configured via a physical switch to perform as an uplink or downlink port.

The network processor module 210 can receive and classify data flows. This classification can be related to any feature, aspect, or nature of the data flow or to any information that is associated with the data flow. Some examples of these include source address, destination address, time of day, day of week, user-agent token, the contents of a packet payload, and so forth. In any case, the classification may be used to drive a decision process which directs the data flow to an application processor module 212 via the passive backplane 224. As data flows are routed between systems and elements according to the present invention, the data flows may be transmitted in a compressed format. These compressed flows may travel between blades, between chassis 218, between devices, and so forth.

It will be seen in the following figures and descriptions that the data flow may return in an augmented, reduced, or otherwise altered state from the application processor module 212 back to the network processor module 210. The network processor module 210 may further classify the data flow; transmit the data flow to another application processor module 212; transmit the data flow out to the public network 202 or the private network 204; or otherwise process, direct, redirect, return, or discard the data flow.

While the flow of data through the network processor module 210 is described in great detail hereinafter with reference to FIG. 4, it is worth noting here that generally and without limitation a data flow arrives at the network processor module 210 via the physical network interface 302 or via the switching fabric 304 of the flow processing facility 102. The data flow is then received by the data flow engine 308 and then processed by the data flow processor 310. Depending upon the outcome of this processing, the data flow engine 308 may direct the data flow at one or more modules 208, 210, 212. When this occurs, the switching fabric 304 receives the data flow and transmits the data flow via the backplane 224 to the designated module(s) 208, 210, 212. Thus, one function of the network processor module 210 is to receive and direct data flows.

A data flow may be directed according to one of its features, which are described hereinafter with reference to FIG. 4. The data flow may be directed at an external network device that is identified by a network address such as an IP address, MAC address, URI, or any other network identifier. In this case, the data flow may be transmitted via the physical network interface 302 to the external device. Alternatively, the data flow may be transmitted via the switching fabric 304 to another network processor module 210 that transmits the data flow via its physical network interface to the external device. Other such configurations are possible and encompassed by the present disclosure.

The machine learning logic 314 classifies a data flow or portion thereof. In the preferred embodiment, the classification is binary, with some data flows being classified as "normal" and others being classified as "anomalous." Also in the preferred embodiment, the machine learning logic 314 includes a self-organizing map or Kohonen map. Throughout this disclosure, the machine learning logic 314 may be described in the context of its preferred embodiment. However, any system or method for the classification of data, whether or not drawn from the field of machine learning and whether or not associated with a binary classification scheme, may be utilized within the scope of the present invention as the machine learning logic 314. Therefore, all such systems and methods are encompassed by this disclosure. Continuing now with the discussion of the preferred embodiment, the classification of data is achieved by comparing a feature vector of the data flow with each of a plurality of artificial neurons that populate an array. Each of the artificial neurons is characterized by a weight vector. While the feature vector and the weight vectors of the artificial neurons may include an arbitrarily high number of dimensions, the array of artificial neurons is typically two or three dimensional. In the preferred embodiment, the array of artificial neurons is a two-dimensional, 10-by-10 array. After an unsupervised training process in which weight vectors of the artificial neurons are adjusted, a mapping process compares an input vector to the weight vectors. The artificial neuron, characterized by the weight factor positioned at the smallest Euclidean distance from the feature vector, is declared the winning neuron, and the feature vector is this mapped to that neuron. Mapping may include incrementing or implementing a counter associated with the neuron, updating a running average associated with the neuron, and so forth. Over time, this mapping of feature vectors creates a distribution or "output map." An anomalous data flow will produce an atypical output map by causing at least one of the values in the output map to become unusually large or unusually small in relation to the other values. Such anomalous data flows are flagged for additional inspection.

During the training process, the artificial neurons are adjusted with respect to or in response to training data. The training data may comprise a set of feature vectors which are typically generated or extracted from one or more representative data flows. These data flows may be simulated or actual, and may be recently, currently, or previously generated. The type of features that comprise the feature vectors may depend upon a subject of the training process.

In embodiments, the subject of the training process may be associated with a networking behavior of a data flow and/or a content behavior of a data flow. In the case where the subject is associated with the networking behavior, the features may be related to one or more packet headers and/or payloads that are associated with the data flow. In an example and without limitation, the networking behavior may be associated with a connection time, an inter-connection time, a request time, a response time, a count of a number of bytes in a connection, any and all other features of the packet headers and/or payloads, and so forth. In the case where the subject is associated with the content behavior, the features may be related to one or more payloads that are associated with the data flow. Here, the features may be extracted by using sequential one- or two-byte chunks (referred to herein as a 1 Gram or 2 Gram) of the payloads. As each chunk is extracted, it is normalized and then sorted, resulting in a profile. The profile may be divided into discrete and/or finite divisions. Each of these divisions may comprise some or all of the occurrences of a 1 Gram or 2 Gram. In embodiments, the subject may encompass a count of the occurrences.

The machine learning logic 314 may normalize or convert the data flow into a feature vector, which is the input vector to a SOM. The SOM may be selected from a plurality of SOMs. This selection may be influenced by the inspection of the packet headers, payloads, protocol, behavior, and so on. In an example and without limitation, the SOM that is selected might correspond to the application associated with the flow.

Normalization of the data flow 444 may be with respect to any and all features of the of the data flow 444. These features may, without limitation, be associated with and/or comprise headers, payloads, protocols, behaviors, and so on. In an example and without limitation, a normalization of a data flow 444 may encompass a time at which a packet of the flow arrived (perhaps measured in milliseconds) and a size of the packet (perhaps measured in millions). In embodiments, a normalization of a data flow 444 may be expressed in terms of standard deviations of measurements of features of the flow. More generally, in embodiments, the normalization may be expressed in terms of a statistical measure or as a concrete and tangible result of a mathematic calculation.

In embodiments, the mapping process is applied to feature vectors which are generated from actual data flows that are specifically associated with network communications. In embodiments, the flows and/or their contents are classified and a self-organizing map corresponding to that classification is used in the mapping process. In an example, one self-organizing map may be trained with feature vectors from HTTP sessions while another is trained with feature vectors from SMTP sessions. When an incoming flow is recognized as being an HTTP session, feature vectors associated with that flow are mapped to the HTTP-trained self-organizing map (SOM), and not the SMTP-trained SOM, and the same process applies in reverse. Such recognition may be achieved by inspecting IP packet headers, IP packet payloads, destination port addresses, URLs and so forth.

The mapping process involves computing the Euclidean distance between an input vector and the weight vector of an artificial neuron. To expedite this calculation, distance-computing circuitry may be provided. This circuitry comprises distance-computing logic, contains memory for storing a plurality of weight vectors, and encompasses a logic that enables the memory to be indirectly addressed. In the preferred embodiment, the machine learning acceleration hardware 318 provides this circuitry. In other embodiments, the machine learning acceleration hardware 318 may be appropriately implemented to accelerate the machine learning logic 314. The machine learning acceleration hardware 318 may comprise a cache, an ASIC, an FPGA, a DSP, a quantum computing device, or any other hardware that accelerates or serves as a co-processor to the machine learning logic 314.

As a flow is being mapped, its feature vectors may also be fed to another SOM to serve as training data. The SOM that receives the training data is in the training process and may eventually replace the SOM with the corresponding SOM that is in the mapping process. This arrangement is advantageous considering that network data flows, due to many factors such as network congestion, application usage patterns, user access patterns and so forth, are dynamic. Thus, the SOM that is in the mapping process most likely trained on data that may now be outdated and, therefore, may or may not reflect optimal and contemporary data flows. Before that SOM becomes obsolete, a newly-trained SOM may replace it. In this way, the system maintains a relatively current view of what is "normal" and can continuously monitor data flows for anomalies.

While the training process may be deterministic, the SOMs that are fed into the training process may initially contain randomized weights. This occurrence may help ensure that the SOMs aren't biased before training begins. One consequence of this randomization, however, is that the output maps of any two SOMs are likely to be quite different, even when considering or assuming the possibility of identical training data and identical input vectors. In the present invention, this may be undesirable because it might introduce a discontinuity when one SOM is replaced with a newly-replaced SOM. In particular and as will be appreciated, a detection threshold or set of detection thresholds that may be applicable to the output map of the first SOM may not be applicable to the output map of the second SOM. To avoid this, an additional SOM may be added to the training process, whereby, being already biased by the SOM it is about to replace, its output map may be similar to the output map of the SOM it is to replace.

The system can generate, in real time, an output map in response to a data flow 444. The detection process that is applied to the output is also conducted in real time. When a data flow 444 is flagged as anomalous, it may be processed off-line and/or out of band, where a more in-depth analysis is performed.

The output maps may periodically be read and reset. When reading the output map, a test may determine whether the output map contains an indication of an anomaly. Alternatively, the values in the output may be continuously normalized to represent running averages of the number of feature vectors that are mapped to each of the artificial neurons. In any case, the indication of an anomaly will appear as an unusual, relatively high, or relatively low value in the output map. A detection threshold may previously be selected for each of values in the output map, wherein the threshold is statistically calculated to yield a maximal detection rate given a maximum false-positive rate. This rate may vary from application to application. When the values in the output map exceed this threshold, the flow is flagged for additional inspection.

As a data flow 444 is received at the network processor module 210, its packet headers and/or payloads may be inspected. This inspection (which when specifically directed at the payload may comprise content inspection) may be performed by the content search logic 312 and may encompass the inspection of source IP address, destination IP address, source port, destination port, application associated with the flow, user associated with the flow, content of the payload, and so forth. In embodiments, the communication flow may be divided into chunks, which may be the packets.

In embodiments, a SOM may generate information (such as and without limitation a signature) that is associated with a data flow 444. The compiler that may be provided in association with and/or as part of the flow processing facility 102 may process this information as input (as described herein with reference to FIG. 3 and elsewhere). The output of the compiler (or the signature itself, if the compiler is not present and/or not used) may be provided to the content search logic 312, which may then provide a content search functionality that is influenced by the information or signature that may have been generated by the SOM.

The content search logic 312 may include an implementation of the Aho-Corasick algorithm, an optimization or modification thereof, or any other algorithm or heuristic for performing pattern matching, such as and without limitation regular expression matching, on a data flow. The content search logic 312 may locate all instances of strings in the data flow that match strings in a dictionary. The Aho-Corasick algorithm may utilize a rooted tree structure (or, "pattern tree") to represent a set of patterns. Each link (or, "transition") between nodes may denote a character or token selected from an alphabet of the same. Each node in the tree may represent a match of a prefix of one or more strings in the dictionary.

A pattern search process may start at the root node of the tree structure and with an input string. The input string may be a data flow 444; or a segment, portion, or subset thereof. The process may traverse the tree by selecting, one by one, transitions that match successive tokens from an input string. The tree is traversed until the input string terminates; a leaf node is reached; or there are no transitions out of a node that match the next token from the input string.

If there are no transitions out of the node and the node is not designated as a terminal node, then the input string may have failed to match a string in the dictionary. When such a failure occurs, a pre-computed failure transition may be used to determine the next node. The failure transition may link to a node that corresponds to the longest prefix of a string in the dictionary that matches the most recent tokens of the input string. This transition can be pre-computed for each node because it may be solely dependent on data that is known a priori (i.e., the pattern of input tokens that reach the node where the failure occurs and the prefixes of the strings in the dictionary). Once the failure transition is followed, the token that failed to match a transition may be applied again, this time to the node at the destination of the failure transition. The pattern search process may continue in this manner until all of the characters of the input string have been applied.

The search algorithm may be further optimized by generating a failure transition table. The failure transition table may also be pre-computed using the pattern set and the matched prefix. The failure transition table may be calculated by finding the longest prefix of the pattern set for all suffixes of the current node. This calculation may produce a list of failure transitions which may be judged to compose the failure transition node(s). The links of all the failure transition nodes may be merged to form a table of links where each link may be associated with a possible search character. When merging the links, the link in the node with the longest prefix may be given precedence. The resultant failure transition table may then utilize a character as input to generate the next node. Such a table (and other such structures that may similarly be constructed) may provide one set of pre-computed failure transitions for all applicable characters. The failure transition table may be merged such that the links in the node that may have existing links may be given precedence. A pattern search procedure may then start and proceed in the same fashion as the original method. Since the failure transitions and their ultimate destinations may now be built in to the nodes links, the fail character may not need to be applied again. The fail character may be matched only once to proceed to the next node. If the character does not correspond to any links in the node (including the failure transition links), the current string segment may not match any patterns in the pattern set and the search resumes with the next character at the root node. The resultant search performance of the optimized search may now be seen as linear to the size of the text.

The pattern tree can be viewed as the next state logic for a state machine. In such a perspective, each node may be seen to represent a state in the state machine. The links, then, may compose transitions from one state to another. The state machine may receive characters as input and may uses this input (and/or may use other factors) to calculate the next state.

If the input string terminates and the current node is specified as a terminal node, then the input string may match a string in the dictionary. Otherwise, the string may not match.

If the current node is a leaf node, then the only transition may be back to the root node of the tree. In the preferred embodiment, an optimized representation of the pattern tree may use a default value for the root node identifier. This may reduce the space required to store a representation of the tree.

Figure 9:
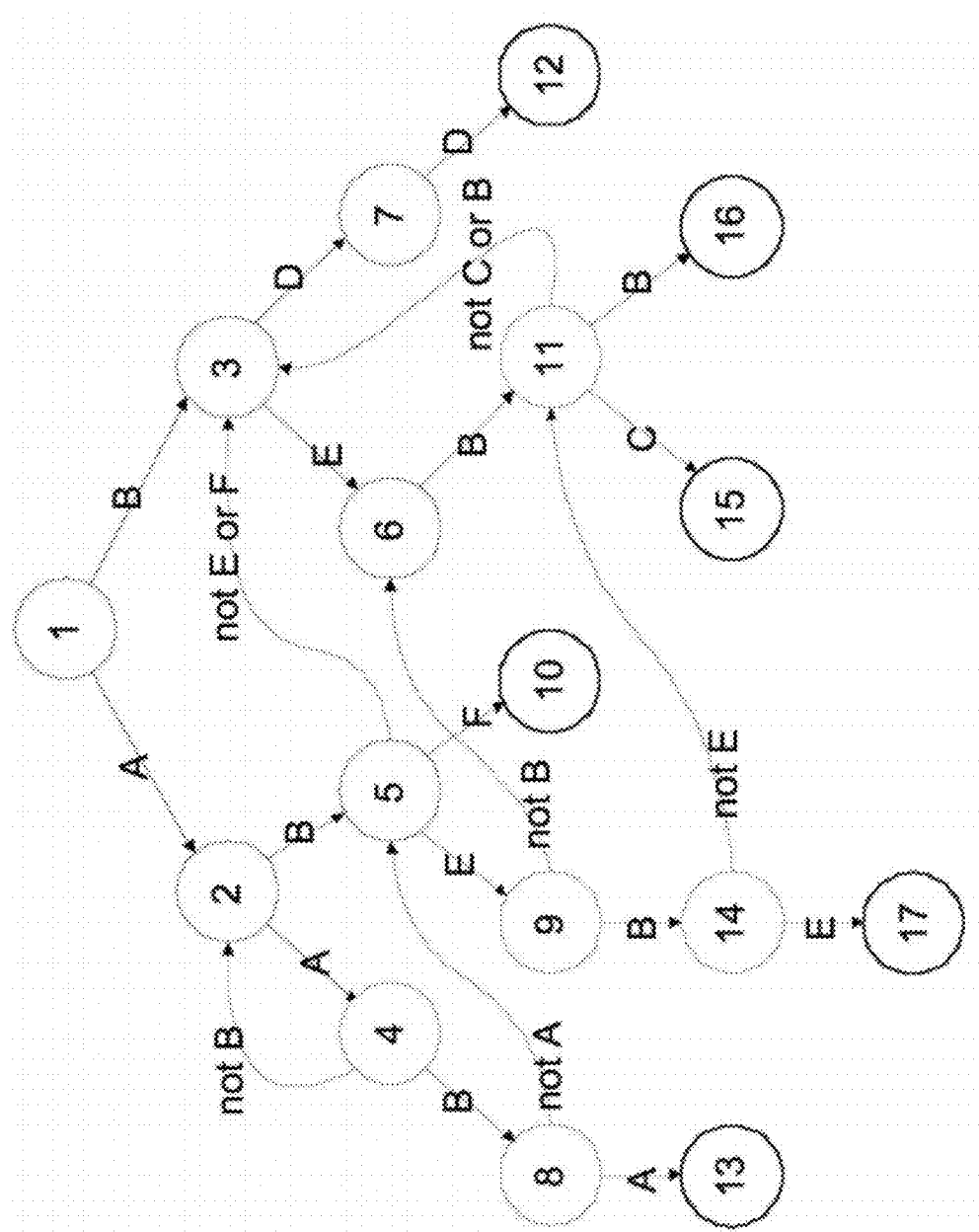
FIG. 9 depicts a pattern tree for using an initial root node.

In an example and without limitation, FIG. 9 depicts a tree built for the pattern set AABA, ABEBE, ABF, BEBC, BEBB and BDD. Node 1 is the root node. Each node in the tree represents a prefix of one or more patterns in the pattern set, the bolded nodes representing complete patterns. Although all terminal nodes are leaf nodes in the example, this is not a necessary characteristic. A searched-for pattern that is another searched-for pattern's prefix will result in a terminal node that is not a leaf node. A straight line represents a state transition based on the successful match of the next character in the search text. The curved lines are state transitions taken when the match of the next character is not successful. When there are no curved lines from a state, a failed match will cause a state transition to the root.

The example shown in FIG. 9 searches for a single match. If all matches are desired, the pattern search can continue at the terminal node by adding the failure transitions. In this case node 16 will have a failure transition to node 3, node 13 will have a failure transition to node 2, and node 17 will have a failure transition to node 6. All the other terminal nodes have failure transitions to the root node.

To illustrate how the algorithm works, suppose that the input string is ABEBC and that it is to be searched simultaneously for all of the search patterns, i.e., AABA, ABEBE, ABF, BEBC, BEBB and BDD. The state machine starts at node 1 and, since the first input-string character is A, follows the A edge from node 1, i.e., the edge that leads that node to node 2. The next input-string character, B, matches an edge from node 2, so the state machine follows that edge to node 5. The next character, E, causes a transition to node 9. Node 14 is entered on the next character B. The next character C does not match any edge from node 14, so the fail transition is taken to node 11. There the machine again tries to match character C. This time a match is found and state 15 is entered. State 15 is a terminal node and indicates that the input string includes one of the search patterns namely, BEBC.

Figure 10:
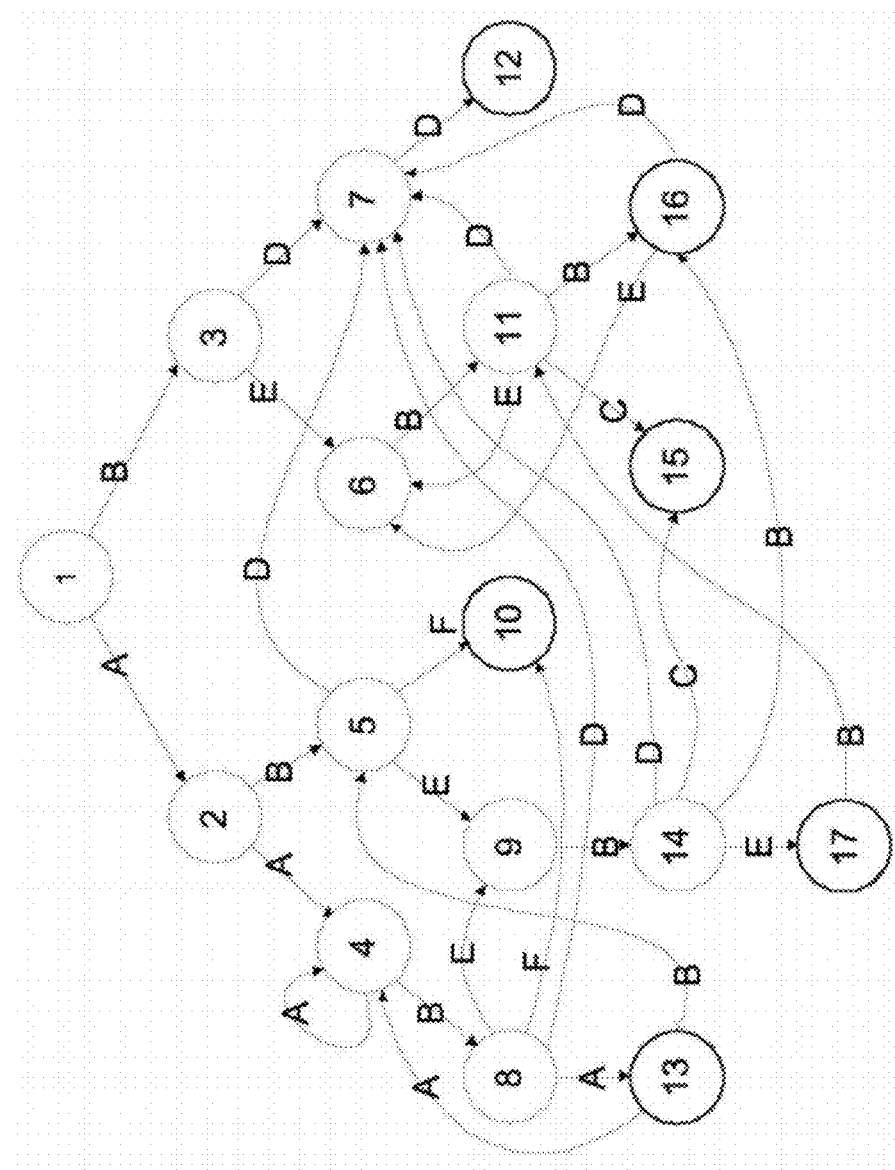
FIG. 10 depicts a pattern tree with failure transitions of terminal nodes.

Note that in the example the last character in the search text was compared twice. A common optimization of the Aho-Corasick algorithm is based on the fact that the possible character matches for a failed node may be known in advance. Thus, when the failure-transition table is incorporated into the links at each node, the tree illustrated in FIG. 10 may result. The tree in FIG. 10 includes the fail transitions for the terminal nodes. By employing this optimization, an attempt to match the search character need only be made once. (It will be appreciated that the tree may be omitting a number of possible fail transitions and that these omissions may or may not be for the purpose of simplifying the depiction.)

A further detailed description of one implementation of the techniques associated with content search logic 312 and implementations of the Aho-Corasick algorithm, (and an optimizations and/or modifications thereof) may be described hereinafter or elsewhere.

In embodiments of the content search logic 312, a hardware-based string search supports position constraints. In embodiments and without limitation, search parameters or signatures for this search may be expressed in the SNORT language. In any case, search parameters or signatures may specify position dependent patterns; absolute position patterns; relative position patterns; and negative and positive patterns. The position dependent patterns relate to a specific position in a packet. The absolute position patterns relate to a position from the beginning of a packet. The relative position patterns relate to a position relative to a previous pattern match.

A compiler may be provided in association with and/or as part of the flow processing facility 102. The compiler may process input that is associated with search parameters, regular expressions, signatures, or any and all other specifications of content search, pattern matching, position constraints in string search, and so forth. The compiler may compile this input into an output that is directed at and/or suitable for programming and/or instructing any and all of the computational hardware of the flow processing facility 102. In embodiments and without limitation, such hardware may comprise one or more of a digital signal processor; an FPGA; a particular brand, model, or series of central processing unit; an ASIC; and so forth. Without limitation, the content search logic 312 may encompass this hardware. It will be appreciated that the compiler may enable the processing of any and all search parameters or signatures such that the parameters or signatures are so transformed.

Embodiments of the content search logic 312 may encompass hardware-based regular expression matching logic. This hardware matches input strings to regular expressions. The regular expressions may include characters, quantifiers, character classes, meta-characters, and so forth. The matching may be greedy or non-greedy and may include look-head and look-behind functionality. In alternate embodiments, the hardware also supports back-references. This hardware may include a hardware implementation of the Aho-Corasick algorithm, an optimization or modification thereof, or any other algorithm or heuristic for performing regular expression matching on a data flow.

Embodiments of the content search logic 312 may encompass hardware-based regular expression logic while performing a search for position dependent substrings. To this end, a regular expression may first be partitioned into a set of position dependent substrings. A pattern tree may then be constructed which represents and enacts the search for substrings. When a substring is found, the relative positions of the substrings may be examined and, depending upon the result of the examination, a positive or negative match may be effectively determined. The logic may include the capability of detecting character classes (such as /[abc]/) and wildcards (such as * and .) which may be included in the regular expression. The logic may be capable of matching the beginning as well as the end of a string. Additionally or alternatively, the hardware-based regular expression logic can match alternation (such as /cat|dog/—"match 'cat' or 'dog'"). In an embodiment, all possible matches resulting from an alternation may be built into the pattern tree. In another embodiment, the character class detector may be employed to match alternation. Alternately or additionally, the hardware-based regular expression logic may be able to match repetitive patterns (e.g. patterns repeated using quantifiers such as /a{3}/—"match 'aaa'"). In an embodiment, the repetition may be unwound and the resulting patterns may be inserted into the pattern tree.

Example implementations of the foregoing may be provided hereinafter or elsewhere.

Figure 4:
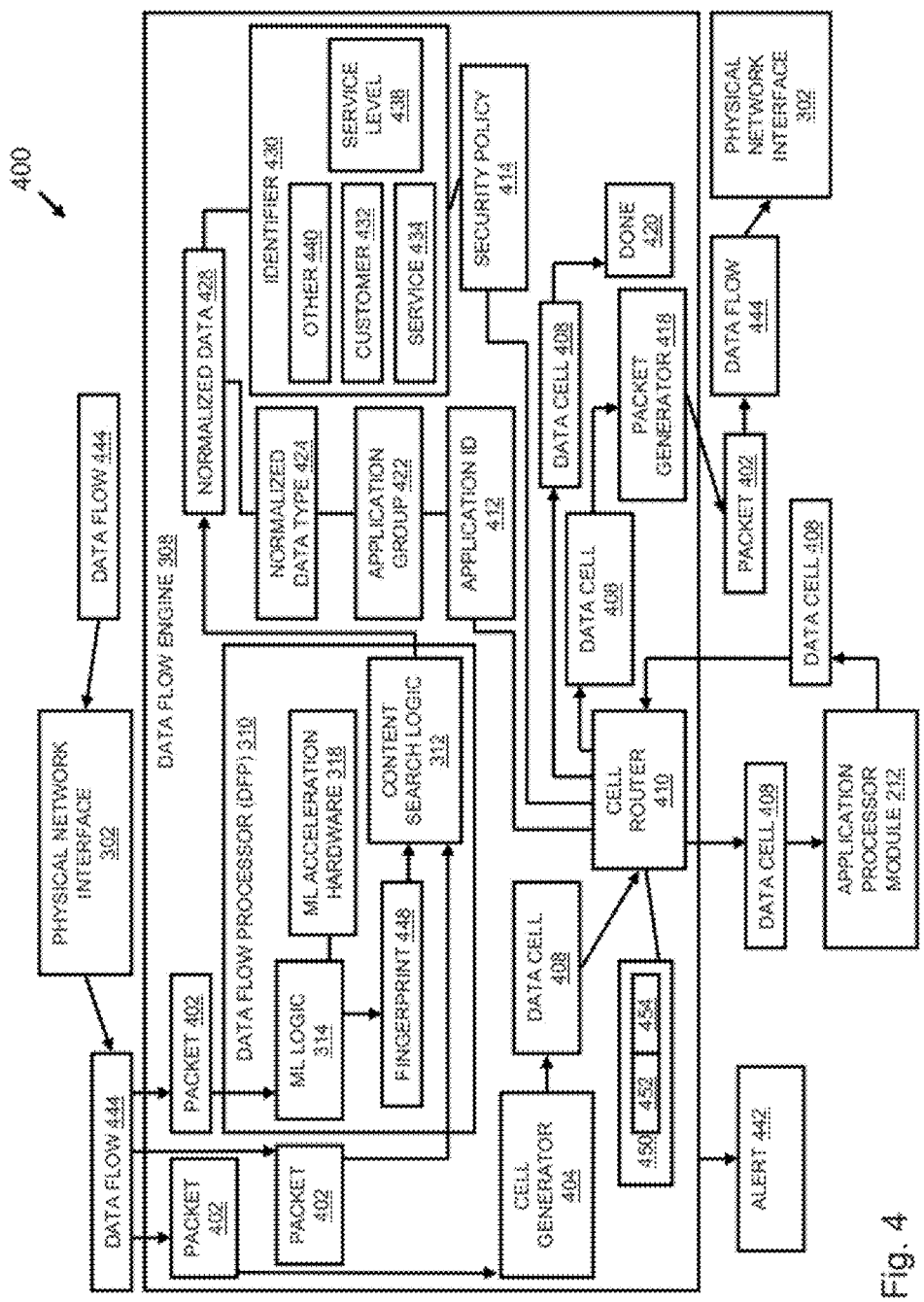
FIG. 4 depicts an expanded, logical view and process flow of a data flow engine.

Referring now to FIG. 4, a process and logical flow of the flow processing facility 102 involves the data flow engine 308. Generally, the process and logical flow are directed at receiving, processing, and, when appropriate, transmitting a data flow 444. In the preferred embodiment, the data flow 444 is composed of an IP-packet sequence, such as may be associated with a connection-oriented protocol (e.g., TCP/IP) or a connectionless protocol (e.g., UDP/IP). Each packet and, by extension, the data flow 444, may be composed of packet headers and packet payloads. Both headers and payloads may comprise digitally encoded information. The headers may conform to a network protocol's specification or, in some malicious or erroneous cases, may defy the network protocol's specification. The payloads may embody information directed at an application and/or encapsulated packets (or fragments thereof). It will be appreciated that features of the data flow 444 may, without limitation, comprise a field, flag, code, or other information in a header; a particular value of a field, flag, code, or other information in a header; a sequence of those values across a plurality of headers; a difference or other relation between two or more headers; a timing associated with one or more headers (for example and without limitation, an arrival time, a inter-arrival time, a response time, a lag time, and so forth); a count or size associated with one or more headers (for example and without limitation, a size of the header as measured in bytes, a size of a payload as indicated in the header, a sequence number or count of the packets in the data flow 444 as indicated in the header, a count of a plurality of headers; and so forth); a value in a payload; a sequence of values in a payload; a sequence of values across a plurality of payloads; a difference or other relation between two or more payloads that are associated with the data flow 444; a timing associated with a payload (such as and without limitation, an arrival time, an inter-arrival time, a response time, a lag time, and so forth); a count or size associated with one or more payloads (for example and without limitation, a size of the payload as measured in bytes; a cumulative size of the payloads; a projected or expected size of the payload; a projected or expected cumulative size of the payloads; the number of payloads associated with the data flow; and so forth); and so on.

The data flow 444 may be received at the physical network interface 302 and then provided to the data flow engine 308. There, the data flow 444, which may be embodied as one or more network data packets 402, may be duplicated. One of the duplicate data flows 444 may proceed to a cell generator 404, while the other may be routed to the data flow processor 310.

The cell generator 404 may convert the packet 402 into a data cell 408, which may simply be an alternate representation of the packet 402. This data cell 408 may be optimized for transmission via the backplane 224 and the switching fabric 304. The data cell 408 may also be optimized for communication between the network processor module 210 and the application processor module 212.

From the cell generator 404, the data cell 408 is transmitted to a cell router 410. The cell router 410 may consider the data 408 in light of an application identifier 412 and security policy 414. Based upon that consideration, the cell router 310 may direct the data cell to the application processor module 212; to a packet generator 418; or to a done logical block 420. The application processor module 212 can receive the data cell 408 from the cell router 410, process the data cell 408; and return the data cell to the cell router 410. This processing of the data cell 408 by the application processor module 212 is described in detail hereinafter with reference to FIG. 5. The packet generator 418 can receive the data cell 408 and transform it into a packet 402, wherein both the data cell 408 and the packet 402 are elements of a data flow. These packets 402 are transmitted as a data flow to the physical network interface 302 from which they are transmitted out of the flow processing facility 102. The done logical block 420 is provided to illustrate that some data cells may be discarded by the cell router 410. The reasons for discarding data cells are numerous, but some examples include reducing network congestion associated with the data cell; reducing resource utilization associated with the data cell; eliminating a data cell that is associated with a prohibited application, source, destination, or some such; and so forth.

The application identifier 412 may be associated with an application group 422, which may be associated with a normalized data type 424, which may be associated with normalized data 428. The application identifier 412 relates to an application that is or could be operating in an application processor module 212. One or more application identifiers 412 may be associated with an application group 422, which may simply be a set of application identifiers 412 that are provided together as group. The normalized data type 424 may simply indicate the type of the normalized data 428. The normalized data 428 may encompass a representation of the data flow 444.

In the interest of providing at least a semblance of visual clarity, each of the elements of FIG. 4 is depicted as a singular block. Particularly in this figure and generally in all figures, it may be appreciated that any of the elements of a figure may encompass a plurality of such elements, even in cases where the depiction may seem to suggest otherwise. Thus, in embodiments, there may be a plurality of network data packets 402; cell generators 404; data cells 408; cell routers 410; application identifiers 412; security policies 414; packet generators 418; done logical blocks 420; application groups 422; normalized data types 424; normalized data 428; identifiers 430; customer identifiers 432; service identifiers 434; service level identifiers 438; other identifiers 440; alerts 442; data flows 444; fingerprints 448; action rules 450; header rules 452; content rules 454; physical network interfaces 302; application processor module 212s 212; and so forth.

The security policy 414 may be associated with an identifier 430, which may be associated with the normalized data 428. The identifier 430 may include one or more of the following: a customer identifier 432; a service identifier 434; a service level identifier 438; or another identifier 440. The security policy 414 may specify any number of limitations or conditions that may be applied to the data flow 444 or its corresponding data cells 408. Alternatively or additionally, the security policy 414 that may be associated with an application that resides within the application processor module 212. In some embodiments, the security policy 414 specifies that certain data cells 408 may be processed by the application processor module 212 while others may not. For those cells that may not be processed, the security policy 414 may specify whether the data cells may be passed through to the packet generator 418 and out of the flow processing facility 102, or whether the data cells may be routed to the done logical block 420, where they are discarded (or, perhaps, logged—but in either case not allowed to leave the flow processing facility 102).

The identifier 430 of the normalized data 428 may encompass metadata related to the normalized data 428. In one example, which is presented here for the purpose of illustration and not limitation, the normalized data 428 is related to a customer that is assigned a customer identifier 432. In the networked computing environment 100, the customer may be an in-house customer, who may be associated with the departmental computing facilities 110. Alternatively, the customer may be an outside customer, whose computing facilities are operatively coupled to the internetwork 104. In this case, the data flow 444 may originate from an application or computer system that is associated with or operated by the customer. Depending upon a business relationship between the operator of the flow processing facility 102 and the customer, a particular security policy 414 may be associated with the customer. In one example, a customer is denied access to the departmental computing facilities 110 but is granted access to the server computing facilities 108. When normalized data 428 that is associated with the customer is present, the chain of associations between that data 428, the customer identifier 432, and the security policy 414 will be invoked. The cell router 410 may act in accordance with the invoked security policy 414, causing all data cells 408 that are of a data flow 444 of the customer and that are addressed to the departmental computing facilities 110 to be routed to the done logical block 420. Many other such examples are described herein and will be appreciated from the present disclosure, and all such examples are encompassed by the present invention.

In some cases, the normalized data 428 is related to a service that is associated with a service identifier 434. In the networked computing environment 100, the service may be provided by the flow processing facility 102. Alternatively or additionally, the service may be provided by a server computing facility 108, the departmental computing facilities 110, or any other computing facilities that are operatively coupled to the flow processing facility 102 or the internetwork 104. In one application and without limitation, the service is a peer-to-peer networking technology that is provided by two computing facilities 108 that are operatively coupled via the flow processing facility 102. A security policy 414 that denies transmission of a data flow 444 may be associated with a service identifier 434 that is associated with a normalized data 428 representation of a peer-to-peer data flow 444. In this way, when such normalized data 428 is present, the chain of associations between that data 428, the service identifier 434, and the security policy 414 will be invoked. The cell router 410 may act in accordance with the invoked security policy 414, causing all data cells 408 that are of the peer-to-peer data flow 444 to be routed to the done logical block 420.

In some cases, the normalized data 428 is related to a service level that is associated to a service level identifier 438. In the networked computing environment 100, the service level may be associated with a service that is provided by the flow processing facility 102. Alternatively or additionally, the service may be provided by a server computing facility 108, the departmental computing facilities 110, or any other computing facilities that are operatively coupled to the flow processing facility 102 or the internetwork 104.

When the service encompasses a peer-to-peer networking technology, it may relate to two or more computing facilities 108 that are both engaged in a peer-to-peer application and operatively coupled via the flow processing facility 102. A security policy 414 that denies transmission of a data flow 444 may be associated with a service identifier 434 which is associated with a normalized data 428 representation of a peer-to-peer data flow 444. In this way, when such normalized data 428 is present, the chain of associations between that data 428, the service 434 identifier, and the security policy 414 will be invoked. The cell router 410 may act in accordance with the invoked security policy 414, causing all data cells 408 that are of the peer-to-peer data flow 444 to be routed to the done logical block 420.

Generally, the normalized data 428 may be related to something that is associated with an identifier 430. For the purposes of capturing this notion, the other identifier 440 is provided to emphasize that any and all identifiers 430 that will be appreciated or that are mentioned herein may be represented and utilized according to the present invention. Many other such examples are described herein and will be appreciated from the present disclosure, and all such examples are encompassed by the present invention.

In embodiments, a system according to the present invention includes hardware-based logic that matches action rules 450 to packets 402 and/or their corresponding data cells 408. The cell router 410 and/or the cell generator 404 may encompass this hardware-based logic. The logic may accept an action rule. The action rule 450 may include a header rule 452, which describes an aspect of a header such as protocol type, source address, destination address, source port, destination port, TCP direction, and so forth. The action rule 450 may additionally include a content rule 454, which relates to a transport-level payload, such as the payload of one or more TCP packets. The header rule 452 may be designated as focused and only one focused rule can match a given packet. The header rule 452 may be designated as promiscuous and any number of promiscuous rules can match a given packet or data cell 408. A compact representation of the header rule 452 may be provided. This representation may explicitly represent a focused header rule 452 combined with a representation of one or more promiscuous header rules 452. Regardless of its representation or designation, a header rule 452 may relate to an action of the cell router 410. In particular, the action may encompass both routing a data cell 408 to a particular application processor module 212 and addressing the data cell 408 to a particular application within the application processor module 212.

In embodiments, the action rules 450 may specify an action that occurs when the header rule and/or content rule match an aspect TCP packet 402 or a sequence of TCP packets 402. The action can be to pass or drop the packets 402. The action can be to receive, modify, and send the packets, resulting in a modification to the headers and/or payloads of the packets 402. The action can be to receive, process, and send a response to the packets 402, such as may occur in a proxy or cache that itself recognizes a request in the payloads of the packets 402. In this way, a data flow engine 308 may respond, just as a proxy or cache would, to a request without passing the packets 402 or data cells 408 associated with the request to the destination specified in their headers.

In embodiments, an action rule 450 may specify an action that triggers a transaction. The transaction may encompass a financial transaction associated with the provision of a service. In an example and without limitation, an owner or operator of the flow processing facility 102 may automatically charge a fee every time the data flow engine 308 responds to a request as a proxy or cache would. Alternatively or additionally, the transaction may encompass a database transaction. In an example and without limitation, a modification to a logging database may be conducted and committed in response to packet 402 or data cell 408 that matches the action rule. The logging database may contain a log of alerts 442, packets 402, data cells 408, or information associated with any and all of the foregoing. The logging database may be provided and/or maintained by a management server 228; a flow processing facility 102; a computing facility that is operatively coupled to a flow processing facility 102 via a physical network interface 302. Many other such examples involving a transaction will be appreciated and all such examples are within the scope of the present disclosure.

In embodiments, the action rule 450 may specify an action that triggers a translation of one protocol to another, where the protocol may be at the application level, the transport level, the network level, the link level, or any other such level.

The present invention may include a subscriber profile. This profile may relate an application to a subscriber. In doing so, it may specify access control rules, privileges, and preferences associated with that relation. Systems and methods of the present invention can store, distribute, modify, act in accordance with, and enforce aspects of the subscriber profile. The action rule may specify an action that comports with the subscriber profile. In an example and without limitation, the action rule may specify that packets 402 or data cells 408 that are associated with a subscriber get a higher priority than those that are not associated with the subscriber. This higher priority may entitle the packets 402 or data cells 408 to faster processing, higher bandwidth, lower latency, a preferred route, and so forth.

In embodiments, a system according to the present invention may include hardware-based logic that reassembles a data flow 444 from TCP packets 402. This logic, which may be encompassed by the cell generator 404, includes a replay process, which repeats current data and appends a packet to a TCP flow 444. The replay process may be recursive; the appended packet 402 may become part of the current data, to which the replay process can again be applied. The logic may also include pattern-matching circuitry (such as the regular expression logic, which may be an embodied as the content search logic 312) that triggers the replay process on a partial rule match, exemplified when a pattern in an action rule straddles a packet boundary. In this way, a data flow 444 can be replayed any number of times, with the replays being presented to pattern-matching circuitry associated with action rules 450. The data flow 444 can be incrementally extended as the payloads of additional TCP packets are appended to the data flow 444.

In some circumstances, the data flow engine 308 may issue an alert 442. The alert may be in the form of a data element, an electric signal, an audible or visible annunciation, and the like. The issuance of the alert may pertain to a condition of the data flow engine 308, such as and without limitation an internal error, a pending failure, a status report, and so forth. The alert may be provided to another element of the flow processing facility 102, to a human operator of the flow processing facility 102, or to any other facility capable of receiving the alert. In some embodiments, the alert may be transmitted via a wireless or wired communication link that may or may not be the internetwork 104, the backplane 224, the switching fabric 304, and so on.

It will be appreciated that, throughout this disclosure and in any and all disclosures included herein by reference, that data flows 444 (and their constituent packets 402 or cells 408) may encompass information that is encoded by different layers of a network stack. In an example and without limitation, the networks stack may comprise the Internet Protocol (IP) stack.

The flow processing facility 102 may provide serialization of applications that are running on application processor modules 212. Serialization may refer to the routing of data flows 444 from one application to another, in a particular order and according to a configuration. The flow processing facility 102 may implement an abstraction that is a simulated or logical network. This abstraction may include any and all servers and networking components that may occur in a real network, including without limitation hardware devices, physical interfaces, logical interfaces, network connections, and the like. Configuration tools may enable a user to create any and all emulated or logical networks by creating and destroying virtual network devices, and by connecting or disconnecting those devices. The configuration tools may further enable a user to configure the ports and interfaces on the virtual network devices, such as and without limitation by setting a MAC address, an IP address, or any and all other addresses as may be associated with the ports and interfaces. The virtual network devices may, without limitation, emulate server computers, server software, virtual machines, hubs, routers, switches, bridges, network ports, cables, virtual private networks, addresses, pipes, sockets, Unix sockets, and so on. In this way, the flow processing facility 102 may provide within itself an emulated or logical network environment.

Once configured, the flow processing facility 102 may implement the emulated or logical network environment by receiving data flows 444, converting them into data cells 408, and then routing them in a serial fashion to applications that are resident on various application processor modules 212. In addition to routing data flows 444 in a serial fashion, data flow engine 308 may route data flows 444 substantially in parallel, sending the flows 444 to two or more applications more or less simultaneously. Points at which such parallel sending of flows 444 occurs may be represented as a tap within the emulated or logical network environment. Regardless of whether the data flow are transmitted serially or in parallel, upon receipt of the data cells 408, the application processor modules 212 may then convert the data cells 408 back into packets 402 for presentation to the operating systems and/or applications that reside within the application processor modules 212. In this way, the operating systems and/or applications that are running on the application processor modules 212 may see and reside in the emulated or logical network environment as though it were a real network environment. In other words, these operating systems and/or applications see only a real network environment and operate only within this real network environment, which unbeknownst to them is actually an emulated or logical network.

In embodiments, data flows 444 that enter the flow processing facility 102 may not be destined for any particular element within the flow processing facility 102. In other words, the flow processing facility 102 may function as a more or less transparent element within a data network as opposed to an addressable endpoint that is connected to a data network. A data flow 444 that arrives at the physical network interface 302 may be driven to one or more application processor modules 212 in accordance with the emulated or logical network environment. In alternate embodiments, the flow processing facility 102 may inspect any and all aspects of the data flow 444 in order to determine which emulated or logical network environments should receive the data flow 444. In one aspect, the emulated or logical network environment may essentially tie the physical interface 302 to virtual network devices comprising the operating systems and/or applications that in fact reside within the application processor modules 212. In embodiments, any and all numbers of emulated or logical networks may coexist within the flow processing facility 102.

For example and without limitation, an emulated or logical network may comprise a firewall, an IPS application, and a traffic analyzer. Both the firewall and the IPS application may have an interface to a public network and an interface to a private network. The traffic analyzer may have an inbound network interface. In an emulated or logical network environment, all of these network interfaces may be assigned IP addresses. A public network connection may be attached to the public network interface on the firewall. The private network interface on the firewall may be connected to the public network interface of the IPS application. Along the connection between the firewall and the IPS application, a network tap may be configured to send any and all traffic along that connection to the inbound network interface of the traffic analyzer. The private network interface of the IPS application may also be attached to a private network connection. Both the public network connection and the private network connection may communicate data flows 444 that are associated, respectively, with a public network and a private network. The public network and the private network may be associated with a physical network interface 302 or a virtual network device. In this way a firewall, an IPS application, and a traffic analyzer that are designed to run on real network devices within a real network environment may be operatively coupled within an emulated or logical network in such a way that they function together as though they were installed on real network devices within a real network environment. As a result of the foregoing disclosure, those of ordinary skill in the art will now appreciate a vast number of applications of the flow processing facility 102, each of the applications including any and all numbers of emulated or logical networks and configurations comprising any and all number of virtual network devices. All such applications, networks, configurations, and devices are intended to fall within the scope of the present disclosure.

The management server 228 may provide a visualization of the emulated or logical networks. The visualization may include interactive features that allow a user to add, remove, and modify virtual network devices within the emulated or logical networks. In embodiments, a graphical user interface may comprise the visualization and interactive features. In embodiments, a command-line interface may comprise the interactive features.

Referring to FIG. 31, a data flow 444 may be composed of an IP-packet sequence that adheres to an Internet Protocol (IP) stack 3100. The IP stack 3100 will be familiar to those skilled in the art. Higher layer packets may be encapsulated in the payload of lower layer packets such that network communication devices that operate at the lower layer may transfer packets with arbitrarily complex payloads without regard for the complexity or content of the payload.

The uppermost layer is the application layer 3110. This layer 3110 may be used to define the particular data and/or data structures that applications may communicate. This data may be application specific and its design may be left to an application developer. In this way, any application-to-application communication may be developed and/or specified independently from the transport mechanism used to communicate the data between applications.

Application-to-application communications (i.e. one or more application layer 3110 packets) may be encapsulated in one or more transport layer 3112 packets. The transport layer 3112 may provide communication specifications that relate to the transport of data between applications. In embodiments, these specifications may be implemented across a plurality of computing facilities, providing a standard abstraction (or set of such abstractions) on top of which the application layer 3110 may reside. These abstractions may provide standardized systems and methods of communication between applications. In an example and without limitation, UDP, a transport layer 3112 protocol, provides the abstraction known as ports to facilitate application-to-application communication; TCP, a transport layer 3112 protocol, provides ports and also provides reliable, in-order data delivery. Many other transport protocols may operate at the transport layer 3112.

A transport layer 3112 packet (header and payload) may be encapsulated in the payload of a network layer 3114 packet. The network layer 3114 may enable the transfer of data between host computers over a network, perhaps without regard to the particular applications that may be communicating via the data. Network services associated with the network layer 3114 may include routing network layer 3114 packets from a source host to the destination host.

A network layer 3114 packet may be encapsulated in the payload of a data link layer 3118 packet. The data link layer 3118 may be associated with the transfer of data between physical nodes in a network. In an example and without limitation, the data link layer 3118 may be associated with Ethernet, WiFi, Token ring, and so on. Thus, a network layer 3114 packet may be formed in accordance with the requirements of a physical data link. Those skilled in the art will appreciate that an alternate embodiment of the data link layer 3118 may consist of frames containing payloads, wherein each frame may comprise a frame header, the payload, and a frame trailer. Thus, in the present disclosure, any reference to a header in the data link layer 3118 may refer to a packet header or to both a frame header and trailer, depending upon the embodiment of the layer 3118.

Any and all of the systems and methods of the flow processing facility 102 may be directed at content inspection. Many examples of content inspection are described herein and will be appreciated. All such examples are within the scope of the present disclosure.

Figure 5:
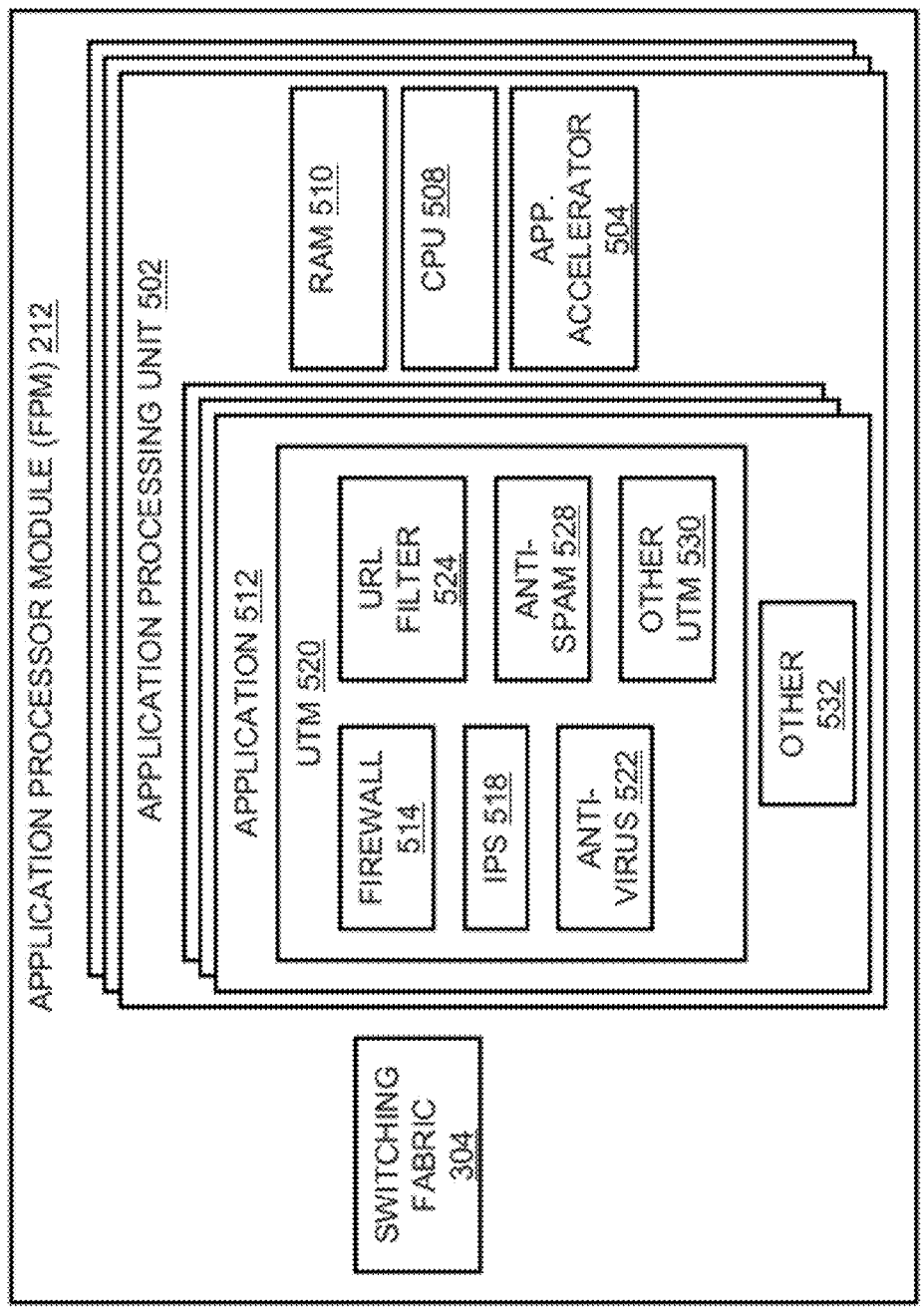
FIG. 5 depicts an expanded, logical view of an application processor module.

Referring now to FIG. 5, the application processor module 212 may include the switching fabric 304 and a plurality of application processing units 502. Each of the application processing units 502 may include an application accelerator 504, a central processing unit (CPU) 508, a random access memory device (RAM) 510, and a plurality of applications 512. The applications 512 may include a unified threat management (UTM) application, which in turn may encompass one or more of a firewall application 514; an intrusion protection system (IPS) application 518; an anti-virus application 522; a URL filter application 524; an anti-spam application 528; and another UTM application 530. The application processing unit may be a logical or physical unit, encompassing one or more hardware devices or software applications. The applications 512 may also include another, non-UTM application 532. Many aspects of the application 512, the application processing unit 502, and the application processor module 212 may be described hereinabove with reference to other figures.

In the preferred embodiment, the application processing unit is a commercial-off-the-shelf (COTS) computer or emulates the same. The applications 512 may be software applications that are uploaded, stored, and/or built into the application processing unit 502. In the preferred embodiment, the applications 512 are best-of-breed software applications that are not specifically designed for operation in a flow processing facility 102. In particular, the applications are preferably, but not necessarily implemented, for COTS computers. Since the application processing unit is a COTS computer or emulates a COTS computer, the applications are capable of operating within the application processing unit 502 as though they were operating within a COTS computer.

The application accelerator 504 may be a specialized hardware device for accelerating a computational feature of an application 512. In one example, the application accelerator 504 is a cryptographic acceleration engine for encrypting and decrypting data. The application 512 may be designed to utilize the application accelerator 504. Alternatively, the application processing unit 502 may automatically utilize the application accelerator 504. In an example, the application accelerator 504 may comprise an FPGA and the application processing unit 502 may profile the execution of the application 512 in order to identify a critical section of the application 512 that is compute intensive. Providing an accelerated execution of the critical region, this critical section may be dynamically programmed into the FPGA. Many such examples relating to the application processor module 212 and its elements will be appreciated from this disclosure and all such examples are objects of the present invention.

In embodiments, a UTM application may encompass a system or method that accepts a data flow 444 and classifies it according to whether or not a more detailed inspection of the flow 444 is warranted. If the detailed inspection is warranted, the UTM application may communicate and/or refer the data flow 444 to the application accelerator 504 for further processing. This further processing may include processing of headers, payloads, protocols, communication traffic patterns, behaviors, and so on. In any case, the application accelerator 504 may be directed at providing real time processing of the flow 444. This further processing may be directed at providing one or more aspects of unified threat management, such as those described herein and elsewhere, and those that will be appreciated.

The CPU 508, in the preferred embodiment, is a COTS CPU such as an Intel Xeon processor, a Sun Sparc processor, or any other processor. The RAM 510 may be any embodiment of RAM, including SRAM, DRAM, Flash RAM, and so forth. Many of the applications 512, 514, 518, 520, 522, 524, 528, 530, 532 are herein described in detail and/or will be appreciated from the present disclosure. All such applications are within the scope of the present invention.

Figure 6:
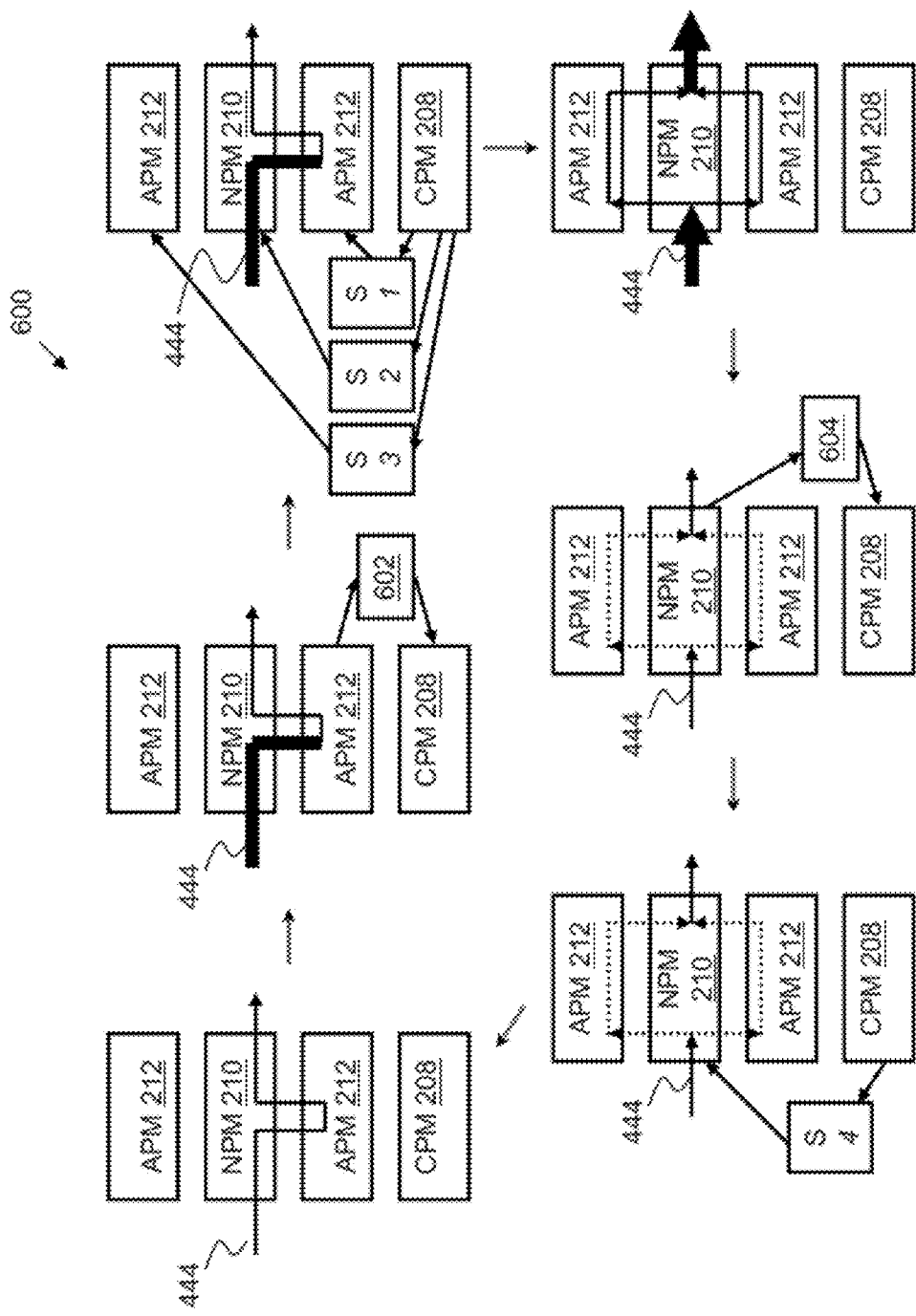
FIG. 6 depicts a logical progression for reconfiguring the flow processing facility in response to a changing data flow.

Referring now to FIG. 6, an example sequence of events 600 shows how the flow processing facility 102 can adapt to changeable data flow conditions. The figure presents six snapshots of the flow processing facility 102. Each snapshot includes two application processor modules 212, a network processor module 210, and a control processor module 208. Arrows that are unassociated with those modules indicate the progression of snapshots as the flow processing facility 102 adapts to changes in the data flow 444 over time.

The first snapshot is the top, leftmost snapshot. Here, a data flow 444 enters the network processor module 210, which routes the data flow to an application processor module 212. The application processor module 212 returns the data flow back to the network processor module 210, which transmits the data flow 444 out of the flow processing facility 102. It will be understood from the foregoing discussion with reference to previous figures that the data flow 444 may be represented at times as packets and at times as data cells. It will also be understood that the data flow 444 or elements thereof may be modified by an application residing in the application processor module 212.

In the next snapshot, which is directly to the right of the first snapshot, the data flow 444 as it first arrives at the network processing module 210 is of such a nature that processing it at one application processor module 212 would exceed the capabilities of that module. This nature may relate to network bandwidth, processor or CPU bandwidth, RAM-related requirements, and so forth. In any case, the application processor module 212 recognizes that it is incapable of completely processing the data flow 444. While continuing to process the data flow 444 to the greatest extent that it can, the application processor module 212 transmits an application-alert signal 602 to the control processor module 208. This application-alert signal 602 serves to notify the control processor module 208 that an overload condition exists at the application processor module 212. The alert signal 602 may further indicate the nature of the overload or any other data or metadata associated with the overload. The control processor module 208 receives the alert signal and processes it.

In the next snapshot, which is directly to the right of the last one, the overload condition persists. The control processor module 208 transmits three signals (S1, S2, S3), one directed at each of the two application processor module 212s and one directed at the network processor module 210. The signal 51 to the application processor module 212 that is currently handling the data flow 444 may encompass an acknowledgement of receipt of the application-alert signal 602. The signal S2 to the network processor module 210 may encompass instructions to begin dividing the data flow 444 into two data flows 444. The signal S2 may further encompass instructions to transmit one data flow 444 to the presently active application processor module 212 while transmitting the other data flow 444 to the presently inactive application processor module 212, which is the topmost APM 212 in the present snapshot. The signal S3 may encompass instructions to the inactive application processor module 212 to configure itself to accept a data flow 444 and to process that data flow 444 with a particular application 512 or set of applications 512. These applications 512 may be the same application 512 or applications 512 that are presently processing the data flow 444 at the active application processor module 212. In other words, the presently inactive application processor module 212 may be configured in response to the signal S3 to replicate the functionality of the active application processor module 212.

In the next snapshot, which is directly below the last one, the data flow 444 into the network processor module 210 is the same as in the previous snapshot. However, now the network processor module 210 divides the incoming data stream into two smaller data flows 444. Both of the application processor modules 212 receive one of these data flows 444. These data flows 444 are of a nature that the receiving application processor modules 212 can process them without creating an overload condition. Having processed the data flows 444, the application processor modules 212 return the data flows 444 to the network processing module 210, where they are reunited into a single data flow 444 that is transmitted out of the flow processing facility 102.

In the next snapshot, which is directly to the left of the last one, the data flow 444 arriving at the network processor module 210 is of a reduced nature as compared with what it was in the previous snapshot. As before, it is divided and each of the resultant data flows 444 are transmitted, received, and processed as before. However, as depicted by dotted lines, the data flows 444 resulting from the division are of a nature that a single application processor module 212 could process both of them without creating an overload condition. In other words, at this point it is now unnecessary to divide the data flow 444 as it first arrives at the network processor module 210. The network processor module 210 recognizes this condition and transmits a network-alert signal 604 to the control processor module 208. The control processor module 208 receives this alert 604 and processes it.

In the next snapshot, directly to the left of the last one, the data flow 444 and its division, transmission, reception, and processing are as they were in the previous snapshot. Here, the control processor module 208 transmits a signal S4 to the network processor module 210. This transmission may be in response to the network-alert signal 604. The signal S4 may encompass an instruction to the network processor module 210 to cease dividing the incoming data flow 444 and, instead, to resume the original mode of operation as depicted and described with reference to the first snapshot. The network processor module 210 receives and processes this signal S4. The network processor module 210 complies with this signal S4 and the flow processing facility 102 assumes the configuration of the first snapshot.

Although the invention can be used in a wide variety of applications, the following examples describe its application in telecommunications-traffic monitoring and, without limiting other applications and embodiments, may illustrate some of its novel features.

Figure 7:
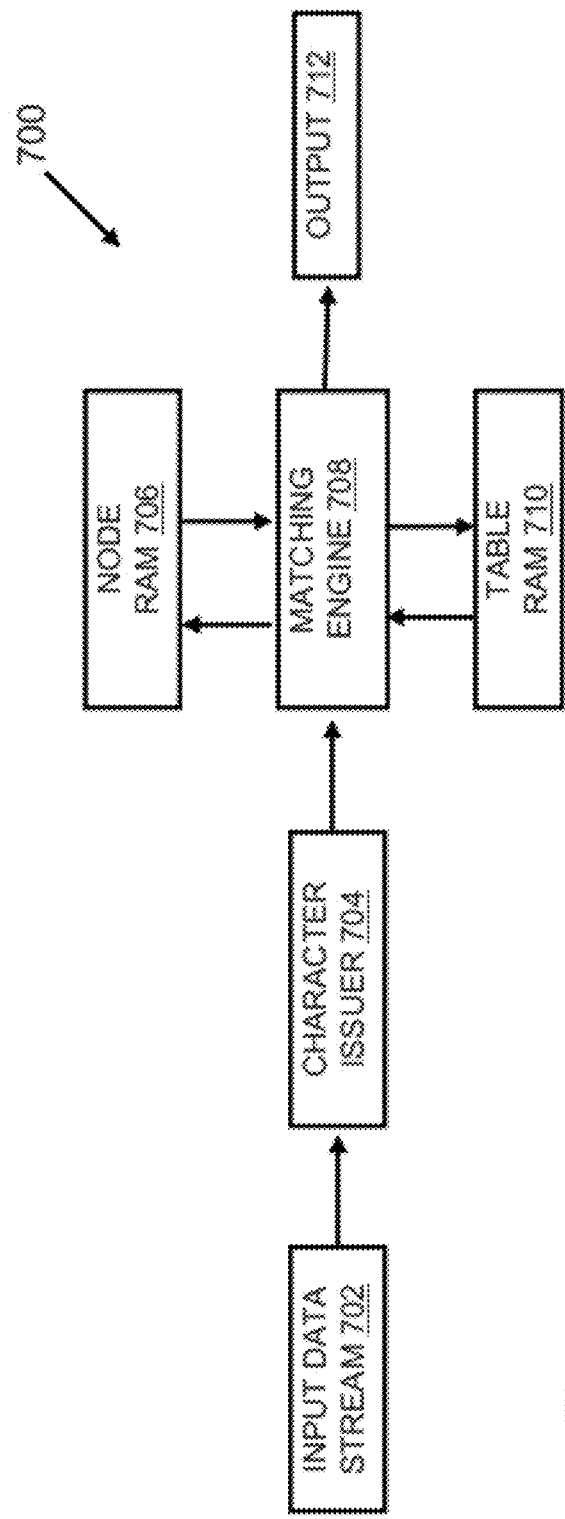
FIG. 7 depicts an expanded, logical view and process flow of content searching.

FIG. 7 depicts an embodiment of an aspect of present invention. A monitoring system 700 (which may be subsumed within content search logic 312) receives an input data stream 702 and employs an apparatus reflected in the elements with FIG. 7. In some implementations, it may be desirable to process input data stream 702 in small units, typically bytes. Note also that in practice, some embodiments of the invention may or may not segregate functions among discrete hardware and/or software modules according to a precise fashion, such as that shown in FIG. 7. It will be appreciated that the layout of the drawing in FIG. 7 may serve to illustrate, without limitation, a method wherein functionality of the present invention may be embedded. In this sense, FIG. 7 and related drawings may provide a simplified view of the present invention for pedagogical purposes, in a manner that conveys novel teachings of the present invention.

Character issuer 704 accepts input stream 702 and may formulate a representation of a new character (which may be composed as a byte and/or other data unit) which may be presented together with an indication of that character's position input data stream 702. Node RAM 706 (and/or some read/write capable device) may contain node-representing data structures whose contents may have been determined from some set of one or more of patterns to be matched. Matching engine 708 may be used to fetch node identifiers (and/or other related information) from node RAM 706 by presenting addresses constructed from input data stream 702 and a last-fetched node identifier. Note, however, that, as detailed below, the last-fetched identifier may not have been fetched from node RAM 706. One possible method for executing this construction mechanism may be described in detail hereinafter or elsewhere.

The data fetched by matching engine 708 may include (but may not be limited to) a node identifier, but may also include an indicator of whether that node represents the end of a complete match that may be required by one or more predefined rules. When matching engine 708 thereby detects a match, it may present an address to table RAM 710 dictated by the match-indicating node's identity. That address may point to one or more list(s) of rules that may be related to detection of this pattern and that may require enforcement when such a string has been found. From this information, matching engine 708 may produce output 712 that may cause any appropriate action to be taken.

As was mentioned above, while FIG. 7 illustrates one possible implementation, there may be many, perhaps widely varied architectures within which the present invention's teachings can be implemented. In an example, they can be implemented in any general-purpose digital computer; in dedicated or application-specific hardware; in any and all combinations of the foregoing; and so on. In any and/or all of these variations, the functions that may be associated with the content search logic 312 or any and all other elements of the present invention may be distributed or arranged in any number of ways within an embodiment, wherein any particular arrangement may be suited for or directed at requirements that are associated with a use and/or context of the embodiment.

Figure 8:
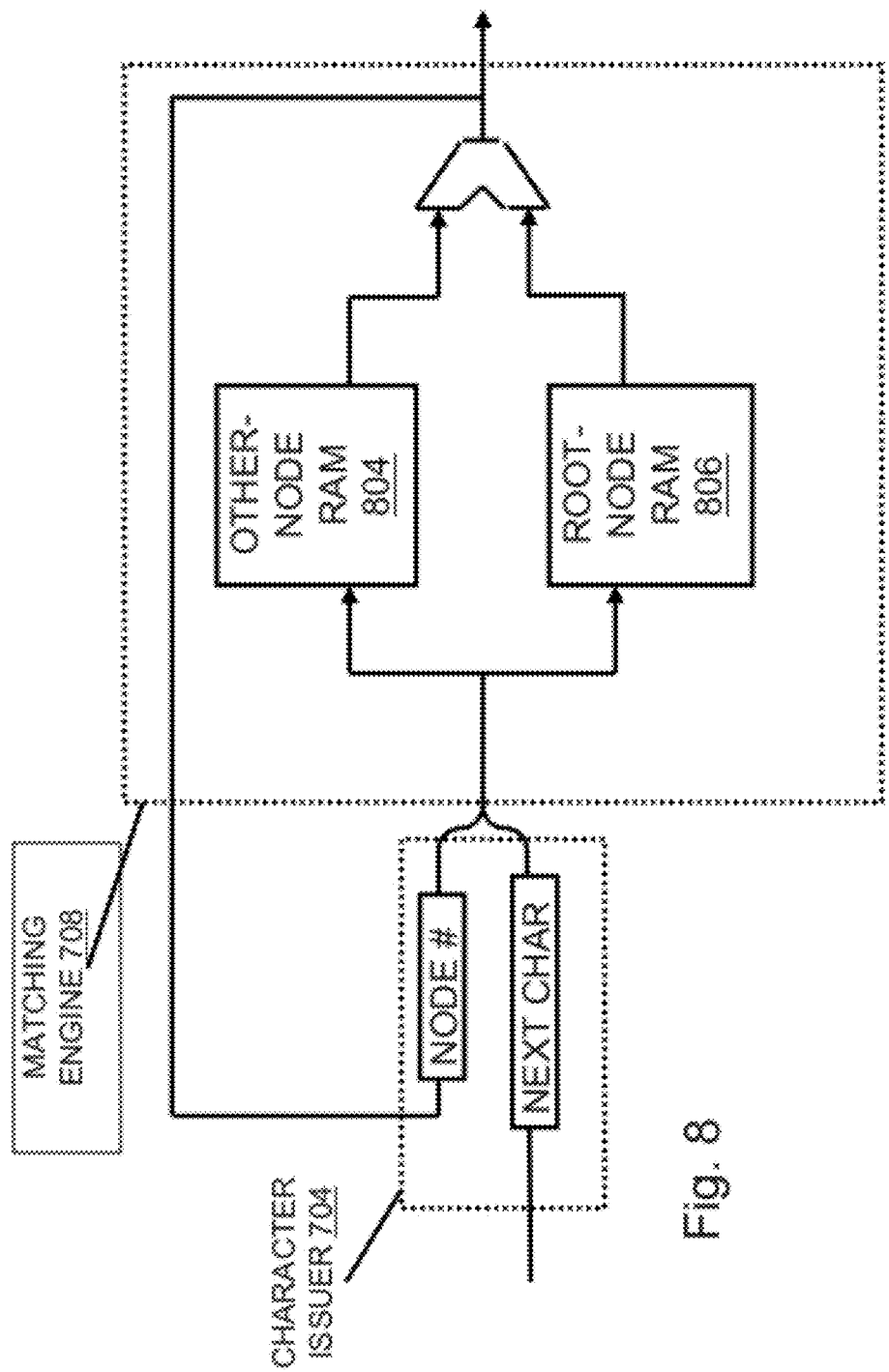
FIG. 8 depicts an expanded, logical view and process flow of portions of FIG. 7.

FIG. 8 depicts in more detail the data flow associated with matching engine 708. The individual character from the "packet data" may be used concurrently in addressing both other-node RAM 804 and root-RAM 806. In the illustrated embodiment, root-RAM 806 may contain only the root node of a pattern tree (i.e., a data structure that lists the root node's child nodes), although other embodiments that employ such concurrent node addressing may also include the root node's closest descendant nodes. The other-node RAM 804 includes all the other nodes. Since the single node that root-RAM 806 contains may ordinarily require less than a single kilobyte of storage, the integrated circuit within this embodiment's matching engine 708 may include root-RAM 806 on board.

In embodiments, pattern trees (such as those of FIG. 9 and other figures) that may reach several thousand nodes (or more), and the storage requirements of such trees or associated arrays may exceed, for example and without limitation, half a megabyte of memory. Thus, some embodiments may provide other-node RAM 804 in a separate dedicated read/write capable device of sufficient capacity and speed to support storage and/or processing of such pattern trees.

Since, in some implementations, other-node RAM 804 may contain many nodes, addressing requirements may require both a high-order, node-indicating portion and a lower-order, link-indicating portion (where the latter identifies an entry within the node). Each such entry may both 1) identify a respective child node; and 2) indicate whether that node is a terminal node. The node-identifying portion of the RAM output that results from addressing such an entry may form the high-order bits of the address that will be next applied to the other-node RAM 804. The low-order bits of that address may then be derived from the next input character.

It may be desirable in some implementations to provide two separate matching engines 708 with respective read/write capable devices for storage of node information. In such cases, both matching engines 708 may receive the same data, but the tree structures in their read/write capable devices would represent different patterns. One advantage of such an extension may be that two pattern matchers doubles the amount of pattern memory and may allow some patterns to be preprocessed. One of the pattern matching engines 708 can, for example and without limitation, be dedicated to case-insensitive patterns by changing the case of the string before the search operation. This may improve the tree's efficiency and may additionally reduce the amount of memory used for each pattern.

But note that there is no limit on the number of pattern matching engines that may be integrated, and though this may entail additional complexity, in some implementations, the optimizations that may result justify the cost. One implementation, for example, supports four pattern trees. In this case, one pattern tree is dedicated to patterns in the URL. A second pattern tree is used for decoded telnet (i.e. preprocessed telnet data located in the decode buffer). The third pattern tree contains the rest of the search patterns. The fourth pattern tree is reserved for future optimization. In this particular implementation, each pattern tree has its own on-chip root node and its own initial root node, but this optimization is optional and represents one of many possible optimizations that may be employed.

Embodiments of the present invention also deal with the condition wherein the next input character results in a failure (that is, when there is no searched-for pattern in which that character succeeds the prefix that the current node represents). Suppose, for example, that the current node is node 14 in FIG. 9. That node represents the ABEB (which will be referred to in the following as the "current prefix"). If the next input character is D, a failure has occurred, because there is no prefix ABEBD in any of the searched-for patterns.

In some embodiments of the Aho-Corasick algorithm, the node 14 data structure would nonetheless include an entry corresponding to D, and that entry would identify the BD-representing node 7, because B is the longest suffix of the node-14-represented prefix ABEB that D immediately succeeds in any searched-for string. Stated more generally, the current node's entry corresponding to the next input character would identify the node that represents the longest prefix that results from concatenating the current input character with a suffix of the current prefix.

Although the foregoing may describe the operation of an instance of the Aho-Corasick algorithm in a given scenario wherein a pattern-match failure has occurred (that is, when input pattern ABEBD is presented), there are embodiments of the present invention wherein the pattern matching of an input pattern may succeed (or may proceed in an alternate manner than that presented herein). Suppose, for example, that the next input character (in the sequence ABEB) is an A instead of the D as described in the foregoing scenario. An optimization of the Aho-Corasick algorithm may additionally or alternatively provide node 14 with an entry corresponding to that character (where the entry would represent a link to node 2; noting, however that this is not explicit in FIG. 9), in implementations of the present invention, there may be two concurrently addressed RAMs (namely, the root-node RAM 806 and the other-node RAM 804) and if the current node's data structure in the other-node RAM 804 has no entry for the input character, the next address's high-order bits may be drawn from root-node RAM 806 rather than from other-node RAM 804. Thus, in implementations, a given node may not need an entry for a given character if that character's entry in the given-node structure would represent a link to the same node as its entry in the root-node structure would. Specifically, since the root-node structure's entry for A identifies node 2 and node-14 structure's would, too, node 14 may not require an entry for that node.

In this manner, many other entries may be similarly be dispensed with, and one consequence may be that many of the node data structures according to the present invention may require less memory than other Aho-Corasick embodiments. This may result in lower computational complexity within content search logic 312 and/or associated modules, an optimization that may provide advantages in cost and/or processing speed and/or in reliability.

Additional optimizations may be realized, as well. To reduce the amount of memory needed to store the node links, some implementations may add a mechanism to allow the removal of a portion of the node links when these links may be holding the default, root-node-identifying value. In some implementations, for example, many nodes may use only a small number of links to hold node IDs. The rest may, in general, be the default value, which is the root node ID. Thus, in implementations, in order to utilize memory efficiently and in order to maximize the number of nodes in memory, only the links with node IDs may be stored.

These types of memory optimizations provided by the present invention may be seen in the following example implementations. In one such example, associated memory space may be divided into sixteen regions of equal size. Each region may then be programmed to use one of three node sizes. The node sizes (in this example) are 64 entries, 128 entries, and 256 entries. The alignment of the nodes in each region may also be programmable. The possible alignments are 0, 64, 128 and 192 entries. The alignment thus maps the reduced node entries in memory into the original node offsets, thereby reducing the memory requirement. In an example, in this scheme (though others of this type are possible depending on the context and requirements of a particular implementation), if the alignment is 64 and the size of the node is 64 entries, there will be no entry for a character whose values is in the range 0-63 or 128-255; when the next character has any of those values, the next node ID will be drawn from root-node RAM 806 rather than from other-node RAM 804. But for entries for character values 64 to 127, the node ID should still be drawn from root-node RAM 806.

Note that in implementations of this type, the region number 0 may be permanently set to a node size of 256 entries, and although this may not itself provide optimization, within the present invention, this approach may provide another optimization.

Figure 11:
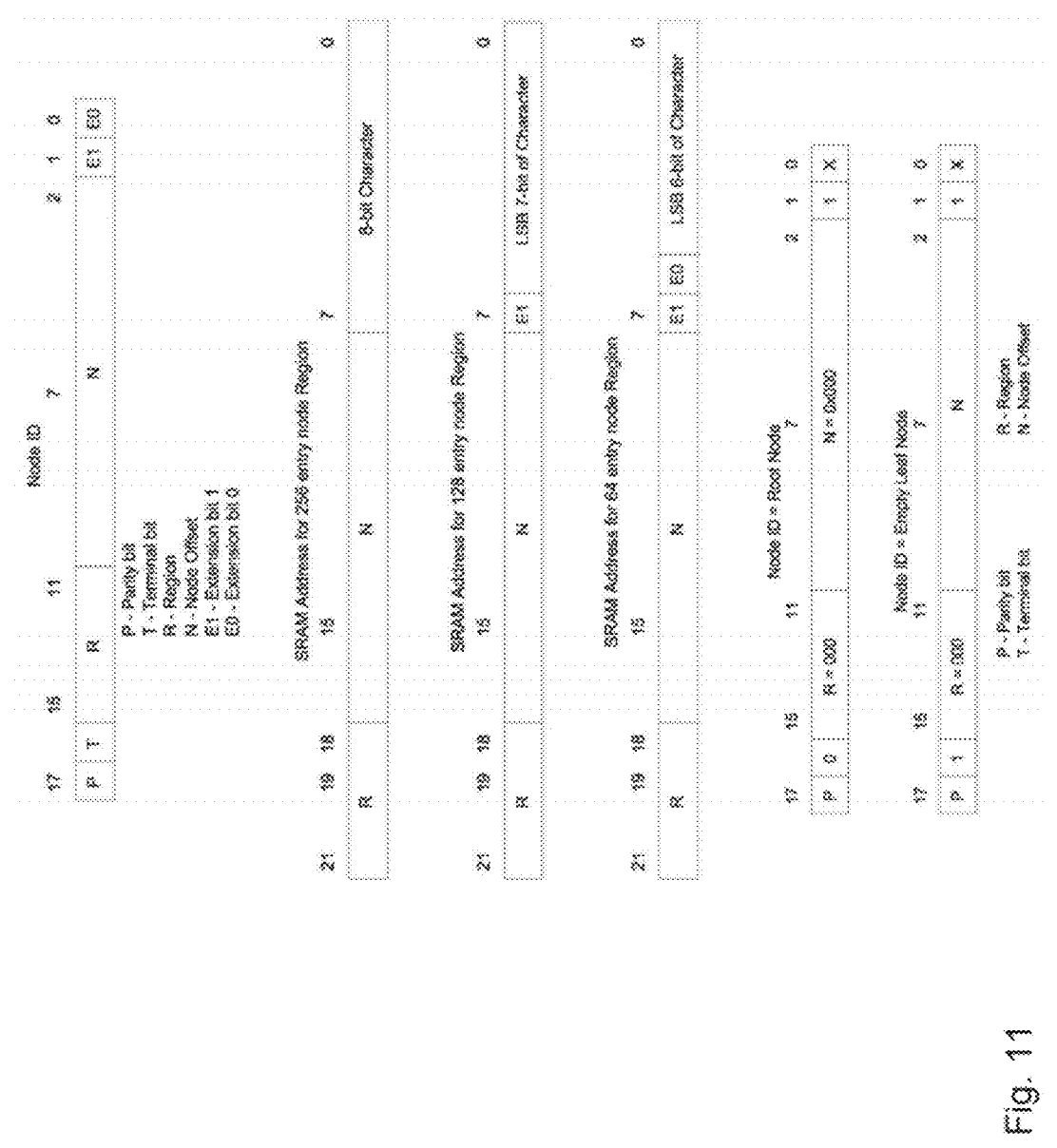

FIG. 11 provides, without limitation, an example of this approach. In this example, on-chip memory is deployed and leaf nodes that have no links may be further optimized by eliminating the entire table of links. Since all the links will, in this case, be the default value, the next node may be solely determined by an on-chip root lookup. Empty leaf nodes will be assigned node IDs that do not map to physical memory. Region number 0 is permanently set to a node size of 256 entries so the E1 and E0 bits are not used in the formulation of the node number. Thus, this configuration may allow an optimization wherein nodes may be mapped without using any memory space. When the region number is 0 and the E1 bit is 0, the circuit may map the node ID to the appropriate read/write capable device. In this case, the node ID is used to determine the next node. When the region number is 0, the T bit is 1 and the E1 bit is 1, an empty leaf node will be decoded and the next node will be determined by the on-chip root lookup. The resultant node ID format and SRAM (or some appropriate read/write capable device) address format is shown in FIG. 11.

Note that empty leaf nodes may only be allowed in region 0. Therefore, an empty leaf node may be decoded whenever the T bit is set and the E1 bit is set and the region number is 0. The E1 bit is ignored in regions 1 to 15 if they have node sizes of 256 entries. The node ID may be reserved for the root node where the region number is 0, the T bit is 0 and the E1 bit is 1. In this instance, this ID composes the root node for all trees and an optimization is realized in the use of the on-chip root lookup to determine the next node.

Note that the format of the node ID for the root node may imply a non-terminal node while the format of the empty leaf node implies a terminal node. In the pattern tree, therefore, an empty leaf node should always be terminal and the root node should never be terminal. Thus, FIG. 11 illustrates, without limitation, an example embodiment wherein a pattern tree with a terminal node and an empty leaf node is shown. Terminal node 3 is not empty because it needs to transition to node 2 when it detects the character 'b' and therefore requires a link to be placed in its table.

Figure 12:
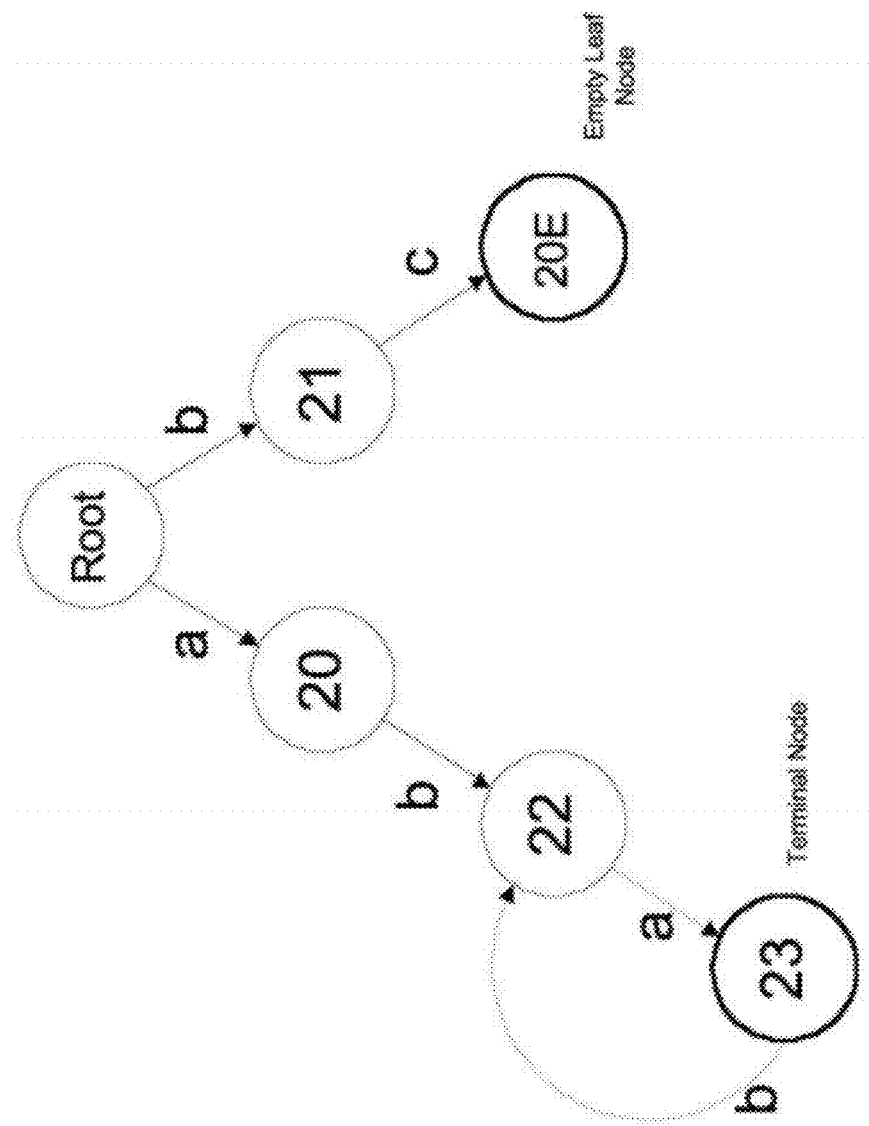
FIG. 12 depicts a pattern tree with a terminal node and an empty leaf node.
Figure 13:
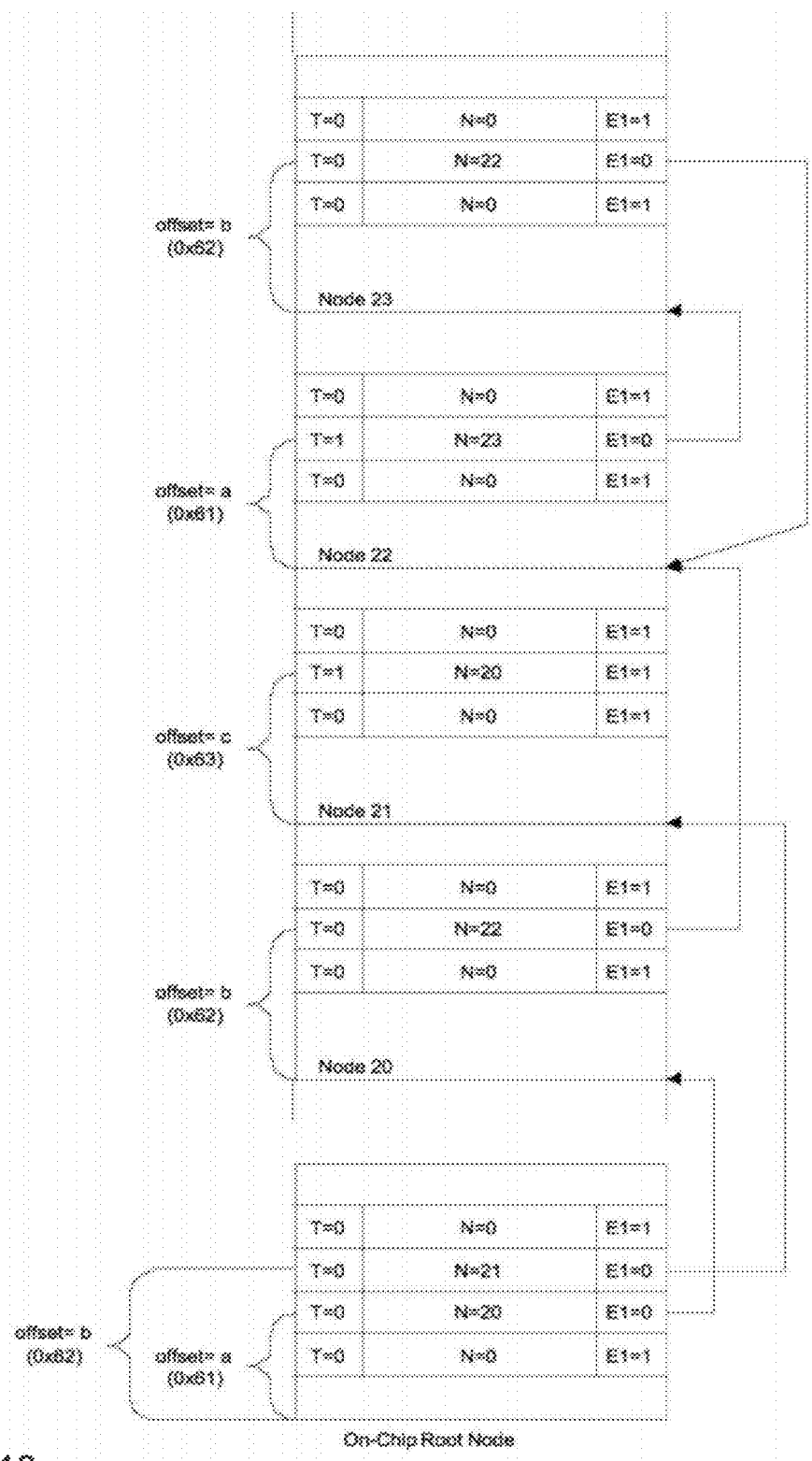
FIG. 13 depicts a pattern tree embodied in a computer memory.

FIG. 12 illustrates a pattern tree with a terminal node and an empty leaf node, which may be implemented with a root node and 4 nodes in SRAM (or any and all other memory devices). FIG. 13 illustrates, for example and without limitation, how such a pattern tree may be embodied in the SRAM (or any and all other memory device). In this example, all the nodes are in a 256-entry region. Each node has 256 links, and each link consists of a node ID. If the link is empty (meaning that node does not have a transition for that particular character offset) its node ID must be the root node. (Note that the terminal node 23 does not have its terminal bits set.) Terminal nodes, in this example, are programmed by setting the terminal bit on all links to the terminal node. Node 23 is terminal by virtue of the terminal bit being set in a node ID at offset 'a' in node 22. Similarly, in this example, the empty leaf node 20E is a terminal node because the terminal bit is set at offset 'c' in node 21. The node offset of the empty leaf node is not used to calculate the next node. When the matching engine 708 encounters an empty leaf node, the next node will be the root node. The node offset of the empty leaf node is still important since it will be used to generate the match event number which indexes into an even translation table which may identify to subsequent circuitry the rule that the detected match contributes to satisfying. An embodiment of the event translation table may be described in detail hereinafter or elsewhere.

Referring now to the present invention in general, embodiments may provide methods that optimize position dependent string searches. Thus, embodiments of the flow processing facility 102 may include such position dependent string searches. In particular, the content search logic 312 may comprise and/or support such string searches. It will be appreciated that these string searches (or, indeed, any and all string searches) may be implemented in hardware, software, or a combination thereof.

It is noteworthy that string searches in conventional approaches may be constrained and/or limited by the position of the string when matching specific formats. Among the consequences of these limitations may be performance degradation and/or increased complexity and/or increased cost. While string search algorithms that address position constraints are generally implemented by searching only over the pertinent data ranges, this may not work well for multi-pattern search since each pattern may have different position ranges. The present invention addresses these limitations without impacting performance.

"Position dependent patterns" may be understood to refer to patterns that provide valid matches only if they occur at a specified position within a packet. "Absolute position patterns" may be understood to refer to patterns with position parameters that are measured from the beginning of the packet. "Relative position patterns" may be understood to refer to patterns with position parameters that are measured from the end of the previous pattern match.

Figure 14:
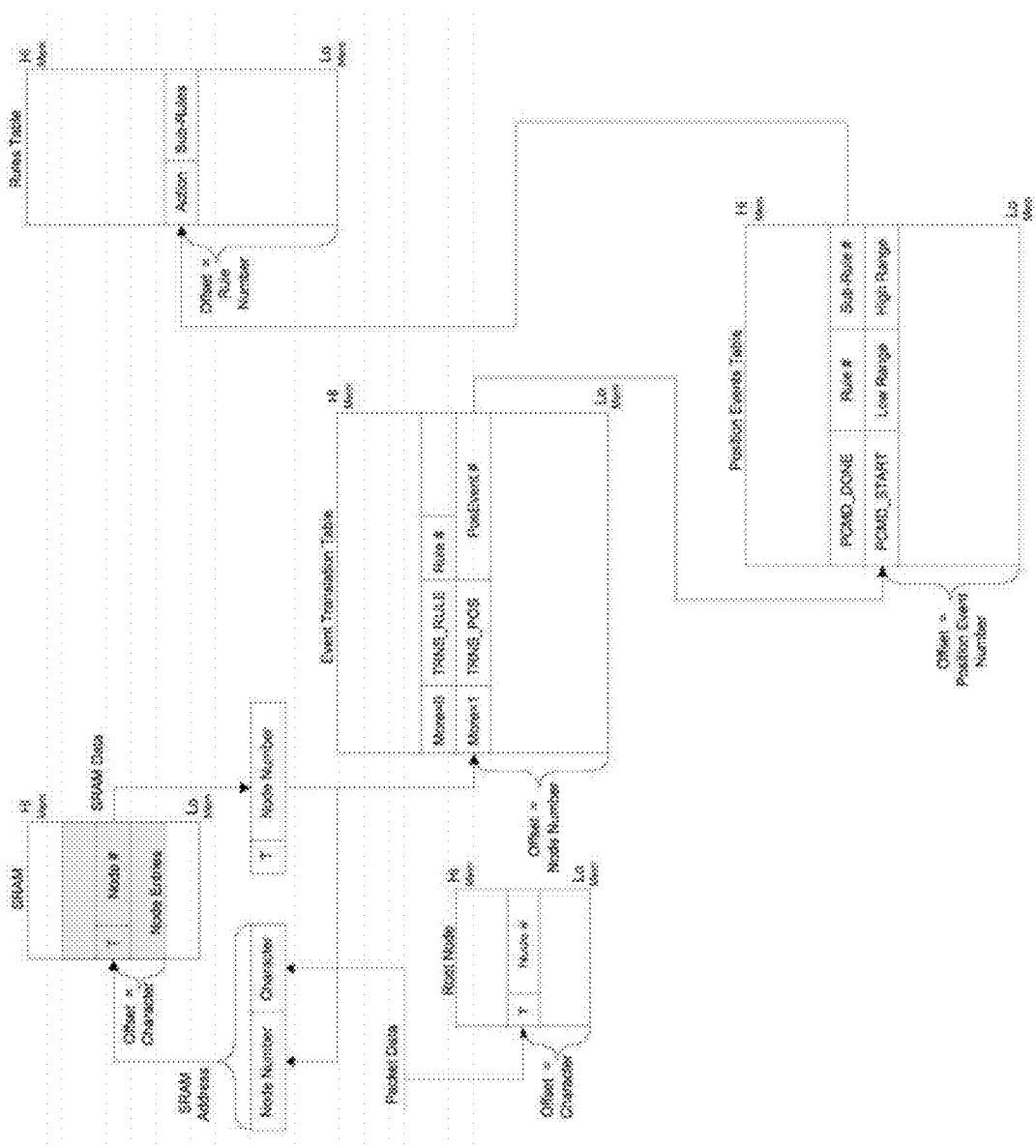
FIG. 14 depicts a relationship of pattern position tables.

In one implementation and without limitation, position dependent patterns may be translated as position independent patterns except that the command used in the event translation table may, in this case, be the TRNS_POS command instead of the TRNS_RULE command. Additionally, an entry in the position events table is needed to specify the pattern position and resultant rule number and sub-rule number. FIG. 14 shows one implementation of the relationship between the tables.

The absolute position pattern may, in this instance, be translated by using a PCMD_START command in the position events table to specify the position parameters. To accomplish this, two consecutive entries in the position events table are reserved for the absolute position pattern. The first entry is then written with the PCMD_START command and the absolute position data. The second entry is written with the PCMD_DONE command along with the rule number and sub-rule number. The offset of the first position entry is then written into the event translation table along with the TRNS_POS command. The event translation table is written using the node number as the offset into the table.

The following table shows the values used, in this example, for the low range and high range fields in the position event entry for absolute position events based on the SNORT language.

| | Absolute Position Event Entry | |
|---|---|---|
| SNORT Position Options | Low Range Value | High Range Value |
| none | 0xFFFF | 0xFFFF |
| offset: N; | N | 0xFFFF |
| offset: N; depth: M; | N | M |
| depth: M; | 0xFFFF | M |

Note that the relative position pattern in this instance is translated with a PCMD_NEXT command in the position events table to specify the position parameters. In these methods, relative positioning requires a position to be established with a match of a pattern. This may be accomplished with the PCMD_START command. In this case, however, it may not be necessary for the PCMD_START command to be position dependent. But the pattern must use the position event table to establish the initial position for the relative position patterns that will follow. The PCMD_NEXT command will be used, in this instance, to specify relative position values.

A PCMD_DONE command will indicate the rule number and sub-rule number for resultant matches. The following table shows the values used, in this example, for the low range and high range fields in the position event entry for relative position events based on the SNORT language.

| | Relative Position Event Entry | |
|---|---|---|
| SNORT Position Options | Low Range Value | High Range Value |
| none | 0x0000 | 0xFFFF |
| distance: N; | N | 0xFFFF |
| distance: N; within: M; | N | M |
| Within: M; | 0x0000 | M |

Thus, as shown below, the rule "content: 'abc'; content: 'def'; distance:5; within:10;" would produce results as may be seen in the following Event Translation Table and Position Event Table. As shown, the string "abc" will have the node number 100 and the string "def" will have the node number 102.

| Event Translation Table | | | |
|---|---|---|---|
| Offset | More | Command | Data fields |
| 99 | | | |
| 100 | 1 | TRNS_POS | POS_EVENT_NUMBER = 25 |
| 101 | 0 | TRNS_RULE | RULE_NUMBER = 71 |
| 102 | 1 | TRNS_POS | POS_EVENT_NUMBER = 26 |
| 103 | 0 | TRNS_RULE | RULE_NUMBER = 71 |
| 104 | | | |

| Position Events Table | | | |
|---|---|---|---|
| offset | Command | Low Range | High Range |
| 24 | | | |
| 25 | PCMD_START | 0xFFFF | 0xFFFF |
| 26 | PCMD_NEXT | 5 | 10 |
| 27 | PCMD_DONE | Rule# = 71 | Sub-rule# = 1 |
| 28 | | | |
| 29 | | | |

"Negative patterns" may also be implemented in a position events table, where "negative patterns", in these implementations, may be understood to refer to patterns that match only if the pattern is not detected within a specified position range. Negative patterns may require an "anchor pattern" to establish the current position context. In this example implementation, the negative pattern is written into the position events table after the anchor pattern. The PCMD_NEG_NEXT command is then used to set the position range in which the pattern is not expected.

Thus, in the present example, to search for the SNORT options content: "ab"; content:!"cd"; within: 100; the string "ab" is inserted into the pattern with the terminal node at 150 and the string "cd" is inserted into the pattern tree with the terminal node at 160. Both strings may generate position events from the event translation table which in turn, invokes commands in the position events table.

The following Event Translation Table and Position Event Table illustrate this example.

Event Translation Table

| Offset | More | Command | Data fields |
|---|---|---|---|
| 149 | | | |
| 150 | 1 | TRNS_POS | POS_EVENT_NUMBER = 133 |
| 151 | 0 | TRNS_RULE | RULE_NUMBER = 50 |
| 160 | 1 | TRNS_POS | POS_EVENT_NUMBER = 134 |
| 161 | 0 | TRNS_RULE | RULE_NUMBER = 50 |
| 162 | | | |

Position Events Table

| offset | Command | Low Range | High Range |
|---|---|---|---|
| 132 | | | |
| 133 | PCMD_START | 0xFFFF | 0xFFFF |
| 134 | PCMD_NEG_NEXT | 0xFFFF | 100 |
| 135 | PCMD_DONE | Rule# = 50 | Sub-rule# = 1 |
| 136 | | | |

As shown above, the string "ab" will, in this example, generate a match event with the node number 150. The node number translates to a TRNS_POS command with a position number of 133. The position number is used to invoke the PCMD_START command at offset 133 in the position events table. The PCMD_START command will check for a valid position and then load the next command into the position context.

Thus, in the present example, the position context now contains the position of the string "ab" and the command of the negative pattern. If the string "cd" is detected and generates a match event, the match event will produce a TRNS_POS command that will invoke the PCMD_NEG_NEXT command at offset 134.

The position, in this example, is checked against the stored position and range. The PCMD_NEG_NEXT command will clear the position context if the position of the string "cd" is within the 100 character range. If the 100 character position range is reached without detecting the string "cd", the next command is retrieved and executed. In this case, the next command is a PCMD_DONE command that generates a rule match event.

The teachings of the present invention may also be applied to processing "regular expressions". A "regular expression" may be understood to refer to a representation of a pattern that may have a variable length and may possibly have many alternate forms. In conventional approaches, searching for regular expression patterns may often require intensive processing power and memory since conventional algorithms, geared towards searching for a single expression, may not scale well in computational terms when attempting to search for many expressions simultaneously. In addition, in these approaches, memory utilization may also be a problem since these memory requirements may increase exponentially as the number search expressions increases.

The present invention provides methods to search for many expressions simultaneously, addressing situations wherein memory utilization increases linearly with the number of expressions and/or wherein there may be untenable increases in computation complexity. Note that, as in the foregoing examples, while these methods may be illustrated in the following example implementations as applied in hardware, such implementations may be accomplished through a number of means.

A regular expression may be understood in the following examples to compose a text string that may include "metacharacters" to describe complex patterns. "Metacharacters" may be understood in the following examples to compose ASCII characters that may be reserved for specifying pattern features. Note that in some implementations, these reserved ASCII characters can still be used in other contexts via an escape sequence.) Note also that regular expressions are by convention typically delimited by the slash character, and this convention is adopted in the following examples.

The metacharacters used in the following examples are outlined in the following table.

| Metacharacter | Description |
|---|---|
| \ | Escape- A reserved character is inserted by the escape sequence of the backslash followed by the reserved character. In an example, the backslash is specified with the sequence "\\". |
| \| | Alternation |
| ( ) | Grouping |
| { } | Quantification |
| [ ] | character class |
| ^ | beginning of string |
| [^ | When it is the first character in a character class it negates the character class |
| $ | end of the string |
| * | matches 0 or more of the previous group or character |
| + | matches 1 or more of the previous group or character |
| ? | matches 0 or 1 of the previous group or character |
| . | matches any character except the new-line character |

Within the present teachings, two basic features that may characterize regular expressions are "alternation" and "quantification". "Alternation" may be understood in the following examples to refer to the capability to specify alternate strings or characters. Alternation may be seen as equivalent to using multiple strings, but in these embodiments may be much more compact. Thus, the regular expression /(get|set)value/ may be, in the present example, equivalent to the string "setvalue" and "getvalue", and thus, matching the regular expression is the same as matching either string.

"Quantification" may be understood in the following examples to describe a repetitious pattern. The number of repetitions may be any integer value greater than 0 and is functionally unlimited.

Regular expressions may also, in the present invention, define some useful non-character string attributes, such as the beginning of the string and/or the end of the string. When the regular expression features are combined, they may provide a flexible and compact method for describing complex patterns.

Some embodiments of the present invention that detect patterns specified by regular expression may or may not support some or all regular-expression constructs. An embodiment that is provided hereinafter for the purposes of illustration and not limitation may not support the following regular-expression features:
  Greedy Matches
  Lookahead Assertion
  Lookbehind Assertion
  Backreferences
  \b and \B—matches word boundaries
  Nested quantifiers (such as/(c(ab){2,}){3,}/

However, such exclusions of certain regular-expression features from any and all examples of the present invention, whether those examples are provided herein or elsewhere, should not be construed to limit the scope of the teachings contained herein. It will be appreciated that any or all regular-expression constructs may or may not be supported by a given embodiment of the present invention, and that all such embodiments of the present invention are within the scope of the present disclosure.

The following example embodiment describes how each regular expression construct may be implemented using one type of pattern-detection circuitry.

Regular expressions may be implemented in this example pattern-detection circuitry by partitioning the regular expression into a set of position dependent substrings that are equivalent to the regular expression. By virtue of this method, searching for regular expressions in the pattern-detection circuitry will then consist of searching for the position dependent substrings. The associated pattern tree may then be used to hold and to search the substrings of the regular expression.

In addition, in this example, a "character class detector" may be used to detect the character class and wildcard constructs in subject regular expressions. The "character class detector" may be understood in the following examples to compose a logic function that detects "character class strings." A character class may be understood in the following examples to specify a set of byte values that will produce a match and, in the present example, is delimited with square brackets. In an example, the character class /[abc]/ will match the characters 'a' or 'b' or 'c'.

A "negative character class" may be specified in the following examples with the caret character as the first character inside the square brackets. Thus, for example, the expression /[^abc]/ will match any 8-bit value except for the characters 'a', 'b' or 'c'.

In this example, when the character class detector matches a character class, it may monitor the data stream to determine the string with the most consecutive matches. When the character class string ends, the character class event number along with its position may be sent to a "correlation block" for further processing.

All substring patterns other than character classes, in the present example, may be are stored in the pattern tree in SRAM (or other read/write capable device.) These substring patterns may be searched by traversing the tree to find the terminal nodes. When a terminal node is encountered, the match event along with its position may be sent to the "correlation block" for processing.

The "correlation block" may be understood in the following examples to compose a function that may validate the position of the patterns relative to each other. In this example, some or all position parameters may be held on-chip and used to verify patterns as they occur. In this manner, the relative position context may be maintained so that next pattern can be correctly validated. In variations of this example, correlation may also aggregate multiple pattern matches into rule matches.

In the following examples, alternation is specified in regular expressions with the '|' character. The regular expression /abc|def/ will thus match the strings "abc" and "def". In the following examples, in order to implement the expression /abc|def/ in the pattern-detection circuitry, the strings "abc" and "def" are both inserted into the pattern tree. A match of either string will result in a match of the expression /abc|def/.

Alternation of character may also be achieved, in this example implementation, with the character class denoted by square bracket groupings. In an example, the regular expression /[abc]/ matches the strings "a", "b" and "c". But note that methods using character class may be implemented in one of two ways. In the first method, the pattern tree may used to encode all the possible matches. In this method, in order to implement the expression /[abc]/, a node may be created for each character, and the character link to each node is added. Each node may also have its terminal bit set to indicate the match of the pattern. Thus, a match may result when any of the characters in the character class are encountered.

The second method may use the character class detector block. In this approach, the character class detector scans for standard character classes and, in this implementation, for up to 32 user defined character classes. But note that since the character class detector may be a limited resource, implementations that use this method typically deal with complicated patterns.

In this sense, the two methods for implementing alternation of using character class may be combined in some embodiments of the invention, and thus, their respective methods should not be viewed as exclusive of one another.

In the following example implementations, quantification may be specified with quantifiers using the '*', '+', '?' or '{ }' metacharacters. The quantifiers, in this case, indicate the number of times the previous character or group is to be consecutively matched. In some variations, however, the use of quantifiers may result in an expression that can be matched at different lengths. The matching of the longest pattern is called, in these example implementations, a "greedy" match, whereas by contrast, a "non-greedy" match will find the short pattern that matches the expression. The following table shows the lists the greedy and non-greedy quantifiers.

| Greedy quantifier | Non-greedy quantifier | |
|---|---|---|
| * | *? | Match 0 or more |
| + | +? | Match 1 or more |
| ? | ?? | Match 0 or 1 |
| {x, y} | {x, y}? | Match a minimum of x and a maximum of y |
| {x,} | {x,}? | Match a minimum of x and unlimited maximum |
| {x} | {x}? | Match exactly x |

By convention, and example implementations follow this convention, the following greedy matches compose the default in regular expressions. To specify a non-greedy match, a question mark is added to the quantifier. Note that the pattern-detection circuitry in this example may not support greedy matches, but that greedy quantifiers may be implemented as non-greedy quantifiers. Other implementations may support greedy matches, however, and the following examples are presented without loss generality to such cases.

Further, in the following examples, an asterisk may indicate a match string consisting of 0 or more instances of the previous character or group. In an example, /a*/ specifies a string of 0 or more a's. The strings " ", "a", "aaa" and "aaaaaaa" all match the regular expression /a*/. In addition, the regular expression /.*/ represents a string of 0 or more characters without any regard for the value of the character.

In the following examples, the plus sign indicates a match string consisting of 1 or more instances of the previous character or group. Thus, the strings "a", "aaa" and "aaaaaaa" all match the regular expression /a+/ but the string " " does not match.

A more general form of quantifiers may, in the examples that follow, use the curly brackets in the form of /{x, y}/. X indicates the minimum number of iterations and y indicates the maximum number of iterations. If y is not present, the maximum number of iterations is infinity. Therefore, /a*/ can also be expressed as /a{0,}/ and /a+/ can also be expressed as /a{1,}/.

In the following example implementation, when the /.*/ construct is encountered, the regular expression may be divided into three substrings. In these cases, the string before the /.*/ becomes a substring and the string after the /.*/ becomes a second substring. A third string may be formed by combining the two substrings. Thus, the expression /abc.*def/ will produce the substrings "abc", "def" and "abcdef". Searching for the expression /abc.*def/ will, in these examples, consist of searching for the string "abc" and then searching for the "def" (i.e. the second string has a relative position and must be detect after the first).

The /a?/ construct may, in the following examples, produce two strings. The question mark quantifier in this case specifies a match of zero or one, so the two strings created are the null string and "a". In an example, the expression /abc?de/ is found by searching the string "abde" or "abcde".

In the following example implementation, the /a*/ expression produces two strings. In the first string, the construct may be removed because it is replaced with the null string. In the second string, the construct may be replaced with /a+/. Thus, searching for the expression /abc*de/ will now consist of searching for the strings "abde" and /abc+de/.

The methods embodied in following example implementation use a character class to search for the 'c+'. The 'c+' expression is replaced with the character class [c]+ which may be found by the character class detector. The character class detector may return the longest string of consecutive character classes. The expression /abc+de/ is then found by searching for the string "ab", then searching for the character class string [c]+ and then searching for the string "de". The expression may be matched if the example correlation module verifies that each string occurs right after the previous string.

In the example implementation that follows, processing of the quantifiers '{x,y}' and '{x,}' is executed in a manner similar to that applied to the quantifier '+'. The difference, in this case, is that the position limits are encoded into the position rules and verified in the correlation module.

In cases where an exact number of matches are needed as specified by the quantifier '{x}', the following example implementation unwinds the expression and then transforms it with the previous described procedures. Thus, the expression /a{8}/ will produce the string "aaaaaaaa".

Negative character classes are supported, in the following example implementations, by means of a character class detector. The negative character class is specified, in this case, with the caret character as the first character in a character class. In an example, the expression /[^abc]/ will match any character except for the characters 'a', 'b' or 'c'.

In some implementations, efficiencies may be achieved within the teachings of the present invention by combining alternation and quantification to create complex patterns. The same partitioning procedures may be used when both alternation and quantification are used in the same expression. Thus, in these cases, to search for the expression /a* (cbd|c*|d.*)e/, two expressions may be derived /(cbd|c*|d.*) e/ and /a+(cbd|c*|d.*)e/ by expanding /a*/. Then transformations may be applied to both expressions. In this manner, the expression /(cbd|c*|d.*)e/ may produce the substrings "cbde", /c*e/ and /d.*e/, and the expression /a+(cbd|c*|d.*)e/ may produce the substrings /a+cbde/, /a+c*e/ and /a+d.*e/. But, in implementations that deploy these methods, the expression /c*e/ may be replaced "e" and /c+e/, and the string /a+c*e/ may produce /a+e/ and /a+c+e/. The string /d.*e/ may then be divided into 2 strings "d" and "e" where the second string must be detected after the first. The expression /a+d.*e/ may be divided into the strings /a+d/ and "e" and the second string must be detected after the first. Finally, the character iterations may be replaced with the character class.

It can be seen that, in this example implementation, matching any of the substrings is equivalent to matching the regular expression. The resultant substrings are:

"cde"
/[c]+e/
"e"
"de"
"d", "e"
/[a]+cbde/
/[a]+e/
/[a]+[c]+e/
/[a]+de/
/[a]+d/, "e"

Some implementations of the present invention may support positive lookahead and lookbehind functionality. When present, the positive assertion may be specified with /(?=)/ and the negative lookahead assertion may be specified with /(?!)/. In practice, these assertions have zero width which means that the matching of the enclosed expression does not move the character pointer used to maintain the current character to process. Thus, the expression preceding the positive lookahead assertion will match only if the lookahead expression matches, and the expression preceding a negative lookahead assertion will match only if the lookahead expression does not match. In an example, in implementations that support lookahead, the expression /foo(?=bar)/ matches the string "foo" if the proceeding characters are "bar". In this case, a match would result in a character pointer that points to the b as the next character.

Though there may be implementations that do not support the lookahead assertion, there are nonetheless four rules in the SNORT rule base that may use the lookahead assertion. Two of these rules use the lookahead for optimization rather than pattern description.

The positive lookbehind assertion may be specified in some implementations with /(?<=)/ and the negative lookbehind assertion is specified with /(?<!)/. In a positive lookbehind assertion the proceeding expression matches only if the lookbehind expression matches. In a negative lookbehind assertion the proceeding expression matches only if the lookbehind expression does not match. In an example, the expression (?<!foo) bar matches the string bar if the preceding 3 characters are not foo.

In the present example implementation, the '^' (caret) is also a "zero with" assertion, and may be used to match the beginning of the string, and/or the beginning of the packet. The '^' may be implemented in the present example pattern-detection circuitry by starting the packet scan at an initial root node in the pattern tree that implicitly matched the beginning of the packet. After comparing the first character, the initial root state is no longer used and will only be entered again at the beginning of the next packet. The initial root node, then, is different from the root node of the pattern tree, and the root node of the pattern tree implies no matches, and thus, can be entered at any byte within the packet. In an example, in the example implementation, the expression /^apple/ may produce a search string of "apple". The string "apple" may link, in this case, to the initial root node but not the root node. Therefore, the string "apple" can be matched at the beginning of the packet but will not match after the beginning of the packet since the root node is not linked to the string "apple."

In the example implementation, the $ metacharacter matches the end of the string and/or the end of the packet. In the present example, this may be implemented within the pattern-detection circuitry in the EOP_registers. A range of node ID can be reserved to additionally check for the end of the packet. In this instance, the EOP_register may be programmed with a base number and an offset. If the node ID is within the range indicated by the EOP register, a match event may be generated if the current character is the last character of the packet. In an example, the expression /apple$/ produces the string "apple." The node ID at the 'e' of the string will be assigned a value that is within the range of the EOP registers, and the match of the string "apple" will activate the EOP check. If the character 'e' is the last character of the packet, a match event is generated with the adjacent node ID (i.e. node ID=node ID of 'e'+1).

In the example implementation, modifiers may be used in regular expressions to control the interpretation of some features. Modifiers are located at the end of the expression after the slash and may be represented with the letters i, m, s and x. In the example expression /apple/is, the i and s modifier is specified.

When the s modifier is present, the dot metacharacter in the expression will match the newline character. If the s modifier is not present, the dot metacharacter would match the newline. Without the s modifier, the dot metacharacter may be replaced with the character class [^\n].

The i modifier will cause the expression to be case insensitive. Otherwise the expression is case sensitive.

The m modifier is used in this example implementation to treat the search text as multiple lines. By default, the search text is considered one long string. The '^' metacharacter will match the beginning of the search text and the '$' metacharacter will match the end of the search text. If the m modifier is present, the '^' metacharacter will match the beginning of the search text and also immediately after a newline character. With the m modifier present, the '$' metacharacter will match the end of the search text and also immediately before a newline character.

The m modifier may be implemented in the example pattern-detection circuitry by inserting a newline at the beginning of the expression if the '^' character is used. The resultant string would then be linked to the root node of the pattern tree, and the initial root node will be linked to the second character of the expression to bypass the newline that was inserted. Thus, the expression /^apple/m will produce the string "\napple", the root node will link to the newline character and the initial root node will link to the 'a' character. In this manner, the expression /^apple/ will be matched if the string "apple" appears at the beginning of the search text or at the beginning of a line which was terminated by the newline. The example pattern-detection circuitry may implement the m modified '$' metacharacter by appending a newline to the end of the string. The string can now be matched by matching the newline and/or to the end of the packet. Thus, in this case, the expression /apple$/m will produce the string "apple\n" where the node ID of the 'e' is assigned to a value within the range of the EOP registers. The expression /apple\n/m will match the string "apple" if it occurs just before a newline or at the end of the search text.

In the example implementation, the x modifier may cause all white space characters in the expression to be ignored except when it is escaped or if it is in a character class. This modifier may only affect the interpretation of characters and can be implemented in the regular expression compiler.

"Backreferences" use groupings that have already been matched to specify an expression. In an example, in the example implementation, when processing the expression /(a|b|c)d\1/, the '\1' will match the string that the grouping "(a|b|c)" matched. The strings the expression /(a|b|c)d\1/will match are "ada", "bdb" and "cdc". It will not match strings "adc" or "bdc" or "cda". Backreferences may not be supported in all implementations, but in the SNORT 2.3.0 rule set there are 242 rules related to Oracle applications that use backreferences.

In the example implementation, the U modifier may be used to apply a regular expression to a decoded URL string. The R modifier may change the starting position of the regular expression search to the end of the last matched pattern. The B modifier may select the undecoded data for use in the regular expression search.

The present invention may extend these optimizations to situations requiring the matching of the beginning of a string. In the example implementation, the "caret" character at the beginning of a regular expression matches the beginning of the string or packet. In the present example, this may be implemented with an initial root node in the pattern tree. The initial root node has a pre-defined number and scans may start at the initial node.

Figure 15:
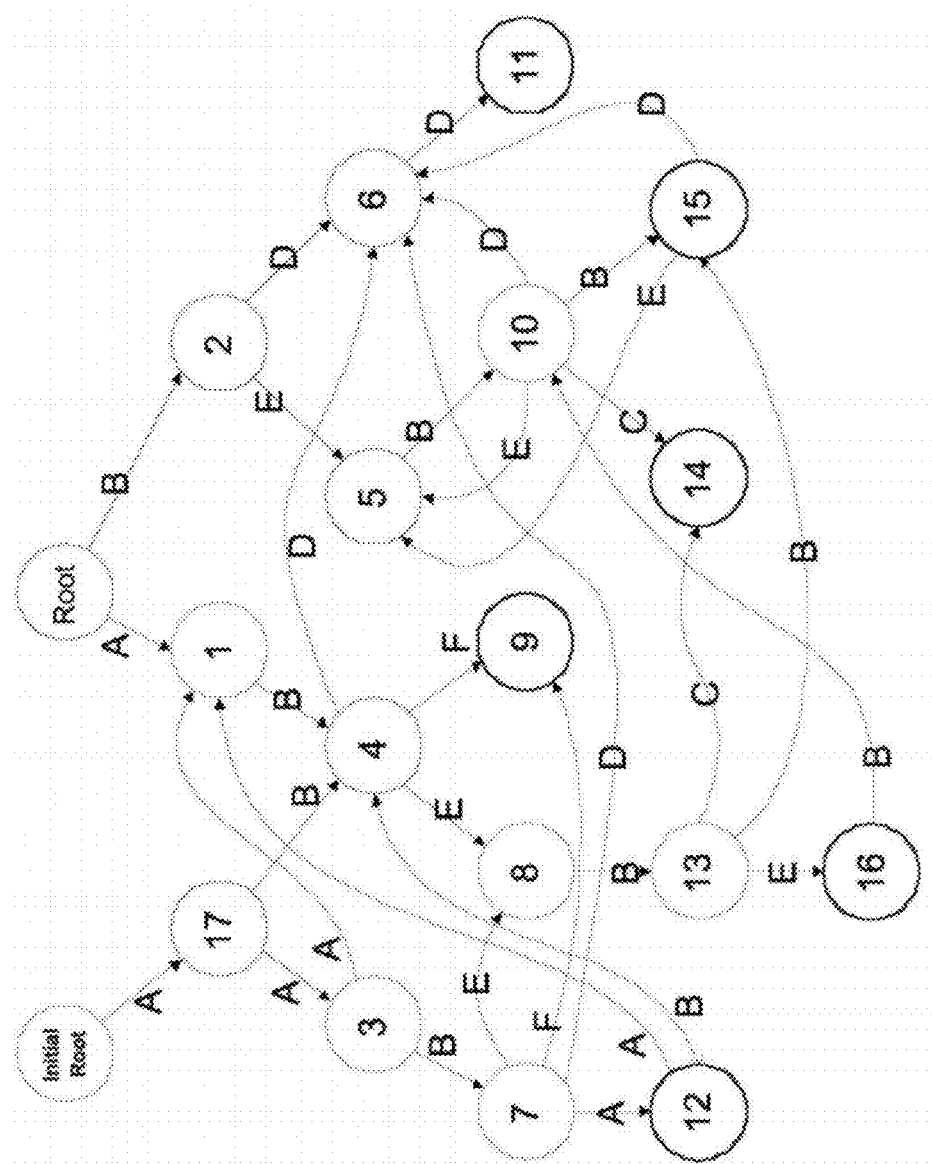
FIG. 15 depicts a pattern tree resulting from using an initial root node.

To illustrate the use of the initial root node, the example from FIG. 9 is used. The patterns AABA, ABEBE, ABF, BEBC, BEBB and BDD are to be inserted into the pattern tree, but, in this case, the AABA pattern is changed to /^AABA/. FIG. 15 shows the resultant tree. Thus, as described in the foregoing, packet scans start at the initial root node but eventually transition to the main tree. The pattern AABA is matched at the terminal node 12 but can only get there from the initial root node.

If, however, the m modifier is not indicated, the "caret anchored" strings are inserted onto the tree at the initial root node, and when merging, nodes in the initial tree are not considered when selecting prefix nodes. In addition, all nodes in the initial tree are merged. It is evident that method is different from merging of the main tree in that in the latter case, only nodes that have a depth greater than one are merged, and the nodes in the initial tree are never merged with other nodes.

Figure 16:
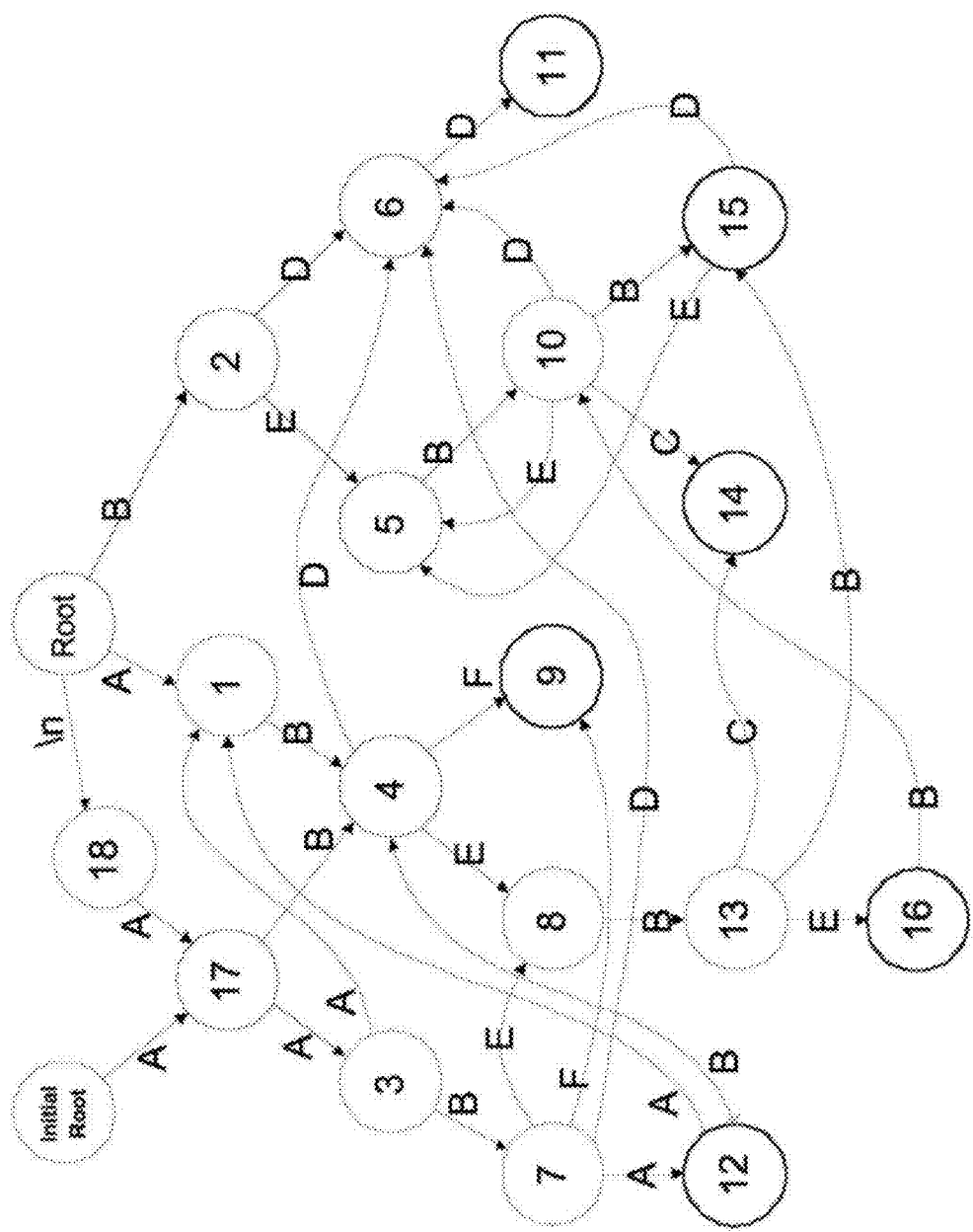
FIG. 16 depicts a pattern tree resulting from using an initial root node with an alternate data expression.

Now in the present example, again referencing FIG. 15, if the expression is changed to /^AABA/m, the caret must match both the beginning of the packet and the newline. Thus FIG. 16 shows the pattern tree with the expression /^AABA/m. Note that there are now two ways to get to the terminal node 12. One path starts at the initial root node while the other starts at the root node. If the pattern AABA is not at the beginning of the packet (i.e. start at the initial root node) then it is only matched if it follows a newline character.

If the m modifier is indicated, the caret anchored string is prepended with a newline and then inserted into the tree at the root node. A link is then made from the initial root node to the representing the match of the first character and the newline.

Figure 17:
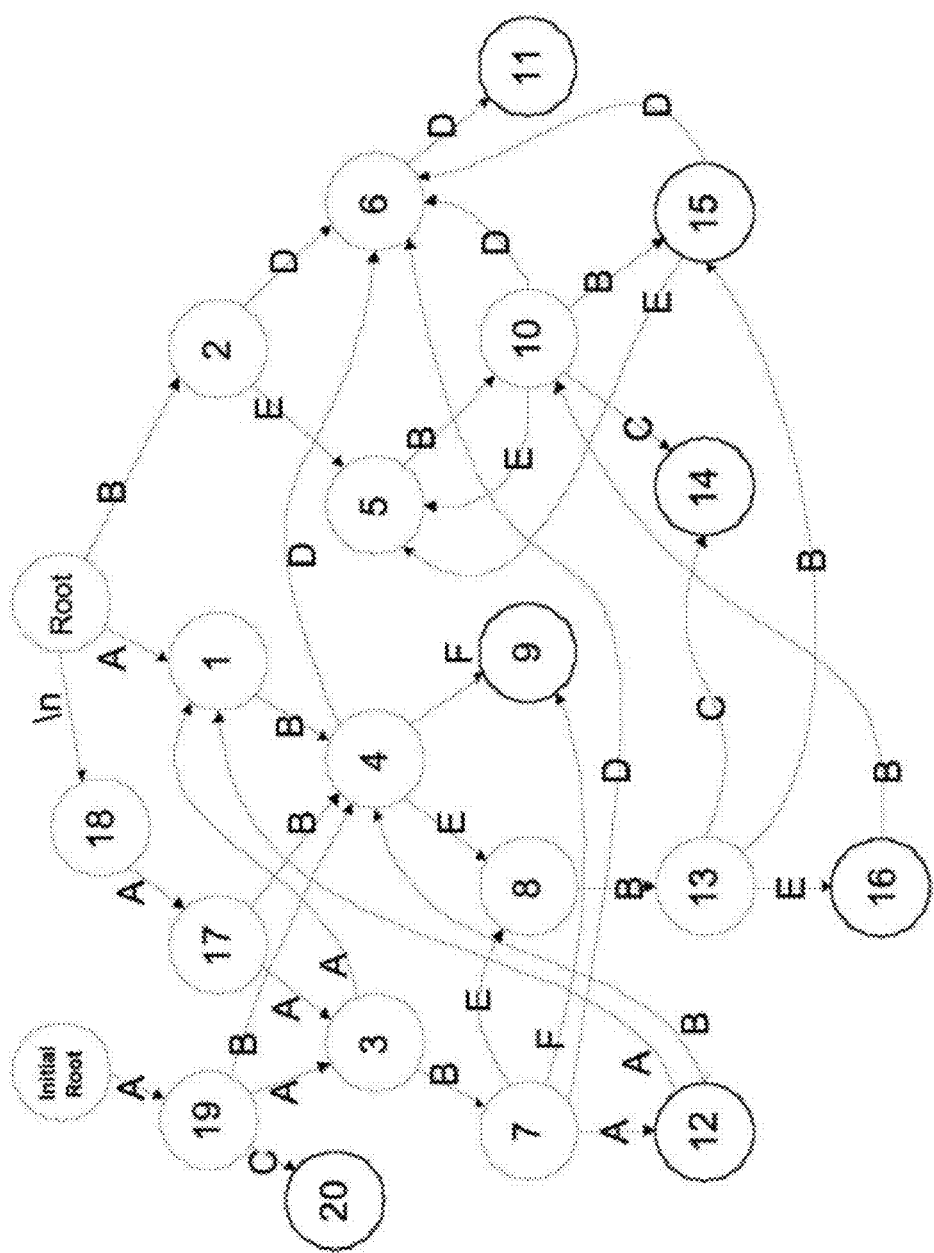
FIG. 17 depicts a pattern tree resulting from using an initial root node with another alternate data expression.

To demonstrate how all patterns are inserted, the new pattern /^AC/ is added. The pattern tree in FIG. 17 contains the patterns /^AC/, /^AABA/m, ABEBE, ABF, BEBC, BEBB and BDD. Notice that because the first character of the two regular expressions is the same, they are merged, in this example, by copying the transitions from node 17 to node 19.

In one example implementation, the following steps may be used to build the pattern tree with caret anchored strings.

1—Insert regular patterns starting at the root node to form the main tree.

2—Insert m-modified caret anchored patterns with prepended newlines starting at the root node and add link to initial root node. Keep track of the patterns that have implicit newlines since they will be treated differently than patterns that have explicit newlines.

3—Insert caret anchored patterns to form the initial tree—if there are overlaps with patterns that have implicit newlines, propagate the link between the initial root node and the node representing the first character of the pattern with an implicit newline onto the next node in the initial tree. On the initial tree, links to other nodes in the initial tree have precedence. A link to the rooted tree is ignored if that link character is already used for a link to the initial tree. A link to the initial tree will overwrite a link to the rooted tree.

4—Merge all patterns—when merging the initial tree, implicit newlines are ignored (i.e. when comparing prefixes, the implicit newline is removed before the comparison).

The present invention may extend these optimizations to situations requiring the matching of the end of a string. In the example implementation, the '$' or end of the string may be matched with the EOP registers. The EOP register defines a base number for a range of node numbers that will be reserved for end of string matching. The EOP Mask Register defines the size of the range of node numbers. The node representing the last character in a pattern that matches the end of the string may be assigned a node number in the range defined by the EOP register and EOP Mask register.

In the example implementation, for example and without limitation, the EOP register may be programmed to 0x0100 and the EOP Mask Register may be programmed to 0x0003. This specifies a range of 16 node numbers that will be reserved for the end of string matching. When presented the pattern /AABA$/, the string "AABA" will be inserted into the pattern tree. Then the terminal node of the string may be assigned to node number 0x0101. If the node number 0x0101 is matched, the next character is checked to see if the end of the packet has been reached. If another character exists (current character is not the last), the event is discarded. If there are no more characters (meaning the packet has ended), a match event is generated using the node number 0x0102 (i.e. 0x0101+1).

In this example, the translation commands for this pattern may be loaded into offset 0x0102 of the event translation table. If the pattern is /AABA$/m, then the string "AABA\n" may be inserted into the pattern tree, and the node representing the last A is designated a terminator, and that node may be assigned node number 0x0101. Likewise, in this example, an event with node number 0x0102 may be generated if node number 0x0101 is detected at the end of the packet. The event translation table may then be written with the translation commands at offset of 0x0102. The node representing the newline is thus, also a terminal node. This node can be arbitrarily assigned, but its corresponding location in the event translation table will contain a link to the entry at 0x0102. Therefore, detecting the string at the end of the packet or at the end of a line will, in this example implementation, execute the same translation commands.

The present invention may also extend these optimizations to expressions with alternations are implemented by either inserting all possible combinations of patterns into the pattern tree or by using the character class detector.

In the example implementation, when patterns of the form (/(pattern1|pattern2), are encountered, each pattern in the alternation group may be inserted into the pattern tree. The translation of each pattern will produce the same rule number and sub-rule number. Therefore, a match resulting from either pattern will produce the same result. When alternation is used in series, the patterns may, in the example implementation, be unwound to obtain a set of equivalent patterns. In an example, using this method, the pattern /(ab|cd)(ba|dc)/ will generate the patterns "abba", "abdc", "cdba" and "cddc". All of the generated patterns may then be inserted into the pattern tree and their translation commands programmed to produce the same result.

Likewise, when patterns of the form (/(char1|char2)/) are encountered, alternation of characters can be employed by means of the pattern tree and/or with the character class detector. To implement this method using the pattern tree, each alternate character would produce a string that is inserted into the pattern tree. In an example, the expression /(a|b|c)/ would generate the strings "a", "b" and "c". The expression /new(a|b|c)/ would generate the strings "newa", "newb", newc". This method may be preferred in situations where the number of characters is relatively small (less than 5).

When patterns of the form (/[characters]/) are presented, a character class may be considered functionally equivalent to alternation of single characters. If there are many alternate characters in an expression, the character class may be chosen since it may implement the expression more efficiently. The character class may be implemented by assigning a "character class number" to the expression. Each character in the character class may then be used as an offset into the "character class table" in order to set a bit representing that character. When any of the characters are detected, a character class event is sent to the position context. Character class methods may have an anchor string which establishes the position in the position context and which may also trigger the character class. Such a trigger may enable the selected character class in the character class detector. In the example implementation, the CC command for this expression would have both the low range and high range values set to 0xFFFF and the NEGATE bit may be cleared.

When patterns of the form (/[^characters]/) are encountered, the negative character class may be handled in the same manner as the character class except that the character values used for detection may be the values not listed in the square brackets. In an example, the expression /[^abc]/matches every character value except for 'a', 'b' and 'c'.

The present invention may extend its teachings to matching repetitive patterns. Patterns larger than one character that are repeated using quantifiers may be implemented by unwinding the repetition and inserting the resulting patterns into the pattern tree. The following scenarios are possible.

a. /(pattern1){x}/—The expression /(abc){3}/may be unwound to the string "abcabcabc". The node representing the last character may be the terminal node.

b. /(pattern1){x,}/—In this case, the pattern may be unwound to at least the minimum value x+1. The links can then be looped back to repeat the pattern. For instance, in the present example implementation, the expression /(abc){3,} may unwind to the string "abcabcabcabc". The link at the last character will loop back to the last 'b' upon detecting an 'a'. But note that the minimum unwound pattern must not be a subset of another pattern, and the unwinding should continue until the pattern is no longer a subset of another pattern. If this type of quantifier occurs at the end of the regular expression, in the example implementation, it may be reduced to {x} because continuing to search beyond x matches does not change the match status. It may, however, affect the final position of the match. In an example, in the example implementation, the expression /(ab){2,}/ may actually be implemented as /(ab){2}/, and when searching the string "ababababac", will produce a match at the position of the second 'b'. But, the match position should have been the last 'b' character. If there are no more position dependent patterns after the regular expression such as a string test command, the match position is not used and hence does not affect the search.

c. /(pattern1){x,y}/—In the example implementation, this pattern must be unwound y times. Thus, the expression /(abc){3,5}/ unwinds to the string "abcabcabcabcabc". This type of quantifier may also be reduced to {x} when encountered at the end of the regular expression. Therefore the expression /(abc){3,5}/ may be implemented as /(abc){3}/.

d. /(pattern1|pattern2){x}/—In the example implementation, repeating patterns with alternation may also implemented by unwinding the patterns. In this case, multiple patterns are generated because each repetition causes a replication due the alternation. The expression /(abc|def){3}/ unwinds to 8 strings "abcabcabc", "abcdefabc", abcdefdef", "defabcabc", defdefabc", "defdefdef", defabcdef", "abcabcdef".

e. /(pattern1|pattern2){x,}/—In the example implementation, the patterns in this case may also unwound at least x+1 times, and links are added in order to loop back to the last pattern. The difference, in the example implementation, is that in this case, the link must be made to a node that matches the last pattern. The patterns in this case cannot be a subset of other patterns in the tree. This type of quantifier may also be reduced to {x} when encountered at the end of the regular expression. Therefore the expression /(abc|def){3,5}/ may be implemented as /(abc|def) {3}/.

f. /(pattern1|pattern2){x,y}/—In the example implementation, the patterns in this expression may be unwound exactly y times and may thus produce multiple patterns because of the alternation. When this quantifier is used at the end of the regular expression, it may be reduced to {x}. Thus, for example, the expression /(abc|def){3,5}/ may implemented as /(abc|def){3}/.

Note that combining repetitive patterns with other patterns may affect the links at the node representing the end of the strings.

In the example implementation, when matching the wildcard (dot) character repetitively with the s modifier, the patterns may be treated as position dependent strings. The patterns may be inserted into the pattern tree and then associated with relative positions stored in the position events table. In these instances, the following scenarios are possible:

a. /.{x}/s—In the example implementation, the expression (/abc.{x}def/s) may be translated into the string "abc" and "def". The string "abc" may be configured to a generate position event from the event translation table. The position event will invoke a PCMD_START command with all ones in the range field (indicating no range limits). The string "def" may be configured to generate a position event that will execute the command following the PCMD_START command. That location is programmed with a PCMD_NEXT command and both range fields are set to x. It is evident that this is functionally equivalent to relative positioning of strings using content options such as "distance:x; within:x;".

b. /.{x,}/s—In the example implementation, the expression (/abc.{x,}def/s) may be translated into the string "abc" and "def". The string "abc" may be configured to generate a position event from the event translation table. The position event will invoke a PCMD_START command with all ones in the range field (indicating no range limits). The string "def" may be configured to generate a position event that will execute the command following the PCMD_START command. That location is programmed with a PCMD_NEXT command and both low range field is set to x and the high range field is all ones. It is evident that this is functionally equivalent to relative positioning of strings using content options such as "distance:x;".

c. /.{x,y}/s—In the example implementation, the expression (/abc.{x,y}def/s) may be translated into the string "abc" and "def". The string "abc" may be configured to generate a position event from the event translation table. The position event will invoke a PCMD_START command with all ones in the range field (indicating no range limits). The string "def" may be configured to generate a position event that will execute the command following the PCMD_START command. That location is programmed with a PCMD_NEXT command and both low range field is set to x and the high range field is set to y. It is evident that this is functionally equivalent to relative positioning of strings using content options such as "distance:x; within:y;.

In the example implementation, when matching the wildcard (dot) character repetitively without the s modifier, the dot may be replaced with the negative character class [^\n] and the patterns will produce position dependent strings. The patterns may be inserted into the pattern tree and then associated with relative positions stored in the position events table. A character class trigger may be invoked when the wildcard is to be matched. In these instances, the following scenarios are possible:

a. /.{x}/ translates to /[^\n]{x}/—In the example implementation, this may be implemented with the character class detector via a PCMD_CC command in the position events table. The PCMD_CC command may be programmed with x in the MIN and MAX field. A match occurs if a character class event for [^\n] is not detected before processing MAX number of characters. The search may be terminated if a character class event for [^\n] is detected before processing MIN number of characters.

b. /.{x,}/ translates to /[^\n]{x,}/—In the example implementation, this may be implemented with the character class detector via a PCMD_CC command in the position events table. The CC command may be programmed with x in the MIN and MAX field. A match occurs if a character class event for [^\n] is not detected before processing MAX number of characters. The search may be terminated if a character class event for [^\n] is detected before processing MIN number of characters.

c. /.{x,y}/ translates to /[^\n]{x,y}/—In the example implementation, this may be implemented with the character class detector via a PCMD_CC command in the position events table. The PCMD_CC command will be programmed with x in the MIN and y in the MAX field. A match occurs if a character class event for [^\n] is not detected before processing MIN number of characters. The search may be terminated if a character class event for [^\n] is detected before processing MIN number of characters.

In the example implementation, if a single character is repeated using a quantifier, the expression can be implemented by unwinding it. This method may be seen as being similar to using quantifiers on patterns except that in this case, the patterns are single characters. In an example, in the example implementation, the expression /a{3}/ may be unwound to the string "aaa". The expression /a{2,}/ may be unwound to the string "aaaa" where a link is used to loop back to the repeated character. The same restriction may apply when the quantifier appears at the end of the regular expression. Thus, the expression /a{2,}/ may be reduced to /a{2}/.

In the example implementation, a character class requires that an anchor string or anchor pattern precede it, and this is due to the need to trigger character classes. The position context needs an anchor pattern to establish the position context and to trigger the character class. Examples of expressions that violate this requirement may include /\w+\s/, /[^\n]{3,}\s/ or /\d+\s/. But note that a character class may be allowed at the beginning of the expression if it can be unwound. In an example, the expression /\sGET/ may be unwound to produce the strings "GET" and "\tGET".

In the example implementation, a character class may be instantiated by placing a PCMD_CC command after an anchor pattern in the position events table. The PCMD_CC command parameters may be used to specify the valid ranges for detecting character class events. When the anchor pattern is detected, the command for the anchor pattern is invoked and will also trigger the character class. The position context may, in this implementation wait for a character class event until MAX position is reached.

In the example implementation, examples of the patterns in these scenarios may include:
  a. /[characters]{x}/—In the example implementation in, order to implement this quantifier, the character class detector may load [characters] (i.e. the set of byte values that are not included in [characters]) in the character class table. The PCMD_CC command may then inserted in the position events table immediately after the anchor pattern and set min position to x and max pos to x.
  b. /[characters]{x,}/—In the example implementation, in order to implement this quantifier, the character class detector may load [characters] (i.e. the set of byte values that are not included in [characters]) in the character class table. The PCMD_CC command may then inserted in the position events table immediately after the anchor pattern and set min position to x and max pos to 0x0FFF.
  c. /[characters]{x,y}/—In the example implementation, in order to implement this quantifier, the character class detector may load [characters] (i.e. the set of byte values that are not included in [characters]) in the character class table. The PCMD_CC command may then inserted in the position events table immediately after the anchor pattern and set min position to x and max pos to y.
  d. /[^characters]{x}/—In the example implementation, in order to implement this quantifier, the character class detector may load [characters] (i.e. the set of byte values that are not included in [characters]) in the character class table. The PCMD_CC command may then inserted in the position events table immediately after the anchor pattern and set min position to x and max pos to y.
  e. /[^characters]{x,}/—In the example implementation, in order to implement this quantifier, the character class detector may load [characters] (i.e. the set of byte values that are not included in [characters]) in the character class table. The PCMD_CC command may then inserted in the position events table immediately after the anchor pattern and set min position to x and max pos to 0x0FFF.
  f. /[^characters]{x,y}/—In the example implementation, in order to implement this quantifier, the character class detector may load [characters] (i.e. the set of byte values that are not included in [characters]) in the character class table. The PCMD_CC command may then inserted in the position events table immediately after the anchor pattern and set min position to x and max pos to y.

Note that the minimum and maximum fields in the PCMD_CC command may in this example implementation, limit the quantifiers to 4000 or less.

Likewise, in the example implementation, the negative character class may also use the character class detector. The expression /name:[^\n]{x}/ may be implemented by partitioning the string into the pattern "name:" and the character class [^\n]{x}. The pattern "name:" will generate a position event that will establish the position context for the character class, and the position event invokes the PCMD_START command. After processing the PCMD_START command, the next command may be read—this will be will be a PCMD_CC command which initiates a character class trigger and specifies the limits x and y. When the character class string ends, a character class event may also generated (that is, when one of the characters inside the brackets is detected). The character class event may be compared with the limits x and y, and if the character class event is within the position limits, the next command may then be read and executed. If a character class event is not detected when the current position reaches the maximum limit, a match is assumed and position context is updated with the maximum limit. The next command is then read and executed.

The teachings of the present invention demonstrate that the inspection process ultimately leads to various actions that may need to be taken in response to the contents of data flows 444. Such actions are described above in the foregoing and may include (but may not be limited to) generating reports, preventing certain segments of the flow from being forwarded, and so on.

Note, however, that whether the system takes a particular action may in implementations, depend on a corresponding action rule 450, (where the action rule 450 may be described hereinabove or elsewhere, and may refer to criteria that the system applies to the contents of flow segments within data flow 444 in order to determine whether to take one or more corresponding actions).

In the context of the teachings of the present invention, an action rule 450 may be considered to have one or both of the following two rule components: 1) a header rule 452 which describes an aspect of a header such as protocol type, source address, destination address, source port, destination port, TCP direction, and so forth; and 2) a content rule 454, which relates to a payload. Although the action rules 450 may, in the present description, be applied to in response to individual packets, the determination as to whether a packet satisfies a given rule may additionally depend not only on that packet's contents but also on those of other packets. Note also that in the example implementation, every action rule 450 includes a header rule 452, but not all action rules include content rules 454.

Note also that the mechanisms that the detection system may use to determine whether a header rule 452 is satisfied may, in implementations, differ from that used to make the corresponding determination for a content rule 454.

One teaching of the present invention provides efficiencies in the means by which components that make the packet-rule determination communicate their results, and in the example implementation, the high-speed circuitry provides this computational economy. But achievement of this goal may be complicated by the fact that there may be a large number of rules and by the fact that a given packet's headers and/or payloads may satisfy several of them. In an example, suppose that there are 10,000 rules and that a given packet's headers may satisfy as many as ten of them. Communicating the results of the header-rules determination would take 14 bits/rule×10 rules=140 bits.

One aspect of the present invention and its example implementation enables a more compactly listing of the header rules 452 that a given packet may satisfy. Specifically, header rules 452 may be divided between "focused" and "promiscuous." A "promiscuous" header rule may be understood (in the context of the present example implementation) to refer to those header rules that are satisfied by a packet but such that that packet also satisfies other header rules, including other promiscuous header rules. A "focused" header rule, on the other hand, may be understood (again in the context of the present example implementation) to refer to those header rules that are satisfied only by a packet that satisfies no other focused packet rule, but such that that packet may additionally satisfy one or more promiscuous header rules.

Figure 18:
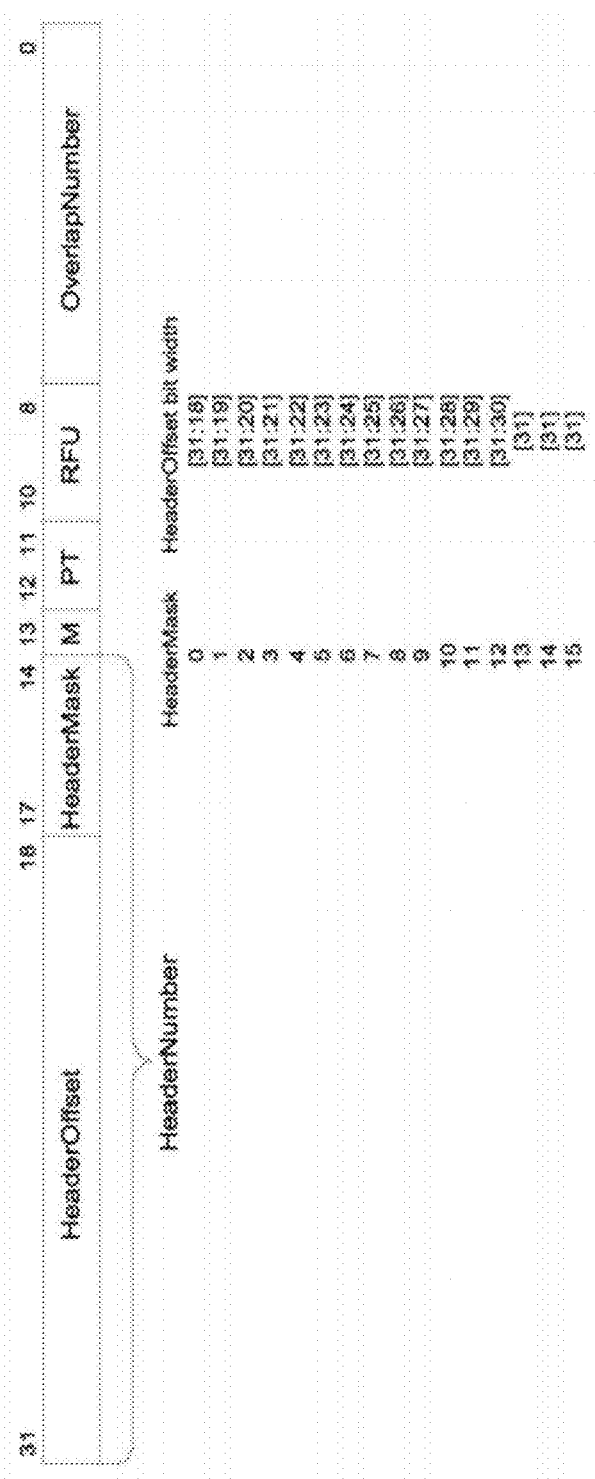
FIG. 18 depicts the use of a Header-ID.

In order to list the rules a header may satisfy, the example implementation may employ a "Header-ID" that 1) explicitly identifies the focused header rule that the header satisfies; and 2) encodes the combination of promiscuous rules it satisfies. FIG. 18 depicts one format that may be used for this purpose. Note that the format depicted in FIG. 18 requires only 32 bits, but any other configuration may be used.

Referencing FIG. 18, the Header-Number identifies the focused header rule that the header associated with the subject satisfies. More precisely, its Header-Offset portion is the first number in a range of numbers that identify action rules 450 of which that focused header rule 452 is a component. The numbers that may used to identify action rules may be such that they reflect the composite, header/content nature of the relevant action rule 450; the most-significant bits identify the header rule 450, and the least-significant bits specify a choice among the content rules 454 that may be mated with that header rule to make up an action rule 452. But note that different header rules 452 may mate with different numbers of content rules 454, so the ranges of action rules 450 that may require the same header rule may have different lengths. Thus, the Header-Number's Header-Mask field conveys how many most-significant bits represent identify the header rule 452 and, consequently, how many least-significant bits identify which of the possible mating content rules 454 are intended. Note that FIG. 18 shows the valid bits in the Header-Offset for each possible Header-Mask value.

Since a packet's headers can satisfy only one focused header rule 452, the Header-ID may not need to specify any other focused header rule 452. But note also that packet's headers may satisfy several promiscuous header rules, and so the Header-ID must specify them. In practice, however, the total number of promiscuous rules may be relatively small. Moreover, only a very small fraction of the theoretical number of combinations of those rules may actually occur. Implementations of the present invention may take advantage of this fact by using the Header-ID's Overlap-Number field to identify which of a number of preconfigured sets of promiscuous header rules 452 also match the current packet.

Figure 19:
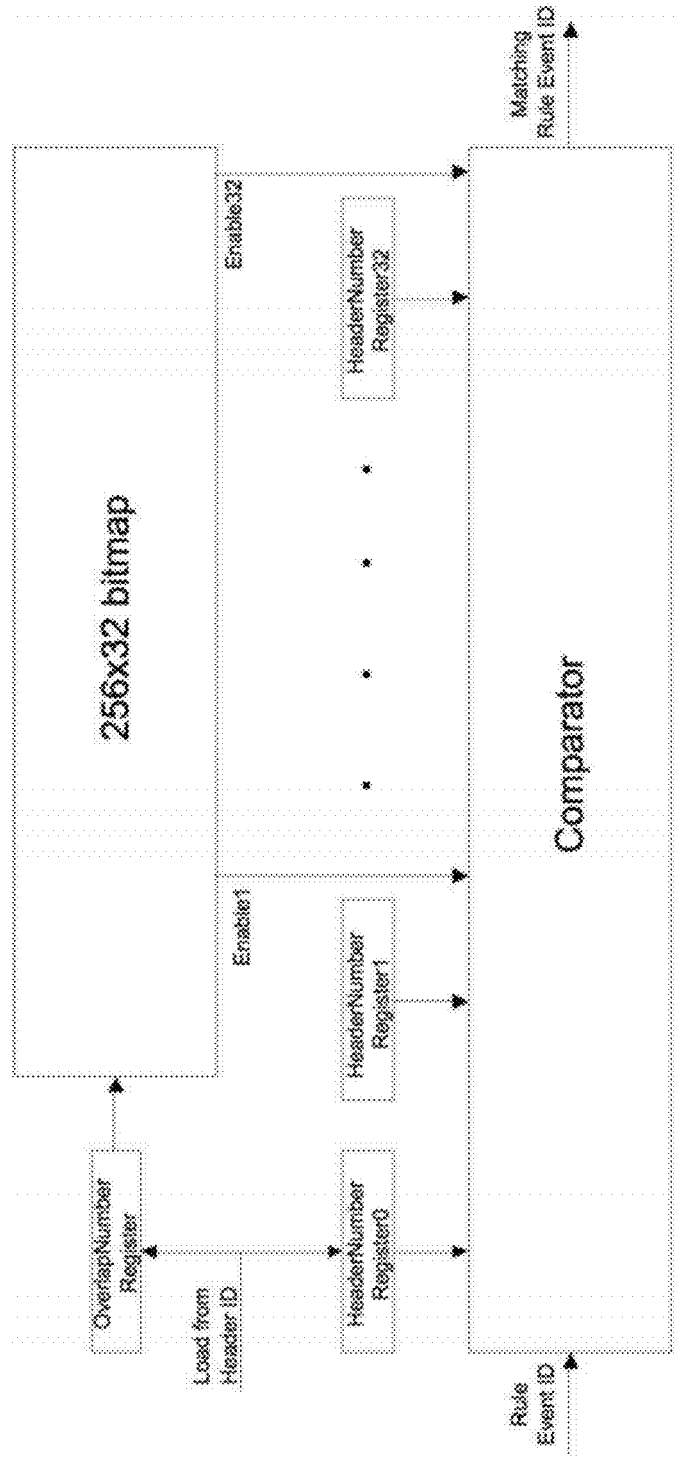
FIG. 19 depicts an address bit map.

Specifically, as shown in FIG. 19 and continuing to describe the example implementation, the contents of the Overlap-Number field may be used to address a 256x32-bit bitmap that may be integrated with a correlation module. The purpose of this correlation module may be to determine which action rules 450 the packet satisfies. The values in this field may be used by the correlation module to determine if patterns detected in the scan are relevant to this packet. Perhaps only patterns associated with Header-Numbers specified in this field are considered when correlating patterns to the rule set.

Referencing FIG. 18, in the example implementation, the M bit in the HEADER-ID may be set to indicate a rule match solely based on the header fields. In this manner, the example pattern-detection circuitry may insert a header alert in the results message when the M bit is set.

The PT field may, in the example implementation, indicate the packet type of the current packet. This field may be derived from the protocol type field in the IP header. The following table describes the encoding for the PT field.

| PT | Packet Type |
|----|-------------|
| 00 | Other (i.e. not TCP, UDP or ICMP) |
| 01 | TCP |
| 10 | UDP |
| 11 | ICMP |

The header match table above may be used, in the example implementation, to search for header matches. The header match table may use the Header-ID from the packet header to determine the matching Header Numbers. Each rule event and position event generated from the event translation table is compared to the Header-Numbers to filter out events that may be irrelevant based on the header rules matching performed.

In the example implementation, up to 33 Header-Numbers may be specified with the Header-ID. The Header-ID may contain a Header-Number and an—Overlap-Number, as shown in FIG. 18. One Header-Number may be obtained directly from the Header-ID and loaded into Header-Number Register0. The other 32 Header-Numbers may be selected via a 256 entry bitmap with 32 bits in each entry. The Overlap-Number may then be used as an offset into the bitmap memory to retrieve a bitmap entry. Each bit in the bitmap entry is associated with a Header-Number Register. When the bit is set, its associated Header-Number Register may be judged to be valid and may thus be used when checking rule events. If the bit is cleared, its associated Header-Number Register is not used during compares.

In the example implementation, note that Header-Number Registers 1 through 32 may be configured at the time the rule set is updated.

In the example implementation, the Header-Number may consist of a 14 bit Header-Offset field and a 4 bit Header-Mask field. The Header-Mask indicates the number of valid bits in the Header-Offset field. The comparison operation is performed by comparing the valid bits in the Header-Offset to the equivalent bits in the RULE NUMBER in the rule event. If all of the valid bits are equal, than the event ID matches the Header-Number. A rule event is passed on as a matching rule event if the RULE NUMBER matches any of the valid Header-Numbers.

To illustrate the use of the Header-ID, in the present example implementation, suppose a value of 0x1541_0002 is used for the Header-ID and the bitmap entry for offset 0x02 is 0x0000_0001. Header-Number Register 1 contains a header offset of 0x2388 and a Header-Mask of 0x3. The Header-ID will produce a Header Offset of 0x0550 and a Header Mask of 0x4 which is loaded into Header-Number Register 0. The overlap number from the Header-ID is 0x0002. The overlap number is used as an offset into the bitmap to read entry at bitmap offset 0x02. The table entry at offset 2 has only one bit set. With bit zero set, Header-Number Register 1 is enabled. All other Header-Number Registers are disabled. When a match event arrives with an event number of 0x0333, it is compared to Header-Number Register0 by masking out the invalid bits and comparing only the valid bits. The event number is changed to 0x0330 by the Header-Mask of Header-Number Register0. A comparison of bits [14:4] of the event number and the Header-Offset results in no match. The same sequence is performed for Header-Number Register1 which also results in no match. A match event arriving with an event number of 0x0553 will match since masking it with the Header-Mask will produce 0x0550 which is equal to the Header-Offset.

This scheme, as embodied in the example implementation and in variations that will be appreciated, is based on the fact that, in practice, most header rules do not overlap. When there are overlaps, the number of overlapping header rules may be relatively small. In the present example implementation, 32 overlapping header rules are supported so that the complete rule base can only have 32 overlapping header rules. But in the present example implementation, if more overlapping Header-Numbers are needed, the Header-Numbers can also be selected based on protocol type. In this case, the Header-Number registers 1 through 32 will consist of 4 Header-Numbers. Thus, each Header-Number register is still enabled by the bitmap but the packet type may be used to select one of the four Header-Numbers in each register. Note, however, that Header-Number Register 0 is not affected by these variations.

The teachings of the present invention may include processing of data flow 444 using replay. Note that many protocols, (for example, in TCP), messages may be sent in multiple packets. The message may be reassembled at the destination from the individual received packets. Thus, when scanning packets in transit, the data flow to be examined may not be present in a single packet. In addition, the packets may not arrive consecutively, and the packets from a single message may be interspersed amongst packets for other messages.

In order to properly detect patterns in messages that are conveyed in this type of protocol (such as TCP messages), the data in the packets must be reassembled much in the same fashion as the destination system reassembles the packets into messages. This reassembly must also be transparent to the TCP protocol to avoid disrupting the communications channel. Thus, the present invention provides methods, illustrated in the present example implementation, for achieving these goals by buffering message data and executing patterns searches within those assembled messages (as described in the foregoing) without disrupting the TCP protocol. The methods that may be applied in the present example implementation include techniques for buffering forwarded data and for intelligently releasing buffers.

In the present example implementation, upon scanning a packet, the pattern-detection circuitry, may request a replay of the current packet with the next packet of the TCP flow (other protocols may support similar invocations). This operation is implemented in a recursive fashion; that is, after the replaying of 2 packets, the pattern-detection circuitry may then indicate that it requires another replay of the original 2 packets plus a third.

In the example implementation, the pattern-detection circuitry may issue replays when it encounters a partial rule match (that is, when a signature straddles more than one packet), and/or when it needs to perform some protocol preprocessing that requires inspecting strings that span more than 1 packet. In the present example, the BIF will always forward the packet when a replay is requested and store a copy in the TQUEUE.

Figure 20:
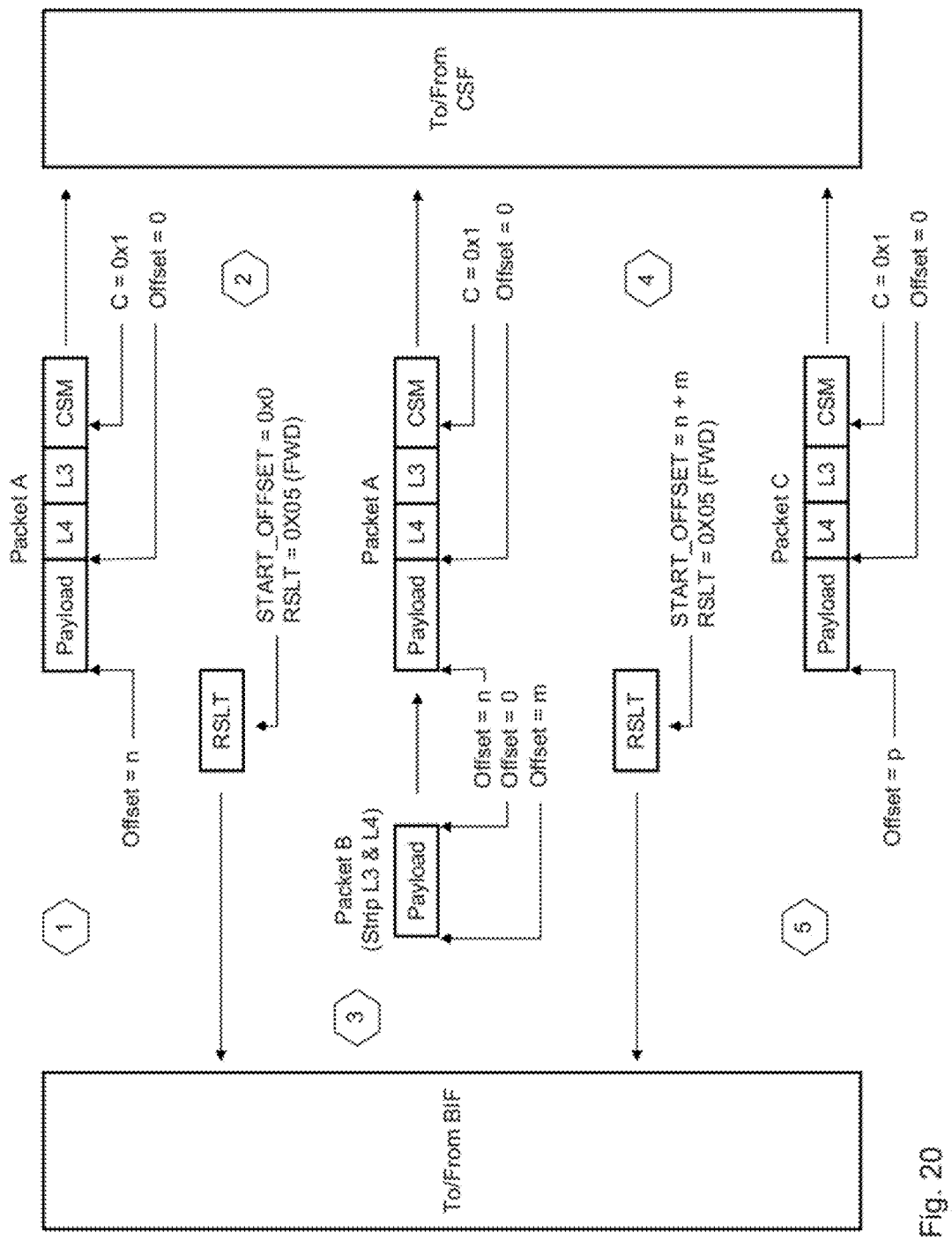
FIG. 20 depicts a two-packet replay.

FIG. 20 provides an example, in the context of the example implementation, of a two-packet replay. In this example, the following steps are executed:

1) The BIF strips the L2 header and appends a BIF_2_CSF Header on Packet "A" and sends to the pattern-detection circuitry. The "C" bit is set, enabling the replay function in the pattern-detection circuitry if the pattern-detection circuitry detects conditions that warrant a replay. The length of the packet, excluding the L3 (IP) and L4 (TCP) headers is "n" bytes.
2) The pattern-detection circuitry generates a result in the CSF_RSLT message back to the BIF. In it, the returned offset (START_OFFSET) is set to 0x0. This indicates that the BIF should replay this packet with the next packet of the TCP flow (which is indicated by the same FLOW_ID). The BIF will proceed to store a copy of packet "A" and forward the packet (RSLT=0x05). Note that the packet "A" will also be forwarded to its next destination based on the DEST_OP_TABLE.
3) The BIF receives packet "B", the next packet of the flow, strips its L2, L3, and L4 headers, and appends the payload to packet "A", which is in its original form. Both packets are sent as one CSF_PKT with a payload length of n+m. The "C" bit is once again set.
4) The pattern-detection circuitry scans the combined packet and returns a result. The START_OFFSET is set to n+m. Since the offset has advanced to the end of the combined packet, these packets do not need replaying anymore.
5) The BIF then sends packet "C" in a similar fashion to how packet "A" was sent in step 1). The process may then repeat.

Note that the result in step 4) could have come back with a "START_OFFSET=0x0". In this case, the next replay would have been a CSF_PKT composed of the packet "A" (with its original L3 and L4 header), packet "B" (with its L3 and L4 headers stripped), and packet "C" (with its L3 and L4 headers stripped).

In one variation of this example, it may also be possible for the pattern-detection circuitry to return a START_OFFSET that points to the middle of the payload of either the original sending of a packet (such as in steps 1) or 5), above), and/or to the middle of one of the packets that were replayed (such as step 3), above). In such cases, the BIF will take the original L3 and L4 headers of the packet to be replayed and append the payload portion, starting at "START_OFFSET", and then the next packet will be appended as before. This combined packet will then be replayed to the pattern-detection circuitry.

The teachings of the present invention may encompass the inspection of data flows 444 to detect anomalous and/or malicious content within those flows. The foregoing disclosure outlines the operations embodied by the invention in these operations, including one or more example implementations of the elements that may compose and/or may be associated with content search logic 312.

The following paragraphs provide descriptions of example implementations of the invention related to detecting anomalous and/or malicious content using one or more SOM's trained such to detect the presence of such content and/or trained to detect the absence of content expected to be present in the context of the subject data flow 444.

Note, however, that as with the foregoing example implementation, the following example may be employed in a wide range of implementations, configurations, embodiments, and the like.

Figure 21:
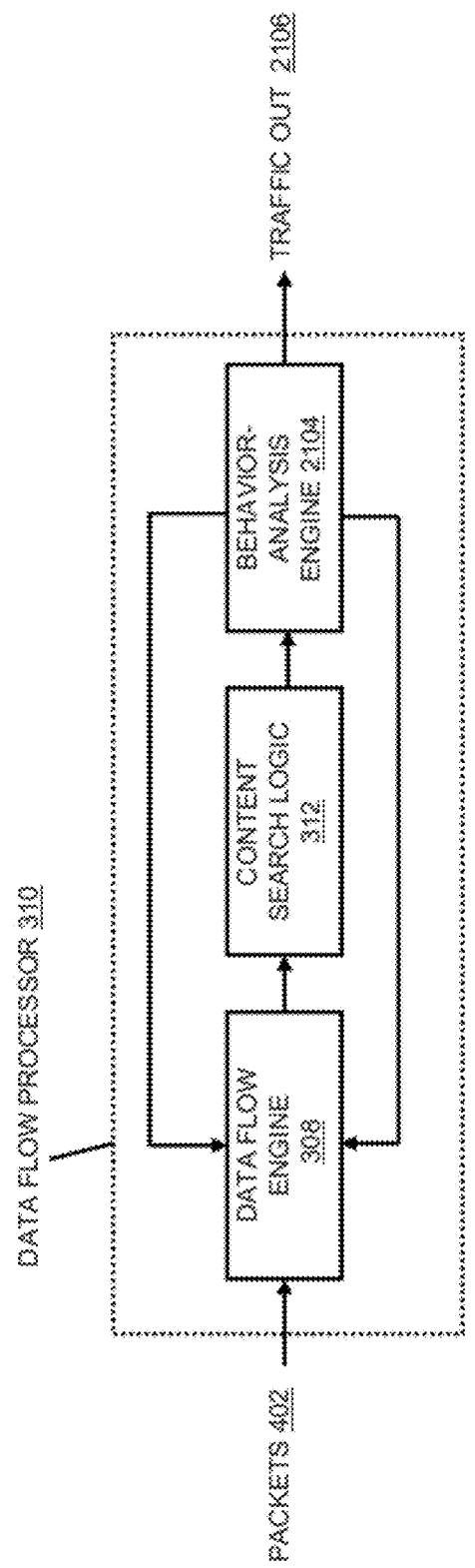
FIG. 21 depicts a simplified communication processing system.

FIG. 21 depicts the simplified communications processing system to which the following example implementation may be applied. Note, however, that this simplification is presented for pedagogical purposes and should not be seen to limit and/or otherwise circumscribe descriptions and/or figures presented herein or elsewhere.

The simplified example system of FIG. 21 receives communications in form of packets 404 on which it performs various operations. In an example, the system may treat the incoming traffic as divided into different "flows" characterized by respective features such as the node that receives the flow, the application (HTTP, SMTP, etc.), the payload (text, JPEG, etc.), other features, or combinations of those features, and among the system's functions may be to de-multiplex the incoming traffic into such flows. As described hereinabove, data flow engine 308 may, in this example, represent the consolidated functionality that may perform this and/or other functions separate from the protection functions discussed below. Note that, with the exception of forwarding traffic, which may depend on such protection operations, the data flow engine 308 operations are not of interest in the following descriptions.

One point of interest regarding these functions, however, is that the flows may include content that may be considered "dangerous" and/or which may otherwise need to be specially monitored according to requirements of a particular instance of the following example implementation. In practice it may often happen that such content is characterized by some signature that distinguishes it from "benign" content. Thus, one purpose of the functionality that may be embedded in content search logic 312 is to search the incoming flows for such signatures. When such signature patterns are encountered, functionality associated with content search logic 312 may cause and/or signal some appropriate action, such as, for example and without limitation, preventing the offending flow from being forwarded.

Additionally or alternatively, there may be malicious flows for which signatures are not yet known. To detect such flows, the simplified example system of FIG. 21, may additionally include a behavior-analysis engine 2104. In implementations, behavior-analysis engine 2104 may attempt to find flows that differ (in some fashion) from those normally encountered (presumably benign) flows. The behavior-analysis engine 2104 may be or be associated with the machine learning logic 314 and/or the machine learning acceleration hardware 318.

In the example implementation that follows, behavior-analysis engine 2104 may comprise a neural network for finding unusual flows. The neural network may be an instance of any and all neural networks for finding unusual flows, pattern matching, and so forth. Such neural networks are described herein and elsewhere.

Some embodiments may use appropriately programmed general-purpose digital computers to implement the neural network (and/or other structures associated with and/or which may be embedded within behavior-analysis engine 2104). But some applications will require real-time filtering of high-speed data flows. In the context of the present invention, and in the following example implementation, "Real-time" filtering may be understood to mean that the net functionality of the apparatus depicted in FIG. 1 executes its functionality such that any delay such a system may impose upon non-anomalous flows would be maximally transparent (that is, at least small enough) to permit proper (that is, normal) operation of flows in the associated apparatus, but which also enable the system associated with the apparatus in FIG. 1 to interrupt detected anomalies before they can do damage.

For many of these applications where "real-time" functionality may be required (and/or for any other reason), dedicated hardware may be used to execute some or all of these functions, where in the context of the present invention, and in the following example implementation, such hardware may be used adjunctively and/or exclusively to appropriately programmed general-purpose digital computers.

Figure 22:
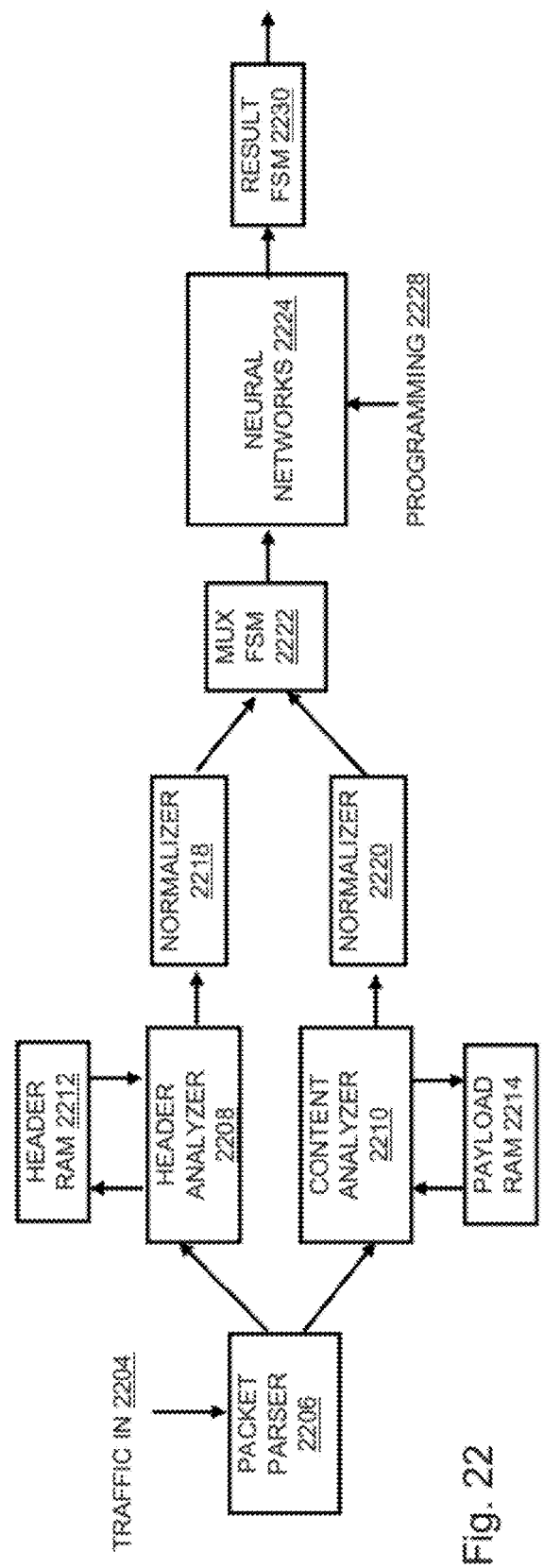
FIG. 22 depicts a simplified arrangement of a behavior analysis engine.

FIG. 22 depicts in simplified form one possible hardware arrangement of the behavior-analysis engine 2104. (Note, however, that the functions depicted in FIG. 22 provide a pedagogical illustration of the following example implementation, and shall not be construed to limit, amend, and/or otherwise circumscribe previous depictions and/or descriptions conveyed in the foregoing paragraphs and figures.) It will be appreciated that the behavior-analysis engine 2104 may a complete, partial, or alternate embodiment of the data flow processor 310 and/or any other element of the flow processing facility 102 as described herein and elsewhere. A packet parser 2206 may divide the input ("traffic in 2204"; which, in embodiments, may be "the packets 402") into "chunks" from which the system may extract respective feature vectors. A typical "chunk" may be an Internet Protocol ("IP") datagram or other link- or other-level protocol data unit. As FIG. 22 suggests, packet parser 2206 may divide those "chunks" into header and payload portions, from which header analyzer 2208 and content analyzer 2210 may extract the features in different ways, as outlined in the following description.

Header analyzer 2208 may extract features that may include, without limitation, the various fields within the IP header and/or with an encapsulated transport-layer header. In addition, header analyzer 2208 may also derive other features from statistics taken over multiple "chunks". Examples of such other features may include, without limitation, connection time, and/or requests per unit time, and/or average request and response sizes, and/or number of connection per unit time, and/or the number of connections to the same destination per N connections, and/or the multicast-to-unicast and unicast-to-multicast traffic distributions.

Certain implementations may require that such "multiple-chunk" quantities be processed on a per-flow basis, but, as mentioned in foregoing paragraphs, packets 402 that carry data for a given flow may arrive out of order and/or may be interspersed with packets that carry data associated with other flows. The feature-extraction operations detailed (in simplified fashion) in FIG. 22 may, therefore, need to reorder and/or reassemble those packets. Header analyzer 2208 and Content Analyzer 2210 may, in any implementation, provided Header RAM 2212 and Payload RAM 2214 (where RAM may be understood to also include any read/write capable device) within which data may be accumulated for the purpose of re-ordering and/or reassembling packets.

The example implementation may not only extract raw features from traffic in 2204, but may also normalize their values, as blocks normalize 2218 and normalize 2220 indicate. (Note that this functionality may be related to aspects of the invention that are conveyed by FIG. 4, and its descriptions, where blocks normalize 2218 and normalize 2220 may produce and/or may modify and/or may be associated with normalized data 428 and related functionality within data flow engine 308).

The purpose of normalization may be to maintain inter-process sensitivity in the distance criteria (as described in the following paragraphs) within processing that may be associated with the neural networks 2224. Note, however, that some embodiments of the present invention may dispense with normalization. But note also that, in implementations in which neural networks 2224 (and associated processes) may require normalization, the alignment functionality provided by normalization may be accomplished in any number of ways, and/or may employ any number of techniques similar to normalization. Any of these cases may be understood as being embodied in the present example implementation by means of the blocks normalize 2218 and normalize 2220.

In the present example implementation, blocks normalize 2218 and normalize 2220 may express the magnitudes of any and/or all of the components extracted from "traffic in" 2004 and which may be delivered by means of header analyzer 2208 and/or content analyzer 2210. These quantities may be expressed in terms of standard deviations, but many other representations may be employed. The result of these processes may be a sequence of feature vectors applied to neural networks 2224.

In the present example implementation, the functionality embedded within neural networks 2224 may optionally be configured to operate on multiple flows concurrently, and in these cases, (as shown in FIG. 22) a multiplexer/finite-state-machine module (mux FSM 2222) may marshal the resultant feature vectors in manner and/or in a configuration appropriate to the neural networks 2224. For similar reasons, implementations may optionally integrate finite-state machine (result fsm 2230) which may marshal the output from neural networks 2224 for use by subsequent circuitry and/or processes.

Figure 23:
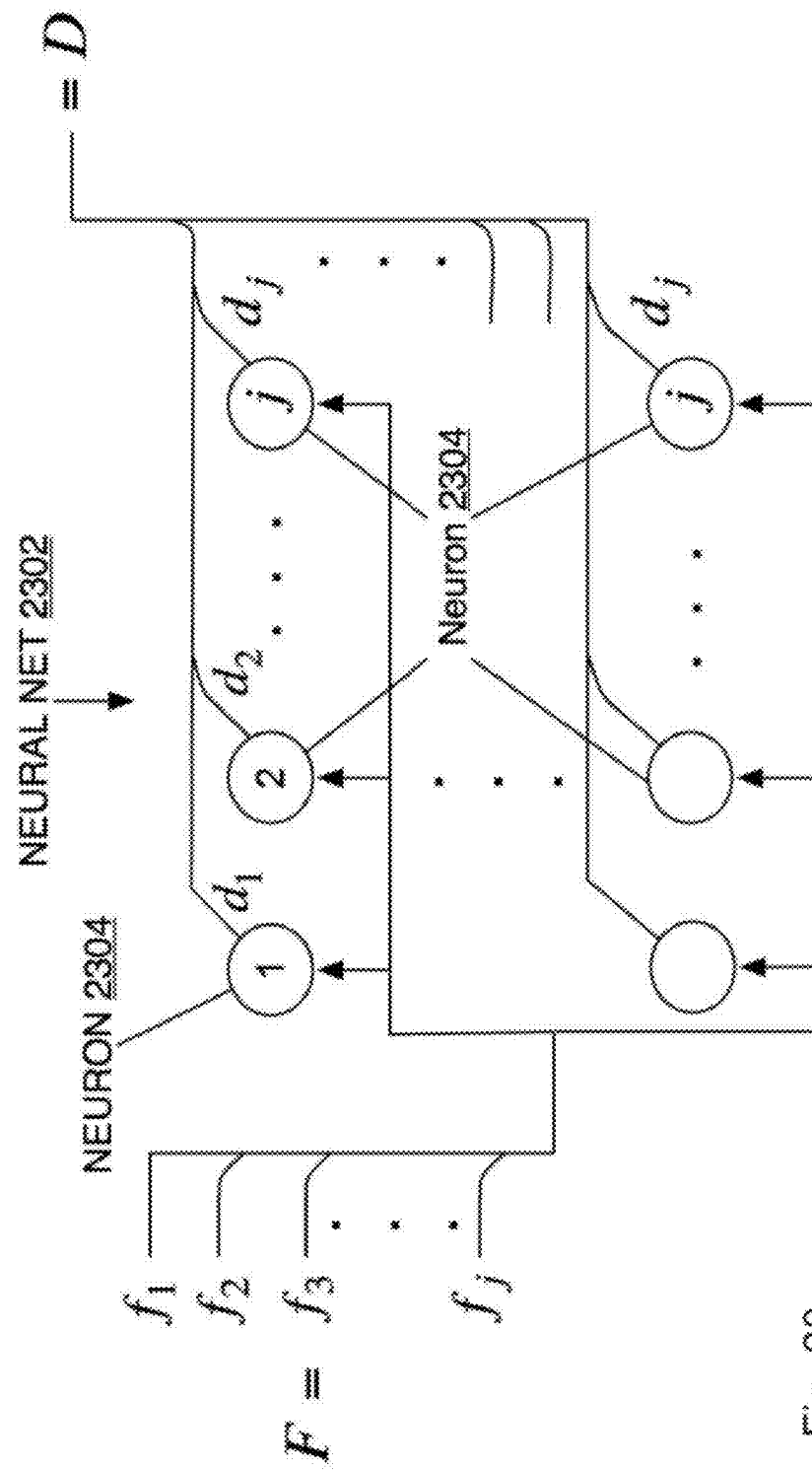
FIG. 23 depicts a neural net.

Referencing FIG. 23, in the present example implementation, each of what may be multiple neural networks 2302 (within neural networks 2224) may contain J "neurons" 2304. Neurons 2304 may be treated as being spaced apart from each other in a virtual (typically but not necessarily two-dimensional) space, and, as discussed in the following paragraphs, operations related to functionality provided by this implementation may depend on and/or may be influenced by the different "distances" between various neurons.

To illustrate one possible set of operations provided by the present example implementation, the features applied to the neural network 2224 have been extracted from headers of an example flow (traffic in 2204). (Note that the present example implementation may utilize more than one separate neural networks 2224, such that one or more neural networks 2224 may operate on header(s) from a flow, and one or more neural networks 2224 may operate on the payload of that flow.) As FIG. 23 indicates, the function of the jth neuron 2304 may be to compute a quantity $d_j$. Each neuron may be characterized by a respective "weight" vector $W_j$ [$w_1, w_2, \ldots w_I$]$^T$. The dimension of "weight" vector $W_j$ is the same as the dimension of the input feature vectors, and the quantity $d_j$ may, therefore, indicate how much weight vector $W_j$ differs from the input feature vector F [$f_1, f_2, \ldots f_I$]$^T$. The measure used to assess that difference may be, for example, the (scalar) Euclidean distance $d_j$ between F and $W_j$. The result of the neural network's computations for a given input feature vector is a vector D [$d_1, d_2, \ldots d_J$]$^T$ whose components compose those differences.

For high-speed communications, and where the present example implementation may be implemented in hardware, it may be advantageous for the circuitry that composes neural network 2224 to include multiple simultaneously operable distance-computing circuits. In such cases, each neuron 2304 may possess a separate, dedicated distance-computation circuit. Implementations may provide separate such complete sets of distance-computation circuitry for each of a plurality of simultaneously operating neural networks 2224. Moreover, some implementations may enhance the foregoing with separately addressable weight memories for each neuron 2304.

In many implementations, and in the present example, the neurons may be assigned their weight vectors during a "learning" phase. In such process or processes neural networks 2224 "learn" (in one or more processes during which weights are adjusted) what may be considered "typical" (that is, non-anomalous) behaviors within data flows (as such behaviors may be characterized by the forgoing processes). The thus-determined weights may then remained fixed (with exceptions to be described below) in a subsequent detection phase, in which neural network 2224 may be used to detect anomalous and therefore possibly malicious traffic.

Figure 24:
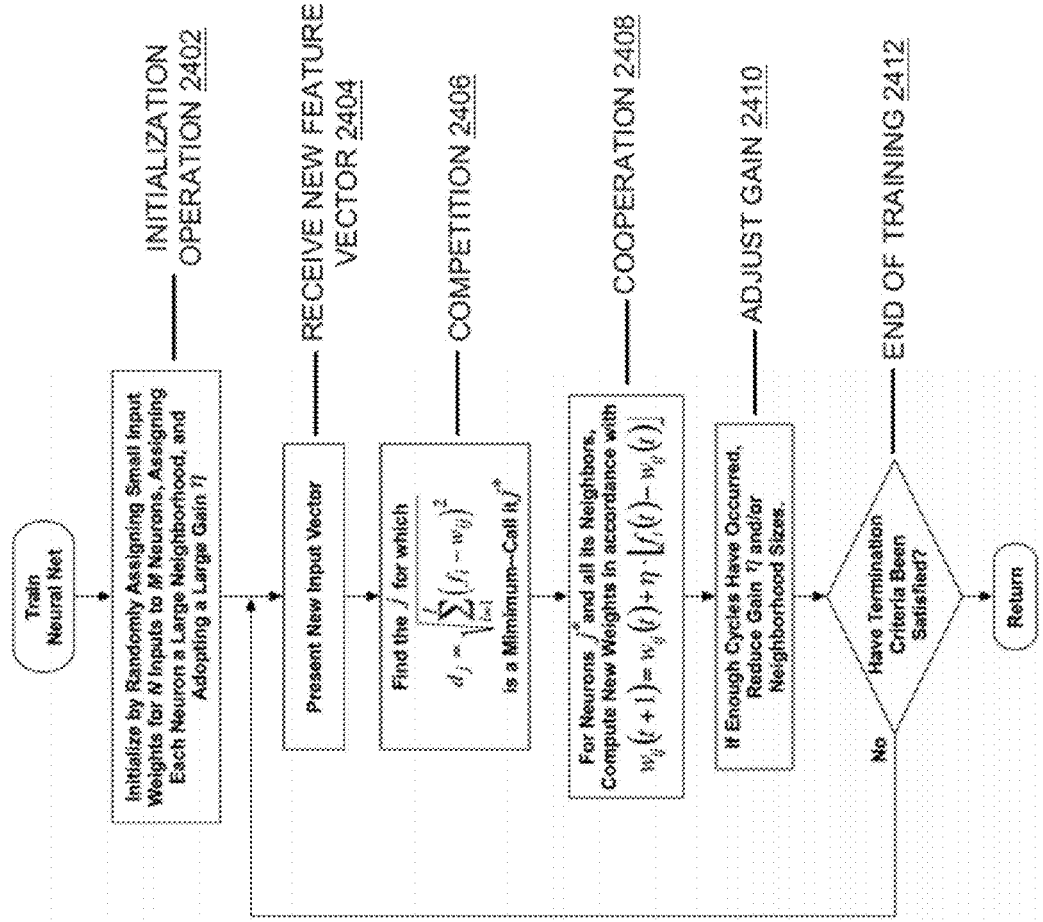
FIG. 24 depicts a learning phase of a neural net.

FIG. 24 illustrates one example of this learning phase. This example operation begins with initialization operation 2402. In initialization operation 2402, each neuron 2304 may be randomly assigned a respective initial weight vector and a respective neighborhood, which may consist of all neurons 2304 that may be 'located' within some limit distance. This neighborhood's size, which may shrink as learning progresses, may initially be large, and in some cases may at first encompass all of the neurons 2304 in neural network 2224. Initialization 2402 may also include adopting an initial gain value $\eta$, $0<\eta<1$, whose purpose will become apparent in the following paragraphs.

As shown in FIG. 24, following initialization 2402, this example implementation executes a loop in which it may operate on a sequence of feature vectors. In this learning phase, feature vectors may be obtained from (one or more) data flow(s) of the type that may be monitored during the detection phase. The loop begins with process "receive feature vector 2404" which represents a process wherein the next such feature vector is input. In process "competition 2406", the neurons 2304 may "compete" in the following fashion (in this example implementation): computational circuitry in the neural network 2224 identifies as the "winner" the neuron 2304 whose weight vector is closest to the current feature vector. (This example implementation uses Euclidean distance to determine "closeness," but note that many other measures may be used instead and/or in a supplemental fashion.) In some implementations, with appropriate normalization such as may be provided by Normalize 2218, the "winner" could be designated as the neuron 2304 associated with the weight vector $W_j$ for which the scalar product $W_j \cdot F$ is the greatest.) The process "competition 2406" is followed by process "cooperation 2408" wherein not only are the weights adjusted for winning neuron 2304, but those of its neighbors, as well.

Note that in the present example implementation of this process, the same gain value $\eta$ mentioned in the foregoing may be used. Note also that this value may be used for all neurons 2304 in the neighborhood, as well, but that in some implementations, other approaches may be employed. Some embodiments, for example and without limitation, may dispense with assigning neighborhoods explicitly but may instead use gains that vary as, say, a Gaussian function of distance from the winning neuron.

In the present example implementation, if some appropriate criterion is met, the routine may then adjust the gain function. This step is depicted in FIG. 24 by process "adjust gain 2410." Note that in this example embodiment, this adjustment may be adjusted using one or both of the following techniques: 1) reduce the gain value $\eta$; and/or 2) reduce the neighborhood size. (But note that many other techniques and/or combinations that may include the foregoing may be possible in this and other implementations.) In this example, the criterion for deciding whether to change the gain function may not be critical, and many such criteria may be integrated in this and/or in other embodiments. That decision, for example, may simply derive from receiving a predetermined number of training vectors. Other criteria may be based on the average distance-vector value in some sliding time window, or the number of vectors that have been processed so far. In any event, the routine in the present example repeats the loop until some end-of-training criterion and/or criteria (tested for in the process "end of training 2412") have been met. There may be any number of criteria (and/or groups of one or more criterion) considered in the threshold function associated with process "end of training 2412". In some implementations, for example, the criterion may be that every weight vector's distance to the feature vector is less than some threshold, but there are many possible threshold possibilities depending on the context requirements of a particular implementation. In any event, when those criteria are met, the learning phase is over.

Figure 25:
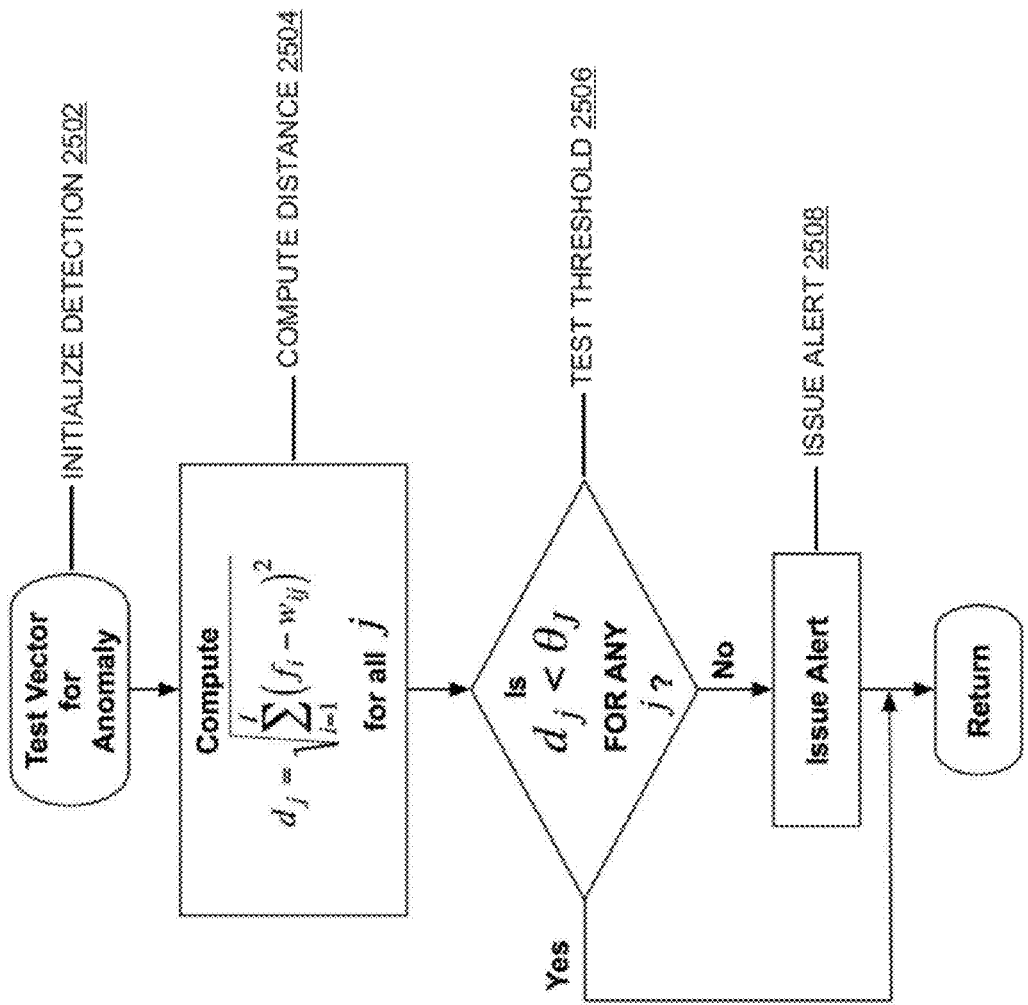
FIG. 25 depicts a detection phase of a neural net.

FIG. 25 depicts an example implementation of the detection phase. In the detection phase, neural net(s) 2302 thus trained may be used to detect anomalous flows. Following initialization (process initialize detection 2502 in FIG. 5) the process "compute distance 2504" computes distances between weight vectors and feature vectors as described in the in the learning phase. (Note that, as in the foregoing, any number of methods may be used here.) In contrast with the learning phase, however, in the detection phase, the weights remain fixed, and the computed distances (resulting from process "compute distance 2504") are used not to determine weight adjustments. Instead, the computed distances are used to detect anomalies; if those distances meet some predetermined criteria, (which may compose one or more groups of criterion) the system may take some appropriate action, such as issuing an alert to other circuitry or to supervisory personnel. As processes "test threshold 2506" and "issue alert 2508" indicate, in this example implementation, an anomaly may be signaled if all distances exceed respective thresholds. Note that in the example implementation, these distances and/or the related thresholds may be some number of standard deviations of the distances that may have been observed during training.

As stated in the foregoing, in the present example implementation, the packet parser 2206 may parse the input stream ("traffic in 2204") into a header, or "connection" portion and a payload, or "content" portion, and header analyzer 2208 and content analyzer 2210 may extract the features from those portions differently. To extract the payload features, content analyzer 2210, in this example implementation, may use a modified version of the N-Gram algorithm.

In an example, provided for the purposes of illustration and not limitation, a window size of, say, two bytes is adopted, and the window is advanced through the content payload chunk in steps of, say, one byte. As it does so, the algorithm takes a histogram of various sequences or groups thereof. In this example, each feature in the content-feature vector corresponds to some sequence or group of sequences within the subject content, and the value (which may be normalized) of the corresponding histogram bin or bins composes the value for that feature.

Continuing with this example, using this illustrative algorithm, the sequence "Papaya" results in a unity value for each of the histogram bins representing the two-byte sequences "Pa," "ap," "pa," "ay," and "ya" and in a zero value for all other histogram bins. If one of the features is the total of the values for the bins corresponding to "PA," "Pa," "pA," and "pa," then that feature's value (before normalization) will be two.

In the present example, if resultant distances fall outside a threshold the flow is considered to be anomalous. Note that such an algorithm may also be embedded in and/or executed by header analyzer 2208, but that the different algorithms may, in implementations, be applied in each case. In any event, a chunk (typically, a packet) may be declared anomalous if either of the two neural networks detects an anomaly.

In many applications, it may be desirable to derive sets of weight vectors from training data drawn from narrow ranges of flow types but in the detection phase to apply different flow types to neural networks that may use the resultant different weight-vectors sets. For this purpose, flow types may be classified in accordance with the functional element that receives the flow, including (but not limited to) the processes (and/or combinations of discrete processes) that deal with application (HTTP, SMTP, etc.), payload (text, JPEG, etc.), or other characteristics of data flow 444. In implementations, this may provide more accurate and customized modeling and, therefore, higher detection rates and very low false-positive rates.

As was mentioned in the foregoing, in some implementations, high-speed circuitry for implementing the present invention may include separate distance-computation circuitry, as well as separately addressable weight memories, for each neuron. In refinements, in order to "personalize" the circuitry differently for different flow types, the distance-computation circuitry for a given neuron may be provided memory not just for one weight vector but for multiple weight vectors.

Figure 26:
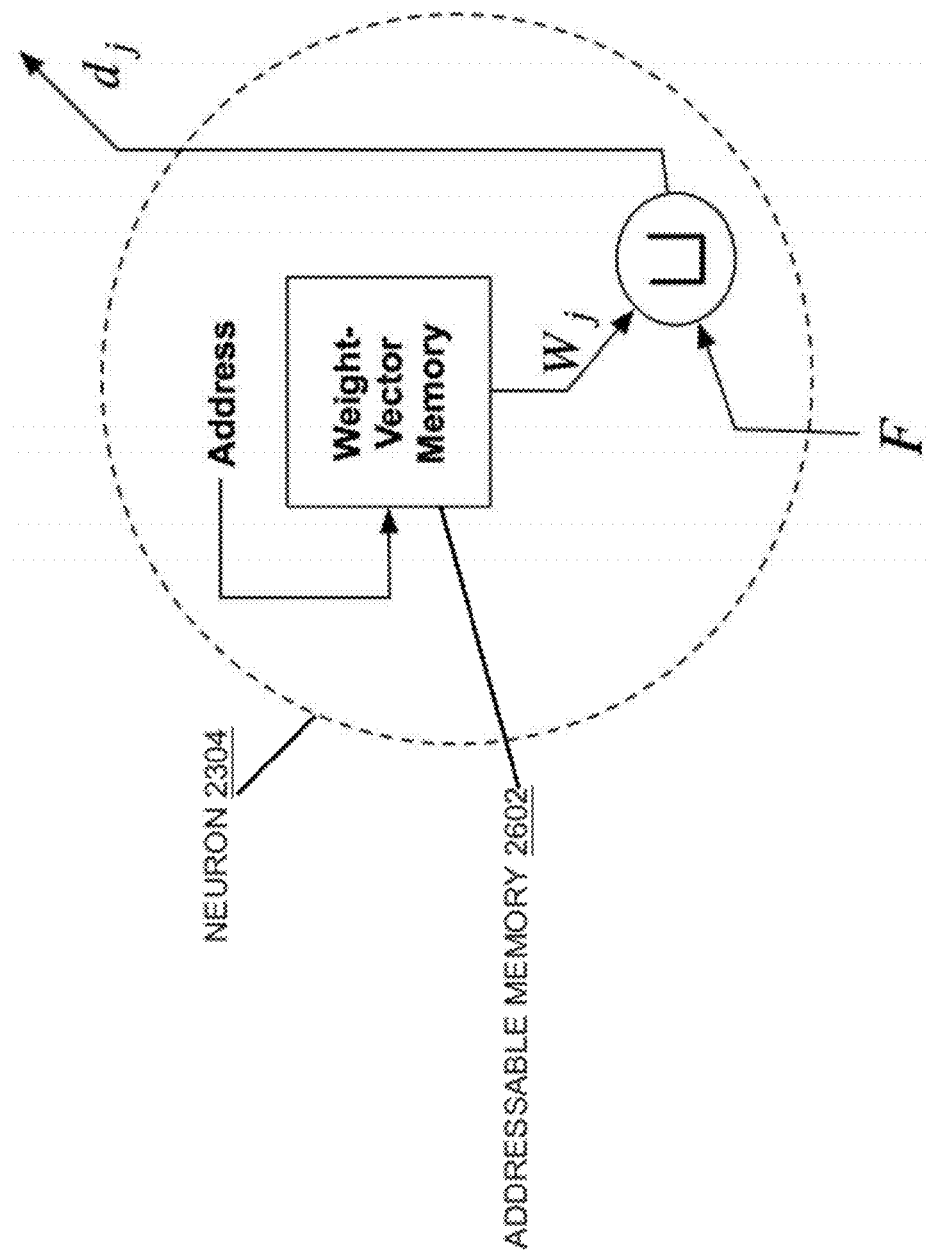
FIG. 26 depicts an expanded, logical view and process flow of a neuron.

Such an example implementation is depicted in FIG. 26. In this figure neuron 2304 includes addressable memory 2602. This co-location may enable the same computation circuitry to act in different time slots as part of different concurrently operating neural networks that may be dedicated to respective different flow types. Specifically, as different flows arrive, corresponding different addresses may be applied to the weight memories from which the difference-computation circuits draw their inputs. In this manner, different SOM's may be implemented within the same circuitry. It will be appreciated that many variations on FIG. 26 may be possible.

The reliability with which the neural networks detect anomalous behavior may be directly affected by the accuracy of elements that are integrated within the training and learning phases. In a further extension of the teachings of the present invention, example implementations may provide the ability not only to learn directly from a customer's network but also to implement incremental learning in a cost effective manner. In example implementations and without limitation, this may be accomplished by using multiple SOMs in such a fashion as to enable the neural networks to learn continually from the network while remaining in detection mode.

This example implementation embeds an apparatus that can gather incremental knowledge from the network and apply it to the knowledge of an existing SOM. (Note that this capability to add experiential knowledge to the SOM may also be applicable in real time intrusion detection systems.) Since customer behaviors may change over time, it is also necessary to integrate knowledge of these new and possible evolving conditions to the existing SOM. If a detected anomalous behavior turns out to be benign, for example, it may be desirable to include this new information into the existing SOM. Further, it may be desirable that that additional knowledge be added without losing and/or degrading and/or modifying existing knowledge. And yet, the existing knowledge may have been acquired during training that may have occurred months or even years ago. So, the network data that may have been used for that past training may not be available. It is for these reasons (and there may be many others) that it may be important to provide the capability to add incremental knowledge to existing SOMs.

Figure 27:
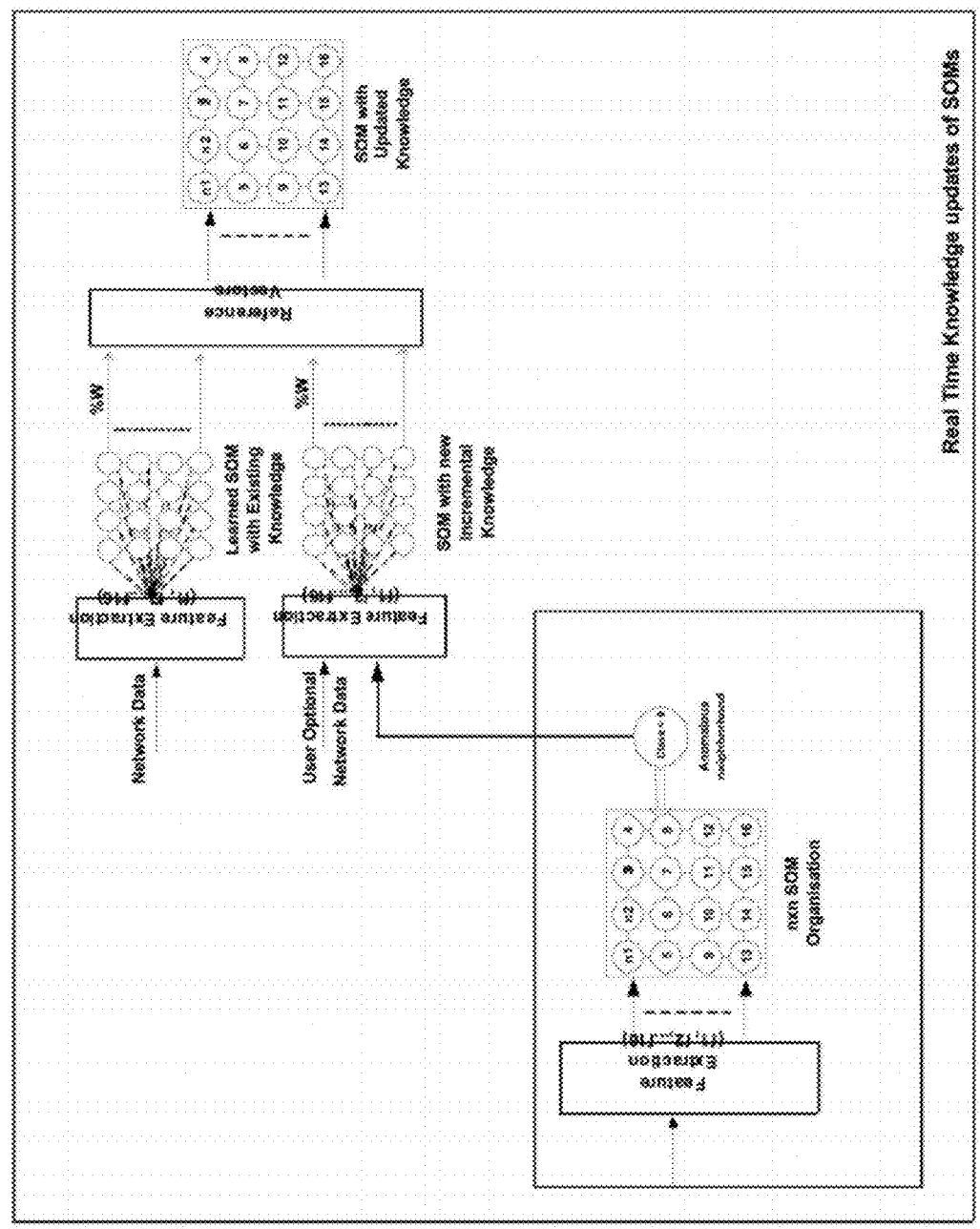
FIG. 27 depicts real-time updates to a self-organizing map.

FIG. 27 depicts an example implementation of a system that may provide the capabilities described in the foregoing. This example apparatus may provide this functionality when deployed in-line; that is, it may be configured to continually learn new behavior from the network, but may also, at pre-defined times, add incremental knowledge to the existing SOMs. In this example implementation, the SOM that is in the detection mode may detect an anomaly, and may then form an "anomalous cluster." This anomalous cluster represents new knowledge. The reference vectors from this cluster (and not the actual network data) are then fed to another SOM. The reference vectors of this incremental SOM along with the reference vectors of the SOM with the acquired knowledge (note that this SOM may be the exact copy of the detection SOM) are then fed into the new updated SOM. Thus, in this example embodiment, the SOM is now trained with the new set of reference vectors as features. The newly-trained SOM is now the SOM with the updated knowledge that is now used for detection. Note that, as an additional optimization provided in this example, since the new SOM is trained with the reference vectors whose dimensionality has already been reduced, the incremental knowledge acquisition process may be very fast.

In many applications of the teachings of the present invention, SOM-based neural networks may reduce false positives to arbitrarily low numbers and may provide advanced logging capability. These enhancements enable high detection rates for unknown attacks while keeping the false positive rates to a minimum. (In practice, in some implementations, this rate has been observed to be as low as less than 1%.). %). At 10 Gb/s rates, however, even this level of performance could overwhelm the network administrator. Thus, the teachings provided by the present invention may be extended to include techniques that filter and correlate a large number of such events (>10 K/s) and, as a result of these processes, may reduce these instances.

The present example describes a method and apparatus to reduce the false positive rates of the intrusion detection system using SOM neural networks. Note that designing intrusion-detection systems involves a tradeoff between the detection rates and the false-positive rates. If the detection rates are kept low, then low false positives can be limited, but then new-attack detection may be missed. If the detection rates are designed to be high so that more new attacks are detected, the false-positive rates can be unacceptably high.

Figure 28:
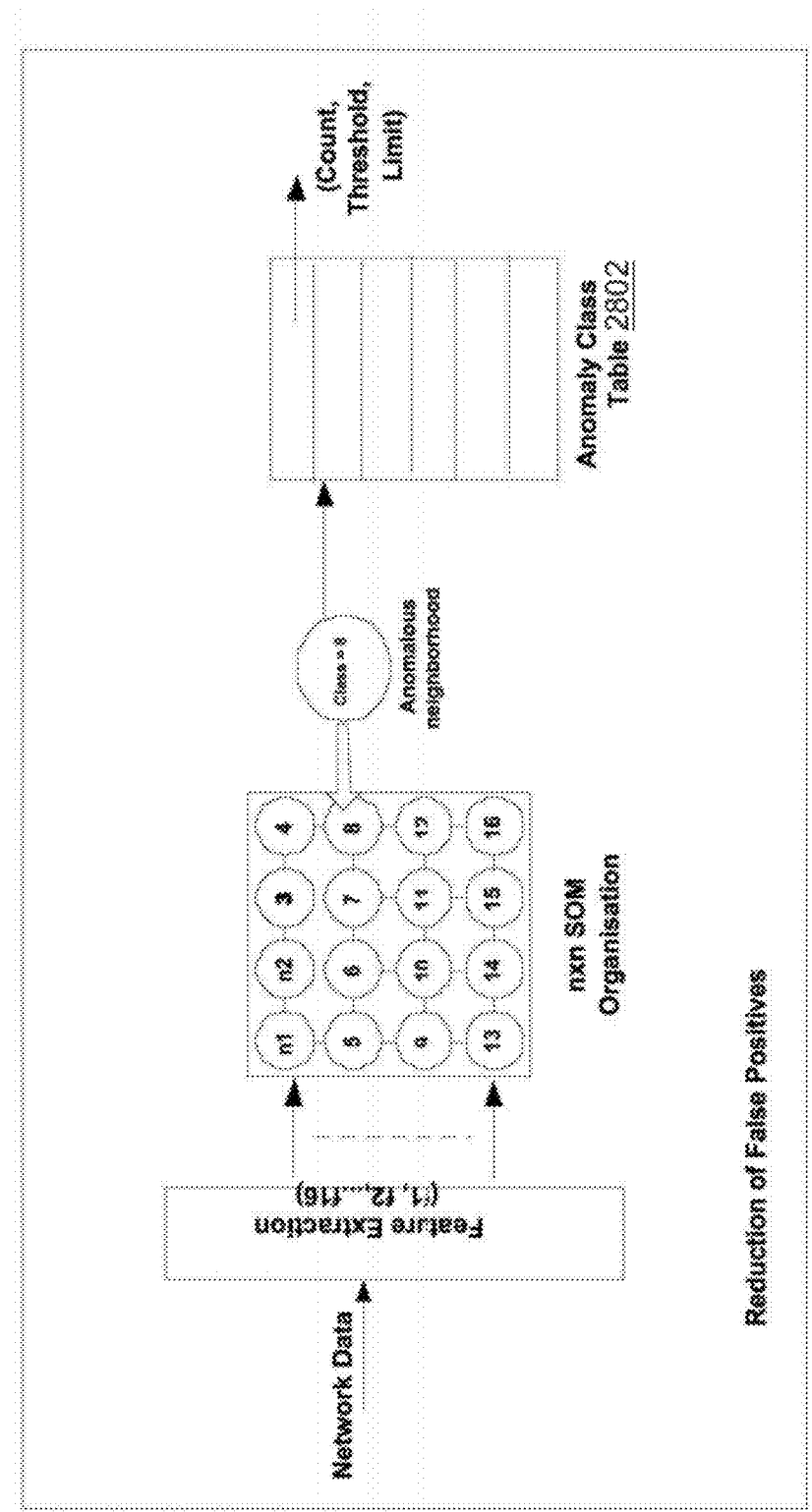
FIG. 28 depicts reduction of false positives.

In the present teaching and the example implementation that follows, a SOM-based neural network is described that may address these trade-offs by achieving low false-positive rates while keeping the detection rates for new attacks high. FIG. 28 depicts an example implementation of this technique. As shown, this example includes an "anomaly-class" table 2802, which contains entries associated with respective neurons 2304. Each entry identifies neuron 2304 with which it is associated and may include counter and threshold fields. In this example implementation, as the system receives network data, it extracts feature vectors (as described in the forgoing), (optionally) normalizes them, and applies them to the SOM lattice. If the SOM lattice finds anomalous behavior, it may not, in this case, interrupt the processes that are tasked to take action (such as issuing an alert) in the event such anomalous behavior is detected. Instead, in this example, the event is recorded by incrementing the counter-field contents in the table entry associated with the winning neuron (neuron 8 in FIG. 28) in anomaly-class" table 2802. A given attack will usually result in the same counter being incremented repeatedly. Monitoring software may read the anomaly-class" table 2802 periodically and but may reset the contents of the counter fields. In this manner, it is possible thereby to keep track of the rates at which various anomaly types occur, and, as a consequence, may issue an alert only if a thereby-monitored rate exceeds a value that the corresponding table entry's threshold field represents.

Referring again to FIG. 5, a data flow 444 may be handled by a flow processing facility 102, which may be incorporated into or associated with a unified threat management application 520, or which itself may perform various unified threat management actions. The unified threat management application 520 or action may encompass one or more applications or actions normally included in or associated with unified threat management, including one or more of a firewall-related application or action, including updating a firewall application 514; an intrusion prevention system application 518 or action; an anti-virus application 522 or action; a URL filter application 524 or action; an anti-spam application 528 or action; another unified threat management application 530 or action, an intrusion detection system application or action, an anti-spyware application or action, an anti-phishing application or action, and so on. In certain embodiments, one or more of these unified threat management applications 520 may, consecutively or simultaneously, process the data flow 444 or a representation thereof. This processing may be directed at providing a feature, function, or service that is generally associated with unified threat management. Thus, the flow processing facility 102 may provide a unified threat management feature, function, or service as it relates to a data flow 444 by routing the data flow to a unified threat management application 520.

In other embodiments, one or more actions related to unified threat management may be embodied in the flow processing facility 102, as illustrated by examples to follow. In particular, a data flow 444 may be processed by the flow processing facility 102 to identify patterns in the data flow 444, such as by using a set of artificial neurons, such as a neural network or the self-organizing maps described above. Patterns in the data flow 444 may be recognized that are relevant to identification of a wide range of threats to the network, including the threats managed by unified threat management applications 520. Thus, as described above and in any of the embodiments described herein, the flow processing facility 102 may be configured to identify, and take action with respect to, data flows 444 that contain patterns that suggest the existence of various types of threats. In embodiments the data flow processor 310 described herein may also include content search logic 312, which may explicitly implement pattern recognition using regular expressions (in one preferred embodiment the pattern recognition is embodied by an optimization of the Aho-Corasick algorithm). Thus, pattern recognition, in certain preferred embodiments, may consist of applying a set of artificial neurons such as a SOM or neural net, processing an output of the set of artificial neurons (e.g., the fingerprint 448), and performing a regular expression pattern match on packets of the data flow 444, or any combination or sub-combination of the same.

In an embodiment, the flow processing facility 102 may be used to in association with a firewall application 514. The firewall application 514 of this simplified example may be associated with TCP/IP and UDP/IP data flows 444. When the flow processing facility 102 receives such data flows 444, they may be associated with the firewall application 514. The flow processing facility 102 may receive such data flows and test them (such as via pattern recognition using the SOM, or otherwise according to the various embodiments described herein) for malicious or malformed TCP/IP or UDP/IP headers (which may be encompassed by a TCP/IP or UDP/IP packet 402), malicious or malformed TCP/IP or UDP/IP packets 402, or any other TCP/IP or UDP/IP packet 402 or header of a questionable nature. The flow processing facility 102 or firewall application 514 may also conduct a test that checks a blacklist and white list to determine whether a given packet should be summarily allowed or denied passage through the firewall application 514. The white list or blacklist may specify a destination IP address, a source IP address, a source port, a destination port, a time of day, a direction of transmission, or any other aspect of a TCP/IP or UDP/IP data flow. Depending upon the results of the tests, the firewall application 514 or flow processing facility 102 may allow or deny the packet 402 or the data flow 444. The firewall application 514 may employ stateful/state-sensitive packet inspection or stateless packet inspection. The application accelerator 504 may enable the firewall application 514 or may expedite processing associated with the firewall application 514. The RAM 510 or other memory facility may contain an operative part or any part of the application 514 and the CPU 508 may process an operative part of the application 514. It will be appreciated that the firewall application 514 in general embodiments may process other types of data flows 444 and may not in any way be limited to processing just the network and transport layers of the Internet protocol stack.

In an embodiment, the flow processing facility 102 is used to enable or support an intrusion prevention system application 518 or to enable or support an intrusion prevention action. In embodiments the intrusion prevention action is accomplished by the flow processing facility 102, such as simultaneously with accomplishing other actions. In other embodiments the flow processing facility may be embodied in the intrusion prevention system application 518. The intrusion prevention system application 518 or action of this simplified example may be associated with preventing malicious network traffic. The flow processing facility may, among other things, test a data flow 444 for indications of an unauthorized attack on, access of, or use of an element of the networked computing environment 100. In some cases, such unauthorized actions are associated with a hacker, a virus, a Trojan horse, a worm, spyware, phishing, and so forth using, for example, pattern recognition, such as using the SOM-based neural net or similar processing facility as described herein. The flow processing facility 102 may test the data flow 444 for unauthorized actions, such as those that are driven by a virus or those that have characteristics of a hacker's attack on a network. The flow processing facility 102 may test for a misuse or an anomaly embodied in the data flow 444. Generally, the flow processing facility 444 may provide access control for any of the elements of the networked computing environment 100. In embodiments the application accelerator 504 may enable this access control or may expedite processing associated with providing this access control. The RAM 510 may contain an operative part or any part of an associated intrusion prevention application 518 and the CPU 508 may process an operative part of the application 518. In embodiments, the intrusion prevention system application 518 or the flow processing facility 102 may differ from the firewall application 514 in that the intrusion prevention application 518 or flow processing facility 102 may provide access control based upon application-level content in the data flow 444. It will be appreciated that the intrusion prevention system application 518 or flow processing facility 102 in general embodiments may process any aspect of a data flow 444 in the manner described throughout this disclosure and is not in any way be limited to processing just the application-level content in the data flow 444.

In an embodiment, unified threat management is enabled by a flow processing facility 102 that is incorporated in or associated with an anti-virus application 518 or that enables an anti-virus action, such as in processing a data flow 444 to recognize patterns that are associated with viruses. The anti-virus action of this simplified example may be associated with preventing a virus that is embodied in the data flow 444 from transiting the flow processing facility 102. The anti-virus action may test a data flow 444 for the presence of a virus, such as by matching a component of the data flow 444 to patterns associated with viruses, such as using a SOM-based neural net or other facility for recognizing patterns as described herein. In embodiments the test may further involve the use of a dictionary, look-up table, database, external data source, or similar facility containing viruses, information about viruses, names of viruses, signatures of viruses or other data indicative of whether a segment of code is a virus or part of a virus. The application accelerator 504 may expedite the test, by embodying some or all of the logic required to compare the contents of the data flow 444 to the virus indicator. The RAM 510 may contain, for example, a dictionary or look-up table (or other data facility) and an operative part of the anti-virus application 522. The CPU 508 may process the operative part of the application 518 in association with, for example, a dictionary or look-up table. Other embodiments of the anti-virus application 522 will be appreciated and all such embodiments are intended to fall within the scope of the present invention.

In an embodiment, unified threat management is enabled by a flow processing facility 102 that is incorporated in or associated with a URL filter application 524 or that accomplishes a URL filtering action. URL filtering in this example may be associated with preventing access to particular URLs, wherein a data flow 444 contains them or contains an attempt to access them. The flow processing facility 102 (which may be a SOM-based flow processing facility) may process a data flow 444 in order to recognize patterns that suggest the presence of a URL or a request to access to a URL, such as one that is in a blacklist or that is otherwise suspect. In one example, without limitation, the request is embodied as an HTTP GET. The blacklist may be a text file, an XML file, a relational database, or any other embodiment of a blacklist. If an offending request is found, the URL filter application 524 may deny that request, such as by dropping the request from the data flow 444 and/or by transmitting an "access denied" message to the facility that originated the request. In one example, without limitation, this message may be embodied as an HTML page. The application accelerator 504 may expedite the test, by embodying some or all of the logic required to compare the contents of the data flow 444 to the blacklist. The RAM 510 may contain the blacklist and an operative part of the URL filter application 524. The CPU may process the operative part of the application 518 in association with the blacklist. Other embodiments of URL filtering will be appreciated and all such embodiments are intended to fall within the scope of the present invention.

In an embodiment, unified threat management is enabled by a flow processing facility 102 that is incorporated in or associated with an anti-spam application 524 or that accomplishes an anti-spam action. The flow processing facility 102 of this example may be associated with preventing e-mail spam that is embodied in a data flow 444 from transiting the flow processing facility 102. The flow processing facility 102 may test a data flow 444 for the presence of spam, such as by recognizing one or more patterns that are associated with spam, such as by using a SOM-based neural net or other pattern recognizing facility as described herein. In embodiments, the flow processing facility 102 or anti-spam application 524 may further involve one or more of the following: checking a DNS blacklist; checking a DNS white list; utilizing a content-based filter; statistical filtering; checksum-based filtering; authenticating a sender of an e-mail; checking the reputation of a sender of an e-mail; checking a ham password; a cost-based system; a heuristic filter; a tar pit; a honeypot; a challenge/response system or method; a Bayesian filter; and so forth. If the result of the test is affirmative, then spam has been found. In response to this, the anti-spam application 528 or flow processing facility 102 may, without limitation, drop the data flow 444; remove the spam from the data flow 444, leaving the rest of the data flow 444 intact; alter the spam, such as by inserting a message into the subject line of the spam e-mail, so that the recipient can easily identify the spam as such; and so forth. The application accelerator 504 may expedite the test, by embodying some or all of the logic required to conduct it. The RAM 510 may contain an operative part of the anti-spam application 528. The CPU may process the operative part of the application 528. Other embodiments of the anti-spam application 528 will be appreciated and all such embodiments are intended to fall within the scope of the present invention.

In an embodiment, unified threat management is provided by a flow processing facility 102 that is incorporated in, or associated with another unified threat management application 530 or that accomplishes another unified threat management action. This application or action may be any application or action providing or associated with an aspect of unified threat management. The application accelerator 504 may be used in association with this application 530, such as by providing a hardware implementation of logic that expedites the execution of the application 530. The RAM 510 may hold data associated with the application 530, including an operative part of the application 530. The CPU 508 may process the operative part of the application 530 and the data that is associated with the application 530. The other application 530 is intended to encompass any and all unified threat management applications 520 and any and all aspects of a unified threat management application 520 that will be appreciated but that may not be described in detail or mention in the present disclosure or in the documents included herein by reference. All such applications 520 and aspects of applications 520 are intended to fall within the scope of the present invention as they used in or adapted for flow processing facility 102.

The flow processing facility 102 may facilitate content inspection as applied in a unified threat management application at the network layer. In addition to detecting abnormalities in a network layer packet header, content inspection of a network layer packet payload may reveal problems that can be addressed by the UTM application. In an example, the content search logic 312 of the flow processing facility 102 may be used to inspect the payload of a network layer packet to detect strings that may match a form of invalid application layer packet header. A network layer packet with such a violation may be acted upon by the UTM application to prevent the packet from reaching the network, and any and all connection or data flow 444 associated with the packet may be terminated or dropped.

The UTM application may be facilitated by the techniques, methods, features, and systems herein described for applying the flow processing facility 102 to content inspection. In addition to packet-header-based behavioral analysis and matching by the flow processing facility 102, content inspection (including, without limitation, packet-payload-based behavioral analysis and matching) may be applied to detect threats within payloads, threats affecting protocols, intrusions passing through ports, and attacks on system resources. The flow processing facility 102 can be configured in a network to inspect content such that threats within payloads that can be detected by content matching can be prevented. Threats that compromise the integrity of one or more network protocols may be detected by the flow processing facility 102 through content matching of packets associated with the protocol. The network processor module 210 elements and application processor module 212 resources may be applied to network traffic to detect protocol compromising packet payloads as the packets flow through the flow processing facility 102 (substantially in real-time). Network traffic associated with a port may be monitored by the flow processing facility 102 with content inspection to ensure any payload destined for the port (or originating in the port) does not include threats, viruses, spam, or other intrusions detectable by applying content matching. With appropriate security policy 414 defined in the flow processing facility 102, system resources such as system files, user passwords, NMS, NEMS, and other key resources may be protected from attack by applying content matching to network traffic packet payloads. The resources of the flow processing facility 102 such as the network processor module 210 elements (e.g. the data flow engine 308, the data flow processor 310, the content search logic 312, the machine learning logic 314, and/or the machine learning acceleration hardware 318) and the application processor module 212 elements (e.g. the application processing unit 502, and/or in the application accelerator 504) may be configured as herein described to provide a unified threat management solution covering packet header and payload inspection.

All of the elements of the flow processing facility 102 and unified threat management application 520 are depicted throughout the figures with respect to logical boundaries between the elements. According to software or hardware engineering practices, the modules that are depicted may in fact be implemented as individual modules. However, the modules may also be implemented in a more monolithic fashion, with logical boundaries not so clearly defined in the source code, object code, hardware logic, or hardware modules that implement the modules. All such implementations are within the scope of the present invention.

In general, the flow processing facility 102 and its unified threat management applications 520 are in no way limited by the examples that are provided herein. All possible embodiments of unified threat management actions or applications 520 within or associated with the flow processing facility 102 are intended to fall within the scope of the present invention. Although some of the following examples of unified threat management applications 520 and action may be simplified for illustrative purposes, this simplification is for the purpose of illustration and not limitation.

Referring generally to the invention described hereinabove with reference to all figures, it should be appreciated that architecture for flow processing has been described herein. The flow processing facility 102 may embody, include, or encompass the architecture. The architecture may comprise a chassis 218 with power supplies 220, fans 222, backplane 224, and slots 214. Into each of the slots 214 a module 208, 210, 212 may be inserted. From each of the slots 214 a module 208, 210, 212 may be removed. Thus, the architecture may support the reconfiguration of hardware through the rearrangement of modules within the chassis 218. In embodiments, the architecture may comprise a rack-mount module, but not a chassis 218. In this case, the modules 208, 210, 212 may be permanently installed in the rack-mount module and may not be so easily removed or inserted as they would be if installed in a chassis 218. Systems built according to the architecture may support redundancy and/or failover with respect to elements of the systems.

Beyond the physical reconfiguration of modules 208, 210, 212 and slots 214, the systems that comply with the architecture may dynamically reconfigure themselves in response to a variety of factors. Some of these factors, without limitation, may include a power failure, equipment failure, device failure, element failure, software failure, network failure, a change in a network data flow, an overload condition, an under-load condition, the output of an optimization algorithm, the output of an algorithm, an output of a heuristic, a value in a look-up table, an output of the machine learning logic 314, a configuration parameter received from a management server 228, an alert signal, an error signal, an alarm signal, an informational signal, a signal, a characteristic of a data flow, a user associated with a data flow, a rule associated with a data flow, a security feature associated with a data flow, a specification associated with a data flow, a security policy 414, an application identification 412, and the like.

The dynamic reconfiguration may encompass an adjustment to software, hardware, and/or the way the data flow 444 wends its way through the flow processing facility 102. One example of such a dynamic reconfiguration is described in detail hereinabove with reference to FIG. 6. However, other types of dynamic reconfiguration are possible. In an example, and without limitation, the dynamic reconfiguration may encompass, include, comprise, be associated with, or be in response to one or more items from the following list of items: the coupling or decoupling of a server computing facility 108 to the flow processing facility 102; the coupling or decoupling of a departmental computing facility 110 to the flow processing facility 102; the coupling or decoupling of the flow processing facility 102 to the internetwork 104, the coupling or decoupling of a network-connected computing facility 112 to the internetwork 104; the coupling or decoupling of a network-connected computing facility 112 to the flow processing facility 102 via a link-, network-, transport-, or application protocol; the failure of a departmental computing facility 110; the failure of a server computing facility 108; the failure of the internetwork 104; the failure of a network-connected computing facility 112; the coupling or decoupling of a management server 228 to a control processor module 208; the coupling or decoupling of a public network 202 to a network processor module 210; the coupling or decoupling of a private network 204 to a network processor module 220; the insertion or removal of a module 208, 210, 212 with respect to a slot 214 in a chassis 218; the failure of a module 208, 210, 212; a change in a data flow 444; the increase of data in a data flow 444; the decrease of data in a data flow 444; an anomaly in a data flow 444; a failure, start, or restart of the public network 202; a failure, start, or restart of the private network 204; a failure of a slot 214; a failure of the passive backplane 224; an overload of a module 208, 210, 212; an overload of a slot 214; an overload of the backplane 224; a reduction in load on a module 208, 210, 212; a reduction in load on a slot 214; a reduction in load on the backplane 224; a failure of a power supply 220; a recovery of a power supply 220; a replacement of a power supply 220; a failure of a fan 222; a recovery of a fan 222; a replacement of a fan 222; a failure, start, or restart of a management server 228; a failure, start, or restart of a physical network interface 302; the coupling or decoupling of something to the physical network interface 302; a failure, start, or restart of a switching fabric; an overload, under-load, or change in load on the switching fabric 304; the association or disassociation of the switching fabric with the backplane 224; a failure, start, or restart of a data flow engine; an overload, under-load, or change in load on the data flow engine 308; a condition association with the data flow engine 308; a failure, start, or restart of a data flow processor 310; an overload, under-load, or change in load on the data flow processor 310; a capability of the data flow processor 310; an energy consumption of the data flow processor 310; a measure of heat generated by the data flow processor 310; an overheat condition of the data flow processor 310; a programming or reprogramming of the data flow engine 308; a programming or reprogramming of a data flow processor 310; a programming or reprogramming of a content search logic 312; a programming or reprogramming of a machine learning acceleration hardware 318; a failure, start, or restart of the machine learning acceleration hardware 318; an association or disassociation between a machine learning logic 314 and the machine learning acceleration hardware 318; a function of the machine learning logic 314; a function of the content search logic 312; a function of the machine learning acceleration hardware 318; an output of the content search logic 312; an output of the machine learning logic 314; an output of the machine learning acceleration hardware 318; a signal directed at or provided by the content search logic 312, the machine learning acceleration hardware 318, and/or the machine learning logic 314; a success or failure of the machine learning logic 314; a success or failure of the content search logic 312; an addition or removal of a data flow 444; a configuration or use of the physical network interface 302; a communication of the data flow 444 through the physical network interface 302; a division of a data flow 444 into one or more packets 402; a provision of a packet 402 to the data flow processor 310; a provision of the packet 402 to a cell generator; a provision of a packet 402 to the content search logic 312; an anomaly contained in one or more packets 402; a provision of a packet to the machine learning logic 314; an processing step provided by the machine learning logic 314; a processing step provided by the machine learning acceleration hardware 318; a processing step provided by the content search logic 412; a fingerprint 448; a conversion of a packet 402 to a data cell 408 by the cell generator 404; a conversion of a packet 402 to a fingerprint 448 by the machine learning logic 314; a conversion of a fingerprint 448 and/or a packet 402 into normalized data 428 by the content search logic 312; the normalized data 428; the normalized data type 424; the application group 442; the application identifier 412; the identifier 430; the other identifier 440; the customer identifier 432; the service identifier 434; the service level identifier 438; the security policy 414; the cell router 410; an action of the cell router 410; an overload, under-load, or change in load on the cell router 410; a condition that is detected by or announced to the cell router 410; an action rule 250; a header rule 452; a content rule 454; an activation or deactivation of the action rule 250; an activation or deactivation of the header rule 452; an activation or deactivation of a content rule 454; an alert 442; a transmission or reception of an alert 442; a transmission of a data cell 408 to a done logical block 420; a transmission of a data cell 408 to a packet generator 418; a generation of one or more packets from one or more data cells 408 by the packet generator 418; a failure, start, or restart of the packet generator 418; a data cell 408 or other information transmitted to or receive from an application processor module 212; a data flow constructed from one or more packets 402; a transmission of a data flow 444 out of the data flow engine 308 via the physical network interface 302; a failure, start, or restart of an application processing unit 502; a failure, start, restart, installation, un-installation, activation, deactivation, run-time profile, measured resource utilization, predicted run-time profile, predicted resource utilization, estimated run-time profile, or estimated resource utilization of an application 512; a failure, start, restart, installation, un-installation, activation, deactivation, run-time profile, measured resource utilization, predicted run-time profile, predicted resource utilization, estimated run-time profile, or estimated resource utilization of a unified threat management application 520; a failure, start, restart, installation, un-installation, activation, deactivation, run-time profile, measured resource utilization, predicted run-time profile, predicted resource utilization, estimated run-time profile, or estimated resource utilization of a firewall application 514; a failure, start, restart, installation, un-installation, activation, deactivation, run-time profile, measured resource utilization, predicted run-time profile, predicted resource utilization, estimated run-time profile, or estimated resource utilization of an intrusion protection system application 518; a failure, start, restart, installation, un-installation, activation, deactivation, run-time profile, measured resource utilization, predicted run-time profile, predicted resource utilization, estimated run-time profile, or estimated resource utilization of an anti-virus application 552; a failure, start, restart, installation, un-installation, activation, deactivation, run-time profile, measured resource utilization, predicted run-time profile, predicted resource utilization, estimated run-time profile, or estimated resource utilization of a URL filter application 524; a failure, start, restart, installation, un-installation, activation, deactivation, run-time profile, measured resource utilization, predicted run-time profile, predicted resource utilization, estimated run-time profile, or estimated resource utilization of an anti-spam application 528; a failure, start, restart, installation, un-installation, activation, deactivation, run-time profile, measured resource utilization, predicted run-time profile, predicted resource utilization, estimated run-time profile, or estimated resource utilization of an other unified threat management application 530; a failure, start, restart, installation, un-installation, activation, deactivation, run-time profile, measured resource utilization, predicted run-time profile, predicted resource utilization, estimated run-time profile, or estimated resource utilization of an other application 532; a usage of RAM 510; a failure of RAM 510; a usage of a CPU 508; a failure of a CPU 508; an energy consumption of a CPU 508; a temperature of a CPU 508; a usage of an application accelerator 504; a failure of an application accelerator 504; an energy consumption of an application accelerator 504; a temperature of an application accelerator 504; an availability of RAM 510, a CPU 508, and/or of an application accelerator 504; an association of an application 512 with an application processing unit 502; an association of an application processing unit 502 with an application processor module 212; a predicted failure of an application processor module 212; a predicted failure of an application processing unit 502; a predicted failure of an application 512, 514, 518, 520, 522, 524, 528, 530, 532; a predicted failure of RAM 510; a predicted failure of a CPU 508; a predicted failure of an application accelerator 504; a predicted failure of a switching fabric 304; a predicted, anticipated, scheduled, unscheduled, unpredicted, foreseeable, unforeseeable, or unanticipated failure, success, change in load, change in availability, change in capability, change in nature, change in character, or change in performance of any element of the networked computing environment 100 or of the flow processing facility 102 or any of its elements, which are described hereinabove with references to FIGS. 1 through 6; and the like.

In embodiments, the methods and systems disclosed herein may provide a flow processing facility for processing a data flow, and configuring the flow processing facility to recognize patterns in the data flow based at least in part on learning (e.g., artificial neurons, an SOM-based neural net, and the like).

In embodiments, the data flow processor 310 may incorporate unified threat management functionalities that are relevant to identifying threats of disparate types, including threats relevant to intrusion detection, intrusion protection, anti-virus protection, anti-spyware protection, and anti-spam protection, as well as other types of threats, such as related to phishing or unauthorized use of computer network resources. In other embodiments, the data flow processor 310 may be incorporated within a unified threat management application such that the data flow processor 310 functionality is one of a plurality of functionalities provided by the unified threat management application. In other embodiments, the data flow processor 310 may be independent from, but associated with, a unified threat management application such that the identification of disparate threat types described above herein is provided by the data flow processor 310 in conjunction with an independent unified threat management application, or the like.

A flow processing facility 102 that is implemented according to an architecture of the present invention may be capable of numerous configurations and reconfigurations, which may be manually applied or automatically applied. In all, the configurations and reconfigurations may be directed at providing unified threat management or any other feature associated with processing a data flow 444 in a networked computing environment 100. The architecture of the flow processing facility 102 may react appropriately to failures, anomalies, predictions, requirements, specifications, instructions, and any other inputs, outputs, or statuses that may be associated with the hardware, software, logic, or data flows of the facility 102.

Referring now to FIG. 7, a logical representation 700 of a flow processing facility 102 includes a data flow 444, a plurality of machine learning logic 314, a plurality of applications 512, a data flow router 702, and the flow processing facility 102. The data flow router 702 may be a high-level, logical representation of features, functions, or elements of the flow processing facility 102 that are described hereinabove with references to FIGS. 1 through 6. These features, functions, or elements may relate to accepting the data flow 444 as a plurality of network data packets 402, converting data packets 402 into an internal representation such as a plurality of data cells 408, routing the data cells 408 from one element to another so as to allow the data cells 408 to be received and transmitted by a plurality of application processor modules 212, routing the data cells 408 so that they are eventually converted back into a data flow 444 and transmitted out of the flow processing facility 102, and so forth. Generally, the data flow router 702 may encompass any and all elements of the process and data flow 400 that do not explicitly appear here, in FIG. 7. The process and data flow 400 is described hereinabove with reference to FIG. 4.

To be clear, the data flow router 702 is provided for pedagogical purposes, to abstract away details that are described hereinabove with references to the other figures, so that discussion of the present invention can proceed with a particular focus on the relationships between the flow processing facility 102, a plurality of machine learning logic 314, and a plurality of applications 512. The abstraction that is the data flow router 702 is not intended to limit, reduce, hinder, minimize, or otherwise provide a limiting context for any aspect or element of the flow processing facility 102.

In an embodiment of a flow processing facility 102 that is implemented according to the present invention, a data flow 444 may be received and/or transmitted by a data flow router 702. The data flow may also be received and/or transmitted by one or more of a plurality of machine learning logic 314. The machine learning logic 314 may be operatively coupled and/or in communication with the data flow router 702. This coupling and/or communication may encompass the transmission of information relating to a desired or appropriate routing of the data flow 444. This routing may trace, specify, suggest, encompass, include, or comprise one or more paths for the data flow 444. These paths may begin with an input of the data flow into the flow processing facility 102, continue to and from one or more of the applications 512, and conclude with an output of a data flow 444 from the processing facility 102. The paths may include parallelism, such as a branch in a path that results in two paths that the flow processing facility 102 executes in parallel. It follows that the paths may include merges, where two paths that may be been executing in parallel are brought back together in some way. A path may also include a terminus, where processing of a data flow 444 ends and, perhaps, the data flow 444 that reaches the terminus is discarded.

It will be appreciated that the output data flow 444 may be related to, associated with, but not necessarily identical to the input data flow 444. The difference between the input data flow 444 and the output data flow 444 may be a function of the applications 512 to which the flow processing facility 102 subjects the input data flow 444. These applications 512, and the order in which the input data flow 444 is subject to them, may be a function of the path or paths that the data flow 444 follows through the flow processing facility 102. Within the flow processing facility 102, any number of intermediate data flows 444 may exist between an input data flow 444 and its corresponding output data flow 444. Depending upon the path or paths, these intermediate data flows 444 may exist in a serial or parallel temporal relationship with respect to one another. In some cases, a data flow 444 may be discarded by the flow processing facility 102, resulting in either no output data flow 444 or in an output data flow 444 that does not carry a contribution from the discarded data flow 444. In embodiments, communication from the machine learning logic 314 to the data flow router 702 may be "direct" or "indirect."

An aspect, then, of the present invention may encompass methods and systems for determining a path. In the preferred embodiment, the machine learning logic 314 are implemented as self-organizing maps. These maps are described in detail hereinabove the reference to FIG. 4. In embodiments, the applications 512 may be security-related, such as the universal threat management application 520 and related applications 514, 518, 522, 524, 528, and 530. Thus, a plurality of self-organizing maps may receive and process an incoming data flow 444. In response to this processing, the machine learning logic 314 may communicate information to the data flow router 702. This information may instruct, suggest, or imply a data path for the data flow 444. The data path may be a function of this information and of the applications 512 that are available to the flow processing facility 102. Recall (for example, by referring back to the discussion of FIG. 6) that the number and types of applications 512 within the flow processing facility 102 may be dynamically and automatically adjusted by the switch 102, perhaps in response to a feature, aspect, or quality of the data flow 444. Thus, the applications that are in a data flow's 444 path may be created, configured, adjusted, prepared, instantiated, or embodied in response to a path, either in advance of the data flow 444 following the path or on a just-in-time basis.

Each of the self-organizing maps 314 may be associated with a particular application 512 or type of application. In an example, and without limitation, a self-organizing map 314 may be associated with an anti-virus application 522; a self-organizing map 314 may be associated with a firewall application 514; a self-organizing map 314 may be associated with an intrusion protection system application 518; a self-organizing map 314 may be associated with a URL filter application 524; a self-organizing map 314 may be associated with an anti-spam application 528; a self-organizing map 314 may be associated with an other universal threat management application 530; a self-organizing map 314 may be associated with a universal threat management application 520; a self-organizing map 314 may be associated with any other application 532; and the like.

In embodiments, the data flow processor 310 may incorporate unified threat management functionalities that are relevant to identifying threats of disparate types, including threats relevant to intrusion detection, intrusion protection, anti-virus protection, anti-spyware protection, and anti-spam protection, as well as other types of threats, such as related to phishing or unauthorized use of computer network resources. In other embodiments, the data flow processor 310 may be incorporated within a unified threat management application such that the data flow processor 310 functionality is one of a plurality of functionalities provided by the unified threat management application. In other embodiments, the data flow processor 310 may be independent from, but associated with, a unified threat management application 320 such that the identification of disparate threat types described above herein is provided by the data flow processor 310 in conjunction with an independent unified threat management application 320, or the like.

In embodiments, the methods and systems disclosed herein may provide a flow processing facility for processing a data flow, and configuring the flow processing facility to recognize patterns in the data flow based at least in part on learning (e.g., artificial neurons, an SOM-based neural net, and the like). When the data flow 444 is received by the flow processing facility, it may be more or less simultaneously provided to a plurality of machine learning logic 314 and to the data flow router 702. In other words, the path of the data flow 444 may include a split where one copy of the data flow proceeds to the machine learning logic 314 and another copy proceeds to the data flow router 702. Any of the paths may traverse a buffer or other mechanism that serves to delay, however perceptibly or imperceptibly, the data flow 444 along one path. This may allow the data flow 444 along one path to be synchronized with a data flow 444 along another path. In one example that relates to the discussion in this paragraph, it may take an amount of time for the machine learning logic 314 to process the data flow 444. During this time, the copy of the data flow en route to the data flow router 702 may be delayed intentionally by a buffer in the path to the router 702. This may allow the machine learning logic 314 enough time to process their copies of the data flow 444 and to communicate with the data flow router 702.

The processing of the data flow by the machine learning logic 314 may serve to classify the data flow 444. Depending upon the association of a particular machine learning logic 314 to a particular application 512, the classification may relate to whether the application 512 may be placed in the path of the data flow 444. In an example, and without limitation, a machine learning logic 314 that is associated with a universal threat management application 520 may determine that the data flow 444 is anomalous or contains an anomaly that may be relevant to, associated with, or require further processing by a universal threat management application 520. Since a plurality of machine learning logic 314 may process the data flow 444, it is possible that a plurality of classifications will be generated for a single data flow 444. Those classifications may relate to a plurality of applications 512, which may, depending upon the classification, be placed in the path of the data flow 444. The information that is communication between the machine learning logic 314 and the data flow router 702 may include the classifications or information associated with the classifications.

The data flow router 702 may receive complete or partial information from or associated with the machine learning logic 314. In addition to or instead of the information that has already been mentioned, the data flow router 702 may receive one or more application identifiers or one or more security policies 414. The data flow router 702 may also receive the data flow, a partial data flow, or a representation thereof. Based upon the information received from or in association with the machine learning logic, the data flow router 702 may construct a complete or partial path, which may be represented implicitly or explicitly. In any case, the data flow router 702, from time to time, may receive additional information from the machine learning logic 314. This information may be a function of additional parts of the data flow 444 that have arrived at the flow processing facility since the last information received by the data flow router 702. Alternatively or additionally, this information may relate to processing of an intermediate data flow that may be provided by the data flow router to the machine learning logic 314. In any case, the additional information may result in the data flow router 702 changing and/or completing the path that it had already determined.

In embodiments, the machine learning logic 314 may encompass a self-organizing map. However, it will be appreciated that many other embodiments of the machine learning logic 314 are possible. In alternate embodiments, without limitation, the machine learning logic may encompass one or more of the following machine-learning algorithms, techniques, and approaches: concept learning; general-to-specific ordering; decision tree learning; artificial neural networks; hypothesis evaluation; Bayesian learning; computational learning theory; instance-based learning; genetic algorithms; learning sets of rules; analytical learning; combining inductive and analytical learning; reinforcement learning; semantic nets; description matching; generate and test; means-ends analysis; problem reduction; basic search; optimal search; trees; adversarial search; rules; rule chaining; cognitive modeling; frames; inheritance; commonsense; numeric constraints; symbolic constraints; propagation; logic; resolution proof; backtracking; truth maintenance; planning; analyzing differences; explaining experience; correcting mistakes; recording cases; managing multiple models; identification trees; hill climbing; perceptrons; approximation nets; simulated evolution; recognizing objects; linear image combination; establishing point correspondence; describing images; computing edge distance; computing surface direction; expressing language constraints; responding to questions and commands; heuristic search; knowledge representation; predicate logic; representing knowledge using rules; symbolic reasoning under uncertainty; statistical reasoning; weak slot-and-filter structures; strong slot-and-filter structures; knowledge representation summary; game playing; planning; understanding; natural language processing; parallel and distributed artificial intelligence; learning; connectionist models; expert systems; perception and action; and so on. The example embodiments of machine learning logic 314 that are provided in this paragraph may be drawn from Patrick Henry Winston, *Artificial Intelligence,* $3^{rd}$ edition, Addison-Wesley Publishing Company, 1993; Elaine Rich and Kevin Knight, *Artificial Intelligence*, McGraw-Hill, Inc., 1991; and Tom M. Mitchell, *Machine Learning*, WCB/McGraw-Hill, 1997, all of which are included herein, in their entirety, by reference. Many other embodiments of the machine learning logic will be appreciated by those of ordinary skill in the art, and all such embodiments are encompassed by the present invention.

Referring again to FIG. 4, it will be appreciated from the preceding paragraph that the machine learning acceleration hardware 318 may be for a particular embodiment of the machine learning logic 314. In embodiments, the machine learning logic may be for a self-organizing map and may relate to the assisting or accelerating computations related to the artificial neurons of the map. However, in alternate embodiments, where the machine learning logic 314 may not be a self-organizing map, the machine learning acceleration hardware 318 may be adapted for that embodiment. Those skilled in the art will appreciate the algorithmic or computational complexities of a particular embodiment of the machine learning logic 314. Moreover, those skilled in the art will appreciate those aspects of the embodiment that may be accelerated or assisted through a hardware implementation. The machine learning acceleration hardware 318 may encompass these aspects. In some cases, these aspects may be associated with a math co-processing function; a math function; math; a look-up table; a search algorithm; digital signal processing; an approximation algorithm; an optimization algorithm; Newton's method; a random number generator; a stack; a heap; a tree; a counter; a learning algorithm; a neural network; Bayes theorem; an encoder; a decoder; a running average; an average; a square root; a probability; a network; a graph; a representation of information; a process applied to information; a hypothesis; a test; an assertion; a rule; a script; a plan; a goal; a rule; a trend; and so forth. Many other aspects will be appreciated and all such aspects are within the scope of the present invention.

Participants to a network may be operatively coupled to the network. This coupling may facilitate communication among participants of the network, allowing sharing and exchange of data, messages, and the like. A network security system, such as the flow processing facility 102, may manage the data flows 444 through the physical connection as it provides network security services. During this management, the flow processing facility 102 may glean information that allows it to provide virtualization with respect to the data flows 444. This virtualization may allow logical arrangements of policies, networks, behavioral analyses, applications, and so on to be applied to the management of the data flows 444. A benefit of these logical arrangements is that they may be tailored to the data flows; consistent with a wieldy, logical model (as opposed to an unwieldy, physical model); and so forth. A benefit of virtualization is that the logical arrangements may be applied programmatically, automatically, and/or transparently with respect to a source and/or sink (i.e. a transmitting computing facility and/or a receiving computing facility) of the data flows 444. In an example and without limitation, virtualization may be provided with respect to a data flow 444 as a function of the source and/or destination IP address of the data flow 444.

Applications of virtualization may relate to any and all aspects of flow processing, unified threat management, and so on. In an example and without limitation, two servers may each communicate with a database over the network. Were this network physically segmented, such as with a network security appliance physically residing between the servers and the database, both servers may be subjected to one intrusion detection and prevention policy. A virtualized network security system, on the other hand, may support a plurality of virtual networks connected to the database, perhaps regardless of the physical arrangement of the network. Thus, each of the servers in this example may be connected to the database through different virtual networks. The security policy on each of the virtual networks may be different and, perhaps, a function of the server's identity.

Referring to FIG. 30, a simplified schematic of an enterprise network 3000, while the physical network connections 3002 may connect all participants to flow processing facility 102, the information transferred along the physical connections may be used to virtually separate one or more participants from one or more other participants. For simplification, the following will describe examples of virtualization of internal participants of a network. However, the same examples could be applied to external participants such as clients, vendors, users, auditors, regulatory agencies, and others connecting over the internet. The same could also be applied to participants connected through VPN or wireless connections. This simplification in no way is intended to restrict or otherwise limit the scope of the virtualization methods and systems here disclosed.

Again referring to FIG. 30, user1 3004, user2 3008, server 108, are example participants of the network 3000 while engineering 3010, and sales 3012 are example participant types of the network 3000. As is shown, each of the user1 3004, user2 3008, server 108, engineering 3101, and sales 3012 have a physical network connection to flow processing facility 102. The network connection to flow processing facility 102 may be a single shared connection, or may be a plurality of individual and/or shared connections, or some combination thereof. While the example network depicted in FIG. 30 is used to illustrate methods and systems of network security virtualization, many other configurations and uses of network security systems may be virtualized and all such virtualizations are within the scope of the present disclosure. Network configurations suitable for enterprise, individual user, home user, home office user, service provider, security provider, central office, remote office, data provider, university, social club, public facility, library, town offices, state offices, federal offices, virtual private network, and any other network that may benefit from security may employ virtualization within a security deployment. Security deployments such as unified threat management, intrusion detection, intrusion prevention, intrusion detection and prevention, internet firewall, URL filtering, anti-virus, anti-spam, anti-spyware, http scanning, application firewall, xml firewall, vulnerability scanning, and any and all other networked security deployments may be virtualized and may include flow processing facility 102 as herein disclosed.

Embodied within flow processing facility 102 may be a virtualization module 3014 that may uniquely identify data flows 444 from each participant and logically route a data flow 444 from a participant to a virtual network 3018 associated with that participant. Security policies 3020 for each virtual network 3018 may be applied to the data flows 444 associated with the virtual network 3018. In an example, user1 3004 may be associated with virtual network 3018' that uses security policy 3020' while server 108 may be associated with virtual network 3018" that uses security policy 3020". In this example, which is provided for the purpose of illustration and not limitation, security policy 3020' may impose URL filtering restrictions for user1 3004 that may not exist in security policy 3020" for server 108 such that user1 3004 may be restricted from accessing non-business related websites during business hours.

Any and all aspects of flow processing facility 102 may be directed by a security policy 3020 to be applied to a data flow 444 of a virtual network 3018 including, without limitation a content scanning function for providing an anti-virus feature; an anti-spam feature; an anti-spyware feature; a pop-up blocker; protection against malicious code; an anti-worm feature; an anti-phishing feature; or a protection against an exploit.

Again referring to FIG. 30, security for network participants may be virtually grouped such that all members of a group may share security policy settings. When visualization is employed to eng 3010, each member of the group eng 3010 will be associated with a virtual network 3018 even though there may be no physical separation of network traffic from participant group sales 3012. As network traffic associated with eng 3010 participants is transferred through flow processing facility 102, the virtualization module 3014 may route eng 3010 data flows to virtual network 3018''' that employs security policy 3018'''. In this example, virtualization of the network security associated with flow processing facility 102 may permit eng 3010 participants to access resources of sales 3012 participants (such as a price list or customer list) while preventing sales 3012 participants from accessing eng 3010 resources (such as source code).

Connection among virtual networks 3018 and other resources such as the internet 3022, wireless ports 3024, VoIP ports 3028, and VPN ports 3030 may be accomplished by switching fabric 304 as described herein and elsewhere. In embodiments, switching fabric 304 may facilitate logical connection of any number of virtual networks 3018 with other resources as herein disclosed thereby enabling each network participant to have secure access as defined by their associated security policy 3020 to shared network resources such as and without limitation a PC, cell phone, pager, laptop, PDA, networked sensor, set-top box, video game console, TiVo, printer, VoIP device, handheld computer, smart phone, wireless e-mail device, Treo, Blackberry, media center, XBOX, PlayStation, GameCube, palmtop computer, tablet computer, barcode scanner, camera, and the like.

Virtualization of a networked security deployment may also be used to share network security hardware resources such as a firewall among otherwise separate networks. By associating each separate network with a virtual network 3018, each network administrator or owner may define security policy for their network. The security policy defined may be applied to network traffic associated with their virtual network 3018. Examples of network configurations that may be virtualized in this way include without limitation remote branch offices, individual enterprises leasing security from a security provider, and data storage service providers.

Virtualization may be applied to aspects of a network security deployment such that each aspect may be provided policies and updates separately. A network security deployment may include a firewall, intrusion detection and prevention, URL filtering, and anti-virus aspects. In one embodiment, a plurality of virtual networks may be established such that each virtual network may be associated with one or more security elements. As an example, a virtual network may be established to connect network resources to the internet and a firewall may be configured between the virtual network and the internet. Additionally a virtual network may be established to also connect the network resources to the internet with intrusion detection and prevention security configured between the internet and the virtual network. Likewise virtual networks that provide URL filtering and anti-virus protection may be configured between the internet and the network resources. Each security aspect could be managed separately facilitating pushing policies and updated to the various aspects separately without impacting others.

In addition to virtualizing aspects of a network security deployment, virtualization may be applied across a plurality of flow processing facilities 102. In a configuration in which the plurality of flow processing facilities 102 are connected substantially in parallel (e.g. for increasing performance), virtualization may be applied across the plurality of facilities 102 to facilitate applying common configuration, security policy 414, and the like. This may result in the plurality of flow processing facilities 102 appearing as a unified network security entity rather than individual entities each requiring configuration, security policy 414, and the like. As an example, a network configuration may include a plurality of flow processing facilities 102 providing an interface between an enterprise network and the Internet. The plurality of flow processing facilities 102 may be configured with virtualization as if they were one flow processing facility 102 by directing a common configuration (i.e. security policy 414) to each of the facilities 102.

Alternatively or additionally, individual modules (e.g. network processing module 210, or application processing module 212) within a flow processing facility 102 may be virtualized into a single network security entity. The modules may appear as one virtual network security resource even though they may be physically connected to different networks or network segments. In this way, common security policy, configuration, maintenance, and the like may be applied to the modules through the virtualized embodiment. This virtualization of individual modules may also be applied to individual modules in separate flow processing facilities 102. It may also be applied to separate flow processing facilities 102 that are not parallelized but instead are serving separate segments of a network (virtual or physical). Virtualized flow processing facilities 102 may be remotely located from each other through a public interconnection such as the Internet.

Virtualization of network security may also facilitate improvements in network security. Virtualization module 3014 may define a development virtual network that mirrors a user virtual network such that all internet traffic for the user virtual network also propagates to the development virtual network. Security policy of the development virtual network may be updated with experimental intrusion prevention algorithms and techniques that are being tested without causing intrusion or critical false rejects on the user virtual network.

Virtualization of network security may also facilitate load balancing of resources within a flow processing facility 102 by routing data flow associated with one virtual network to one of a plurality of application processor modules 212 while routing data flow associated with another virtual network to another of the plurality of application processor modules 212. Alternatively, virtualization of network security may facilitate optimizing utilization of a flow processing facility 102 by routing data flow from a plurality of virtual networks to one application processor module 212. Routing may be provided by the virtualization module 3014, the switching fabric 304, or a combination of both.

The management server 228 may provide control, configuration, and monitoring of the visualization module 3014 and/or the flow processing facility 102 such that virtual networks 3018 may be defined and configured and security policies 3020 may be associated with the virtual networks 3018.

A flow processing facility 102 may be adapted to provide secure web-to-network connectivity to protect against threats, intrusions, and the like through the use of SSL encryption such as and without limitation the encryption included with the Internet Explorer browser. Data flows 444 passing through the flow processing facility 102 from the internet may be processed according to security policy 414 that includes SSL encryption to ensure threats are detected and preventive actions are taken. By configuring the flow processing facility 102 to provide interconnection of external resources to network resources, the network resources may be protected.

In an embodiment, the flow processing facility 102 may be configured to separate network resources from web based devices such that traffic from each web based device must pass through the flow processing facility 102 to reach the network resources. Flow processing facility 102 may be configured to support a variety of typical web based activities through an SSL connection such as shared files, email, instant messaging, and web applications.

Security policy 414 for each web based client may be separately defined and employed by the flow processing facility 102 enforcing an appropriate security policy for each client. In an example and without limitation, a web based client associated with a new employee may be only permitted to access limited functionality and resources of the network. In another example, an airport internet kiosk may be subjected to a security policy that prevents access to confidential data on the network. The flow processing facility 102 may prevent intrusion or threats detected in SSL communication from a web client from affecting the network.

Additionally a web based client that may be identified as transmitting infected or malicious data flow may be quarantined such that further data flow or new connection requests from the client will be dropped. As an example and without limitation, a web client computer that is attempting to propagate a virus over an SSL connection to a network that is detected by the flow processing facility 102, may have all further packets 402 associated with the web client dropped or directed to a security port for further analysis. Quarantining web client devices may also facilitate security patch installation such that the infected client may remain quarantined from the network resources until the patch is deemed effective. In addition to the preventive actions herein described when an intrusion attempt or threat is detected, the flow processing facility 102 may issue an alert 442 that may be separately communicated to a management server 228.

The flow processing facility 102 may also provide SSL and VPN protocol intrusion detection and prevention. Even though a VPN connection provides a means of securely connecting a web client to network web interface, such as a flow processing facility 102, the content and protocol of the VPN tunneling application may be analyzed for threats and intrusions. The VPN protocol may include IPsec with encryption, L2TP inside of IPsec, SSL with encryption, MPLS through BGP (layer 3 VPN),) and MPLS (layer 2 VPN). The flow processing facility 102 may be configured with security policy 414 such that web traffic associated with VPN tunneling applications can be analyzed for anomalies that may indicate intrusions and threats. By using the resources of the flow processor facility 102 such as the data flow processor 310, the security policy 414, and the application processor module 212, web network traffic data flowing into the flow processing facility 102 may be compared and analyzed for anomalies in the protocols disclosed herein.

The flow processing facility 102 may also be configured to provide security for web infrastructure devices such as web servers. Security policy 414 may be configured to facilitate detection of common web application threats such as buffer overflow, command injection, SQL injection, malicious code intrusions, and the like that may elude signature-based detection. Machine learning logic 314 may include self organizing maps or neural network algorithms for learning web infrastructure intrusions.

In an embodiment, the flow processing facility 102 may be embodied as a client software application further facilitating secure connection of a web based client running flow processing software embodying the functionality disclosed herein for the flow processing facility 102. In such an embodiment, the flow processing facility 102 may be used to detect and prevent spyware and malware on a client device. Additionally, a flow processing facility 102 software embodiment may perform conversion of client communication to secure SSL protocol for communicating with an enterprise network.

The flow processing facility 102 software may securely encrypt all web network traffic files such as email, attachments, cookies and passwords on the client thereby facilitating preventing sensitive information on the client from being viewed or stolen from the web client. Such an application may be particularly beneficial in public use clients such as and without limitation airport internet kiosk PCs.

In another embodiment, a flow processing facility 102 may be configured to provide a secure VPN gateway for a network. The network may include servers such as Intel or AMD based servers running Linux or an equivalent OS that has been adapted to integrate network security with the flow processing facility 102. This may provide the benefit of facilitating scalable, fault-tolerant, network security using industry-standard dynamic routing protocols such as IGRP, EIGRP, BGP, OSPF, RIPv1 and RIPv2, and multicast protocols such as IGMP, PIM-DM, and PIM-SM, SRM, RMTP, MTP-2, RAMP, TMTP, LORAX, SCE, RMP, and NTE. Such a configuration may provide load sharing of resources within a flow processing facility 102 as well as across a plurality of flow processing facilities 102. In an example and without limitation, one or more flow processing facilities 102 may be configured in this embodiment such that when any one facility 102 or a module within a flow processing facility 102 fails, the data flows 444 associated with the failure are immediately routed to other facilities 102 or modules such that the network does not become victim to a "ripple effect" or other interruption.

A flow processing facility 102 may be adapted to provide network security to protect against internal threats such as worms, denial of service, email-borne malware, and the like. Data flows 444 passing through the flow processing facility 102 may be processed to ensure such threats are detected and preventive actions are taken. By configuring the flow processing facility 102 to provide interconnection of internal network resources, the resources that are interconnected by the flow processing facility 102 may be protected.

In an embodiment, the flow processing facility 102 may be configured to provide network traffic separation between one or more segments of the network such that each segment's network traffic must pass through the resources of the flow processing facility 102 to reach another segment. Flow processing facility 102 may be configured in bridge mode, switch mode, or router mode to provide effective segmentation. In such a configuration, at least some of the network resources on a segment share security policy as it may be employed in the flow processing facility 102.

A security policy for each segment may be separately defined and employed by the flow processing facility 102 enabling segments with critical network resources to enforce a stricter security policy than segments with less critical resources. The flow processing facility 102 may prevent intrusion or threats detected in one segment from affecting other segments of the network. Segmentation may be physical with each segment connecting to a different port on the flow processing facility 102, or it may be logical based on IP address or other network device property. As an example and without limitation, each segment may be connected to a different network processor module 210 of the flow processing facility 102 and each network processor module 210 may be configured with different data flow 444 control parameters.

Additionally, a network client such as a server or user computer that may be identified as transmitting infected or malicious data flow may be quarantined through dynamic reconfiguration of a segment into logical zones. As an example, a user computer that is attempting to propagate a virus over the network that is detected by the flow processing facility 102, may have all further packets 402 associated with the user computer MAC address dropped or directed to a security port for further analysis. Quarantining and logically separating client devices may also facilitate security and software patch installation such that the infected client computer may remain quarantined from other network resources until the patch is deemed effective. If a client device or segment traffic is determined to contain an intrusion or threat, flow processing facility 102 may take preventive actions and/or may issue an alert 442.

The flow processing facility 102 may also provide protocol intrusion detection and protection. In an example, network protocols such as CIFS, DCOM, MS RPC, MS SQL, and so on may be analyzed for anomalies that could indicate an intrusion or threat. Flow processing facility 102 may also provide protection of protocols such as Citrix ICA, CDE RPC, HTTP, Sun RPC, and so on. By using the resources of the flow processor facility 102 such as the data flow processor 310, the security policy 414, and the application processor module 212, data flowing into the flow processing facility 102 may be compared and analyzed for anomalies in the protocols disclosed here and any other network protocol that may be represented by packets 402.

The flow processing facility 102 may also be configured to provide security for web infrastructure devices such as web servers. Security policy 414 may be configured to facilitate detection of common web application threats such as buffer overflow, command injection, SQL injection, malicious code intrusions, and so on that may elude signature-based detection. Machine learning logic 314 may include self organizing maps or neural network algorithms for web infrastructure intrusion detection.

An embodiment that may provide the benefit of reducing the complexity of administrative setup of rules while providing security of the network from internal sources may combine intrusion detection learning capabilities of a flow processing facility 102 with firewall functionality. Since network traffic from internal network resources may be less risky than externally generated traffic, the machine learning functionality 314 (e.g. algorithms for analyzing network traffic for anomalies based on rate) may be used to determine what is abnormal traffic through a flow processing facility or segment (virtual or physical). The security policy 414 applied to the packet and data flow 444 filtering capabilities of the firewall 514 may be automatically updated based on the anomalous patterns learned by the machine learning functionality 314. This may result in the firewall being directed to drop packets associated with a flow determined to be bad without having to establish complex rule sets for network security.

Alternatively, the network conditions determined to be bad may be provided, such as through alert 442 and management sever 228, to an administrator who may manually update the firewall to filter out the newly detected intrusion or threat conditions. Such a method allows the network administrator to assess the internally detected conditions separately from externally generated threats. This may be a workable solution for some network configurations if the number of alerts 442 remains manageable without critically compromising the integrity of the network resources and data.

Content inspection may reveal details about a packet or flow of packets that cannot be determined by only examining the packet header. Content inspection may allow a determination of the nature of the data being carried in the packet. Such determination may be accomplished by matching the content of the payload to known information such as that which can be detected by regular expression matching. Details such as the source website of a packet and the type of data (e.g. audio, video, email, executable code) may allow the content to be classified and therefore more easily inspected for security threats, intrusions, extrusion, and the like. In an example and without limitation, if the payload of a packet or flow of packets is classified as a portion of an audio file (such as an MP3 file) then other packets in the associated flow may also be expected to be audio file content. If evidence provided by further payload inspections contradicts this expectation, then a network security threat (such as and without limitation a Trojan horse) may be present in what originally appeared to be an audio file.

By the nature of how packets in a packet switching network relate to the layers of communication protocol in such a network (e.g. internet IP stack layers), packet payloads associated with one level may include both header and payload information for another level. Therefore facilitating content inspection at one layer may require performing inspection of packet header and payload information for another layer. In an example and without limitation, facilitating content inspection at the network layer may require performing inspection of packet header and payload information for the application layer. In this example, to the extent that the protocols and data constructions associated with the application layer may be substantially more complex than those associated with the network layer, an inspection platform, such as the flow processing facility 102, may be needed for efficient, effective network security.

Content inspection may also be performed using behavioral anomaly detection techniques. By evaluating packet payload content, time-history behavioral metrics of the content may be developed. As behavioral metrics of each new packet or flow of packets are developed and compared to the time-history metrics, critical aberrations may be detected, which may indicate an intrusion or threat to the network security. While developing broadly based behavioral metrics for use in content inspection may facilitate network security, applying behavioral anomaly detection techniques that are based on the content associated with a protocol layer may facilitate detection of additional threats or intrusions not detectable at a broad level. Elements of a flow processing facility 102 may facilitate developing and/or calculating metrics and detecting behavioral anomalies for the content of packets in a variety of protocol communication layers.

Content inspection may be performed by a computing facility connected to a network when the packets that comprise network traffic are directed to the computing facility for content inspection. The computing facility may perform content inspection by applying content matching and behavioral analysis algorithms implemented in software, firmware, or hardware. The computing facility may comprise a general purpose processor (e.g. a COTS processor herein described) that may execute software embodying methods for inspecting the payload of packets accessed by the processor. Alternatively, the computing facility may comprise a special purpose processor providing flow processing resources to efficiently perform processing of network traffic packets. Programmable or special purpose hardware such an FPGA, programmable logic device, ASIC, and so forth may be configured as a packet processing engine for executing these methods, in hardware, on network traffic.

The flow processing facility 102 herein described may comprise one or more of a general purpose processor, a special purpose processor, and programmable hardware, and the like and therefore may facilitate content inspection. As herein described, the application processor module 212 of the flow processing facility 102 may comprise one or more application processing units 502 that, in an embodiment, encompass a COTS processor. Software encompassing the content inspection methods for performing content matching and/or behavioral anomaly detection may be embodied in the applications 512 as herein described. Therefore, the applications 512 of software containing the content inspection methods may be uploaded, stored, and/or built into the application processing unit 502. As the application processing units 502 may be a COTS processor, the content inspection software may be compiled into a native format compatible with the COTS processor prior to being uploaded. The management server 228 may facilitate compiling and uploading the content inspection software to the application processing unit 502 of the flow processing facility 102.

Content inspection software may make use of the application accelerator 504 of the flow processing facility 102 such that network traffic being inspected may maintain a satisfactory throughput rate. When the content inspection software is compiled (for example and without limitation, by the management server 228) for the flow processing facility 102, aspects of the software may be directed toward the application accelerator 504. In embodiments, FPGA code may be generated for programming the application accelerator 504. The management server 228 may profile the execution of the content sensing software in order to identify a critical section that is computationally intensive. This critical section may be dynamically programmed into the application accelerator 504 FPGA to provide an accelerated execution of the critical section and may result in improved network performance or improved packet payload inspection.

The flow processing facility 102 may include a network processing module 210 that may also play a critical role in content inspection. Network traffic passing through flow processing facility 102 physical network interface 302 may pass into the data flow engine 308 where each packet may be further processed by resources such as the data flow processor 310 and cell router 410. Data flow processor 310 may process packets to determine behavioral metrics of packet payload using the machine learning logic 314 and machine learning acceleration hardware 318. The data flow processor 310 may be programmed to distinguish among the various protocol layers that may be present in a packet payload such that the payload associated with a packet associated with a protocol layer may be analyzed for behavior related to the protocol layer. In this way, the payload of a packet identified as a network layer protocol packet (based on the packet header information) may be inspected by the data flow processor 310 such that any transport layer packets or application layer packets found within the network layer packet payload can be distinguished for behavioral analysis. The data flow processor 310 may be preconfigured to analyze the behavior of one or more protocol layer packets. Alternatively, the data flow processor 310 may be configured to perform content inspection of any one or any plurality of different protocol layer packets. The data flow processor 310 configuration may be performed through the management server 228 as herein described. The data flow processor 310 may execute a program that may be installed through the management server 228. Such a program may be a compiled output in a native format for the data flow processor 310. The program may be provided to the management server 228 for compilation or it may be precompiled by another network computing facility before delivery to the management server 228. The server 228 may install the program into the network processor module 210 for execution by the data flow processor 310.

Machine learning acceleration hardware 318 may also be preconfigured to provide acceleration of behavioral analysis computations and processing, or it may be configured through the management server 228. As herein described, the machine learning acceleration hardware 318 may be an FPGA or similar programmable logic that may be configured to perform any of a number of machine learning acceleration functions. In an example and without limitation, the flow processing facility 102 may include a plurality of network processing modules 210, each containing a data flow processor 310 and a machine learning acceleration hardware 318. Each machine learning acceleration hardware 318 may be an FPGA that may be loaded with logic to analyze a subset of possible protocol layer packet payloads. Therefore a packet may be directed to one or more of the plurality of network processing modules 210 of the flow processing facility 102 based on the content of the packet payload.

The content search logic 312 may be used to facilitate content matching of packet payloads. This logic 312 may perform hardware based regular expression matching of packet payloads using one or more of the techniques herein described as associated with the content search logic 312. The content search logic 312 may coordinate with other resources of the data flow engine 308 such as the cell generator 404 to facilitate content matching across multiple packets. Content searching logic 312 may perform content matching based on one or more action rules 450 or security policy 414.

Referring again to FIG. 31, network security may be performed at the network layer 3114 although it will be appreciated from the present disclosure that there are advantages to performing network security at the application layer 3110. In particular, it will be appreciated that content inspection of application layer 3110 packets may reveal intrusions or threats to a network that are not detectable at a lower protocol layer.

The flow processing facility 102 may facilitate content inspection as applied in a unified threat management application targeting the network layer. In addition to detecting abnormalities in a network layer packet header, content inspection of a network layer packet payload may reveal problems that can be addressed by the UTM application. In an example, the content search logic 312 of the flow processing facility 102 may be used to inspect the payload of a network layer packet to detect strings that may match a form of invalid application layer packet header. A network layer packet with such a violation may be acted upon by the UTM application to prevent the packet from reaching the network, and any and all connection or data flow 444 associated with the packet may be terminated or dropped.

Another form of intrusion that may not be detectable by network security methods that inspect only packet headers is a computer virus. Packets may contain malicious code, HTTP links, and other data that may be associated with a virus. Such data may not affect the packet header and therefore may not be detectable when inspecting an application layer packet header. Such intrusions may be detected with content inspection as facilitated by the flow processing facility 102. As described herein, the flow processing facility 102 may process packets such that resources of the network processor module 210 and the application processor module 212 may be used to inspect packet payloads. In this way, flow processing facility 102 resources such as the content search logic 312 may be configured to compare a payload against a wide variety of threats. Likewise cell router 410 may apply security policy 414 and payload action rule 454 to determine if a cell contains or is associated with a packet that appears to include a threat. If so, the cell router 310 may respond by routing the cell (or the data flow 444 that is associated with the cell) to an appropriate application processor module 212 for further processing. By applying action rule 454, the cell router 410 may, in embodiments, identify cells that appear to contain or be associated with packets that harbor or are themselves associated with a computer virus. In any case, the elements of the application processor module 212, such as and without limitation the application processing unit 502, may further inspect the content. This further inspection may be directed at identifying content that may be associated with a computer virus and taking an appropriate action (such as and without limitation, dropping the packet). It will be appreciated that any and all forms of intrusion, misuse, abuse, undesirable or illegal conduct, and so forth may be detected, processed, and remedied according to the systems and methods described in this paragraph, this disclosure, and elsewhere.

In an example, the payload action rule 454 may direct the cell router 410 in routing any and all cells that are associated with a protected system resource (such as and without limitation a database) to the application processor module 212. The application processing unit 502 may inspect the payload of one or more packets 402 of the cells to determine if the system resource reference is threatened by the contents of the payload. Without limitation, such a threat may be associated with accessing, modifying, enabling, disabling, impairing, or otherwise affecting the system resource.

Additionally or alternatively, content inspection may be applied to an anti-spam campaign at a network level such as at the border of a network and the internet. The flow processing facility 102 may be used to determine patterns associated with normal border traffic coming into the network such as email traffic. These patterns may be determined by routing packets through the data flow processor 310 for behavioral analysis. By applying the behavioral analysis methods and techniques herein described to packets containing email, the flow processing facility 102 may detect email that may be a spam email. In an example, internet email traffic to each recipient on the network may be analyzed for patterns associated with the source of the email (i.e.: the sender). When spam email begins being delivered to one or more of the recipients, the sender pattern may change in a critical way that is detectable by the data flow processor 310 or other resources of the flow processing facility 102. Because this determination may be performed at the border of the network, the security policy 414 may provide for remedies such as dropping the entire spam email or flagging the packets associated with the spam, such that when they are delivered to the network mail server they can be efficiently routed to a spam folder. By applying anti-spam techniques such as behavioral based content inspection with the flow processing facility 102 to all packets passing through a network border, other communication applications such as instant messaging and faxing may also be protected from spam.

Content inspection as performed by the flow processing facility 102 may provide intrusion detection and prevention services that seek to match content and assess behavior at a plurality of network levels. As an example and without limitation, a flow processing facility 102 may include a plurality of application processor modules 212 with each module 212 configured to detect intrusions in packet payloads at a specific network layer. One module 212 may be configured to match packet 402 payload contents to known intrusions at the network layer, while another may be configured to match packet 402 payload contents to known intrusions at the application layer. These or other application processor modules 212 may also analyze the behavior of packet payloads at the network and application layer respectively. The switching fabric 304 of the flow processing facility 102 may switch packets through each application processor module 212 serially or in parallel to provide intrusion detection and prevention at the plurality of protocol layers. By applying the packets to each application processor module 212, the flow processing facility 102 may determine that the packet 402 or flow of related packets 402 may have both a network layer content matching violation and an application layer behavioral anomaly. Such information may be used to improve network security and performance.

Identifying threats from internal network resources (laptop computers and other mobile computing devices represent known sources of internal network threats) may also be facilitated by inspecting packet payload content with the flow processing facility 102. Network behavior of internal network resources may be analyzed by the machine learning logic 314 to determine metrics for normal payload content. By routing network traffic from internal network resources such as mobile computing devices through the flow processing facility 102, anomalies in the patterns generated by the payload contents may be detected. As an example and without limitation, when a mobile computing device synchronizes with a network resource such as an email server or database server, patterns of packet payload at the network layer may be readily established. If the packet 402 payload patterns during synchronization differ critically from the pattern predicted by the behavioral analysis, the flow processing facility 102 may detect the difference and take protective action such as quarantining the device.

Additionally or alternatively, the security policy 414 of the network may identify certain types of data to be protected when traveling in packet payloads over the network. Certain types of data, such as social security numbers, may be identified in the security policy 414 as being restricted to certain destinations on the network. The security policy 414 may, for example and without limitation, dictate that a social security number must be encrypted in a specific way to be transmitted out of the network. By using the flow processing facility 102 to inspect content of outgoing packet 402 payloads, unencrypted social security data may be detected by the content search logic 312 or cell router 410 applying the security policy 414.

Behavioral analysis of packet 402 payloads may not only detect anomalies in the payloads at various protocol layers, but may also provide an analysis of behavior of the network that may be beneficial in increasing network security. As the flow processing facility 102 detects anomalies in packet 402 payloads, the routing information associated with the packets, such as the source, destination, route taken, and the like may be determined and analyzed for patterns. By associating packet payloads that fail content inspection (content matching or behavioral analysis) with the network routing information, behaviors of the network may be determined and used to detect troublesome network activity. In an example and without limitation, a segment of a network, such as a manufacturing segment containing critical product information, may be associated with a low occurrence of intrusions. If the intrusion rate from the manufacturing segment changes significantly, the flow processing facility 102 may issue an alert 442. The alert 442 may direct external suppliers who connect to the manufacturing segment to provide an updated compliance report for the security of their networks as they may be introducing intrusions or threats that are being detected by the flow processing facility 102 within the manufacturing segment. Such network behavioral analysis (NBA) and network behavioral anomaly detection (NBAD) may be performed by the flow processing facility 102 as each new threat is detected, thereby providing an early alert 442 of the network behavioral anomaly.

A network security infrastructure may include a Security Event Information Management system that may be represented by a variety of acronyms such as SEIM, SIM, SEM, and SIEM to provide central logging for security events. Security events such as the manufacturing segment example described above may be communicated from the flow processing facility 102 to the management server 228 that may maintain the SEIM. Alternatively, the management server 228 or the flow processing facility 102 may send the event information to another server maintaining the SEIM. In this way, even if the flow processing facility 102 were to encounter a failure, the event information would be retained by the management 228 or other server.

Payload inspection may also detect network behavioral anomalies that may be associated with network connections such as ports. By establishing the normal behavior of packet payloads through a port, a critical change in the behavior detected by analyzing the payloads (such as an increase in the size of payloads or an increase in the number of payloads directed toward a port during a normally quite time) may indicate a network anomaly such as an intrusion. Because the machine learning logic 314 of the flow processing facility 102 may determine "normal" network activity for the port for various times, such as times of day or days of week, critical changes in the activity as determined by the inspection of packet payloads through the port can be detected by the flow processing facility 102 and action taken such as alerting the management server 228 to close the port.

Machine learning logic 314 and the associated machine learning acceleration hardware 318 may apply any or all of the techniques and methods herein disclosed such as self-organizing maps, neural networks, and others in analyzing the behavior of packet 402 payloads. These techniques may facilitate establishing behavioral criteria associated with content inspection of packet 402 payloads processed by the flow processing facility 102 independent of the protocol layer at which the packet payload is processed. The techniques and methods herein disclosed along with embodiments of the data flow processor 310 may allow the flow processing facility 102 to acquire the behavioral criteria into artificial neurons that may allow for implementation of behavioral anomaly detection in hardware such as the machine learning hardware accelerator 318, the cell router 410, or the application accelerator 504. The result may be near real-time detection of network behavioral anomalies based on content inspection without relying on queries of databases of 'normal' behavior.

Content inspection, when applied across the layers of the IP stack, may constitute a unification of a variety of threat management capabilities from network layer firewalls to application layer data security. Unified Threat Management (UTM) as herein described may be facilitated by the techniques, methods, features, and systems herein described for applying the flow processing facility 102 to content inspection. In addition to packet header based behavioral analysis and matching by the flow processing facility 102, content matching may be applied to detect threats within payloads, threats affecting protocols, intrusions passing through ports, and attacks on system resources. The flow processing facility 102 can be configured in a network to inspect content such that threats within payloads that can be detected by content matching can be prevented. Threats that compromise the integrity of one or more network protocols may be detected by the flow processing facility 102 through content matching of packets associated with the protocol. The network processor module 210 elements and application processor module 212 resources may be applied to network traffic to detect protocol compromising packet payloads as the packets flow through the flow processing facility 102 (substantially in real-time). Network traffic associated with a port may be monitored by the flow processing facility 102 with content inspection to ensure any payload destined for the port (or originating in the port) does not include threats, viruses, spam, or other intrusions detectable by applying content matching. With appropriate security policy 414 defined in the flow processing facility 102, system resources such as system files, user passwords, NMS, NEMS, and other key resources may be protected from attack by applying content matching to network traffic packet payloads. The resources of the flow processing facility 102 such as the network processor module 210 elements (e.g. the data flow engine 308, the data flow processor 310, the content search logic 312, the machine learning logic 314, and/or the machine learning acceleration hardware 318) and the application processor module 212 elements (e.g. the application processing unit 502, and/or in the application accelerator 504) may be configured as herein described to provide a unified threat management solution covering packet header and payload inspection.

A network infrastructure may include a Network Management System (NMS) which may include a Network Element Management System (NEMS) responsible for the management of at least a portion of the network elements (such as computers, routers, hubs, network security devices, and the like). The NEMS may communicate with the management server 228 and or the flow processing facility 102 to provide network management services. The management server 228 may provide network security related metrics gathered from one or more flow processing facilities 102 to the NEMS for further analysis or presentation to a network administrator. In an example and without limitation, a roll-out campaign for content inspection may be proceeding with two flow processing facilities 102 operating in parallel on the same network traffic wherein one flow processing facility 102 is not inspecting content and the other is inspecting content. The NEMS may receive a comparison of the threat and intrusion detection metrics for the two flow processing facilities 102. The management server 228 may communicate with the NEMS throughout the campaign, receiving updates to security policy 414, new compilation of programs to be loaded into the flow processing facility 102 for the application processing unit 502, and the like.

In embodiments, the flow processing facility 102 and flow processor 310 may be used to process data flows 444 that potentially contain computer viruses, Trojan horses, or similar content. In embodiments, one or more actions related to threat management, such as virus detection and cleaning may be embodied in the flow processing facility 102 of the flow processor 310, as illustrated by examples to follow. In particular, a data flow 444 may be processed by the flow processing facility 102 or flow processor 310 to identify patterns in the data flow 444, such as by using a set of artificial neurons, such as a neural network or the self-organizing maps described above. Patterns in the data flow 444 may be recognized that are relevant to identification of a wide range of threats to the network, including the threats managed by anti-virus applications. Thus, as described above and in any of the embodiments described herein, the flow processing facility 102 may be configured to identify, and take action with respect to, data flows 444 that contain patterns that suggest the existence of various types of threats, including viruses, as well as Trojan horses and other vehicles for carrying viruses. In embodiments, the data flow processor 310 described herein may also include content search logic 312, which may explicitly implement pattern recognition using regular expressions (in one preferred embodiment the pattern recognition is embodied by an optimization of the Aho-Corasick algorithm). Thus, pattern recognition, in certain preferred embodiments, may consist of applying a set of artificial neurons such as a SOM or neural net, processing an output of the set of artificial neurons (e.g., the fingerprint 448), and performing a regular expression pattern match on packets of the data flow 444, or any combination or sub-combination of the same.

The flow processor 310 may thus be configured, applying the pattern matching techniques described above, to assist with matching patterns associated with viruses and other similar types of threats.

In certain embodiments, pattern matching may be implemented with respect to patterns associated with a computer virus. A computer virus as the term is used herein encompasses any software program, file, computer code, or the like that may infect, damage, or otherwise threaten files, system areas of a computer, network routers, and other computer components or resources, such as through what is commonly referred to as a virus vector. Some viruses may be harmless, while others may damage data files, destroy files, interrupt networking, and or inflict other damage to a computer or network. Some viruses may be designed to deliberately damage files, and others may simply spread to other computers without damaging files (e.g., a viral propagation of a message that is intended to obtain as many viewers of the message as possible). Computer virus vectors of infection may include network shares, software vulnerabilities, mass-mailers, worms, internet relay chat, shared drives, instant messages, infected files, peer-to-peer networks, physical drives, removable drives, floppy drives, spammed email, wireless (e.g., Bluetooth), and other infection vectors. Some computer viruses may require a user action (e.g., opening an email attachment or visiting a malicious web page) to implement or spread. Other viruses may not require direct user action (e.g., exploitation of a network's vulnerability to outside access).

In certain embodiments, pattern matching may be implemented with respect to patterns associated with a Trojan horse program. A Trojan horse program (sometimes also referred to as "social engineering") is a type of virus, or other potentially damaging program, that is embedded, joined, linked, or otherwise associated with a computer program or file that masks the presence of the virus to the user. A Trojan horse may be a program that purports to do one action (e.g., an mpeg file ostensibly containing a video for viewing), when in fact, it has as one of its actions instructions for performing a malicious action on, or using, a computer or network. Trojan horses may be included, for example, in software downloads, as attachments in email messages, or other file types. Because the user downloading a Trojan horse may not know of its presence, this type of "back door" program may allow intruders access to the user's computer without the user's knowledge. Through this access, the intruder may be able to change the computer's system configurations, or infect the computer with a virus, or take other actions that are unauthorized by the user. Some Trojan horse programs may not require the user of a computer to directly download a file (e.g., an email attachment) in order for the virus to have access to the computer. If a user's email client permits scripting, it may be possible for a Trojan horse (and its accompanying virus) to load on the user's computer by opening an email message alone. A Trojan program may also employ the technique of providing an URL link or download link in order to place unwanted files onto a computer directly, via a network (e.g., the Internet). This technique may place an added burden on a user's computer insofar as it may enable an intruder to return to the computer to update the virus.

In one example, from many, of a Trojan horse-based virus may come in the form of an email attachment unknowingly downloaded by a computer user and used to launch a denial-of-service attack. This type of attack may cause a computer problems by giving it so many processing instructions that the computer is overwhelmed by the data processing volume to such an extent that it crashes or is otherwise not fully operable. A computer may be a direct target of a denial-of-service attack or it may be used as a participant in a denial-of-service attack on another system, such as a server hosting a website targeted by the intruder. Intruders may use security compromised computers as platforms for attacking other systems. In an example, in a distributed denial-of-service attack the intruders may install an agent, such as a Trojan horse program, that runs on the compromised computer. Once the Trojan horse program is installed on the computer, the intruder may issue further instructions to the computer for it to carry out actions, unbeknownst to the user of the computer. Once the intruder has marshaled a sufficient number of agent computers for a planned attack, he may assign a handler computer through which instructions for a denial-of-service attack may be forwarded to the agent computers.

In certain embodiments, pattern matching may be implemented with respect to patterns associated with a worm. A worm is another type of computer virus that may spread from computer to computer without users' direct interaction with the computer virus program. Worms may take up valuable memory and network bandwidth, which may cause a computer to stop responding. Worms may also allow attackers to gain access to your computer remotely. Worm creators may use binary packers to compress the executable files associated with viruses, thus making them easier to distribute. The packing process also modifies the internal structure of a file, which worm creators may use to their benefit. Binary packers may be used to distribute a worm file that is capable of changing, masked by dozens of different packers. The capability of a worm to change may permit a virus to have greater longevity, as the virus may be altered to circumvent security measures taken to combat the virus' first incarnation upon its introduction.

In certain embodiments, pattern matching may be implemented with respect to patterns associated with a virus that is targeted to impact a particular operating system. Some computer viruses are specifically targeted to impact a type of computer, computer operating system, or other computer feature. In an example and without limitation, unprotected Microsoft Windows networking shares may be exploited by intruders through automation and used to place tools on Microsoft Windows-based computers that are connected to the Internet. Because site security on the Internet or other network may be interdependent, a compromised computer may not only create problems for that computer's user, but it may also be a threat to other computers, or other locations on a network. Similarly, programming languages, such as Java, JavaScript, ActiveX, and others, that allow web developers to write code that is executed by a web browser may be used by intruders to gather information (such as visited web sites) or to run malicious code on your computer.

In certain embodiments, pattern matching may be implemented with respect to patterns associated with items sent over a network, such as to a web site. A virus creator may attach a script to something sent to the web site, such as a URL, an element in a form, or a database inquiry. Later, when the web site responds to a user, the malicious script may be transferred to the user's browser. A computer, computer network, or other network device or network may be exposed to malicious scripts by a user linking to web pages, opening email messages, or newsgroup postings, and the like without knowing that the action is actually linking them to an untrustworthy site.

In certain embodiments, pattern matching may be implemented with respect to patterns associated with a various other types of computer viruses and the means for their delivery, including, without limitation, email spoofing, hidden text file extensions, chat clients, packet sniffing, root kits, bots, and other means of virus delivery.

In certain embodiments, pattern matching may be implemented with respect to patterns associated with email spoofing. Email spoofing refers to the technique of making an email message appears to have originated from one source when it actually was sent from another. Email spoofing may be intended, for example, to instill in the user a false sense of trust in order to successfully prompt the user into providing the intruder with sensitive information (e.g., passwords or financial information). In an example and without limitation, an email may claim to be from a system administrator requesting a user to change a password to a specified string and threatening to suspend their account if they do not comply. Similarly, an email spoof that is from an authority figure that is requesting user to send a password file or other sensitive information.

In certain embodiments, pattern matching may be implemented with respect to patterns associated with a hidden file extension. Microsoft Windows operating systems contain an option to "hide file extensions for known file types". The option may be enabled by default, but a user may choose to disable this option in order to have file extensions displayed by Windows. Email-borne viruses may exploit these hidden file extensions. In an example and without limitation, a file attached to an email message sent by such a virus may appear to be harmless text (.txt), MPEG (.mpg), AVI (.avi) or other file types, when in fact the file is a malicious script or executable (e.g., .vbs or .exe).

In certain embodiments, pattern matching may be implemented with respect to patterns associated with exploitation of Internet chat applications, instant messaging applications, Internet Relay Chat networks, and the like, which provide a mechanism for bi-directional data exchange between computers that may be exploited by a computer virus or other damaging code or file. Chat clients may provide the ability to exchange executable code. This ability may permit an intruder to employ methods described herein, such as a Trojan horse or spoofing, to present computer virus and the like to unsuspecting users for download.

In certain embodiments, pattern matching may be implemented with respect to patterns associated with a packet-sniffer. A packet sniffer is a computer program designed to capture data from information packets traveling over the network. The data from these packets may include user names, passwords, and other sensitive information traveling over the network. The ability to install a packet sniffer may not require administrator-level access. Thus, an intruder may be able to employ a packet sniffer to capture such sensitive information for further exploitation (e.g., using a stolen password to access a user's online bank account).

In certain embodiments, pattern matching may be implemented with respect to patterns associated with a rootkit. Rootkits are another type of viral program and may be employed in order to intercept specific Application Programmer's Interface (API) functions in such a way that the information returned by API functions is untrue. A rootkit may use techniques to gain command of a registry database, process lists, and the like, in part for the purpose of masking the presence of viral programs running on the computer, network, or other system. The rootkit may also be able to mask the registry keys it has modified to further minimize detection.

The limitations of the traditional means of controlling and or preventing viruses through, for example, a stand alone antivirus software application may be seen in the example of rootkits. Because of the detection shield provided by a rootkit, conventional antivirus software may be unable to detect its presence on a computer, computer network, or other network. This failure to detect the virus may permit it to remain on a computer, computer network, or other network where it may continue to perform unwanted and or harmful actions. Furthermore, even in instances where a stand alone software application may be effective in detecting and or removing an unwanted or harmful file, the application may remain cumbersome in its implementation. In an example and without limitation, the application may require individualized installation on each client within a network; the application may require frequent updates to be downloaded on each client with a network; differences in client characteristics (e.g., processor speed) may require different antivirus applications to be downloaded on a subset of clients with in a network, different antivirus applications may contain different libraries of viruses for which they scan, resulting in variation of protection levels across the clients within a network, and so forth.

In embodiments, a flow processing facility 102 or flow processor 310 may secure a computer, computer network, or other network from a virus that is carried by or associated with a data flow 444. In certain embodiments, the flow processing facility 102 may receive the data flow 444 and associate the flow 444 with one or more of a plurality of anti-virus applications 522, which may reside in one or more of a plurality of application processor modules 212. In other embodiments, the flow processing facility 102 may incorporate or provide anti-virus actions, or it may itself be incorporated into one or more anti-virus applications. In an example and without limitation, in certain embodiments a data flow 444 from a public network 202 or private network 204 may be received by a flow processing facility 102 and handled by the flow processor 310 to produce normalized data 428 from the data flow 444. A data cell 408 of the received data flow 444 may indicate the presence of a computer program. This data cell 408 may optionally be routed through a cell router 410 to an application processor module 212. The application processor module 212 may include an antivirus program that may be used to analyze the data cell 408 for the presence of a virus or other type of threat described herein. After the application processor module 212 has analyzed the data cell 408 containing the computer program, the data cell 408 may be routed back through the cell router 410. If the application processor module 212 determines the presence of a virus or other suspicious code, the cell router 410 may route the data cell 408 to a quarantine facility, at which point the processing of the data cell 408 is done 420. Alternatively, the cell router 410 may check the data cell 408 against an application ID 412, application group 422, or other identifier 430 or security policy 414 in order to determine the appropriate future routing of the data cell 408 (e.g., whether the data cell, and the program therein, is safe for further processing). This flow processing facility architecture may be used to detect viruses, including, but not limited to, associated with network shares, software vulnerabilities, mass-mailers, worms, internet relay chat, shared drives, instant messages, infected files, peer-to-peer networks, physical drives, removable drives, floppy drives, spammed email, wireless (e.g., Bluetooth), and other infection vectors. This flow processing facility architecture may be used to analyze virus vectors, including, but not limited to, Trojan horses, Windows networking shares, worms, scripts, email spoofing, hidden text file extensions, chat clients, packet sniffing, root kits, bots, and other means of virus delivery.

In embodiments, machine learning may be used to create a self organizing map capable of detecting anomalies in a data flow 444 for securing a computer, computer network, or other network from viruses. In an example and without limitation, a data flow 444 from a public network 202 or private network 204 may be received by a data flow processor 310. The data flow processor 310 may include machine learning acceleration hardware 318, machine learning logic 314, content search logic 312, and the like, that may be used to generate a self organizing map or neural network that may identify anomalies in the packets 402 associated with the data flow 444. In embodiments, the flow processor 310 may produce normalized data 428 for further processing and security analysis. For instance and without limitation, the normalized data 428 produced by the flow processor 310 through the use of the self organizing map may be further associated with a normalized data type 424, an application group 422 or application ID 412, other identifiers 430, and or a security policy 414 in order to determine the appropriate future routing of the data cell 408 (e.g., whether the data cell, and the program therein, is safe for further processing). An anomalous data flow 444 that may be detected by a self organizing map may include, but is not limited to, a data flow 444 from an unknown source, a data flow 444 from a new source, a data flow 444 from an infrequent source, a data flow 444 containing a file type rarely or never received, a data flow 444 containing a file type rarely or never received from a particular source, a data flow 444 exceeding a size, a data flow 444 from an application group 422, a data flow 444 from a targeted application ID 412, a data flow 444 for a targeted host, a data flow 444 from a targeted host type, a data flow 444 from a targeted host location, a data flow 444 including a programming language type, a data flow 444 containing a targeted text, and or any other data flow 444 indicator or combination of a plurality of data flow 444 indicators.

This artificial neuron approach, optionally embodied in a self organizing map architecture or neural net, may be used to detect viruses, including, but not limited to, ones associated with network shares, software vulnerabilities, mass-mailers, worms, internet relay chat, shared drives, instant messages, infected files, peer-to-peer networks, physical drives, removable drives, floppy drives, spammed email, wireless (e.g., Bluetooth), and other infection vectors. This flow processing facility architecture may be used to analyze virus vectors, including, but not limited to, Trojan horses, Windows networking shares, worms, scripts, email spoofing, hidden text file extensions, chat clients, packet sniffing, root kits, bots, and other means of virus delivery.

In embodiments, a flow processing facility 102 may secure a computer, computer network, or other network from a virus that is carried by or associated with a data flow 444 from a targeted user. A targeted user may be, but is not limited to, an individual, entity, customer, source, and the like. The flow processing facility 102 may receive the targeted user's data flow 444 and associate the flow 444 with one or more of a plurality of anti-virus applications 522, which may reside in one or more of a plurality of application processor modules 212. In an example and without limitation, a targeted user's data flow 444 may be received from a public network 202 or private network 204 by a flow processing facility 102 enabled to produce normalized data 428 from the target user's data flow 444. A data cell 408 of the received data flow 444 may indicate the presence of a computer program. This data cell 408 may be routed through a cell router 410 to an application processor module 212. The application processor module 212 may include an antivirus program that may be used to analyze the target user's data cell 408 for the presence of a virus. After the application processor module 212 has analyzed the targeted user's data cell 408 containing the computer program, the data cell 408 may be routed back through the cell router 410. If the application processor module 212 determines the targeted user's data flow 444 contains a virus or other suspicious code, the cell router 410 may route the data cell 408 to a quarantine facility, at which point the processing of the data cell 408 is done 420. Alternatively, the cell router 410 may further check the targeted user's data cell 408 against other identifiers 430, security policies 414, and the like in order to determine the appropriate future routing of the user's data cell 408. Once the targeted user's normalized data 428 has been determined to be free of viruses it may be routed to a packet generator 418 for forwarding on to a network (e.g., a physical network interface 302).

In embodiments, machine learning may be used to create a self organizing map capable of detecting anomalies in a targeted user's data flow 444 for securing a computer, computer network, or other network from viruses. In an example and without limitation, a targeted user's data flow 444 may be received from a public network 202 or private network 204 by a data flow processor 310. The data flow processor 310 may include machine learning acceleration hardware 318, machine learning logic 314, content search logic 312, and the like, that may be used to generate a self organizing map associated with the targeted user. The self organizing map may be able to identify anomalies in the packets 402 associated with the targeted user's data flow 444, and produce normalized data 428 for further processing and security analysis. For instance and without limitation, the targeted user's data flow 444 may be anomalous in that it exceeds the data format associated with the user. The normalized data 428 produced through the use of the self organizing map may be further associated with a normalized data type 424, an application group 422, other identifiers 430, and/or a security policy 414 in order to determine the appropriate future routing of the targeted user's data cell 408 (e.g., whether the data cell, and the program therein, is safe for further processing). Once the targeted user's normalized data 428 has been determined to be free of viruses it may be routed to a packet generator 418 for forwarding on to a network (e.g., a physical network interface 302).

In embodiments, a flow processing facility 102 may secure a computer, computer network, or other network from a virus that is carried by or associated with a data flow 444 from a targeted host. A targeted host may be, but is not limited to, a server, network host, ISP, entity, and the like. The flow processing facility 102 may receive the targeted host's data flow 444 and associate the flow 444 with one or more of a plurality of anti-virus applications 522, which may reside in one or more of a plurality of application processor modules 212. In an example and without limitation, a targeted host's data flow 444 may be received from a public network 202 or private network 204 by a flow processing facility 102 enabled to produce normalized data 428 from the target host's data flow 444. A data cell 408 of the received data flow 444 may indicate the presence of a computer program. This data cell 408 may be routed through a cell router 410 to an application processor module 212. The application processor module 212 may include an antivirus program that may be used to analyze the target host's data cell 408 for the presence of a virus. After the application processor module 212 has analyzed the targeted host's data cell 408 containing the computer program, the data cell 408 may be routed back through the cell router 410. If the application processor module 212 determines the targeted host's data flow 444 contains a virus or other suspicious code, the cell router 410 may route the data cell 408 to a quarantine facility, at which point the processing of the data cell 408 is done 420. Alternatively, the cell router 410 may further check the targeted user's data cell 408 against other identifiers 430, security policies 414, and the like in order to determine the appropriate future routing of the host's data cell 408. Once the targeted host's normalized data 428 has been determined to be free of viruses it may be routed to a packet generator 418 for forwarding on to a network (e.g., a physical network interface 302).

In embodiments, machine learning may be used to create a self organizing map capable of detecting anomalies in a targeted host's data flow 444 for securing a computer, computer network, or other network from viruses. In an example and without limitation, a targeted host's data flow 444 may be received from a public network 202 or private network 204 by a data flow processor 310. The data flow processor 310 may include machine learning acceleration hardware 318, machine learning logic 314, content search logic 312, and the like, that may be used to generate a self organizing map associated with the targeted host. The self organizing map may be able to identify anomalies in the packets 402 associated with the targeted host's data flow 444, and produce normalized data 428 for further processing and security analysis. For instance and without limitation, the targeted host's data flow 444 may be anomalous in that the source of the data flow 444 is other than that associated with the host in the self organizing map. The normalized data 428 produced through the use of the self organizing map may be further associated with a normalized data type 424, an application group 422, other identifiers 430, and/or a security policy 414 in order to determine the appropriate future routing of the targeted host's data cell 408 (e.g., whether the data cell, and the program therein, is safe for further processing). Once the targeted host's normalized data 428 has been determined to be free of viruses it may be routed to a packet generator 418 for forwarding on to a network (e.g., a physical network interface 302).

In embodiments, a flow processing facility 102 may secure a computer, computer network, or other network from a virus that is carried by or associated with a data flow 444 from a targeted application type. A targeted application type may be, but is not limited to, an email application, Java application, Bluetooth application, open source application, and the like. The flow processing facility 102 may receive the targeted application data flow 444 and associate the flow 444 with one or more of a plurality of anti-virus applications 522, which may reside in one or more of a plurality of application processor modules 212. In an example and without limitation, a targeted application data flow 444 may be received from a public network 202 or private network 204 by a flow processing facility 102 enabled to produce normalized data 428 from the target application data flow 444. A data cell 408 of the received data flow 444 may indicate the presence of a computer program made by the targeted application type. This data cell 408 may be routed through a cell router 410 to an application processor module 212. The application processor module 212 may include an antivirus program that may be used to analyze the target application data cell 408 for the presence of a virus. After the application processor module 212 has analyzed the targeted application data cell 408 it may be routed back through the cell router 410. If the application processor module 212 determines the targeted application data flow 444 contains a virus or other suspicious code, the cell router 410 may route the data cell 408 to a quarantine facility, at which point the processing of the data cell 408 is done 420. Alternatively, the cell router 410 may further check the targeted application data cell 408 against other identifiers 430, security policies 414, and the like in order to determine the appropriate future routing of the application data cell 408. Once the targeted application normalized data 428 has been determined to be free of viruses it may be routed to a packet generator 418 for forwarding on to a network (e.g., a physical network interface 302).

In embodiments, machine learning may be used to create a self organizing map capable of detecting anomalies in a data flow 444 from a targeted application type for securing a computer, computer network, or other network from viruses. In an example and without limitation, a targeted application data flow 444 may be received from a public network 202 or private network 204 by a data flow processor 310. The data flow processor 310 may include machine learning acceleration hardware 318, machine learning logic 314, content search logic 312, and the like, that may be used to generate a self organizing map associated with the targeted application type. The self organizing map may be able to identify anomalies in the packets 402 associated with the targeted application data flow 444, and produce normalized data 428 for further processing and security analysis. For instance and without limitation, a targeted application data flow 444 may be a data flow associated with the Java application type. A Java application type data flow 444 may be anomalous in that it contains non-standard Java code, embedded code, code type hybrids, and so forth. The normalized data 428 produced through the use of the self organizing map may be further associated with a normalized data type 424, an application group 422, other identifiers 430, and or a security policy 414 in order to determine the appropriate future routing of the targeted application data cell 408 (e.g., whether the data cell, and the program therein, is safe for further processing). Once the targeted application normalized data 428 has been determined to be free of viruses it may be routed to a packet generator 418 for forwarding on to a network (e.g., a physical network interface 302).

In embodiments, a flow processing facility 102 may secure a computer, computer network, or other network from a virus that is carried by or associated with a data flow 444 from a targeted file type. A targeted file type may be, but is not limited to, an email, executable file, .jpeg, .mpeg, and the like. The flow processing facility 102 may receive the targeted file data flow 444 and associate the flow 444 with one or more of a plurality of anti-virus applications 522, which may reside in one or more of a plurality of application processor modules 212. In an example and without limitation, a targeted file data flow 444 may be received from a public network 202 or private network 204 by a flow processing facility 102 enabled to produce normalized data 428 from the target file data flow 444. A data cell 408 of the received data flow 444 may indicate the presence of a computer program with the targeted file type. This data cell 408 may be routed through a cell router 410 to an application processor module 212. The application processor module 212 may include an antivirus program that may be used to analyze the target file data cell 408 for the presence of a virus. After the application processor module 212 has analyzed the targeted file data cell 408 it may be routed back through the cell router 410. If the application processor module 212 determines the targeted file data flow 444 contains a virus or other suspicious code, the cell router 410 may route the data cell 408 to a quarantine facility, at which point the processing of the data cell 408 is done 420. Alternatively, the cell router 410 may further check the targeted file data cell 408 against other identifiers 430, security policies 414, and the like in order to determine the appropriate future routing of the targeted file data cell 408. Once the targeted file normalized data 428 has been determined to be free of viruses it may be routed to a packet generator 418 for forwarding on to a network (e.g., a physical network interface 302).

In embodiments, machine learning may be used to create a self organizing map capable of detecting anomalies in a data flow 444 from a targeted file type for securing a computer, computer network, or other network from viruses. In an example and without limitation, a targeted file data flow 444 may be received from a public network 202 or private network 204 by a data flow processor 310. The data flow processor 310 may include machine learning acceleration hardware 318, machine learning logic 314, content search logic 312, and the like, that may be used to generate a self organizing map associated with the targeted file type. The self organizing map may be able to identify anomalies in the packets 402 associated with the targeted file data flow 444, and produce normalized data 428 for further processing and security analysis. For instance and without limitation, a targeted file data flow 444 may be a data flow associated with an email file type. An email file data flow 444 may be anomalous in that it contains an executable file, .jpeg, or other code. The normalized data 428 produced through the use of the self organizing map may be further associated with a normalized data type 424, an application group 422, other identifiers 430, and/or a security policy 414 in order to determine the appropriate future routing of the targeted file data cell 408 (e.g., whether the data cell is safe for further processing). Once the targeted file normalized data 428 has been determined to be free of viruses it may be routed to a packet generator 418 for forwarding on to a network (e.g., a physical network interface 302).

All of the elements of the flow processing facility 102 and related anti-virus features may be depicted throughout the figures with respect to logical boundaries between the elements. According to software or hardware engineering practices, the modules that are depicted may in fact be implemented as individual modules. However, the modules may also be implemented in a more monolithic fashion, with logical boundaries not so clearly defined in the source code, object code, hardware logic, or hardware modules that implement the modules. All such implementations are within the scope of the present disclosure.

The flow processing facility 102 may provide a service generally associated with a network firewall; may be incorporated in a network file; and/or may be associated with a network firewall. A self-organizing map or other machine learning logic 314 may, respectively, detect an anomalous data flow 444 and process the data flow 444 to check for and, perhaps, remedy network attacks or threats, which may include intentional or unintentional malformations of the data flow 444, repetitions in the data flow 444, multiple transmissions of the data flow 444, and so forth. A firewall application 514 may process a data flow 444 (including its packet headers and/or payloads), checking its data cells 408 for known attacks, malformed headers, suspicious payloads, and so forth. The firewall application 514 may or may not provide stateful inspection of the data cells 408. The firewall application 514 may allow, deny, or modify the data flow 444, as appropriate and as is described in greater detail hereinafter. The firewall application 514 may employ content inspection.

It will be appreciated that using a self-organizing map to provide anomaly detection on the data flow 444 may provide advantages. In an example and without limitation, the flow processing facility 102 may direct only anomalous data flows 444 to the firewall application 514. Since any and all data flows 444 that are not anomalous might not be directed to the firewall application 514, computing resources are conserved as compared with a system in which all of the data flows 444 are directed to the firewall application 514. Moreover, the self-organizing map may be trained on recent data flows 444, so that its representation of what is and is not anomalous may be relatively current. This may be important since network conditions such as throughput, inter-arrival times, and other factors may change dramatically over time. Thus, the flow processing facility 102 may be capable of accurately classifying data flows 444 as anomalous, even in the face of changing network conditions. Many other advantages will be apparent.

A firewall may refer to a system or group of systems comprising one or more software programs and/or hardware devices that, when integrated into a networked environment 100, implement one or more measures to detect, prohibit, circumscribe, and/or otherwise limit communications that are disallowed, such as and without limitation by a reference network security policy 414. Such a policy 414 may consist of information concerning the conditions (if any) under which a facility that is interacting with a network may be granted to access to and/or from network resources, facilities, services, devices, and the like. A networked environment 100 may be composed of one or more computers (such as and without limitation the server computing facilities 108) that may be operatively coupled to one or more computers via a data communication system, which may consist of the internetwork 104, the flow processing facility 102, and so forth.

The term "network firewall" may be used interchangeably with the terms "packet filter" and "border security device", but formally may refer to one or more systems, devices, or combinations thereof that control access to and from a network by examining elements of a data flow 444 that may be associated with a layer of a protocol stack, which may consist of an OSI-compliant protocol stack, an Internet protocol stack, or any other protocol stack. In embodiments, the network firewall may be directed at the network layer of a OSI-compliant protocol stack (Layer 3), which may encompass TCP/IP. In any case, the communication may consist of packets 402 that may originate from and/or may be directed to facilities within the a protected network, application, service, or other element of a networked computing environment 100. The network firewall may inspect and filter a packet 402 or associated data cell 408 according to a criterion or rule 450, which may be associated with one or more access policies. This rule 450 may factor such Layer 3 components as source and destination addresses, port access information, other semaphore elements, and so forth.

The term "network firewall" may refer to one or more system or devices that control access to and/of from clients and resources within a network by examining the network-level components of a layered communication protocol (where these components may reside in Layer 3 of the OSI communication model). An "application-layer firewall" may examine the payload of a packet 402 or associated data cell 408 and may be directed at elements above Layer 3 and particularly at elements associated with Layer 7, the application layer. An application-layer firewall may process and respond to a data flow 444 and associated packets 402 or data cells 408 according to a different set of criteria than a network firewall. Examples of application-layer firewalls include, but are not limited to, anti-virus facilities, anti-spam programs, pop-up blockers, and other such content-based, behavior-based, anomaly-based, flow-based, rule-based, or other data flow 444 processing facilities.

A network firewall may be operated in parallel to or in series with an application-layer firewall. When deployed in this way, the network firewall may comprise a component in a Unified Threat Management (UTM) system, which may include an application-layer firewall and/or any and all other security facilities. In a parallel configuration, a packet 402 or groups of packets 402 (or one or more data cells 408 associated therewith) that are in violation of a network-layer security policy (which may be an instance of the security policy 414) may be routed to an plurality of adjunctive facilities (such as and without limitation a plurality of applications 512) for further, parallel examination or processing. In a series configuration, either the network firewall or the application-layer firewall (the order of the cascade may vary) may first process a packet 402 or associated data cell 408 and then route it to the succeeding stage. Finally, a network firewalls may be operated in a standalone fashion; that is, operated without any parallel systems or adjunctive facilities.

One aim of firewall protection may be to shield a computer or network from a communication or data flow 444 that would be harmful to that computer or network. The subject data flow 444 may originate from a public network 202, a private network 204, a server computing facility 108, an internetwork 104, a computing facility that is associated with one or more of the foregoing, and so forth. A network firewall may examine the structure, formation, source, destination, or other such element of associated with a data flow 444. This examination may be directed at detecting communications that, if allowed to pass unhindered through the network firewall, may impair the proper operation of a network that is operatively coupled to the network firewall and/or a computing facility that is operatively coupled to the network and/or network firewall. Such an impairment may, without limitation, include damage to or degradation of a service provided by the network; corruption or disruption of processes within the computing facility; corruption of and/or damage to data within the network or computing facility; breach or compromise of confidentiality or integrity of the network, the computing facility, data transmitted through the network, data stored in the computing facility; and so forth.

A network firewall may provide protection from many types of attacks, some of which may be intentional and malicious, some of which may be the result of a malfunctioning or rogue facility. Any and all of these attacks may attempt to create a disruption by one or more of these techniques selected from the following group of techniques: consume resources used in data communication (such as bandwidth, disk space, or CPU time); intentionally mangling or otherwise manipulating configuration information related to network communication (such as routing information); creating a disruption of physical network components; and so forth.

In an example and without limitation, a denial-of-service (DoS) attack may comprise a malicious or intentional communication attack against which a network firewall may provide protection. One kind of DoS attack is referred to in the art as flooding. Flooding may consist of a brute force attempt to monopolize network and/or computational resources by submitting a large number of packets 402 to a destination with the intent of overwhelming a computing facility at the destination and causing a disruption. Flooding may use one or more elements in the network layer to initiate, introduce, or reinforce the disruption.

An example of flooding is known in the art as a "SYN flood," which may generate a flurry of TCP SYN packets 402—where a SYN packet 402 may be a synchronization packet 402 for requesting a TCP connection—from an invalid sender address. An unprotected target facility that interprets these packets 402 as being valid requests to initiate TCP connections would open a connection with the source of the packet, returning an acknowledgement (a TCP/SYN-ACK packet 402). However, since the source address is invalid, no response would be forthcoming. As a result, a large number of unresolved connections may remain oven on the target facility, consuming system resources so as to impair the ability of the target facility to responding to legitimate requests. Other examples of flooding may consist of a SYN flood and other techniques, such as "ping flooding" in a distributed manner or other so-called distributed, denial-of-service attacks (DDoS) wherein multiple computing facilities mount a more or less simultaneous attack on one or more targets.

A "smurf" attack is another example of a DoS flooding attack. In this case, a client within a network is co-opted and floods other clients on that network with packets 402 (which are made to carry the address of the co-opted client as the source) using a broadcast address of the network as the destination. The other clients may monitor the broadcast address in addition to their own unique address. In a variation of this attack, a banana attack uses a co-opted client to generate packets 402 (typically ICMP packets) with that client's own address as the destination, thereby consuming network bandwidth and routing resources. A further variation of the smurf attack is called a "fraggle" attack, which uses the echo facility of UDP to flood the broadcast address of a network, using either an invalid or co-opted source address.

Another kind of attack may be referred to in the art as a "nuke" attack. In this case, a malicious resource sends a damaged or malformed packet to a target (often via ICMP) that is directed at exploiting a weakness in the operating system of the target. In one example, a "bomb" may be addressed to a certain logical network port of a target computing facility and may contain invalid information that, when received, may cause the target to crash, to operate in an impaired mode or fashion, or to impair another computing facility. In one example, unrelated logical network ports that are otherwise available for other services may be blocked or changed. Some types of nukes are directed at a server to which other computers may attach: when a malicious packet is received at the server, the server may not be able to service requests from its clients or may return nonsensical or harmful data.

One variation of the nuke attack may be known in the art as a "teardrop" attack. Here, a malicious source may exploits a bug in an older Windows system by sending fragments that are spread across packets with overlapping payloads. The design of the packets may induce the system into incorrectly reassembling the fragments, causing the system to crash.

Other attacks may use an element of the network layer inappropriately or out-of-context. In one case, a packet 402 may be transmitted to a destination facility wherein an URG flag within the packet may be set. The URG flag may be a TCP flag signaling that that packet 402 is to be processed immediately. A queuing operation of the destination facility may be impaired or otherwise affected by such a packet 402.

A firewall may be configured in a variety of ways, including (but not limited to) a system that provides protection for a local area network (LAN); a system that is deployed by an ISP and that provides Internet access to subscribers, computing facilities, networks, and so forth; an individual computing facility that access a network facility; and so forth.

In the preferred embodiment, a network firewall may monitor a data flow 444 consisting of one or more IP-based data packets 402. In alternate embodiments, the network firewall may monitor any and all other communication structures that may be overlaid above a link layer such as Ethernet. These protocols may include (but are limited to) IP; TCP/IP; UDP/IP; IPSec; SSH; SCP/SSH; DHCP; BGP; SMTP; ICMP; NNTP; NTP; LDAP; IGMP; RTTP; ARP; and so on.

It will be appreciated that network attacks may be randomized and/or permuted in ways that may be directed at avoiding detection by a network firewall. For this reason, security policies in a network firewall may require a need to be dynamic, adaptive, and/or updated on a regular basis to keep pace with new attacks and new variations of older ones.

In embodiments, a flow processing facility 102 may protect a computing facility and/or network facility from a network attack by examining a data flow 444 that is received from a public network 202 and/or from a private network 204. The flow processing facility 102 may comprise one or more application modules 512, which themselves may encompass one or more firewall applications 514. The firewall applications 514 may be associated with one more applications 512, which may be co-resident in the application modules 512.

In embodiments, the network processor module 210 may receive a data flow 444 through any of the physical interfaces 302 as described hereinabove with reference to FIG. 3. The data flow 444 may then be provided to a data flow engine 308. There, a data packet 402 that is associated with the data flow 444 may be presented to a cell generator 404 or other formatting stage, which may transform the packet 402 into a data cell 408 for presentation to a cell router 410. Additionally, portions of the packet 402 that may relate to the firewall application 514 may be processed into normalized data 428. Furthermore, an application identifier 412 of the firewall application 514 may be associated with the data packet 402. The cell router 410 may consider this application identifier 412 when determining where to route a data cell 408 that is associated with the packet 402.

In embodiments, a data flow 444 that contains an IP SYN may be received by a flow processing facility 102 from a public network 202 or private network 204. In an example and without limitation, the IP SYN may encompass a request by a client computing facility within Eng Dept 110 and to which a reply, in accordance with TCP, may be in order. The data flow processor 310 may communicate an application identifier 412 to the cell router 410, wherein the identifier 412 may be associated with a packet 402 of the data flow 444 that contains the SYN. The cell router, in light of the application identifier 412, may direct one or more data cells 408 that are associated with the packet 402 to one or more instances of a firewall application 514. These instances of the firewall application 514 may analyze the SYN request that may be within data cells 408 for the presence of anomalous, repetitious, and/or malformed data that may indicate that the SYN request is malicious or erroneous. The presence of repeated SYN requests over a short period of time from the same address may be indicative that SYN flooding attack is underway.

The flow processing facility 102 may include one or more firewall applications 514, which may be used, as described throughout this document, to protect against network attacks including (but not limited to) DoS attacks and their variants, DDoS attacks and their variants, bombs, nukes, and other such attacks wherein one or more packets 402 are intentionally or unintentionally malformed, sequenced, repeated, damaged, mangled, or otherwise directed at producing an ill effect on a computing facility or network facility.

In embodiments, the methods and systems disclosed herein may provide a flow processing facility for processing a data flow, and configuring the flow processing facility to recognize patterns in the data flow based at least in part on learning (e.g., artificial neurons, an SOM-based neural net, and the like).

In embodiments, the data flow processor 310 may incorporate unified threat management functionalities that are relevant to identifying threats of disparate types, including threats relevant to intrusion detection, intrusion protection, anti-virus protection, anti-spyware protection, and anti-spam protection, as well as other types of threats, such as related to phishing or unauthorized use of computer network resources. In other embodiments, the data flow processor 310 may be incorporated within a unified threat management application such that the data flow processor 310 functionality is one of a plurality of functionalities provided by the unified threat management application. In other embodiments, the data flow processor 310 may be independent from, but associated with, a unified threat management application such that the identification of disparate threat types described above herein is provided by the data flow processor 310 in conjunction with an independent unified threat management application, or the like.

In embodiments, an indication suggestive of an attack may be detected by a machine learning logic 312, such as and without limitation a self-organizing map. The machine learning logic 314 and/or parameters thereof may be generated by one or more components of a data flow engine 308, may be imported from another machine learning logic 314, may be the result of a machine-learning algorithm, or may result from a combination of the foregoing. In embodiments, elements or parameters of a self-organizing map may be updated, refreshed, or otherwise modified, on a continuing or discrete basis, by a machine-learning algorithm, which may or may not reside in the data flow engine 308. Alternatively or additionally, the self-organizing map or a process associated with it may import or otherwise obtain adjunctive, additional, or revised elements or parameters from another self-organizing map. The self-organizing map may also be updated, refreshed, and/or otherwise modified, on a continuing or discrete basis, by co-resident modules (and/or by processes associated with such co-resident modules). In an example and without limitation, an anti-virus application 522 may pass an alert to or otherwise inform a resident firewall application 512 that it has identified a data flow 444 as carrying malicious code. Such an alert may include relevant elements of (and/or information about) the data cells 408 or data packets 402 that are associated with the malicious code.

The firewall application 512 may identify an anomalous activity within a data flow 444 by detecting the degree to which (or, the number of number of times that) the data flow 444 maps to an artificial neuron in the self organizing map. It will be appreciated that the machine learning logic 314 or self-organizing map may detect an anomaly that emerges over time and that may not be evident in a single event, packet 403, or cell 408. When such an anomaly is detected, it may be indicated in the normalized data 428, which may be associated with an application identification 412 and a security policy 414, either or both of which may be associated with directing the cell router 410 to transmit any and all data cells 408 that are associated with the anomaly to an instance of the firewall application 514. The firewall application 514 may examine these data cells 408, either on line or off line, to determine whether or not the detected anomaly represents a correct detection. If it does, the firewall application 514 may take an action, such as modifying or dropping one or more of the data cell 408, so that no harm or ill effect is brought upon a computing facility or network facility by the data cell 408.

The anomaly may derive from, but may not be limited to, a data flow 444 from an unknown source or to an unknown destination; a data flow 444 from a new infrequent source; a data flow 444 to a new or infrequent destination; a data flow 444 with or without any of the foregoing source and destination combinations; a data flow 444 that contains an IP flag, function, or other semaphore that may be associated with a particular attack; a data flow 444 that contains a flag, function, or other semaphore is rarely or never before received; a data flow 444 containing a component that is rarely or never before received from a particular source; a data flow 444 that is malformed or damaged; a data flow 444 that is addressed to or from a particular location; a data flow 444 that is addressed to one or more ports on a computing facility or network facility that are associated with an attack; and so forth.

In an example and without limitation, one or more self-organizing maps may have been trained to detect the emergence of a fraggle attack. In this attack, a UDP/IP packet 402 may be sent from a source to a destination computing facility. The packet 402 may comprise a request that the target computing facility "echo" the packet. The packet 402 may be transmitted using the broadcast address of the network within which the target resides. A security policy 414 may specify, generally, whether such a request should be allowed to pass through the data flow engine 308. However, some requests of this type may be valid (there are valid communications that use UDP/IP echoing) so simply prohibiting this type of communication may not be desirable. Instead, each and every packet 402 that is received by the data flow engine 308 may be mapped to a feature vector. These feature vectors may themselves be mapped to artificial neurons within a self-organizing map. A detection threshold may be set for some or all of the artificial neurons of the self-organizing map. If the number of feature vectors that map to a particular neuron exceeds the detection threshold for that neuron then the data flow 444 may be flagged as anomalous. If a security policy 414 that is associated with the data flow 444 indicates that such an anomaly is cause for further processing, and if an application identifier 412 associated with the data flow refers to a firewall application 514, then from that point and until the data flow 444 is no longer flagged as anomalous, any and all of the data cells 408 associated with the data flow 444 may be routed by the cell router 410 to the firewall application 514 in an application processor module 212. Depending upon a determination or action of the firewall application 514, the data flow 444 may be quarantined, dropped, modified, inhibited, allowed, denied, or otherwise controlled.

In the event that the firewall application 512 detects an attack, an alert 442 may be generated. As with other elements in a UTM environment, this alert may take the form of a data element, an electric signal, an audible or visible annunciation, a wireless signal, or a communication stream, some combination of the foregoing, and so forth. The alert 442 may also be routed to another element of the flow processing facility 102, such as another component of an application processor module 212. The alert 442 may also signal a human operator of the flow processing facility 102, and/or any other facility, program, or device that is configured to receive and process the alert 442. In the present example of a fraggle attack, an alert 442 may be passed to anti-spam application 528 so that the source address of the attack may be integrated into a database or set of references used by that application 528.

All of the elements of the flow processing facility 102 and firewall application 514 may be depicted throughout the figures with respect to logical boundaries between the elements. According to software or hardware engineering practices, the modules that are depicted may in fact be implemented as individual modules. However, the modules may also be implemented in a more monolithic fashion, with logical boundaries not so clearly defined in the source code, object code, hardware logic, or hardware modules that implement the modules. All such implementations are within the scope of the present invention.

Firewalls 514 are known to provide external access control and filtering. Embodied as a firewall 514, intrusion detection and prevention may act as a perimeter guard for a network, determining what traffic to allow or deny in and out. A firewall 514 may do this by applying a policy, which may comprise accept and deny rules, based on various criteria, such as a source, destination, and protocol. By providing access control, a firewall 514 may provide a first layer of defense to external intrusions. A firewall policy may allow protocols that enable organizations to do business on the Internet, such as SMTP, FTP, HTTP, SMTP and DNS, and may keep out some traffic that may pose a threat to the internal systems. As herein disclosed, flow processing facility 102 may include a firewall 514 application and therefore may facilitate intrusion detection and prevention.

Figure 29:
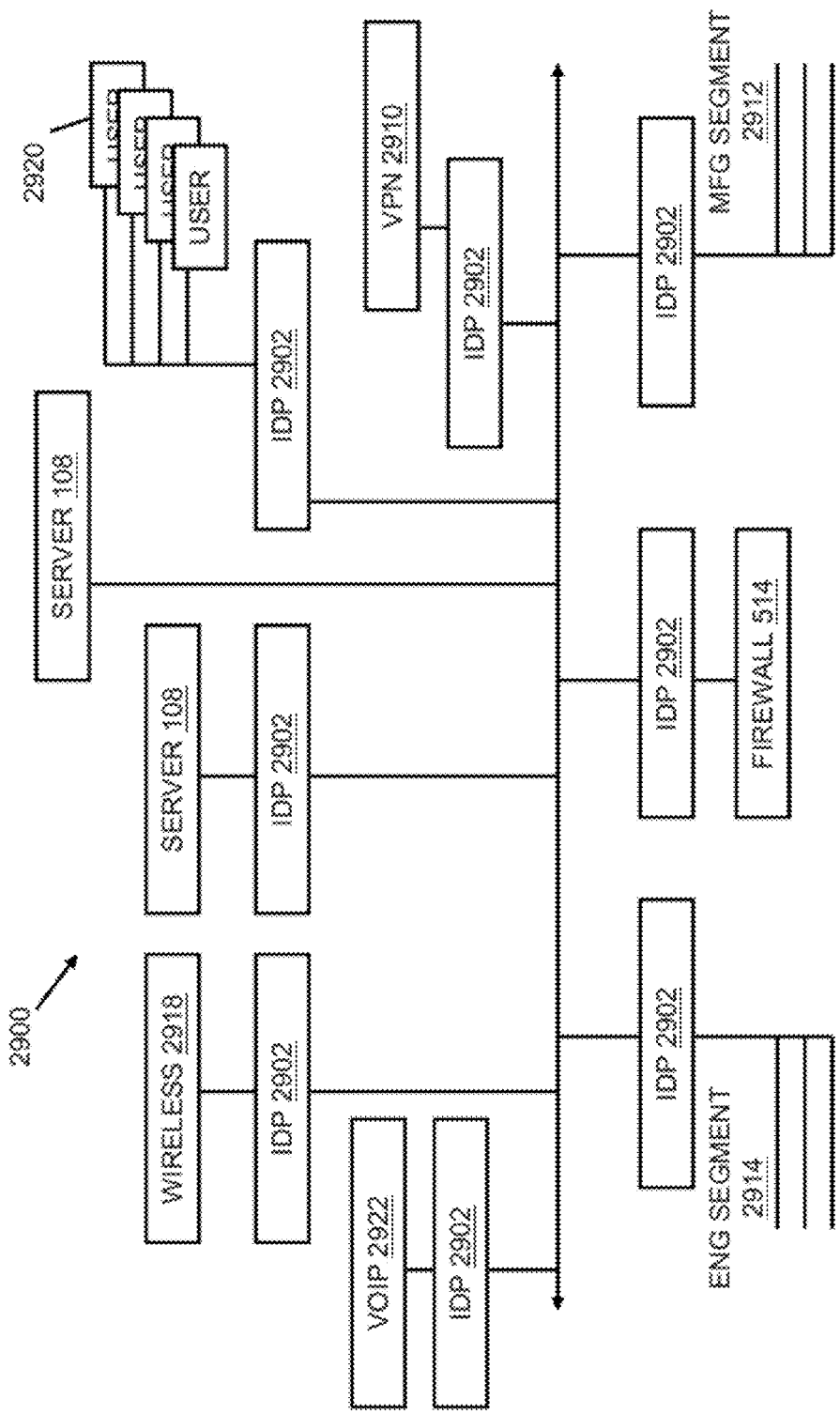
FIG. 29 depicts a computer network incorporating intrusion detection and prevention.

Referring to FIG. 29, a schematic depicting an example networked computing environment 2900 in which intrusion detection and prevention is employed; various locations of intrusion detection and prevention are shown. The network of FIG. 29 includes a firewall 514; servers 108; virtual private network port 2910; segments 2912, 2914; a wireless port 2918; users 2920; and a VoIP port 2922.

Those skilled in the art will appreciate that the example networked computing environment 2900 is simplified for pedagogical purposes. In an example and without limitation, the environment 2900 does not show the plurality of networking devices that externally connect to the firewall 514, the various hubs, routers, and switches that may comprise the networked computing operation of an actual enterprise, and so on. These simplifications are provided for the purpose of drawing attention to the intrusion detection and prevention facility 2902, which is an object of the present invention. However, given that networked computing environments 2900 can be arbitrarily complex and assume a countless number of configurations, the deployment of the intrusion detection and prevention facility 2902 is not in any way limited to the particular networked computing environment 2900 shown here.

The intrusion detection and prevention facility 2902 may be an independent platform as shown in FIG. 29. Such a facility 2902 may identify and prevent intrusions by examining network traffic through one or more connections of a network. This examination of network traffic may encompass content inspection and/or processing packet headers. Intrusion detection and prevention facility 2902 may gain access to the network traffic by interconnecting a network and a firewall 514, a segment such as eng segment 2914 or mfg segment 2912, users 2920, a virtual private network 2910, a server 108, or a wireless port 2918, and any other networked device, facility, port, hub, router, switch, and so on. In such a configuration, the intrusion detection and prevention facility 2902, also called a sensor, may capture network traffic flows for analysis of the content and packets for malicious traffic.

Intrusion detection and prevention 2902 may be configured in a flow processing facility 102 and operate in one or more modes including, without limitation hub mode, tap mode, port clustering mode, and in-line mode. In a hub mode network configuration the flow processing facility 102 may be connected to a SPAN port of a network switch device or a network hub device processing data streams in parallel to the switch or hub. In a tap mode network configuration the flow processing facility 102 may be configured in-line with network traffic yet may be functionally disabled without disrupting network traffic by allowing network traffic to passively transfer through the device. Such a mode may be appropriate for interconnection to a segment 2912. In port clustering mode a plurality of network traffic streams may be combined for intrusion analysis, detection, and prevention. Examples of port clustering shown in FIG. 29 include interconnecting users 2920, and segments 2912 and 2914. In-line mode may be similar to tap mode in that network traffic passes through the flow processing facility 102 for detection and prevention of intrusions. Unlike tap mode, in-line mode may enforce network traffic to pass through it to reach other devices on the network. In-line mode may facilitate the use of caching data streams until there is enough for data reassembly which may allow detection and prevention of intrusions not otherwise easily detected. Examples of in-line mode shown in FIG. 29 include interconnecting a firewall 514, a wireless port 2918, a server 2904, and a VPN 2910.

As embodied in flow processing facility 102, intrusion detection and prevention functionality 2902 may be configured as an application or action encompassed by unified threat management application 520. As such, intrusion detection and prevention 2902 may include one or more of a firewall related application or action, an intrusion prevention application 518 or action, and a URL filter application 524 or action.

Intrusion detection and prevention 2902 may alternatively be embodied as a function or application within a network-connected computing device such as a server 108. Such an application or software agent may monitor any and all activity of the server 108 on which it is installed, facilitating intrusion detection and prevention of such things as applications, databases, file systems, operating systems, network communication, and security policy. Intrusion detection and prevention 2902 may identify and prevent intrusions by analyzing system calls, application logs, file-system modifications (binaries, password files, capability/ac1 databases) and other sever activities and states.

Any combination of independent and application based embodiments of intrusion detection and prevention 2902 is possible within a network 2900.

As can be seen in FIG. 29, virtual private networks 2910 and wireless networks 2918 provide access to the internal network that may bypass the firewall 514. An intrusion detection and prevention facility 2902 may be effective at detecting and preventing intrusions through these network interfaces.

Intrusion detection and prevention 2902 may employ misuse type detection algorithms for detecting intrusion attempts at various levels of data flow within a network. Such algorithms may be based on known intrusions and stored in a database or table of intrusion signatures. Flow processing facility 102 may provide access to the various levels of data flow 444 such as packets 402 and may also provide access to the signatures. Application processor module 212 may process the data flows 444 and the signatures to facilitate detection of intrusion attempts.

While signature based algorithms may detect known attacks as defined in the signatures, processing logic such as the application processor module 212 may be able to adapt or combine signatures to detect new attacks which share characteristics with old attacks, e.g., accessing 'cmd.exe' via a HTTP GET request.

Intrusion detection may include the use of signatures that include knowledge of semantics of session layer and application layer data flows 444. The knowledge may be based on weighted network data flow content that is analyzed to develop the signatures.

Intrusion detection functions within intrusion detection and prevention 2902 may include monitoring and analyzing both user and system activities, analyzing system configurations and vulnerabilities, assessing system and file integrity, recognizing patterns typical of attacks, analyzing abnormal activity patterns, tracking user policy violations, address matching, HTTP string and substring matching, generic pattern matching, analyzing TCP connections, packet anomaly detection, traffic anomaly detection, and TCP/UDP port matching, and the like. Threats associated with user and system activities may include, without limitation worms, Trojans, spyware, keyloggers, and other malware, rogue servers and applications that may have been unknowingly added to the network.

Intrusion detection and prevention 2902 may employ an anomaly based technique for identifying intrusions of traffic or application content presumed to be different from 'normal' activity on the network. Anomaly-based intrusion detection and prevention 2902 configurations may achieve this with self-learning such as a self organizing map or a Kohonen map.

In anomaly detection, a system administrator may define a baseline, or normal, state of the network's traffic load, breakdown, protocol, and typical packet size. Intrusion detection and prevention 2902 may monitor network segment activity to compare it to the normal baseline and look for anomalies. Anomaly detection within intrusion detection and prevention 2902 may use network protocol analysis to detect anomalies that may indicate an intrusion.

Protocol analysis may also include low level analysis of data flows such as at the network or transport layer by looking at the behavior of well known protocols such as ARP, BGP, EGP, IGMP, IPv4, IPv6, IPX, MPLS, OSPF, RARP, RIP, XNS, IL, RTP, SPX, SCTP, TCP, IP, and ICMP. Examples of network or protocol level intrusions that may be detected by protocol analysis include TCP SYN flooding, malformed IP packets (such as an out of range IP header) or malformed browser data blocks sent to a web server.

To facilitate protocol analysis, the flow processing facility 102 may include packet arrival time stamping, packet filtering, packet triggering, and the like. In an example and without limitation, a network configuration of the flow processing facility 102 for very high speed networks like Gigabit Ethernet may include packet arrival time stamping to facilitate merging two or more data flows together for detection and prevention. This may facilitate detecting intrusions that do not sufficiently impact one flow to trigger an intrusion.

Intrusion detection and prevention 2902 may additionally or alternatively encompass a rate based intrusion protection technique. This rate based technique applied in intrusion detection and prevention 2902 may rely on learned thresholds for different parameters of network traffic. This technique may prevent denial of service attacks and distributed denial of service attacks. This technique may use a SOM or neural net algorithm in learning the traffic behavior over a period of time and adjusting thresholds on different parameters of network traffic.

In an embodiment, the machine learning logic 314 may support continuously learning network traffic patterns of data flows 444 such that a prediction may be made as to how much traffic is expected the next moment. In an example and without limitation, applying a rate based intrusion detection and prevention technique may facilitate predicting how many packets in all, how many IP packets, how many ARP packets, how many new connections/second, how many packets/connection, how many packets to a specific tcp/udp port, and so forth. Detection may activate intrusion prevention when a measured network traffic parameter is different than that predicted.

Detection of rate-intrusion may be done using the adaptive thresholds wherein the thresholds may be adjusted based on time of day, day of week, and based on past stored traffic statistics. Prevention may be done using one or more of several techniques such as those that are associated with or comprise granular rate-limiting on the specific dimension of attack; source tracking; connection tracking; dark-address filtering; network scan filtering; port scan filtering; legitimate IP address validation; and any and all other techniques that facilitate avoiding false positives.

In addition to detection and prevention, intrusion detection and prevention 2902 may provide protection against protocol anomalies, known attacks (e.g. probes, scans, backdoors), malicious code (e.g. worms, viruses, Trojans), peer-to-peer traffic and denial-of-service attacks. Intrusion detection and prevention 2902 may also enforce network flow policies and watch for suspicious connections such as IPv6 tunneling. Intrusion detection and prevention 2902 may also use a combination of signatures and behavioral heuristics to detect security threats for providing zero-day attack protection.

Content filtering may be an employed technique in intrusion detection and protection 2902 for both inbound and outbound network data flows 444. Content filtering may include signature-based filters that can be updated in real-time to facilitate guarding against newly determined threats. In addition, heuristic and artificial intelligence tools such as self organizing maps and neural-networks may be leveraged to provide content filtering against unknown (i.e. zero-day) threats. As an example and without limitation, a content filtering solution within intrusion detection and prevention 2902 may allow customization of a security policy 414 such as filtering out any outbound e-mail containing proprietary diagrams, confidentiality content, non-compliant content, or legal liability items.

Health Insurance Portability and Accountability Act (HIPAA) has set out detailed regulations on the confidentiality of patient records and keeping them safe from unauthorized use or viewing. Given the electronic nature of most patient health information, such as insurance approvals, prescription requests, and medical histories, mishandling confidential data may violate HIPPA. Content filters and other prevention techniques within intrusion detection and prevention 2902 may be configured to manage the transfer of this information securely.

Intrusion detection and prevention 2902 may include sensors deployed inline with a network connection such that the data streams that are passing through are analyzed for intrusions. Depending on the type and severity of an intrusion detected, a prevention action may be taken such as the data packets within the data stream may be dropped, or an alert may be issued, or the intrusion may simply be logged for later analysis. Another such prevention action may be to route intruding data streams to a virtual network such that all the information related to the intrusion is tracked and captured to facilitate providing forensic reports.

Intrusion detection and prevention 2902 may include alerting through a variety of electronic means such as email, system logging, snmp, logfile, SMS-external, pager, application execution, process spawning, third-party application execution, SGMS, SMS via email, console updating, instant messaging, and any other electronic signaling techniques.

While smart mobile devices (i.e. phones, PDAs, etc.) enable abundant new applications, they also increase the risk of an Internet-based security breach. As an example, a laptop that has been intruded can easily propagate malicious code of the intrusion, impacting critical business processes the next time it legitimately connects to the network. Providing intrusion detection and prevention 2902 inline with connections to these smart mobile devices may eliminate additional potential sources of intrusion.

Referring again to FIG. 29, intrusion detection and prevention 2902 may also provide solutions for voice over IP (VoIP) 2922 as it relates to a network 2900. VoIP may be vulnerable to intrusion such as hackers, attacks, worms, and vulnerabilities native to the application. These and other vulnerabilities may open the VoIP solution up to eavesdropping, identity theft, fraud and denial of service. VoIP protocols may be protected by intrusion detection and prevention 2902 through monitoring control flow such as SIP, H.225 (for H.323), and MGCP since the control flow is where the logic and policy enforcement take place. VoIP data flow or "media" such as RTP and RTCP may be subject to intrusion from a variety of sources such as exploits that target Skype, SIP, H.323, as well as vendor-specific VoIP phones. Integrating intrusion detection and prevention 2902 with VoIP may facilitate preventing most of the potential threats.

In addition to detecting VoIP control flow attacks with stateful signatures, intrusion detection and prevention 2902 may also provide protocol anomaly detection. Examples of some detectable and preventable intrusions associated with VoIP include SIP related intrusions: non-standard method, wrong version, no colon after the command, method overflow, unknown header, chunk length overflow, wrong content length, max-forwards are too big, H:225 intrusions unknown command, and no protocol ID.

Elements of the flow processing facility 102 may be depicted throughout the figures with respect to logical boundaries between the elements. According to software or hardware engineering practices, the modules depicted may be implemented as individual modules. However, the modules may also be implemented in an alternate fashion, with logical boundaries less clearly defined in the source code, object code, hardware logic, or hardware modules that implement the modules. All such implementations are within the scope of the present invention.

It will be appreciated that the various steps identified and described above may be varied, and that the order of steps may be changed to suit particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

It will be appreciated that the above processes, and steps thereof, may be realized in hardware, software, or any combination of these suitable for a particular application. The hardware may include a general purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device that may be configured to process electronic signals. It will further be appreciated that the process may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across a camera system and/or a computer in a number of ways, or all of the functionality may be integrated into a dedicated, standalone image capture device or other hardware. All such permutations and combinations are intended to fall within the scope of the present disclosure.

It will also be appreciated that means for performing the steps associated with the processes described above may include any of the hardware and/or software described above. In another aspect, each process, including individual process steps described above and combinations thereof, may be embodied in computer executable code that, when executing on one or more computing devices, performs the steps thereof.

While the invention has been disclosed in connection with certain preferred embodiments, other embodiments will be recognized by those of ordinary skill in the art, and all such variations, modifications, and substitutions are intended to fall within the scope of this disclosure. Thus, the invention is to be understood in the broadest sense allowable by law.

What is claimed is:

1. A method in a flow processing facility for securing a computer resource, comprising:
   providing a data flow processing facility comprising a plurality of network addressable data processing modules;
   receiving a data flow;
   identifying data packets associated with a subscriber profile in the data flow;
   employing a policy to make a determination, the determination indicating which of a plurality of network addresses of the plurality of network addressable data processing modules to select for first processing of the identified data packets based on at least one of the subscriber profile in the data flow and the policy;
   accessing a configuration, the configuration associating two or more processing actions with the policy;
   delivering the identified data packets to a first network addressable data processing module for executing one of the actions that are associated with the policy, the first network addressable data processing module being accessible at the network address that the determination indicates, the one of the actions modifying the data flow;
   determining a second network address of a network addressable data processing module for second processing of the identified data packets based on the configuration and at least one of the subscriber profile and the policy; and
   delivering the identified data packets from the first network address to the second network address to secure a computer resource.

2. The method of claim 1, wherein determining a second network address is performed by the network addressable data processing module for first processing of the identified data packets.

3. The method of claim 2, wherein determining a second network address is based on a result of first processing.

4. The method of claim 1, wherein delivering the identified data packets to at least one of the first network address and the second network address includes delivering the identified data packets through a network switch fabric.

5. The method of claim 1, further including processing the data packets with a first application in the network addressable data processing module identified by the first network address.

6. The method of claim 5, wherein the first application is based on the policy.

7. The method of claim 5, further including processing the data packets with a second application in the network addressable data processing module identified by the second network address.

8. The method of claim 7, wherein the second application is based on the policy.

9. The method of claim 7, wherein the second application is based in part on a result of first processing.

10. The method of claim 1, wherein identifying data packets associated with a subscriber profile is performed by a network processor module of the data flow processing facility.

11. A serial data flow processing facility to secure a computer resource, comprising:
   a plurality of network addressable data processing modules;
   a policy for applying to data packets;
   a network processor module for identifying data packets associated with a subscriber profile in a stream of data packets, determining a first network address of a network addressable data processing module of the plurality of network addressable data processing modules for first processing of the identified data packets based on at least one of the subscriber profile and the policy, and delivering the identified data packets to the first network address; and
   the network addressable data processing module at the first network address for first processing the identified data packets, determining a second network address of a network addressable data processing module of the plurality of network addressable data processing modules for second processing of the identified data packets based on at least one of the subscriber profile and the policy, and delivering data packets from the first network address to the second network address to secure a computer resource.

12. The serial data flow processing facility of claim 11, wherein determining a second network address is performed by the network addressable data processing module for first processing of the identified data packets.

13. The serial data flow processing facility of claim 12, wherein the second network address is determined based on a result of first processing.

14. The serial data flow processing facility of claim 11, further including a network switch fabric for delivering the identified data packets to at least one of the first network address and the second network address.

15. The serial data flow processing facility of claim 11, wherein the network addressable data flow processor module at the first network address includes a processor and a first application for executing by the processor for first processing the data packets.

16. The serial data flow processing facility of claim 15, wherein the first application is based on the policy.

17. The serial data flow processing facility of claim 15, wherein the network addressable data flow processor module at the second network address includes a processor and a second application for executing by the processor for second processing the data packets.

18. The serial data flow processing facility of claim 17, wherein the second application is based on the policy.

19. The serial data flow processing facility of claim 17, wherein the second application is based in part on a result of first processing.

* * * * *